(12) United States Patent
Itano et al.

(10) Patent No.: US 11,441,819 B2
(45) Date of Patent: Sep. 13, 2022

(54) REFRIGERATION CYCLE APPARATUS

(71) Applicant: DAIKIN INDUSTRIES, LTD., Osaka (JP)

(72) Inventors: Mitsushi Itano, Osaka (JP); Daisuke Karube, Osaka (JP); Yuuki Yotsumoto, Osaka (JP); Kazuhiro Takahashi, Osaka (JP); Tatsuya Takakuwa, Osaka (JP); Yuzo Komatsu, Osaka (JP); Shun Ohkubo, Osaka (JP); Tetsushi Tsuda, Osaka (JP); Takeo Abe, Osaka (JP); Yumi Toda, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 0 days.

(21) Appl. No.: 16/912,055

(22) Filed: Jun. 25, 2020

(65) Prior Publication Data

US 2020/0326101 A1 Oct. 15, 2020

Related U.S. Application Data

(63) Continuation-in-part of application No. 16/955,222, filed as application No. PCT/JP2018/046427 on Dec. 17, 2018.

(30) Foreign Application Priority Data

Dec. 18, 2017 (JP) .............................. JP2017-242183
Dec. 18, 2017 (JP) .............................. JP2017-242185
(Continued)

(51) Int. Cl.
*F25B 1/00* (2006.01)
*F25B 43/00* (2006.01)
*C09K 5/04* (2006.01)

(52) U.S. Cl.
CPC ................ *F25B 1/00* (2013.01); *C09K 5/045* (2013.01); *F25B 43/006* (2013.01);
(Continued)

(58) Field of Classification Search
CPC .. F25B 13/00; F25B 21/00; F25B 1/00; F25B 9/006; F25B 39/00; F25B 7/00;
(Continued)

(56) References Cited

U.S. PATENT DOCUMENTS 5,185,092 A 2/1993 Fukuda et al.
5,344,069 A 9/1994 Narikiyo
(Continued)

FOREIGN PATENT DOCUMENTS

AU 2001284508 3/2002
CN 1288132 3/2001
(Continued)

OTHER PUBLICATIONS

International Search Report dated Mar. 19, 2019 in International Application No. PCT/JP2018/046531.
(Continued)

*Primary Examiner* — Kun Kai Ma
(74) *Attorney, Agent, or Firm* — Wenderoth, Lind & Ponack, L.L.P.

(57) ABSTRACT

A refrigeration cycle apparatus that can improve operation efficiency when a refrigerant that contains at least 1,2-difluoroethylene is used is provided. An air conditioning apparatus 1 includes a compressor (21), an outdoor heat exchanger (23), an outdoor expansion valve (24), an indoor heat exchanger (31), and a suction injection pipe (40), and uses a refrigerant that contains at least 1,2-difluoroethylene. The suction injection pipe (40) allows a part of a refrigerant that flows toward the indoor heat exchanger (31) from the
(Continued)

outdoor heat exchanger (23) to merge with a low-pressure refrigerant that is sucked into the compressor (21).

20 Claims, 23 Drawing Sheets

(30) Foreign Application Priority Data

| Dec. 18, 2017 | (JP) | .............................. JP2017-242186 |
|---|---|---|
| Dec. 18, 2017 | (JP) | .............................. JP2017-242187 |
| Oct. 5, 2018 | (WO) | .................. PCT/JP2018/037483 |
| Oct. 17, 2018 | (WO) | .................. PCT/JP2018/038746 |
| Oct. 17, 2018 | (WO) | .................. PCT/JP2018/038747 |
| Oct. 17, 2018 | (WO) | .................. PCT/JP2018/038748 |
| Oct. 17, 2018 | (WO) | .................. PCT/JP2018/038749 |

(52) U.S. Cl.
CPC .... *C09K 2205/126* (2013.01); *C09K 2205/22* (2013.01); *F25B 2400/121* (2013.01)

(58) Field of Classification Search
CPC .......... F25B 49/02; F25B 41/00; F25B 29/02; F25B 29/003; F25B 1/04; F25B 41/40; C09K 2205/128; C09K 2205/43; C09K 2205/106; C09K 2205/122; C09K 2205/24; C09K 2205/126; C09K 2205/22; F24F 11/88; F24F 5/001; F24F 1/14; F24F 1/32; F24F 1/34; F24F 40/06; F24F 40/02

See application file for complete search history.

(56) References Cited

U.S. PATENT DOCUMENTS

| 5,851,968 | A | 12/1998 | Schnur |
|---|---|---|---|
| 6,591,631 | B1 | 7/2003 | Taira |
| 6,667,285 | B1 | 12/2003 | Kawahara et al. |
| 8,358,040 | B2 | 1/2013 | Komuro et al. |
| 10,131,827 | B2 | 11/2018 | Fukushima et al. |
| 10,883,745 | B2 | 1/2021 | Higashiiue et al. |
| 2002/0140309 | A1 | 10/2002 | Yanashima et al. |
| 2002/0193262 | A1 | 12/2002 | Kaimai et al. |
| 2004/0011062 | A1 | 1/2004 | Taira |
| 2006/0000224 | A1 | 1/2006 | Matsuoka |
| 2007/0209373 | A1 | 9/2007 | Taira et al. |
| 2008/0184723 | A1 | 8/2008 | Sato et al. |
| 2008/0184731 | A1 | 8/2008 | Sienel et al. |
| 2008/0188173 | A1 | 8/2008 | Chen et al. |
| 2009/0260382 | A1 | 10/2009 | Takeichi et al. |
| 2010/0067264 | A1 | 3/2010 | Ohashi et al. |
| 2010/0082162 | A1 | 4/2010 | Mundy et al. |
| 2010/0122545 | A1 | 5/2010 | Minor et al. |
| 2011/0108756 | A1 | 5/2011 | Tsuchiya et al. |
| 2011/0167848 | A1 | 7/2011 | Wakashima et al. |
| 2012/0260679 | A1 | 10/2012 | Huerta-Ochoa |
| 2014/0070132 | A1 | 3/2014 | Fukushima |
| 2014/0077123 | A1 | 3/2014 | Fukushima |
| 2014/0291411 | A1 | 10/2014 | Tamaki et al. |
| 2014/0314606 | A1 | 10/2014 | Maeyama et al. |
| 2014/0373569 | A1 | 12/2014 | Tsuboe et al. |
| 2015/0001981 | A1 | 1/2015 | Hattori et al. |
| 2015/0075203 | A1 | 3/2015 | Mochizuki et al. |
| 2015/0096321 | A1 | 4/2015 | Kawano et al. |
| 2015/0143841 | A1* | 5/2015 | Kawano .................. F25B 1/005 62/498 |
| 2015/0256038 | A1 | 9/2015 | Nigo et al. |
| 2015/0362199 | A1 | 12/2015 | Yumoto et al. |
| 2015/0376486 | A1 | 12/2015 | Hashimoto et al. |
| 2016/0018135 | A1 | 1/2016 | Yuzawa et al. |
| 2016/0075927 | A1 | 3/2016 | Fukushima |
| 2016/0131378 | A1 | 5/2016 | Hinokuma et al. |
| 2016/0276886 | A1 | 9/2016 | Baba et al. |
| 2016/0333241 | A1 | 11/2016 | Fukushima et al. |
| 2016/0333243 | A1 | 11/2016 | Fukushima et al. |
| 2016/0340565 | A1 | 11/2016 | Tasaka et al. |
| 2016/0348933 | A1 | 12/2016 | Takeuchi et al. |
| 2016/0355719 | A1 | 12/2016 | Fukushima et al. |
| 2017/0002245 | A1 | 1/2017 | Fukushima |
| 2017/0058172 | A1 | 3/2017 | Fukushima et al. |
| 2017/0058173 | A1 | 3/2017 | Fukushima |
| 2017/0058174 | A1 | 3/2017 | Fukushima et al. |
| 2017/0121581 | A1 | 5/2017 | Horiike et al. |
| 2017/0138642 | A1* | 5/2017 | Ueno ...................... F04B 39/00 |
| 2017/0166831 | A1 | 6/2017 | Matsumoto |
| 2017/0248328 | A1 | 8/2017 | Eskew et al. |
| 2017/0328586 | A1 | 11/2017 | Maeyama |
| 2017/0336085 | A1 | 11/2017 | Yasuo et al. |
| 2017/0338707 | A1 | 11/2017 | Shono et al. |
| 2018/0051198 | A1* | 2/2018 | Okamoto ............... C09K 5/044 |
| 2018/0094844 | A1 | 4/2018 | Suzuki |
| 2018/0138763 | A1 | 5/2018 | Nakamura et al. |
| 2018/0156217 | A1 | 6/2018 | Sakima et al. |
| 2018/0156511 | A1 | 6/2018 | Chikami et al. |
| 2018/0254676 | A1 | 9/2018 | Nigo et al. |
| 2018/0299175 | A1 | 10/2018 | Hayamizu et al. |
| 2018/0320942 | A1 | 11/2018 | Hayamizu et al. |
| 2018/0331436 | A1 | 11/2018 | Hayamizu et al. |
| 2018/0358861 | A1 | 12/2018 | Hayamizu et al. |
| 2019/0063773 | A1 | 2/2019 | Nagahashi et al. |
| 2019/0068015 | A1 | 2/2019 | Yabe et al. |
| 2019/0309963 | A1 | 10/2019 | Zaki et al. |
| 2020/0079985 | A1 | 3/2020 | Okamoto et al. |
| 2020/0321816 | A1 | 10/2020 | Watanabe |
| 2020/0325375 | A1 | 10/2020 | Kumakura et al. |
| 2020/0325376 | A1 | 10/2020 | Kumakura et al. |
| 2020/0325377 | A1 | 10/2020 | Kumakura et al. |
| 2020/0326100 | A1 | 10/2020 | Ukibune et al. |
| 2020/0326101 | A1 | 10/2020 | Itano et al. |
| 2020/0326102 | A1 | 10/2020 | Kumakura et al. |
| 2020/0326103 | A1 | 10/2020 | Kumakura et al. |
| 2020/0326105 | A1 | 10/2020 | Kumakura et al. |
| 2020/0326109 | A1 | 10/2020 | Kumakura et al. |
| 2020/0326110 | A1 | 10/2020 | Asano et al. |
| 2020/0332164 | A1 | 10/2020 | Itano et al. |
| 2020/0332166 | A1 | 10/2020 | Kumakura et al. |
| 2020/0333041 | A1 | 10/2020 | Itano et al. |
| 2020/0333054 | A1 | 10/2020 | Asano et al. |
| 2020/0347283 | A1 | 11/2020 | Itano et al. |
| 2020/0363085 | A1 | 11/2020 | Itano et al. |
| 2020/0363105 | A1 | 11/2020 | Kumakura et al. |
| 2020/0363106 | A1 | 11/2020 | Itano et al. |
| 2020/0363112 | A1 | 11/2020 | Ohtsuka et al. |
| 2020/0369934 | A1 | 11/2020 | Itano et al. |
| 2020/0385620 | A1 | 12/2020 | Itano et al. |
| 2020/0385621 | A1 | 12/2020 | Itano et al. |
| 2020/0385622 | A1 | 12/2020 | Itano et al. |
| 2020/0392387 | A1 | 12/2020 | Ohtsuka et al. |
| 2020/0392388 | A1 | 12/2020 | Itano et al. |
| 2020/0393178 | A1 | 12/2020 | Kumakura et al. |
| 2021/0018191 | A1 | 1/2021 | Itano et al. |
| 2021/0135520 | A1 | 5/2021 | Shimokawa et al. |
| 2021/0189209 | A1 | 6/2021 | Yotdumoto et al. |
| 2021/0222040 | A1 | 7/2021 | Fukushima et al. |
| 2021/0355359 | A1 | 11/2021 | Ohkubo et al. |

FOREIGN PATENT DOCUMENTS

| CN | 1447491 | 10/2003 |
|---|---|---|
| CN | 1455855 | 11/2003 |
| CN | 1723373 | 1/2006 |
| CN | 1987264 | 6/2007 |
| CN | 101235815 | 8/2008 |
| CN | 101441012 | 5/2009 |
| CN | 102401519 | 4/2012 |
| CN | 103562338 | 2/2014 |
| CN | 203704143 | 7/2014 |
| CN | 103975204 | 8/2014 |
| CN | 104094069 | 10/2014 |
| CN | 104456760 | 3/2015 |
| CN | 104578493 | 4/2015 |

(56) References Cited

FOREIGN PATENT DOCUMENTS

| | | |
|---|---|---|
| CN | 204534884 | 8/2015 |
| CN | 104903661 | 9/2015 |
| CN | 104937350 | 9/2015 |
| CN | 204648544 | 9/2015 |
| CN | 105102905 | 11/2015 |
| CN | 204943959 | 1/2016 |
| CN | 205261858 | 5/2016 |
| CN | 106029821 | 10/2016 |
| CN | 106030222 | 10/2016 |
| CN | 106062159 | 10/2016 |
| CN | 106085363 | 11/2016 |
| CN | 106103992 | 11/2016 |
| CN | 106133110 | 11/2016 |
| CN | 106414653 | 2/2017 |
| CN | 106414654 | 2/2017 |
| CN | 106415152 | 2/2017 |
| CN | 106574802 | 4/2017 |
| CN | 106661477 | 5/2017 |
| CN | 106839496 | 6/2017 |
| CN | 107110570 | 8/2017 |
| CN | 107112830 | 8/2017 |
| CN | 107429957 | 12/2017 |
| CN | 107614980 | 1/2018 |
| CN | 107925285 | 4/2018 |
| CN | 108139112 | 6/2018 |
| CN | 108431414 | 8/2018 |
| CN | 108469126 | 8/2018 |
| EP | 1 231 255 | 8/2002 |
| EP | 1 246 348 | 10/2002 |
| EP | 1 326 057 | 7/2003 |
| EP | 1 632 732 | 3/2006 |
| EP | 1 953 388 | 8/2008 |
| EP | 2 423 609 | 2/2012 |
| EP | 2 620 736 | 7/2013 |
| EP | 2 711 405 | 3/2014 |
| EP | 2 789 933 | 10/2014 |
| EP | 2 840 335 | 2/2015 |
| EP | 2 853 826 | 4/2015 |
| EP | 2 918 953 | 9/2015 |
| EP | 2 952 828 | 12/2015 |
| EP | 2 980 508 | 2/2016 |
| EP | 3 012 555 | 4/2016 |
| EP | 3 012 557 | 4/2016 |
| EP | 3 070 417 | 9/2016 |
| EP | 3 109 302 | 12/2016 |
| EP | 3 101082 | 12/2016 |
| EP | 3 115 716 | 1/2017 |
| EP | 3 121 242 | 1/2017 |
| EP | 3 128 259 | 2/2017 |
| EP | 3 147 595 | 3/2017 |
| EP | 3 153 559 | 4/2017 |
| EP | 3 153 561 | 4/2017 |
| EP | 3 170 881 | 5/2017 |
| EP | 3 222 934 | 9/2017 |
| EP | 3 249 309 | 11/2017 |
| EP | 3 299 731 | 3/2018 |
| EP | 3 358 272 | 8/2018 |
| EP | 3 358 278 | 8/2018 |
| EP | 3 399 189 | 11/2018 |
| GB | 2530915 | 4/2016 |
| JP | 51-90115 | 7/1976 |
| JP | 52-13025 | 4/1977 |
| JP | 57-198968 | 12/1982 |
| JP | 59-39790 | 3/1984 |
| JP | 62-69066 | 3/1987 |
| JP | 63-69066 | 3/1987 |
| JP | 2-4163 | 1/1990 |
| JP | 5-264070 | 10/1993 |
| JP | 5-272823 | 10/1993 |
| JP | 7-19627 | 1/1995 |
| JP | 7-190571 | 7/1995 |
| JP | 8-200273 | 8/1996 |
| JP | 08200273 A * | 8/1996 |
| JP | 10-46170 | 2/1998 |
| JP | 10-300292 | 11/1998 |
| JP | 10-309050 | 11/1998 |
| JP | 10-318564 | 12/1998 |
| JP | 11-206001 | 7/1999 |
| JP | 11-256358 | 9/1999 |
| JP | 2000-161805 | 6/2000 |
| JP | 2000-220877 | 8/2000 |
| JP | 2000-234767 | 8/2000 |
| JP | 2000-304302 | 11/2000 |
| JP | 2001-82755 | 3/2001 |
| JP | 2001-139972 | 5/2001 |
| JP | 2002-54888 | 2/2002 |
| JP | 2002-89978 | 3/2002 |
| JP | 2002-257366 | 9/2002 |
| JP | 2002-272043 | 9/2002 |
| JP | 2002-318028 | 10/2002 |
| JP | 2003-18776 | 1/2003 |
| JP | 2003-83614 | 3/2003 |
| JP | 2003-174794 | 6/2003 |
| JP | 2004-28035 | 1/2004 |
| JP | 2004-132647 | 4/2004 |
| JP | 2004-215406 | 7/2004 |
| JP | 2004-251535 | 9/2004 |
| JP | 2004-361036 | 12/2004 |
| JP | 2005-61711 | 3/2005 |
| JP | 2005-241045 | 9/2005 |
| JP | 2005-288502 | 10/2005 |
| JP | 2006-162197 | 6/2006 |
| JP | 2006-211824 | 8/2006 |
| JP | 2006-313027 | 11/2006 |
| JP | 2008-39305 | 2/2008 |
| JP | 2008-54488 | 3/2008 |
| JP | 2008-190377 | 8/2008 |
| JP | 2008-245384 | 10/2008 |
| JP | 2008-286422 | 11/2008 |
| JP | 2009-63216 | 3/2009 |
| JP | 2009-92274 | 4/2009 |
| JP | 2009-121654 | 6/2009 |
| JP | 2009-150620 | 7/2009 |
| JP | 2009-299975 | 12/2009 |
| JP | 2010-28985 | 2/2010 |
| JP | 2010-103346 | 5/2010 |
| JP | 2010-119190 | 5/2010 |
| JP | 2010-164222 | 7/2010 |
| JP | 2010-230242 | 10/2010 |
| JP | 2011-4449 | 1/2011 |
| JP | 2011-43304 | 3/2011 |
| JP | 2011-52884 | 3/2011 |
| JP | 2011-94841 | 5/2011 |
| JP | 2011-135638 | 7/2011 |
| JP | 2011-202738 | 10/2011 |
| JP | 2011-252636 | 12/2011 |
| JP | 2012-42169 | 3/2012 |
| JP | 2012-112617 | 6/2012 |
| JP | 2012-132637 | 7/2012 |
| JP | 2012-151969 | 8/2012 |
| JP | 2013-124848 | 6/2013 |
| JP | 2013-126281 | 6/2013 |
| JP | 2013-139990 | 7/2013 |
| JP | 2013-155892 | 8/2013 |
| JP | 2013-155921 | 8/2013 |
| JP | 2013-172615 | 9/2013 |
| JP | 2013-200090 | 10/2013 |
| JP | 2013-221671 | 10/2013 |
| JP | 2014-70840 | 4/2014 |
| JP | 2014-75971 | 4/2014 |
| JP | 2014-89004 | 5/2014 |
| JP | 2014-129543 | 7/2014 |
| JP | 2014-152999 | 8/2014 |
| JP | 2014-167381 | 9/2014 |
| JP | 2015-23721 | 2/2015 |
| JP | 2015-55455 | 3/2015 |
| JP | 2015-78789 | 4/2015 |
| JP | 2015-82875 | 4/2015 |
| JP | 2015-111012 | 6/2015 |
| JP | 2015-114082 | 6/2015 |
| JP | 2015-145765 | 8/2015 |
| JP | 2015-158282 | 9/2015 |
| JP | 2015-218909 | 12/2015 |
| JP | 2015-218912 | 12/2015 |

(56) References Cited

FOREIGN PATENT DOCUMENTS

| | | | | |
|---|---|---|---|---|
| JP | 2015-229767 | 12/2015 | | |
| JP | 2016-1062 | 1/2016 | | |
| JP | 2016-11423 | 1/2016 | | |
| JP | 2016-56340 | 4/2016 | | |
| JP | 2016-125808 | 7/2016 | | |
| JP | 2016-133256 | 7/2016 | | |
| JP | 2016-172869 | 9/2016 | | |
| JP | 2016-174461 | 9/2016 | | |
| JP | 2017-36861 | 2/2017 | | |
| JP | 2017-46430 | 3/2017 | | |
| JP | 2017-53285 | 3/2017 | | |
| JP | 2017-67373 | 4/2017 | | |
| JP | 2017-67428 | 4/2017 | | |
| JP | 2017-122549 | 7/2017 | | |
| JP | 2017-145975 | 8/2017 | | |
| JP | 2017-192190 | 10/2017 | | |
| JP | 2018-25377 | 2/2018 | | |
| KR | 2001-0029975 | 4/2001 | | |
| KR | 2003-0028838 | 4/2003 | | |
| KR | 10-0939609 | 10/2003 | | |
| KR | 10-2004-0075737 | 8/2004 | | |
| KR | 10-2005-0044931 | 5/2005 | | |
| KR | 10-2017-0034887 | 3/2017 | | |
| RU | 2013 156 380 | 6/2015 | | |
| TW | 20030103482 | 2/2003 | | |
| WO | 01/36571 | 5/2001 | | |
| WO | 02/23100 | 3/2002 | | |
| WO | 2009/069679 | 6/2009 | | |
| WO | 2009/093345 | 7/2009 | | |
| WO | 2012/157764 | 11/2012 | | |
| WO | 2012/157765 | 11/2012 | | |
| WO | WO-2012157765 A1 * | 11/2012 | ............. | C09K 5/045 |
| WO | 2013/084301 | 6/2013 | | |
| WO | 2013/146103 | 10/2013 | | |
| WO | 2013/146208 | 10/2013 | | |
| WO | 2013/151043 | 10/2013 | | |
| WO | 2014/045400 | 3/2014 | | |
| WO | 2014/118945 | 8/2014 | | |
| WO | 2014/119149 | 8/2014 | | |
| WO | 2014/156190 | 10/2014 | | |
| WO | 2014/203353 | 12/2014 | | |
| WO | 2014/203354 | 12/2014 | | |
| WO | 2015/071967 | 5/2015 | | |
| WO | 2015/115252 | 8/2015 | | |
| WO | 2015/125763 | 8/2015 | | |
| WO | 2015/125884 | 8/2015 | | |
| WO | 2015/136981 | 9/2015 | | |
| WO | 2015/140827 | 9/2015 | | |
| WO | 2015/141678 | 9/2015 | | |
| WO | 2015/186557 | 12/2015 | | |
| WO | 2015/186670 | 12/2015 | | |
| WO | 2016/009884 | 1/2016 | | |
| WO | 2016/017460 | 2/2016 | | |
| WO | 2016/103711 | 6/2016 | | |
| WO | 2016/104418 | 6/2016 | | |
| WO | 2016/117443 | 7/2016 | | |
| WO | 2016/157538 | 10/2016 | | |
| WO | 2016/182030 | 11/2016 | | |
| WO | 2016/190232 | 12/2016 | | |
| WO | 2017/038489 | 3/2017 | | |
| WO | 2017/056789 | 4/2017 | | |
| WO | 2017/057004 | 4/2017 | | |
| WO | 2017/115636 | 7/2017 | | |
| WO | 2017/122517 | 7/2017 | | |
| WO | 2017/195248 | 11/2017 | | |
| WO | 2019/123782 | 6/2019 | | |
| WO | 2019/123804 | 6/2019 | | |
| WO | 2019/123805 | 6/2019 | | |
| WO | 2019/123806 | 6/2019 | | |
| WO | 2019/123807 | 6/2019 | | |
| WO | 2019/124400 | 6/2019 | | |
| WO | 2019/124401 | 6/2019 | | |
| WO | 2019/124402 | 6/2019 | | |
| WO | 2019/124403 | 6/2019 | | |
| WO | 2019/124404 | 6/2019 | | |

OTHER PUBLICATIONS

International Preliminary Report on Patentability dated Jun. 23, 2020 in International Application No. PCT/JP2018/046531.
International Preliminary Report on Patentability dated Jun. 23, 2020 in International Application No. PCT/JP2018/045978.
International Search Report dated Mar. 19, 2019 in International Application No. PCT/JP2018/045978.
International Preliminary Report on Patentability dated Jun. 23, 2020 in International Application No. PCT/JP2018/046532.
International Search Report dated Feb. 12, 2019 in International Application No. PCT/JP2018/046532.
International Preliminary Report on Patentability dated Jun. 23, 2020 in International Application No. PCT/JP2018/042027.
International Search Report dated Feb. 12, 2019 in International Application No. PCT/JP2018/042027.
International Preliminary Report on Patentability dated Jun. 23, 2020 in International Application No. PCT/JP2018/042032.
International Search Report dated Feb. 19, 2019 in International Application No. PCT/JP2018/042032.
International Preliminary Report on Patentability dated Jun. 23, 2020 in International Application No. PCT/JP2018/046666.
International Search Report dated Apr. 2, 2019 in International Application No. PCT/JP2018/046666.
International Preliminary Report on Patentability dated Jun. 23, 2020 in International Application No. PCT/JP2018/045336.
International Search Report dated Feb. 19, 2019 in International Application No. PCT/JP2018/045336.
International Preliminary Report on Patentability dated Jun. 23, 2020 in International Application No. PCT/JP2018/045557.
International Search Report dated Mar. 12, 2019 in International Application No. PCT/JP2018/045557.
International Preliminary Report on Patentability dated Jun. 23, 2020 in International Application No. PCT/JP2018/046426.
International Search Report dated Feb. 19, 2019 in International Application No. PCT/JP2018/046426
International Preliminary Report on Patentability dated Jun. 23, 2020 in International Application No. PCT/JP2018/046427.
International Search Report dated Feb. 19, 2019 in International Application No. PCT/JP2018/046427.
International Preliminary Report on Patentability dated Jun. 23, 2020 in International Application No. PCT/JP2018/046428.
International Search Report dated Mar. 19, 2019 in International Application No. PCT/JP2018/046428.
International Preliminary Report on Patentability dated Jun. 23, 2020 in International Application No. PCT/JP2018/046581.
International Search Report dated Mar. 5, 2019 in International Application No. PCT/JP2018/046581.
International Preliminary Report on Patentability dated Jun. 23, 2020 in International Application No. PCT/JP2018/046630.
International Search Report dated Mar. 5, 2019 in International Application No. PCT/JP2018/046630.
International Preliminary Report on Patentability dated Jun. 23, 2020 in International Application No. PCT/JP2018/046582.
International Search Report dated Mar. 5, 2019 in International Application No. PCT/JP2018/046582.
International Preliminary Report on Patentability dated Jun. 23, 2020 in International Application No. PCT/JP2018/046631.
International Search Report dated Mar. 5, 2019 in International Application No. PCT/JP2018/046631.
International Preliminary Report on Patentability dated Jun. 23, 2020 in International Application No. PCT/JP2018/046627.
International Search Report dated Mar. 19, 2019 in International Application No. PCT/JP2018/046627.
International Preliminary Report on Patentability dated Jun. 23, 2020 in International Application No. PCT/JP2018/046628.
International Search Report dated Mar. 19, 2019 in International Application No. PCT/JP2018/046628.
International Preliminary Report on Patentability dated Jun. 23, 2020 in International Application No. PCT/JP2018/045979.
International Search Report dated Mar. 12, 2019 in International Application No. PCT/JP2018/045979

(56) References Cited

OTHER PUBLICATIONS

International Preliminary Report on Patentability dated Jun. 23, 2020 in International Application No. PCT/JP2018/046434.
International Search Report dated Feb. 19, 2019 in International Application No. PCT/JP2018/046434.
International Preliminary Report on Patentability dated Jun. 23, 2020 in International Application No. PCT/JP2018/045290.
International Search Report dated Jan. 22, 2019 in International Application No. PCT/JP2018/045290.
International Preliminary Report on Patentability dated Jun. 23, 2020 in International Application No. PCT/JP2018/045288.
International Search Report dated Jan. 22, 2019 in International Application No. PCT/JP2018/045288.
International Preliminary Report on Patentability dated Jun. 23, 2020 in International Application No. PCT/JP2018/045289.
International Search Report dated Jan. 22, 2019 in International Application No. PCT/JP2018/045289.
International Preliminary Report on Patentability dated Jun. 23, 2020 in International Application No. PCT/JP2018/046639.
International Preliminary Report on Patentability dated Jun. 23, 2020 in International Application No. PCT/JP2018/046642.
International Preliminary Report on Patentability dated Jun. 23, 2020 in International Application No. PCT/JP2018/038746.
International Preliminary Report on Patentability dated Jun. 23, 2020 in International Application No. PCT/JP2018/046643.
International Preliminary Report on Patentability dated Jun. 23, 2020 in International Application No. PCT/JP2018/038748.
International Preliminary Report on Patentability dated Jun. 23, 2020 in International Application No. PCT/JP2018/046640.
International Preliminary Report on Patentability dated Jun. 23, 2020 in International Application No. PCT/JP2018/046644.
International Preliminary Report on Patentability dated Jun. 23, 2020 in International Application No. PCT/JP2018/038749.
International Preliminary Report on Patentability dated Jun. 23, 2020 in International Application No. PCT/JP2018/037483.
International Search Report dated Feb. 19, 2019 in International Application No. PCT/JP2018/045335
International Preliminary Report on Patentability dated Jun. 23, 2020 in International Application No. PCT/JP2018/045335.
International Search Report dated Feb. 19, 2019 in International Application No. PCT/JP2018/046435.
International Preliminary Report on Patentability dated Jun. 23, 2020 in International Application No. PCT/JP2018/046435.
International Search Report dated Mar. 19, 2019 in International (PCT) Application No. PCT/JP2018/046530.
International Preliminary Report on Patentability dated Jun. 23, 2020 in International Application No. PCT/JP2018/046530.
International Search Report dated Feb. 12, 2019 in International (PCT) Application No. PCT/JP2018/046533.
International Preliminary Report on Patentability dated Jun. 23, 2020 in International Application No. PCT/JP2018/046533.
Hirahara et al., "Latest trend of alternative refrigerant: LCCP-analogy for HFO-1234yf Air Conditioners using a Simulation with R134a Properties", Refrigeration, Jan. 15, 2010, vol. 85, No. 987, pp. 15-20, with partial translation.
International Preliminary Report on Patentability dated Jun. 23, 2020 in International Application No. PCT/JP2018/038747.
International Search Report dated Mar. 12, 2019 in International (PCT) Application No. PCT/JP2018/046639.
International Search Report dated Mar. 12, 2019 in International (PCT) Application No. PCT/JP2018/046642.
International Search Report dated Dec. 18, 2018 in International (PCT) Application No. PCT/JP2018/038746.
International Search Report dated Mar. 19, 2019 in International (PCT) Application No. PCT/JP2018/046643.
International Search Report dated Dec. 18, 2018 in International (PCT) Application No. PCT/JP2018/038748.
International Search Report dated Mar. 12, 2019 in International (PCT) Application No. PCT/JP2018/046640.
International Search Report dated Mar. 19, 2019 in International (PCT) Application No. PCT/JP2018/046644.
International Search Report dated Dec. 18, 2018 in International (PCT) Application No. PCT/JP2018/038749.
International Search Report dated Dec. 18, 2018 in International (PCT) Application No. PCT/JP2018/037483
International Search Report dated Dec. 18, 2018 in International (PCT) Application No. PCT/JP2018/038747.
Summary, Collection of Papers of the 2nd Symposium on New Technologies of Refrigeration and Air Conditioning, 2nd Edition, Ding Guoliang, Ed., published by Shanghai Jiatong University Press, 2003, with Concise Explanation.

\* cited by examiner

REFRIGERATION CYCLE APPARATUS

TECHNICAL FIELD

The present disclosure relates to a refrigeration cycle apparatus.

BACKGROUND ART

Hitherto, a refrigeration cycle apparatus such as an air conditioning apparatus has frequently uses R410A as a refrigerant. R410A is a two-component mixed refrigerant containing ($CH_2F_2$; HFC-32 or R32) and pentafluoroethane ($C_2HF_5$; HFC-125 or R125), and is a near-azeotropic composition.

However, the global warming potential (GWP) of R410A is 2088, and, in recent years, due to increasing concern about global warming, R32, which is a refrigerant having a lower GWP, is being frequently used.

Therefore, for example, Patent Literature 1 (International Publication No. 2015/141678) proposes various low-GWP mixed refrigerants that can replace R410A.

SUMMARY OF THE INVENTION

Technical Problem

However, the operation efficiency of a refrigeration cycle when a refrigerant containing at least 1,2-difluoroethylene is used as a refrigerant having a sufficiently low GWP has not been considered at all up to this time.

The content of the present disclosure is based on the point above, and an object is to provide a refrigeration cycle apparatus that can improve operation efficiency when using a refrigerant containing at least 1,2-difluoroethylene.

Solution to Problem

A refrigeration cycle apparatus according to a first aspect includes a compressor, a condenser, a decompressor, an evaporator, and an injection flow path. The compressor sucks a low-pressure refrigerant from a suction flow path, compresses the refrigerant, and discharges a high-pressure refrigerant. The condenser condenses the high-pressure refrigerant discharged from the compressor. The decompressor decompresses the high-pressure refrigerant that has exited from the condenser. The evaporator evaporates the refrigerant decompressed at the decompressor. The injection flow path is at least either one of an intermediate injection flow path and a suction injection flow path. The intermediate injection flow path allows a part of a refrigerant that flows toward the evaporator from the condenser to merge with an intermediate-pressure refrigerant in the compressor. The suction injection flow path allows a part of a refrigerant that flows toward the evaporator from the condenser to merge with the low-pressure refrigerant that is sucked by the compressor. The refrigerant contains at least 1,2-difluoroethylene.

The refrigeration cycle apparatus can improve the operation efficiency of a refrigeration cycle by using the injection flow path, while sufficiently reducing GWP by using the refrigerant containing 1,2-difluoroethylene.

A refrigeration cycle apparatus according to a second aspect is the refrigeration cycle apparatus of the first aspect and further includes a branching flow path, an opening degree adjusting valve, and an injection heat exchanger. The branching flow path branches off from a main refrigerant flow path that connects the condenser and the evaporator to each other. The opening degree adjusting valve is provided in the branching flow path. The injection heat exchanger causes a refrigerant that flows in the main refrigerant flow path and a refrigerant that flows on a downstream side with respect to the opening degree adjusting valve in the branching flow path to exchange heat. A refrigerant that exits from the injection heat exchanger and flows in the branching flow path flows in the injection flow path.

The refrigeration cycle apparatus can further improve the operation efficiency of a refrigeration cycle.

A refrigeration cycle apparatus according to a third aspect is the refrigeration cycle apparatus of the first aspect or the second aspect and further includes a refrigerant storage tank that is provided in a main refrigerant flow path that connects the condenser and the evaporator to each other. A gas component of a refrigerant that accumulates in the refrigerant storage tank flows in the injection flow path.

The refrigeration cycle apparatus can improve the efficiency of a refrigeration cycle, while accumulating an excess refrigerant in the refrigerant storage tank.

A refrigeration cycle apparatus according to a fourth aspect is the refrigeration cycle apparatus of any one of the first aspect to the third aspect, in which the compressor includes a fixed scroll and a swinging scroll. The fixed scroll includes a end plate and a lap that stands spirally from the end plate. The swinging scroll forms a compression chamber by engaging with the fixed scroll. A refrigerant that flows in the injection flow path merges at the compression chamber.

The refrigeration cycle apparatus can improve the operation efficiency of a refrigeration cycle while using a scroll compressor.

A refrigeration cycle apparatus according to a fifth aspect is the refrigeration cycle apparatus according to any one of the first aspect to the fifth aspect, wherein
the refrigerant comprises trans-1,2-difluoroethylene (HFO-1132(E)), trifluoroethylene (HFO-1123), and 2,3,3,3-tetrafluoro-1-propene (R1234yf).

The refrigeration cycle apparatus can improve the operation efficiency of a refrigeration cycle by using a refrigerant having a sufficiently low GWP and having a refrigeration capacity (may be referred to as "cooling capacity" or "capacity") and a coefficient of performance (COP) that are equivalent to those of R410A.

A refrigeration cycle apparatus according to a sixth aspect is the refrigeration cycle apparatus according to the fifth aspect, wherein
when the mass % of HFO-1132(E), HFO-1123, and R1234yf based on their sum in the refrigerant is respectively represented by x, y, and z, coordinates (x,y,z) in a ternary composition diagram in which the sum of HFO-1132(E), HFO-1123, and R1234yf is 100 mass % are within the range of a figure surrounded by line segments AA', A'B, BD, DC', C'C, CO, and OA that connect the following 7 points:
point A (68.6, 0.0, 31.4),
point A' (30.6, 30.0, 39.4),
point B (0.0, 58.7, 41.3),
point D (0.0, 80.4, 19.6),
point C' (19.5, 70.5, 10.0),
point C (32.9, 67.1, 0.0), and
point O (100.0, 0.0, 0.0),
or on the above line segments (excluding the points on the line segments BD, CO, and OA);
the line segment AA' is represented by coordinates (x, $0.0016x^2-0.9473x+57.497$, $-0.0016x^2-0.0527x+42.503$),
the line segment A'B is represented by coordinates (x, $0.0029x^2-1.0268x+58.7$, $-0.0029x^2+0.0268x+41.3$), the line segment DC' is represented by coordinates (x, $0.0082x^2-0.6671x+80.4$, $-0.0082x^2-0.3329x+19.6$), the line segment C'C is represented by coordinates (x, $0.0067x^2-0.6034x+79.729$, $-0.0067x^2-0.3966x+20.271$), and the line segments BD, CO, and OA are straight lines.

A refrigeration cycle apparatus according to a seventh aspect is the refrigeration cycle apparatus according to the fifth aspect, wherein when the mass % of HFO-1132(E), HFO-1123, and R1234yf based on their sum in the refrigerant is respectively represented by x, y, and z, coordinates (x,y,z) in a ternary composition diagram in which the sum of HFO-1132(E), HFO-1123, and R1234yf is 100 mass % are within the range of a figure surrounded by line segments GI, IA, AA', A'B, BD, DC', C'C, and CG that connect the following 8 points:
point G (72.0, 28.0, 0.0),
point I (72.0, 0.0, 28.0),
point A (68.6, 0.0, 31.4),
point A' (30.6, 30.0, 39.4),
point B (0.0, 58.7, 41.3),
point D (0.0, 80.4, 19.6),
point C' (19.5, 70.5, 10.0), and
point C (32.9, 67.1, 0.0),
or on the above line segments (excluding the points on the line segments IA, BD, and CG);

the line segment AA' is represented by coordinates (x, $0.0016x^2-0.9473x+57.497$, $-0.0016x^2-0.0527x+42.503$), the line segment A'B is represented by coordinates (x, $0.0029x^2-1.0268x+58.7$, $-0.0029x^2+0.0268x+41.3$), the line segment DC' is represented by coordinates (x, $0.0082x^2-0.6671x+80.4$, $-0.0082x^2-0.3329x+19.6$), the line segment C'C is represented by coordinates (x, $0.0067x^2-0.6034x+79.729$, $-0.0067x^2-0.3966x+20.271$), and the line segments GI, IA, BD, and CG are straight lines.

A refrigeration cycle apparatus according to an eighth aspect is the refrigeration cycle apparatus according to the fifth aspect, wherein when the mass % of HFO-1132(E), HFO-1123, and R1234yf based on their sum in the refrigerant is respectively represented by x, y, and z, coordinates (x,y,z) in a ternary composition diagram in which the sum of HFO-1132(E), HFO-1123, and R1234yf is 100 mass % are within the range of a figure surrounded by line segments JP, PN, NK, KA', A'B, BD, DC', C'C, and CJ that connect the following 9 points:
point J (47.1, 52.9, 0.0),
point P (55.8, 42.0, 2.2),
point N (68.6, 16.3, 15.1),
point K (61.3, 5.4, 33.3),
point A' (30.6, 30.0, 39.4),
point B (0.0, 58.7, 41.3),
point D (0.0, 80.4, 19.6),
point C' (19.5, 70.5, 10.0), and
point C (32.9, 67.1, 0.0),
or on the above line segments (excluding the points on the line segments BD and CJ);

the line segment PN is represented by coordinates (x, $-0.1135x^2+12.112x-280.43$, $0.1135x^2-13.112x+380.43$), the line segment NK is represented by coordinates (x, $0.2421x^2-29.955x+931.91$, $-0.2421x^2+28.955x-831.91$), the line segment KA' is represented by coordinates (x, $0.0016x^2-0.9473x+57.497$, $-0.0016x^2-0.0527x+42.503$), the line segment A'B is represented by coordinates (x, $0.0029x^2-1.0268x+58.7$, $-0.0029x^2+0.0268x+41.3$), the line segment DC' is represented by coordinates (x, $0.0082x^2-0.6671x+80.4$, $-0.0082x^2-0.3329x+19.6$), the line segment C'C is represented by coordinates (x, $0.0067x^2-0.6034x+79.729$, $-0.0067x^2-0.3966x+20.271$), and the line segments JP, BD, and CG are straight lines.

A refrigeration cycle apparatus according to a ninth aspect is the refrigeration cycle apparatus according to the fifth aspect, wherein when the mass % of HFO-1132(E), HFO-1123, and R1234yf based on their sum in the refrigerant is respectively represented by x, y, and z, coordinates (x,y,z) in a ternary composition diagram in which the sum of HFO-1132(E), HFO-1123, and R1234yf is 100 mass % are within the range of a figure surrounded by line segments JP, PL, LM, MA', A'B, BD, DC', C'C, and CJ that connect the following 9 points:
point J (47.1, 52.9, 0.0),
point P (55.8, 42.0, 2.2),
point L (63.1, 31.9, 5.0),
point M (60.3, 6.2, 33.5),
point A' (30.6, 30.0, 39.4),
point B (0.0, 58.7, 41.3),
point D (0.0, 80.4, 19.6),
point C' (19.5, 70.5, 10.0), and
point C (32.9, 67.1, 0.0),
or on the above line segments (excluding the points on the line segments BD and CJ);

the line segment PL is represented by coordinates (x, $-0.1135x^2+12.112x-280.43$, $0.1135x^2-13.112x+380.43$)

the line segment MA' is represented by coordinates (x, $0.0016x^2-0.9473x+57.497$, $-0.0016x^2-0.0527x+42.503$), the line segment A'B is represented by coordinates (x, $0.0029x^2-1.0268x+58.7$, $-0.0029x^2+0.0268x+41.3$), the line segment DC' is represented by coordinates (x, $0.0082x^2-0.6671x+80.4$, $-0.0082x^2-0.3329x+19.6$), the line segment C'C is represented by coordinates (x, $0.0067x^2-0.6034x+79.729$, $-0.0067x^2-0.3966x+20.271$), and the line segments JP, LM, BD, and CG are straight lines.

A refrigeration cycle apparatus according to a tenth aspect is the refrigeration cycle apparatus according to the fifth aspect, wherein when the mass % of HFO-1132(E), HFO-1123, and R1234yf based on their sum in the refrigerant is respectively represented by x, y, and z, coordinates (x,y,z) in a ternary composition diagram in which the sum of HFO-1132(E), HFO-1123, and R1234yf is 100 mass % are within the range of a figure surrounded by line segments PL, LM, MA', A'B, BF, FT, and TP that connect the following 7 points:
point P (55.8, 42.0, 2.2),
point L (63.1, 31.9, 5.0),
point M (60.3, 6.2, 33.5),
point A' (30.6, 30.0, 39.4),
point B (0.0, 58.7, 41.3),
point F (0.0, 61.8, 38.2), and
point T (35.8, 44.9, 19.3),
or on the above line segments (excluding the points on the line segment BF);

the line segment PL is represented by coordinates (x, $-0.1135x^2+12.112x-280.43$, $0.1135x^2-13.112x+380.43$), the line segment MA' is represented by coordinates (x, $0.0016x^2-0.9473x+57.497$, $-0.0016x^2-0.0527x+42.503$), the line segment A'B is represented by coordinates (x, $0.0029x^2-1.0268x+58.7$, $-0.0029x^2+0.0268x+41.3$), the line segment FT is represented by coordinates (x, $0.0078x^2-0.7501x+61.8$, $-0.0078x^2-0.2499x+38.2$), the line segment TP is represented by coordinates (x, $0.00672x^2-0.7607x+63.525$, $-0.00672x^2-0.2393x+36.475$), and the line segments LM and BF are straight lines.

A refrigeration cycle apparatus according to an eleventh aspect is the refrigeration cycle apparatus according to the fifth aspect, wherein when the mass % of HFO-1132(E), HFO-1123, and R1234yf based on their sum in the refrigerant is respectively represented by x, y, and z, coordinates (x,y,z) in a ternary composition diagram in which the sum of HFO-1132(E), HFO-1123, and R1234yf is 100 mass % are within the range of a figure surrounded by line segments PL, LQ, QR, and RP that connect the following 4 points:

point P (55.8, 42.0, 2.2),
point L (63.1, 31.9, 5.0),
point Q (62.8, 29.6, 7.6), and
point R (49.8, 42.3, 7.9),
or on the above line segments;

the line segment PL is represented by coordinates (x, $-0.1135x^2+12.112x-280.43$, $0.1135x^2-13.112x+380.43$), the line segment RP is represented by coordinates (x, $0.00672x^2-0.7607x+63.525$, $-0.00672x^2-0.2393x+36.475$), and the line segments LQ and QR are straight lines.

A refrigeration cycle apparatus according to a twelfth aspect is the refrigeration cycle apparatus according to the fifth aspect, wherein when the mass % of HFO-1132(E), HFO-1123, and R1234yf based on their sum in the refrigerant is respectively represented by x, y, and z, coordinates (x,y,z) in a ternary composition diagram in which the sum of HFO-1132(E), HFO-1123, and R1234yf is 100 mass % are within the range of a figure surrounded by line segments SM, MA', A'B, BF, FT, and TS that connect the following 6 points:

point S (62.6, 28.3, 9.1),
point M (60.3, 6.2, 33.5),
point A' (30.6, 30.0, 39.4),
point B (0.0, 58.7, 41.3),
point F (0.0, 61.8, 38.2), and
point T (35.8, 44.9, 19.3),
or on the above line segments, the line segment MA' is represented by coordinates (x, $0.0016x^2-0.9473x+57.497$, $-0.0016x^2-0.0527x+42.503$), the line segment A'B is represented by coordinates (x, $0.0029x^2-1.0268x+58.7$, $-0.0029x^2+0.0268x+41.3$), the line segment FT is represented by coordinates (x, $0.0078x^2-0.7501x+61.8$, $-0.0078x^2-0.2499x+38.2$), the line segment TS is represented by coordinates (x, $-0.0017x^2-0.7869x+70.888$, $-0.0017x^2-0.2131x+29.112$), and the line segments SM and BF are straight lines.

A refrigeration cycle apparatus according to a thirteenth aspect is the refrigeration cycle apparatus according to any of the first through fourth aspects, wherein the refrigerant comprises trans-1,2-difluoroethylene (HFO-1132(E)) and trifluoroethylene (HFO-1123) in a total amount of 99.5 mass % or more based on the entire refrigerant, and the refrigerant comprises 62.0 mass % to 72.0 mass % of HFO-1132(E) based on the entire refrigerant.

The refrigeration cycle apparatus can improve the operation efficiency of a refrigeration cycle by using a refrigerant having a sufficiently low GWP, having a coefficient of performance (COP) and a refrigeration capacity (may be referred to as "cooling capacity" or "capacity") that are equivalent to those of R410A, and being classified with lower flammability (class 2L) based on the standard of American Society of Heating, Refrigerating and Air Conditioning Engineers (ASHRAE).

A refrigeration cycle apparatus according to a fourteenth aspect is the refrigeration cycle apparatus according to any of the first through fourth aspects, wherein the refrigerant comprises HFO-1132(E) and HFO-1123 in a total amount of 99.5 mass % or more based on the entire refrigerant, and the refrigerant comprises 45.1 mass % to 47.1 mass % of HFO-1132(E) based on the entire refrigerant.

The refrigeration cycle apparatus can improve the operation efficiency of a refrigeration cycle by using a refrigerant having a sufficiently low GWP, having a coefficient of performance (COP) and a refrigeration capacity (may be referred to as "cooling capacity" or "capacity") that are equivalent to those of R410A, and being classified with lower flammability (class 2L) based on the standard of American Society of Heating, Refrigerating and Air Conditioning Engineers (ASHRAE).

A refrigeration cycle apparatus according to a fifteenth aspect is the refrigeration cycle apparatus according to any of the first through fourth aspects, wherein the refrigerant comprises trans-1,2-difluoroethylene (HFO-1132(E)), trifluoroethylene (HFO-1123), 2,3,3,3-tetrafluoro-1-propene (R1234yf), and difluoromethane (R32), wherein when the mass % of HFO-1132(E), HFO-1123, R1234yf, and R32 based on their sum in the refrigerant is respectively represented by x, y, z, and a, if 0<a≤11.1, coordinates (x,y,z) in a ternary composition diagram in which the sum of HFO-1132(E), HFO-1123, and R1234yf is (100−a) mass % are within the range of a figure surrounded by straight lines GI, IA, AB, BD', D'C, and CG that connect the following 6 points:

point G ($0.026a^2-1.7478a+72.0$, $-0.026a^2+0.7478a+28.0$, 0.0), point I ($0.026a^2-1.7478a+72.0$, 0.0, $-0.026a^2+0.7478a+28.0$), point A ($0.0134a^2-1.9681a+68.6$, 0.0, $-0.0134a^2+0.9681a+31.4$), point B (0.0, $0.0144a^2-1.6377a+58.7$, $-0.0144a^2+0.6377a+41.3$), point D' (0.0, $0.0224a^2+0.968a+75.4$, $-0.0224a^2-1.968a+24.6$), and point C ($-0.2304a^2-0.4062a+32.9$, $0.2304a^2-0.5938a+67.1$, 0.0), or on the straight lines GI, AB, and D'C (excluding point G, point I, point A, point B, point D', and point C);

if 11.1<a≤18.2, coordinates (x,y,z) in the ternary composition diagram are within the range of a figure surrounded by straight lines GI, IA, AB, BW, and WG that connect the following 5 points:

point G ($0.02a^2-1.6013a+71.105$, $-0.02a^2+0.6013a+28.895$, 0.0), point I ($0.02a^2-1.6013a+71.105$, 0.0, $-0.02a^2+0.6013a+28.895$), point A ($0.0112a^2-1.9337a+68.484$, 0.0, $-0.0112a^2+0.9337a+31.516$), point B (0.0, $0.0075a^2-1.5156a+58.199$, $-0.0075a^2+0.5156a+41.801$), and point W (0.0, 100.0−a, 0.0), or on the straight lines GI and AB (excluding point G, point I, point A, point B, and point W);

if 18.2<a≤26.7, coordinates (x,y,z) in the ternary composition diagram are within the range of a figure surrounded by straight lines GI, IA, AB, BW, and WG that connect the following 5 points:
point G ($0.0135a^2-1.4068a+69.727$, $-0.0135a^2+0.4068a+30.273$, 0.0),
point I ($0.0135a^2-1.4068a+69.727$, 0.0, $-0.0135a^2+0.4068a+30.273$),
point A ($0.0107a^2-1.9142a+68.305$, 0.0, $-0.0107a^2+0.9142a+31.695$),
point B (0.0, $0.009a^2-1.6045a+59.318$, $-0.009a^2+0.6045a+40.682$), and
point W (0.0, 100.0−a, 0.0),
or on the straight lines GI and AB (excluding point G, point I, point A, point B, and point W);
if 26.7<a≤36.7, coordinates (x,y,z) in the ternary composition diagram are within the range of a figure surrounded by straight lines GI, IA, AB, BW, and WG that connect the following 5 points:
point G ($0.0111a^2-1.3152a+68.986$, $-0.0111a^2+0.3152a+31.014$, 0.0),
point I ($0.0111a^2-1.3152a+68.986$, 0.0, $-0.0111a^2+0.3152a+31.014$),
point A ($0.0103a^2-1.9225a+68.793$, 0.0, $-0.0103a^2+0.9225a+31.207$),
point B (0.0, $0.0046a^2-1.41a+57.286$, $-0.0046a^2+0.41a+42.714$), and
point W (0.0, 100.0−a, 0.0),
or on the straight lines GI and AB (excluding point G, point I, point A, point B, and point W); and
if 36.7<a≤46.7, coordinates (x,y,z) in the ternary composition diagram are within the range of a figure surrounded by straight lines GI, IA, AB, BW, and WG that connect the following 5 points:
point G ($0.0061a^2-0.9918a+63.902$, $-0.0061a^2-0.0082a+36.098$, 0.0),
point I ($0.0061a^2-0.9918a+63.902$, 0.0, $-0.0061a^2-0.0082a+36.098$),
point A ($0.0085a^2-1.8102a+67.1$, 0.0, $-0.0085a^2+0.8102a+32.9$),
point B (0.0, $0.0012a^2-1.1659a+52.95$, $-0.0012a^2+0.1659a+47.05$), and
point W (0.0, 100.0−a, 0.0),
or on the straight lines GI and AB (excluding point G, point I, point A, point B, and point W).

The refrigeration cycle apparatus can improve the operation efficiency of a refrigeration cycle by using a refrigerant having a sufficiently low GWP and having a refrigeration capacity (may be referred to as "cooling capacity" or "capacity") and a coefficient of performance (COP) that are equivalent to those of R410A.

A refrigeration cycle apparatus according to a sixteenth aspect is the refrigeration cycle apparatus according to any of the first through fourth aspects, wherein
the refrigerant comprises trans-1,2-difluoroethylene (HFO-1132(E)), trifluoroethylene (HFO-1123), 2,3,3,3-tetrafluoro-1-propene (R1234yf), and difluoromethane (R32), wherein
when the mass % of HFO-1132(E), HFO-1123, R1234yf, and R32 based on their sum in the refrigerant is respectively represented by x, y, z, and a,
if 0<a≤11.1, coordinates (x,y,z) in a ternary composition diagram in which the sum of HFO-1132(E), HFO-1123, and R1234yf is (100−a) mass % are within the range of a figure surrounded by straight lines JK', K'B, BD', D'C, and CJ that connect the following 5 points:
point J ($0.0049a^2-0.9645a+47.1$, $-0.0049a^2-0.0355a+52.9$, 0.0),
point K' ($0.0514a^2-2.4353a+61.7$, $-0.0323a^2+0.4122a+5.9$, $-0.0191a^2+1.0231a+32.4$),
point B (0.0, $0.0144a^2-1.6377a+58.7$, $-0.0144a^2+0.6377a+41.3$),
point D' (0.0, $0.0224a^2+0.968a+75.4$, $-0.0224a^2-1.968a+24.6$), and
point C ($-0.2304a^2-0.4062a+32.9$, $0.2304a^2-0.5938a+67.1$, 0.0),
or on the straight lines JK', K'B, and D'C (excluding point J, point B, point D', and point C);
if 11.1<a≤18.2, coordinates (x,y,z) in the ternary composition diagram are within the range of a figure surrounded by straight lines JK', K'B, BW, and WJ that connect the following 4 points:
point J ($0.0243a^2-1.4161a+49.725$, $-0.0243a^2+0.4161a+50.275$, 0.0),
point K' ($0.0341a^2-2.1977a+61.187$, $-0.0236a^2+0.34a+5.636$, $-0.0105a^2+0.8577a+33.177$),
point B (0.0, $0.0075a^2-1.5156a+58.199$, $-0.0075a^2+0.5156a+41.801$), and
point W (0.0, 100.0−a, 0.0),
or on the straight lines JK' and K'B (excluding point J, point B, and point W);
if 18.2<a≤26.7, coordinates (x,y,z) in the ternary composition diagram are within the range of a figure surrounded by straight lines JK', K'B, BW, and WJ that connect the following 4 points:
point J ($0.0246a^2-1.4476a+50.184$, $-0.0246a^2+0.4476a+49.816$, 0.0),
point K' ($0.0196a^2-1.7863a+58.515$, $-0.0079a^2-0.1136a+8.702$, $-0.0117a^2+0.8999a+32.783$),
point B (0.0, $0.009a^2-1.6045a+59.318$, $-0.009a^2+0.6045a+40.682$), and
point W (0.0, 100.0−a, 0.0),
or on the straight lines JK' and K'B (excluding point J, point B, and point W);
if 26.7<a≤36.7, coordinates (x,y,z) in the ternary composition diagram are within the range of a figure surrounded by straight lines JK', K'A, AB, BW, and WJ that connect the following 5 points:
point J ($0.0183a^2-1.1399a+46.493$, $-0.0183a^2+0.1399a+53.507$, 0.0),
point K' ($-0.0051a^2+0.0929a+25.95$, 0.0, $0.0051a^2-1.0929a+74.05$),
point A ($0.0103a^2-1.9225a+68.793$, 0.0, $-0.0103a^2+0.9225a+31.207$),
point B (0.0, $0.0046a^2-1.41a+57.286$, $-0.0046a^2+0.41a+42.714$), and
point W (0.0, 100.0−a, 0.0),
or on the straight lines JK', K'A, and AB (excluding point J, point B, and point W); and
if 36.7<a≤46.7, coordinates (x,y,z) in the ternary composition diagram are within the range of a figure surrounded by straight lines JK', K'A, AB, BW, and WJ that connect the following 5 points:
point J ($-0.0134a^2+1.0956a+7.13$, $0.0134a^2-2.0956a+92.87$, 0.0),
point K' ($-1.892a+29.443$, 0.0, $0.892a+70.557$),
point A ($0.0085a^2-1.8102a+67.1$, 0.0, $-0.0085a^2+0.8102a+32.9$),
point B (0.0, $0.0012a^2-1.1659a+52.95$, $-0.0012a^2+0.1659a+47.05$), and
point W (0.0, 100.0−a, 0.0),
or on the straight lines JK', K'A, and AB (excluding point J, point B, and point W).

The refrigeration cycle apparatus can improve the operation efficiency of a refrigeration cycle by using a refrigerant having a sufficiently low GWP and having a refrigeration capacity (may be referred to as "cooling capacity" or "capacity") and a coefficient of performance (COP) that are equivalent to those of R410A.

A refrigeration cycle apparatus according to a seventeenth aspect is the refrigeration cycle apparatus according to any of the first through fourth aspects, wherein the refrigerant comprises trans-1,2-difluoroethylene (HFO-1132(E)), difluoromethane(R32), and 2,3,3,3-tetrafluoro-1-propene (R1234yf), wherein when the mass % of HFO-1132(E), R32, and R1234yf based on their sum in the refrigerant is respectively represented by x, y, and z, coordinates (x,y,z) in a ternary composition diagram in which the sum of HFO-1132(E), R32, and R1234yf is 100 mass % are within the range of a figure surrounded by line segments IJ, JN, NE, and EI that connect the following 4 points:
point I (72.0, 0.0, 28.0),
point J (48.5, 18.3, 33.2),
point N (27.7, 18.2, 54.1), and
point E (58.3, 0.0, 41.7),
or on these line segments (excluding the points on the line segment EI;
the line segment IJ is represented by coordinates $(0.0236y^2-1.7616y+72.0, y, -0.0236y^2+0.7616y+28.0)$;
the line segment NE is represented by coordinates $(0.012y^2-1.9003y+58.3, y, -0.012y^2+0.9003y+41.7)$; and
the line segments JN and EI are straight lines.

The refrigeration cycle apparatus can improve the operation efficiency of a refrigeration cycle by using a refrigerant having a sufficiently low GWP, having a refrigeration capacity (may be referred to as "cooling capacity" or "capacity") that is equivalent to that of R410A, and being classified with lower flammability (class 2L) based on the standard of American Society of Heating, Refrigerating and Air Conditioning Engineers (ASHRAE).

A refrigeration cycle apparatus according to an eighteenth aspect is the refrigeration cycle apparatus according to any of the first through fourth aspects, wherein the refrigerant comprises HFO-1132(E), R32, and R1234yf,
wherein
when the mass % of HFO-1132(E), R32, and R1234yf based on their sum in the refrigerant is respectively represented by x, y, and z, coordinates (x,y,z) in a ternary composition diagram in which the sum of HFO-1132(E), R32, and R1234yf is 100 mass % are within the range of a figure surrounded by line segments MM', M'N, NV, VG, and GM that connect the following 5 points:
point M (52.6, 0.0, 47.4),
point M' (39.2, 5.0, 55.8),
point N (27.7, 18.2, 54.1),
point V (11.0, 18.1, 70.9), and
point G (39.6, 0.0, 60.4),
or on these line segments (excluding the points on the line segment GM);
the line segment MM' is represented by coordinates $(0.132y^2-3.34y+52.6, y, -0.132y^2+2.34y+47.4)$;
the line segment M'N is represented by coordinates $(0.0596y^2-2.2541y+48.98, y, -0.0596y^2+1.2541y+51.02)$;
the line segment VG is represented by coordinates $(0.0123y^2-1.8033y+39.6, y, -0.0123y^2+0.8033y+60.4)$; and
the line segments NV and GM are straight lines.

The refrigeration cycle apparatus can improve the operation efficiency of a refrigeration cycle by using a refrigerant having a sufficiently low GWP, having a refrigeration capacity (may be referred to as "cooling capacity" or "capacity") that is equivalent to that of R410A, and being classified with lower flammability (class 2L) based on the standard of American Society of Heating, Refrigerating and Air Conditioning Engineers (ASHRAE).

A refrigeration cycle apparatus according to a nineteenth aspect is the refrigeration cycle apparatus according to any of the first through fourth aspects, wherein the refrigerant comprises HFO-1132(E), R32, and R1234yf,
wherein
when the mass % of HFO-1132(E), R32, and R1234yf based on their sum in the refrigerant is respectively represented by x, y and z, coordinates (x,y,z) in a ternary composition diagram in which the sum of HFO-1132(E), R32, and R1234yf is 100 mass % are within the range of a figure surrounded by line segments ON, NU, and UO that connect the following 3 points:
point O (22.6, 36.8, 40.6),
point N (27.7, 18.2, 54.1), and
point U (3.9, 36.7, 59.4),
or on these line segments;
the line segment ON is represented by coordinates $(0.0072y^2-0.6701y+37.512, y, -0.0072y^2-0.3299y+62.488)$;
the line segment NU is represented by coordinates $(0.0083y^2-1.7403y+56.635, y, -0.0083y^2+0.7403y+43.365)$; and
the line segment UO is a straight line.

The refrigeration cycle apparatus can improve the operation efficiency of a refrigeration cycle by using a refrigerant having a sufficiently low GWP, having a refrigeration capacity (may be referred to as "cooling capacity" or "capacity") that is equivalent to that of R410A, and being classified with lower flammability (class 2L) based on the standard of American Society of Heating, Refrigerating and Air Conditioning Engineers (ASHRAE).

A refrigeration cycle apparatus according to a twentieth aspect is the refrigeration cycle apparatus according to any of the first through fourth aspects, wherein the refrigerant comprises HFO-1132(E), R32, and R1234yf,
wherein
when the mass % of HFO-1132(E), R32, and R1234yf based on their sum in the refrigerant is respectively represented by x, y, and z, coordinates (x,y,z) in a ternary composition diagram in which the sum of HFO-1132(E), R32, and R1234yf is 100 mass % are within the range of a figure surrounded by line segments QR, RT, TL, LK, and KQ that connect the following 5 points:
point Q (44.6, 23.0, 32.4),
point R (25.5, 36.8, 37.7),
point T (8.6, 51.6, 39.8),
point L (28.9, 51.7, 19.4), and
point K (35.6, 36.8, 27.6),
or on these line segments;
the line segment QR is represented by coordinates $(0.0099y^2-1.975y+84.765, y, -0.0099y^2+0.975y+15.235)$;
the line segment RT is represented by coordinates $(0.0082y^2-1.8683y+83.126, y, -0.0082y^2+0.8683y+16.874)$;
the line segment LK is represented by coordinates $(0.0049y^2-0.8842y+61.488, y, -0.0049y^2-0.1158y+38.512)$;

the line segment KQ is represented by coordinates $(0.0095y^2-1.2222y+67.676, y, -0.0095y^2+0.2222y+32.324)$; and the line segment TL is a straight line.

The refrigeration cycle apparatus can improve the operation efficiency of a refrigeration cycle by using a refrigerant having a sufficiently low GWP, having a refrigeration capacity (may be referred to as "cooling capacity" or "capacity") that is equivalent to that of R410A, and being classified with lower flammability (class 2L) based on the standard of American Society of Heating, Refrigerating and Air Conditioning Engineers (ASHRAE).

A refrigeration cycle apparatus according to a twenty first aspect is the refrigeration cycle apparatus according to any of the first through fourth aspects, wherein the refrigerant comprises HFO-1132(E), R32, and R1234yf, wherein when the mass % of HFO-1132(E), R32, and R1234yf based on their sum in the refrigerant is respectively represented by x, y, and z, coordinates (x,y,z) in a ternary composition diagram in which the sum of HFO-1132(E), R32, and R1234yf is 100 mass % are within the range of a figure surrounded by line segments PS, ST, and TP that connect the following 3 points:

point P (20.5, 51.7, 27.8),
point S (21.9, 39.7, 38.4), and
point T (8.6, 51.6, 39.8),
or on these line segments;

the line segment PS is represented by coordinates $(0.0064y^2-0.7103y+40.1, y, -0.0064y^2-0.2897y+59.9)$;

the line segment ST is represented by coordinates $(0.0082y^2-1.8683y+83.126, y, -0.0082y^2+0.8683y+16.874)$; and the line segment TP is a straight line.

The refrigeration cycle apparatus can improve the operation efficiency of a refrigeration cycle by using a refrigerant having a sufficiently low GWP, having a refrigeration capacity (may be referred to as "cooling capacity" or "capacity") that is equivalent to that of R410A, and being classified with lower flammability (class 2L) based on the standard of American Society of Heating, Refrigerating and Air Conditioning Engineers (ASHRAE).

A refrigeration cycle apparatus according to a twenty second aspect is the refrigeration cycle apparatus according to any of the first through fourth aspects, wherein the refrigerant comprises trans-1,2-difluoroethylene (HFO-1132(E)), trifluoroethylene (HFO-1123), and difluoromethane (R32), wherein when the mass % of HFO-1132(E), HFO-1123, and R32 based on their sum in the refrigerant is respectively represented by x, y, and z, coordinates (x,y,z) in a ternary composition diagram in which the sum of HFO-1132(E), HFO-1123, and R32 is 100 mass % are within the range of a figure surrounded by line segments IK, KB', B'H, HR, RG, and GI that connect the following 6 points:

point I (72.0, 28.0, 0.0),
point K (48.4, 33.2, 18.4),
point B' (0.0, 81.6, 18.4),
point H (0.0, 84.2, 15.8),
point R (23.1, 67.4, 9.5), and
point G (38.5, 61.5, 0.0),
or on these line segments (excluding the points on the line segments B'H and GI);

the line segment IK is represented by coordinates $(0.025z^2-1.7429z+72.00, -0.025z^2+0.7429z+28.0, z)$, the line segment HR is represented by coordinates $(-0.3123z^2+4.234z+11.06, 0.3123z^2-5.234z+88.94, z)$, the line segment RG is represented by coordinates $(-0.0491z^2-1.1544z+38.5, 0.0491z^2+0.1544z+61.5, z)$, and the line segments KB' and GI are straight lines.

The refrigeration cycle apparatus can improve the operation efficiency of a refrigeration cycle by using a refrigerant having a sufficiently low GWP and having a coefficient of performance (COP) that is equivalent to that of R410A.

A refrigeration cycle apparatus according to a twenty third aspect is the refrigeration cycle apparatus according to any of the first through fourth aspects, wherein the refrigerant comprises HFO-1132(E), HFO-1123, and R32, wherein when the mass % of HFO-1132(E), HFO-1123, and R32 based on their sum in the refrigerant is respectively represented by x, y, and z, coordinates (x,y,z) in a ternary composition diagram in which the sum of HFO-1132(E), HFO-1123, and R32 is 100 mass % are within the range of a figure surrounded by line segments U, JR, RG, and GI that connect the following 4 points:

point I (72.0, 28.0, 0.0),
point J (57.7, 32.8, 9.5),
point R (23.1, 67.4, 9.5), and
point G (38.5, 61.5, 0.0),
or on these line segments (excluding the points on the line segment GI);

the line segment U is represented by coordinates $(0.025z^2-1.7429z+72.0, -0.025z^2+0.7429z+28.0, z)$, the line segment RG is represented by coordinates $(-0.0491z^2-1.1544z+38.5, 0.0491z^2+0.1544z+61.5, z)$, and the line segments JR and GI are straight lines.

The refrigeration cycle apparatus can improve the operation efficiency of a refrigeration cycle by using a refrigerant having a sufficiently low GWP and having a coefficient of performance (COP) that is equivalent to that of R410A.

A refrigeration cycle apparatus according to a twenty fourth aspect is the refrigeration cycle apparatus according to any of the first through fourth aspects, wherein the refrigerant comprises HFO-1132(E), HFO-1123, and R32, wherein when the mass % of HFO-1132(E), HFO-1123, and R32 based on their sum in the refrigerant is respectively represented by x, y, and z, coordinates (x,y,z) in a ternary composition diagram in which the sum of HFO-1132(E), HFO-1123, and R32 is 100 mass % are within the range of a figure surrounded by line segments MP, PB', B'H, HR, RG, and GM that connect the following 6 points:

point M (47.1, 52.9, 0.0),
point P (31.8, 49.8, 18.4),
point B' (0.0, 81.6, 18.4),
point H (0.0, 84.2, 15.8),
point R (23.1, 67.4, 9.5), and
point G (38.5, 61.5, 0.0),
or on these line segments (excluding the points on the line segments B'H and GM);

the line segment MP is represented by coordinates $(0.0083z^2-0.984z+47.1, -0.0083z^2-0.016z+52.9, z)$, the line segment HR is represented by coordinates $(-0.3123z^2+4.234z+11.06, 0.3123z^2-5.234z+88.94, z)$, the line segment RG is represented by coordinates $(-0.0491z^2-1.1544z+38.5, 0.0491z^2+0.1544z+61.5, z)$, and the line segments PB' and GM are straight lines.

The refrigeration cycle apparatus can improve the operation efficiency of a refrigeration cycle by using a refrigerant having a sufficiently low GWP and having a coefficient of performance (COP) that is equivalent to that of R410A.

A refrigeration cycle apparatus according to a twenty fifth aspect is the refrigeration cycle apparatus according to any of the first through fourth aspects, wherein
the refrigerant comprises HFO-1132(E), HFO-1123, and R32,
wherein
when the mass % of HFO-1132(E), HFO-1123, and R32 based on their sum in the refrigerant is respectively represented by x, y, and z, coordinates (x,y,z) in a ternary composition diagram in which the sum of HFO-1132(E), HFO-1123, and R32 is 100 mass % are within the range of a figure surrounded by line segments MN, NR, RG, and GM that connect the following 4 points:
point M (47.1, 52.9, 0.0),
point N (38.5, 52.1, 9.5),
point R (23.1, 67.4, 9.5), and
point G (38.5, 61.5, 0.0),
or on these line segments (excluding the points on the line segment GM);
the line segment MN is represented by coordinates $(0.0083z^2-0.984z+47.1, -0.0083z^2-0.016z+52.9, z)$,
the line segment RG is represented by coordinates $(-0.0491z^2-1.1544z+38.5, 0.0491z^2+0.1544z+61.5, z)$, and
the line segments JR and GI are straight lines.

The refrigeration cycle apparatus can improve the operation efficiency of a refrigeration cycle by using a refrigerant having a sufficiently low GWP and having a coefficient of performance (COP) that is equivalent to that of R410A.

A refrigeration cycle apparatus according to a twenty sixth aspect is the refrigeration cycle apparatus according to any of the first through fourth aspects, wherein
the refrigerant comprises HFO-1132(E), HFO-1123, and R32,
wherein
when the mass % of HFO-1132(E), HFO-1123, and R32 based on their sum in the refrigerant is respectively represented by x, y, and z, coordinates (x,y,z) in a ternary composition diagram in which the sum of HFO-1132(E), HFO-1123, and R32 is 100 mass % are within the range of a figure surrounded by line segments PS, ST, and TP that connect the following 3 points:
point P (31.8, 49.8, 18.4),
point S (25.4, 56.2, 18.4), and
point T (34.8, 51.0, 14.2),
or on these line segments;
the line segment ST is represented by coordinates $(-0.0982z^2+0.9622z+40.931, 0.0982z^2-1.9622z+59.069, z)$,
the line segment TP is represented by coordinates $(0.0083z^2-0.984z+47.1, -0.0083z^2-0.016z+52.9, z)$, and
the line segment PS is a straight line.

The refrigeration cycle apparatus can improve the operation efficiency of a refrigeration cycle by using a refrigerant having a sufficiently low GWP and having a coefficient of performance (COP) that is equivalent to that of R410A.

A refrigeration cycle apparatus according to a twenty seventh aspect is the refrigeration cycle apparatus according to any of the first through fourth aspects, wherein
the refrigerant comprises HFO-1132(E), HFO-1123, and R32,
wherein
when the mass % of HFO-1132(E), HFO-1123, and R32 based on their sum in the refrigerant is respectively represented by x, y, and z, coordinates (x,y,z) in a ternary composition diagram in which the sum of HFO-1132(E), HFO-1123, and R32 is 100 mass % are within the range of a figure surrounded by line segments QB", B"D, DU, and UQ that connect the following 4 points:
point Q (28.6, 34.4, 37.0),
point B" (0.0, 63.0, 37.0),
point D (0.0, 67.0, 33.0), and
point U (28.7, 41.2, 30.1),
or on these line segments (excluding the points on the line segment B"D);
the line segment DU is represented by coordinates $(-3.4962z^2+210.71z-3146.1, 3.4962z^2-211.71z+3246.1, z)$,
the line segment UQ is represented by coordinates $(0.0135z^2-0.9181z+44.133, -0.0135z^2-0.0819z+55.867, z)$, and
the line segments QB" and B"D are straight lines.

The refrigeration cycle apparatus can improve the operation efficiency of a refrigeration cycle by using a refrigerant having a sufficiently low GWP and having a coefficient of performance (COP) that is equivalent to that of R410A.

Figure 1:
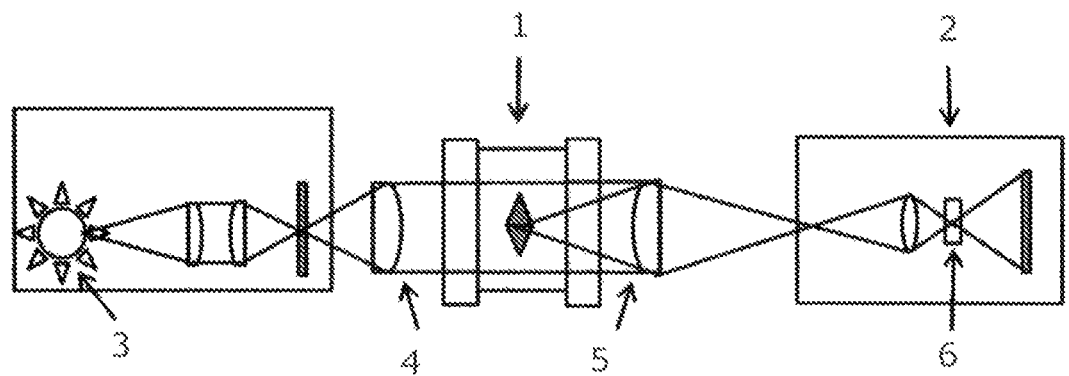
FIG. 1 is a schematic view of an instrument used for a flammability test.
Figure 2:
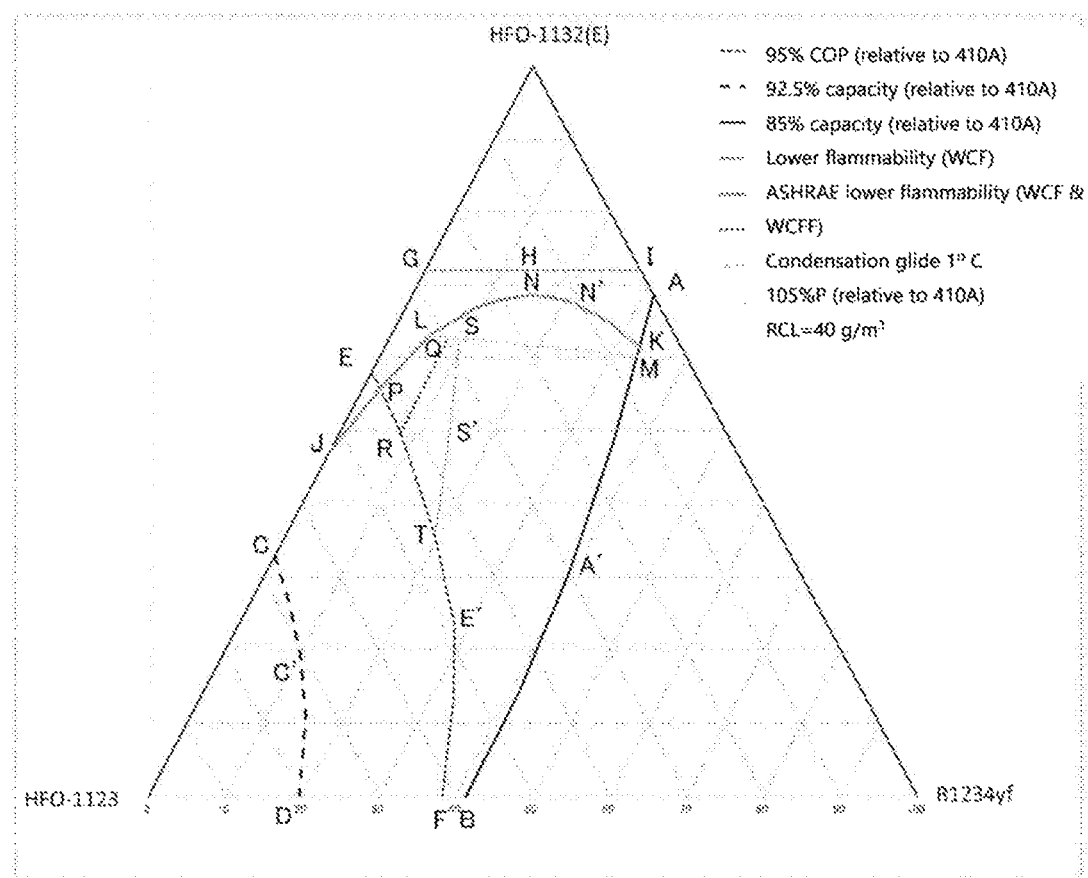
FIG. 2 is a diagram showing points A to T and line segments that connect these points in a ternary composition diagram in which the sum of HFO-1132(E), HFO-1123, and R1234yf is 100 mass %.

DESCRIPTION OF EMBODIMENTS (1) Definition of Terms

In the present specification, the term "refrigerant" includes at least compounds that are specified in ISO 817 (International Organization for Standardization), and that are given a refrigerant number (ASHRAE number) representing the type of refrigerant with "R" at the beginning; and further includes refrigerants that have properties equivalent to those of such refrigerants, even though a refrigerant number is not yet given. Refrigerants are broadly divided into fluorocarbon compounds and non-fluorocarbon compounds in terms of the structure of the compounds. Fluorocarbon compounds include chlorofluorocarbons (CFC), hydrochlorofluorocarbons (HCFC), and hydrofluorocarbons (HFC). Non-fluorocarbon compounds include propane (R290), propylene (R1270), butane (R600), isobutane (R600a), carbon dioxide (R744), ammonia (R717), and the like.

In the present specification, the phrase "composition comprising a refrigerant" at least includes (1) a refrigerant itself (including a mixture of refrigerants), (2) a composition that further comprises other components and that can be mixed with at least a refrigeration oil to obtain a working fluid for a refrigerating machine, and (3) a working fluid for a refrigerating machine containing a refrigeration oil. In the present specification, of these three embodiments, the composition (2) is referred to as a "refrigerant composition" so as to distinguish it from a refrigerant itself (including a mixture of refrigerants). Further, the working fluid for a refrigerating machine (3) is referred to as a "refrigeration oil-containing working fluid" so as to distinguish it from the "refrigerant composition."

In the present specification, when the term "alternative" is used in a context in which the first refrigerant is replaced with the second refrigerant, the first type of "alternative" means that equipment designed for operation using the first refrigerant can be operated using the second refrigerant under optimum conditions, optionally with changes of only a few parts (at least one of the following: refrigeration oil, gasket, packing, expansion valve, dryer, and other parts) and equipment adjustment. In other words, this type of alternative means that the same equipment is operated with an alternative refrigerant. Embodiments of this type of "alternative" include "drop-in alternative," "nearly drop-in alternative," and "retrofit," in the order in which the extent of changes and adjustment necessary for replacing the first refrigerant with the second refrigerant is smaller.

The term "alternative" also includes a second type of "alternative," which means that equipment designed for operation using the second refrigerant is operated for the same use as the existing use with the first refrigerant by using the second refrigerant. This type of alternative means that the same use is achieved with an alternative refrigerant.

In the present specification, the term "refrigerating machine" refers to machines in general that draw heat from an object or space to make its temperature lower than the temperature of ambient air, and maintain a low temperature. In other words, refrigerating machines refer to conversion machines that gain energy from the outside to do work, and that perform energy conversion, in order to transfer heat from where the temperature is lower to where the temperature is higher.

In the present specification, a refrigerant having a "WCF lower flammability" means that the most flammable composition (worst case of formulation for flammability: WCF) has a burning velocity of 10 cm/s or less according to the US ANSI/ASHRAE Standard 34-2013. Further, in the present specification, a refrigerant having "ASHRAE lower flammability" means that the burning velocity of WCF is 10 cm/s or less, that the most flammable fraction composition (worst case of fractionation for flammability: WCFF), which is specified by performing a leakage test during storage, shipping, or use based on ANSI/ASHRAE 34-2013 using WCF, has a burning velocity of 10 cm/s or less, and that flammability classification according to the US ANSI/ASHRAE Standard 34-2013 is determined to classified as be "Class 2L."

In the present specification, a refrigerant having an "RCL of x % or more" means that the refrigerant has a refrigerant concentration limit (RCL), calculated in accordance with the US ANSI/ASHRAE Standard 34-2013, of x % or more. RCL refers to a concentration limit in the air in consideration of safety factors. RCL is an index for reducing the risk of acute toxicity, suffocation, and flammability in a closed space where humans are present. RCL is determined in accordance with the ASHRAE Standard. More specifically, RCL is the lowest concentration among the acute toxicity exposure limit (ATEL), the oxygen deprivation limit (ODL), and the flammable concentration limit (FCL), which are respectively calculated in accordance with sections 7.1.1, 7.1.2, and 7.1.3 of the ASHRAE Standard.

In the present specification, temperature glide refers to an absolute value of the difference between the initial temperature and the end temperature in the phase change process of a composition containing the refrigerant of the present disclosure in the heat exchanger of a refrigerant system.

(2) Refrigerant (2-1) Refrigerant Component

Any one of various refrigerants such as refrigerant A, refrigerant B, refrigerant C, refrigerant D, and refrigerant E, details of these refrigerant are to be mentioned later, can be used as the refrigerant.

(2-2) Use of Refrigerant

The refrigerant according to the present disclosure can be preferably used as a working fluid in a refrigerating machine.

The composition according to the present disclosure is suitable for use as an alternative refrigerant for HFC refrigerant such as R410A, R407C and R404 etc, or HCFC refrigerant such as R22 etc.

(3) Refrigerant Composition

The refrigerant composition according to the present disclosure comprises at least the refrigerant according to the present disclosure, and can be used for the same use as the refrigerant according to the present disclosure. Moreover, the refrigerant composition according to the present disclosure can be further mixed with at least a refrigeration oil to thereby obtain a working fluid for a refrigerating machine.

The refrigerant composition according to the present disclosure further comprises at least one other component in addition to the refrigerant according to the present disclosure. The refrigerant composition according to the present disclosure may comprise at least one of the following other components, if necessary. As described above, when the refrigerant composition according to the present disclosure is used as a working fluid in a refrigerating machine, it is generally used as a mixture with at least a refrigeration oil. Therefore, it is preferable that the refrigerant composition according to the present disclosure does not substantially comprise a refrigeration oil. Specifically, in the refrigerant composition according to the present disclosure, the content of the refrigeration oil based on the entire refrigerant composition is preferably 0 to 1 mass %, and more preferably 0 to 0.1 mass %.

(3-1) Water

The refrigerant composition according to the present disclosure may contain a small amount of water. The water content of the refrigerant composition is preferably 0.1 mass % or less based on the entire refrigerant. A small amount of water contained in the refrigerant composition stabilizes double bonds in the molecules of unsaturated fluorocarbon compounds that can be present in the refrigerant, and makes it less likely that the unsaturated fluorocarbon compounds will be oxidized, thus increasing the stability of the refrigerant composition.

(3-2) Tracer

A tracer is added to the refrigerant composition according to the present disclosure at a detectable concentration such that when the refrigerant composition has been diluted, contaminated, or undergone other changes, the tracer can trace the changes.

The refrigerant composition according to the present disclosure may comprise a single tracer, or two or more tracers.

The tracer is not limited, and can be suitably selected from commonly used tracers. Preferably, a compound that cannot be an impurity inevitably mixed in the refrigerant of the present disclosure is selected as the tracer.

Examples of tracers include hydrofluorocarbons, hydrochlorofluorocarbons, chlorofluorocarbons, hydrochlorocarbons, fluorocarbons, deuterated hydrocarbons, deuterated hydrofluorocarbons, perfluorocarbons, fluoroethers, brominated compounds, iodinated compounds, alcohols, aldehydes, ketones, and nitrous oxide ($N_2O$). The tracer is particularly preferably a hydrofluorocarbon, a hydrochlorofluorocarbon, a chlorofluorocarbon, a fluorocarbon, a hydrochlorocarbon, a fluorocarbon, or a fluoroether.

The following compounds are preferable as the tracer.
FC-14 (tetrafluoromethane, $CF_4$)
HCC-40 (chloromethane, $CH_3Cl$)
HFC-23 (trifluoromethane, $CHF_3$)
HFC-41 (fluoromethane, $CH_3Cl$)
HFC-125 (pentafluoroethane, $CF_3CHF_2$)
HFC-134a (1,1,1,2-tetrafluoroethane, $CF_3CH_2F$)
HFC-134 (1,1,2,2-tetrafluoroethane, $CHF_2CHF_2$)
HFC-143a (1,1,1-trifluoroethane, $CF_3CH_3$)
HFC-143 (1,1,2-trifluoroethane, $CHF_2CH_2F$)
HFC-152a (1,1-difluoroethane, $CHF_2CH_3$)
HFC-152 (1,2-difluoroethane, $CH_2FCH_2F$)
HFC-161 (fluoroethane, $CH_3CH_2F$)
HFC-245fa (1,1,1,3,3-pentafluoropropane, $CF_3CH_2CHF_2$)
HFC-236fa (1,1,1,3,3,3-hexafluoropropane, $CF_3CH_2CF_3$)
HFC-236ea (1,1,1,2,3,3-hexafluoropropane, $CF_3CHFCHF_2$)
HFC-227ea (1,1,1,2,3,3,3-heptafluoropropane, $CF_3CHFCF_3$)
HCFC-22 (chlorodifluoromethane, $CHClF_2$)
HCFC-31 (chlorofluoromethane, $CH_2ClF$)
CFC-1113 (chlorotrifluoroethylene, $CF_2=CClF$)
HFE-125 (trifluoromethyl-difluoromethyl ether, $CF_3OCHF_2$)
HFE-134a (trifluoromethyl-fluoromethyl ether, $CF_3OCH_2F$)
HFE-143a (trifluoromethyl-methyl ether, $CF_3OCH_3$)
HFE-227ea (trifluoromethyl-tetrafluoroethyl ether, $CF_3OCHFCF_3$)
HFE-236fa (trifluoromethyl-trifluoroethyl ether, $CF_3OCH_2CF_3$)

The tracer compound may be present in the refrigerant composition at a total concentration of about 10 parts per million (ppm) to about 1000 ppm. Preferably, the tracer compound is present in the refrigerant composition at a total concentration of about 30 ppm to about 500 ppm, and most preferably, the tracer compound is present at a total concentration of about 50 ppm to about 300 ppm.

(3-3) Ultraviolet Fluorescent Dye

The refrigerant composition according to the present disclosure may comprise a single ultraviolet fluorescent dye, or two or more ultraviolet fluorescent dyes.

The ultraviolet fluorescent dye is not limited, and can be suitably selected from commonly used ultraviolet fluorescent dyes.

Examples of ultraviolet fluorescent dyes include naphthalimide, coumarin, anthracene, phenanthrene, xanthene, thioxanthene, naphthoxanthene, fluorescein, and derivatives thereof. The ultraviolet fluorescent dye is particularly preferably either naphthalimide or coumarin, or both.

(3-4) Stabilizer

The refrigerant composition according to the present disclosure may comprise a single stabilizer, or two or more stabilizers.

The stabilizer is not limited, and can be suitably selected from commonly used stabilizers.

Examples of stabilizers include nitro compounds, ethers, and amines.

Examples of nitro compounds include aliphatic nitro compounds, such as nitromethane and nitroethane; and aromatic nitro compounds, such as nitro benzene and nitro styrene.

Examples of ethers include 1,4-dioxane.

Examples of amines include 2,2,3,3,3-pentafluoropropylamine and diphenylamine.

Examples of stabilizers also include butylhydroxyxylene and benzotriazole.

The content of the stabilizer is not limited. Generally, the content of the stabilizer is preferably 0.01 to 5 mass %, and more preferably 0.05 to 2 mass %, based on the entire refrigerant.

(3-5) Polymerization Inhibitor

The refrigerant composition according to the present disclosure may comprise a single polymerization inhibitor, or two or more polymerization inhibitors.

The polymerization inhibitor is not limited, and can be suitably selected from commonly used polymerization inhibitors.

Examples of polymerization inhibitors include 4-methoxy-1-naphthol, hydroquinone, hydroquinone methyl ether, dimethyl-t-butylphenol, 2,6-di-tert-butyl-p-cresol, and benzotriazole.

The content of the polymerization inhibitor is not limited. Generally, the content of the polymerization inhibitor is preferably 0.01 to 5 mass %, and more preferably 0.05 to 2 mass %, based on the entire refrigerant.

(4) Refrigeration Oil—Containing Working Fluid

The refrigeration oil-containing working fluid according to the present disclosure comprises at least the refrigerant or refrigerant composition according to the present disclosure and a refrigeration oil, for use as a working fluid in a refrigerating machine. Specifically, the refrigeration oil-containing working fluid according to the present disclosure is obtained by mixing a refrigeration oil used in a compressor of a refrigerating machine with the refrigerant or the refrigerant composition. The refrigeration oil-containing working fluid generally comprises 10 to 50 mass % of refrigeration oil.

(4-1) Refrigeration Oil

The refrigeration oil is not limited, and can be suitably selected from commonly used refrigeration oils. In this case, refrigeration oils that are superior in the action of increasing the miscibility with the mixture and the stability of the mixture, for example, are suitably selected as necessary.

The base oil of the refrigeration oil is preferably, for example, at least one member selected from the group consisting of polyalkylene glycols (PAG), polyol esters (POE), and polyvinyl ethers (PVE).

The refrigeration oil may further contain additives in addition to the base oil. The additive may be at least one member selected from the group consisting of antioxidants, extreme-pressure agents, acid scavengers, oxygen scavengers, copper deactivators, rust inhibitors, oil agents, and antifoaming agents.

A refrigeration oil with a kinematic viscosity of 5 to 400 cSt at 40° C. is preferable from the standpoint of lubrication.

The refrigeration oil-containing working fluid according to the present disclosure may further optionally contain at least one additive. Examples of additives include compatibilizing agents described below.

(4-2) Compatibilizing Agent

The refrigeration oil-containing working fluid according to the present disclosure may comprise a single compatibilizing agent, or two or more compatibilizing agents.

The compatibilizing agent is not limited, and can be suitably selected from commonly used compatibilizing agents.

Examples of compatibilizing agents include polyoxyalkylene glycol ethers, amides, nitriles, ketones, chlorocarbons, esters, lactones, aryl ethers, fluoroethers, and 1,1,1-trifluoroalkanes. The compatibilizing agent is particularly preferably a polyoxyalkylene glycol ether.

(5) Various Refrigerants

Hereinafter, the refrigerants A to E, which are the refrigerants used in the present embodiment, will be described in detail.

In addition, each description of the following refrigerant A, refrigerant B, refrigerant C, refrigerant D, and refrigerant E is each independent. The alphabet which shows a point or a line segment, the number of an Examples, and the number of a comparative examples are all independent of each other among the refrigerant A, the refrigerant B, the refrigerant C, the refrigerant D, and the refrigerant E. For example, the first embodiment of the refrigerant A and the first embodiment of the refrigerant B are different embodiment from each other.

(5-1) Refrigerant A

The refrigerant A according to the present disclosure is a mixed refrigerant comprising trans-1,2-difluoroethylene (HFO-1132(E)), trifluoroethylene (HFO-1123), and 2,3,3,3-tetrafluoro-1-propene (R1234yf).

The refrigerant A according to the present disclosure has various properties that are desirable as an R410A-alternative refrigerant, i.e., a refrigerating capacity and a coefficient of performance that are equivalent to those of R410A, and a sufficiently low GWP.

The refrigerant A according to the present disclosure is a composition comprising HFO-1132(E) and R1234yf, and optionally further comprising HFO-1123, and may further satisfy the following requirements. This refrigerant also has various properties desirable as an alternative refrigerant for R410A; i.e., it has a refrigerating capacity and a coefficient of performance that are equivalent to those of R410A, and a sufficiently low GWP.

Requirements

Preferable refrigerant A is as follows:

When the mass % of HFO-1132(E), HFO-1123, and R1234yf based on their sum in the refrigerant is respectively represented by x, y, and z, coordinates (x,y,z) in a ternary composition diagram in which the sum of HFO-1132(E), HFO-1123, and R1234yf is 100 mass % are within the range of a figure surrounded by line segments AA', A'B, BD, DC', C'C, CO, and OA that connect the following 7 points:

point A (68.6, 0.0, 31.4),
point A' (30.6, 30.0, 39.4),
point B (0.0, 58.7, 41.3),
point D (0.0, 80.4, 19.6), point C' (19.5, 70.5, 10.0),
point C (32.9, 67.1, 0.0), and
point O (100.0, 0.0, 0.0),
or on the above line segments (excluding the points on the line CO);
the line segment AA' is represented by coordinates (x, $0.0016x^2-0.9473x+57.497$, $-0.0016x^2-0.0527x+42.503$),
the line segment A'B is represented by coordinates (x, $0.0029x^2-1.0268x+58.7$, $-0.0029x^2+0.0268x+41.3$,
the line segment DC' is represented by coordinates (x, $0.0082x^2-0.6671x+80.4$, $-0.0082x^2-0.3329x+19.6$),
the line segment C'C is represented by coordinates (x, $0.0067x^2-0.6034x+79.729$, $-0.0067x^2-0.3966x+20.271$), and
the line segments BD, CO, and OA are straight lines.

When the requirements above are satisfied, the refrigerant according to the present disclosure has a refrigerating capacity ratio of 85% or more relative to that of R410A, and a COP of 92.5% or more relative to that of R410A.

When the mass % of HFO-1132(E), HFO-1123, and R1234yf, based on their sum in the refrigerant A according to the present disclosure is respectively represented by x, y, and z, the refrigerant is preferably a refrigerant wherein coordinates (x,y,z) in a ternary composition diagram in which the sum of HFO-1132(E), HFO-1123, and R1234yf is 100 mass % are within a figure surrounded by line segments GI, IA, AA', A'B, BD, DC', C'C, and CG that connect the following 8 points:
point G (72.0, 28.0, 0.0),
point I (72.0, 0.0, 28.0),
point A (68.6, 0.0, 31.4),
point A' (30.6, 30.0, 39.4),
point B (0.0, 58.7, 41.3),
point D (0.0, 80.4, 19.6),
point C' (19.5, 70.5, 10.0), and
point C (32.9, 67.1, 0.0),
or on the above line segments (excluding the points on the line segment CG);
the line segment AA' is represented by coordinates (x, $0.0016x^2-0.9473x+57.497$, $-0.0016x^2-0.0527x+42.503$),
the line segment A'B is represented by coordinates (x, $0.0029x^2-1.0268x+58.7$, $-0.0029x^2+0.0268x+41.3$),
the line segment DC' is represented by coordinates (x, $0.0082x^2-0.6671x+80.4$, $-0.0082x^2-0.3329x+19.6$),
the line segment C'C is represented by coordinates (x, $0.0067x^2-0.6034x+79.729$, $-0.0067x^2-0.3966x+20.271$), and
the line segments GI, IA, BD, and CG are straight lines.

When the requirements above are satisfied, the refrigerant A according to the present disclosure has a refrigerating capacity ratio of 85% or more relative to that of R410A, and a COP of 92.5% or more relative to that of R410A; furthermore, the refrigerant A has a WCF lower flammability according to the ASHRAE Standard (the WCF composition has a burning velocity of 10 cm/s or less).

When the mass % of HFO-1132(E), HFO-1123, and R1234yf based on their sum in the refrigerant according to the present disclosure is respectively represented by x, y, and z, the refrigerant is preferably a refrigerant wherein coordinates (x,y,z) in a ternary composition diagram in which the sum of HFO-1132(E), HFO-1123, and R1234yf is 100 mass % are within the range of a figure surrounded by line segments JP, PN, NK, KA', A'B, BD, DC', C'C, and CJ that connect the following 9 points:
point J (47.1, 52.9, 0.0),
point P (55.8, 42.0, 2.2),
point N (68.6, 16.3, 15.1),
point K (61.3, 5.4, 33.3),
point A' (30.6, 30.0, 39.4),
point B (0.0, 58.7, 41.3),
point D (0.0, 80.4, 19.6),
point C' (19.5, 70.5, 10.0), and
point C (32.9, 67.1, 0.0),
or on the above line segments (excluding the points on the line segment CJ);
the line segment PN is represented by coordinates (x, $-0.1135x^2+12.112x-280.43$, $0.1135x^2-13.112x+380.43$),
the line segment NK is represented by coordinates (x, $0.2421x^2-29.955x+931.91$, $-0.2421x^2+28.955x-831.91$),
the line segment KA' is represented by coordinates (x, $0.0016x^2-0.9473x+57.497$, $-0.0016x^2-0.0527x+42.503$),
the line segment A'B is represented by coordinates (x, $0.0029x^2-1.0268x+58.7$, $-0.0029x^2+0.0268x+41.3$),
the line segment DC' is represented by coordinates (x, $0.0082x^2-0.6671x+80.4$, $-0.0082x^2-0.3329x+19.6$),
the line segment C'C is represented by coordinates (x, $0.0067x^2-0.6034x+79.729$, $-0.0067x^2-0.3966x+20.271$), and
the line segments JP, BD, and CG are straight lines.

When the requirements above are satisfied, the refrigerant A according to the present disclosure has a refrigerating capacity ratio of 85% or more relative to that of R410A, and a COP of 92.5% or more relative to that of R410A; furthermore, the refrigerant exhibits a lower flammability (Class 2L) according to the ASHRAE Standard (the WCF composition and the WCFF composition have a burning velocity of 10 cm/s or less).

When the mass % of HFO-1132(E), HFO-1123, and R1234yf based on their sum in the refrigerant according to the present disclosure is respectively represented by x, y, and z, the refrigerant is preferably a refrigerant wherein coordinates (x,y,z) in a ternary composition diagram in which the sum of HFO-1132(E), HFO-1123, and R1234yf is 100 mass % are within the range of a figure surrounded by line segments JP, PL, LM, MA', A'B, BD, DC', C'C, and CJ that connect the following 9 points:
point J (47.1, 52.9, 0.0),
point P (55.8, 42.0, 2.2),
point L (63.1, 31.9, 5.0),
point M (60.3, 6.2, 33.5),
point A' (30.6, 30.0, 39.4),
point B (0.0, 58.7, 41.3),
point D (0.0, 80.4, 19.6),
point C' (19.5, 70.5, 10.0), and
point (32.9, 67.1, 0.0),
or on the above line segments (excluding the points on the line segment CJ);
the line segment PL is represented by coordinates (x, $-0.1135x^2+12.112x-280.43$, $0.1135x^2-13.112x+380.43$),
the line segment MA' is represented by coordinates (x, $0.0016x^2-0.9473x+57.497$, $-0.0016x^2-0.0527x+42.503$),
the line segment A'B is represented by coordinates (x, $0.0029x^2-1.0268x+58.7$, $-0.0029x^2+0.0268x+41.3$),
the line segment DC' is represented by coordinates (x, $0.0082x^2-0.6671x+80.4$, $-0.0082x^2-0.3329x+19.6$),
the line segment C'C is represented by coordinates (x, $0.0067x^2-0.6034x+79.729$, $-0.0067x^2-0.3966x+20.271$), and
the line segments JP, LM, BD, and CG are straight lines.

When the requirements above are satisfied, the refrigerant according to the present disclosure has a refrigerating capacity ratio of 85% or more relative to that of R410A, and a COP of 92.5% or more relative to that of R410A; furthermore, the refrigerant has an RCL of 40 g/m$^3$ or more.

When the mass % of HFO-1132(E), HFO-1123, and R1234yf based on their sum in the refrigerant A according to the present disclosure is respectively represented by x, y, and z, the refrigerant is preferably a refrigerant wherein coordinates (x,y,z) in a ternary composition diagram in which the sum of HFO-1132(E), HFO-1123, and R1234yf is 100 mass % are within the range of a figure surrounded by line segments PL, LM, MA', A'B, BF, FT, and TP that connect the following 7 points:
point P (55.8, 42.0, 2.2),
point L (63.1, 31.9, 5.0),
point M (60.3, 6.2, 33.5),
point A' (30.6, 30.0, 39.4),
point B (0.0, 58.7, 41.3),
point F (0.0, 61.8, 38.2), and
point T (35.8, 44.9, 19.3),
or on the above line segments (excluding the points on the line segment BF);
the line segment PL is represented by coordinates (x, $-0.1135x^2+12.112x-280.43$, $0.1135x^2-13.112x+380.43$),
the line segment MA' is represented by coordinates (x, $0.0016x^2-0.9473x+57.497$, $-0.0016x^2-0.0527x+42.503$),
the line segment A'B is represented by coordinates (x, $0.0029x^2-1.0268x+58.7$, $-0.0029x^2+0.0268x+41.3$),
the line segment FT is represented by coordinates (x, $0.0078x^2-0.7501x+61.8$, $-0.0078x^2-0.2499x+38.2$),
the line segment TP is represented by coordinates (x, $0.00672x^2-0.7607x+63.525$, $-0.00672x^2-0.2393x+36.475$), and
the line segments LM and BF are straight lines.

When the requirements above are satisfied, the refrigerant according to the present disclosure has a refrigerating capacity ratio of 85% or more relative to that of R410A, and a COP of 95% or more relative to that of R410A; furthermore, the refrigerant has an RCL of 40 g/m$^3$ or more.

The refrigerant A according to the present disclosure is preferably a refrigerant wherein when the mass % of HFO-1132(E), HFO-1123, and R1234yf based on their sum in the refrigerant is respectively represented by x, y, and z, coordinates (x,y,z) in a ternary composition diagram in which the sum of HFO-1132(E), HFO-1123, and R1234yf is 100 mass % are within the range of a figure surrounded by line segments PL, LQ, QR, and RP that connect the following 4 points:
point P (55.8, 42.0, 2.2),
point L (63.1, 31.9, 5.0),
point Q (62.8, 29.6, 7.6), and
point R (49.8, 42.3, 7.9),
or on the above line segments;
the line segment PL is represented by coordinates (x, $-0.1135x^2+12.112x-280.43$, $0.1135x^2-13.112x+380.43$),
the line segment RP is represented by coordinates (x, $0.00672x^2-0.7607x+63.525$, $-0.00672x^2-0.2393x+36.475$), and
the line segments LQ and QR are straight lines.

When the requirements above are satisfied, the refrigerant according to the present disclosure has a COP of 95% or more relative to that of R410A, and an RCL of 40 g/m$^3$ or more, furthermore, the refrigerant has a condensation temperature glide of 1° C. or less.

The refrigerant A according to the present disclosure is preferably a refrigerant wherein when the mass % of HFO-1132(E), HFO-1123, and R1234yf based on their sum in the refrigerant is respectively represented by x, y, and z, coordinates (x,y,z) in a ternary composition diagram in which the sum of HFO-1132(E), HFO-1123, and R1234yf is 100 mass % are within the range of a figure surrounded by line segments SM, MA', A'B, BF, FT, and TS that connect the following 6 points:
point S (62.6, 28.3, 9.1),
point M (60.3, 6.2, 33.5),
point A'(30.6, 30.0, 39.4),
point B (0.0, 58.7, 41.3),
point F (0.0, 61.8, 38.2), and
point T (35.8, 44.9, 19.3),
or on the above line segments,
the line segment MA' is represented by coordinates (x, $0.0016x^2-0.9473x+57.497$, $-0.0016x^2-0.0527x+42.503$),
the line segment A'B is represented by coordinates (x, $0.0029x^2-1.0268x+58.7$, $-0.0029x^2+0.0268x+41.3$),
the line segment FT is represented by coordinates (x, $0.0078x^2-0.7501x+61.8$, $-0.0078x^2-0.2499x+38.2$),
the line segment TS is represented by coordinates (x, $-0.0017x^2-0.7869x+70.888$, $-0.0017x^2-0.2131x+29.112$), and
the line segments SM and BF are straight lines.

When the requirements above are satisfied, the refrigerant according to the present disclosure has a refrigerating capacity ratio of 85% or more relative to that of R410A, a COP of 95% or more relative to that of R410A, and an RCL of 40 g/m$^3$ or more furthermore, the refrigerant has a discharge pressure of 105% or more relative to that of R410A.

The refrigerant A according to the present disclosure is preferably a refrigerant wherein when the mass % of HFO-1132(E), HFO-1123, and R1234yf based on their sum in the refrigerant is respectively represented by x, y, and z, coordinates (x,y,z) in a ternary composition diagram in which the sum of HFO-1132(E), HFO-1123, and R1234yf is 100 mass % are within the range of a figure surrounded by line segments Od, dg, gh, and hO that connect the following 4 points:
point d (87.6, 0.0, 12.4),
point g (18.2, 55.1, 26.7),
point h (56.7, 43.3, 0.0), and
point o (100.0, 0.0, 0.0),
or on the line segments Od, dg, gh, and hO (excluding the points O and h);
the line segment dg is represented by coordinates ($0.0047y^2-1.5177y+87.598$, y, $-0.0047y^2+0.5177y+12.402$),
the line segment gh is represented by coordinates ($-0.0134z^2-1.0825z+56.692$, $0.0134z^2+0.0825z+43.308$, z), and
the line segments hO and Od are straight lines.

When the requirements above are satisfied, the refrigerant according to the present disclosure has a refrigerating capacity ratio of 92.5% or more relative to that of R410A, and a COP ratio of 92.5% or more relative to that of R410A.

The refrigerant A according to the present disclosure is preferably a refrigerant wherein
when the mass % of HFO-1132(E), HFO-1123, and R1234yf, based on their sum is respectively represented by x, y, and z, coordinates (x,y,z) in a ternary composition diagram in which the sum of HFO-1132(E), HFO-1123, and R1234yf is 100 mass % are within the range of a figure surrounded by line segments lg, gh, hi, and it that connect the following 4 points:
point l (72.5, 10.2, 17.3),
point g (18.2, 55.1, 26.7),
point h (56.7, 43.3, 0.0), and
point i (72.5, 27.5, 0.0) or
on the line segments lg, gh, and il (excluding the points h and i);

the line segment lg is represented by coordinates $(0.0047y^2-1.5177y+87.598, y, -0.0047y^2+0.5177y+12.402)$, the line gh is represented by coordinates $(-0.0134z^2-1.0825z+56.692, 0.0134z^2+0.0825z+43.308, z)$, and the line segments hi and il are straight lines.

When the requirements above are satisfied, the refrigerant according to the present disclosure has a refrigerating capacity ratio of 92.5% or more relative to that of R410A, and a COP ratio of 92.5% or more relative to that of R410A; furthermore, the refrigerant has a lower flammability (Class 2L) according to the ASHRAE Standard.

The refrigerant A according to the present disclosure is preferably a refrigerant wherein when the mass % of HFO-1132(E), HFO-1123, and R1234yf based on their sum is respectively represented by x, y, and z, coordinates (x,y,z) in a ternary composition diagram in which the sum of HFO-1132(E), HFO-1123, and R1234yf is 100 mass % are within the range of a figure surrounded by line segments Od, de, ef, and fO that connect the following 4 points:

point d (87.6, 0.0, 12.4),
point e (31.1, 42.9, 26.0),
point f (65.5, 34.5, 0.0), and
point O (100.0, 0.0, 0.0),
or on the line segments Od, de, and ef (excluding the points O and f);

the line segment de is represented by coordinates $(0.0047y^2-1.5177y+87.598, y, -0.0047y^2+0.5177y+12.402)$, the line segment ef is represented by coordinates $(-0.0064z^2-1.1565z+65.501, 0.0064z^2+0.1565z+34.499, z)$, and the line segments fO and Od are straight lines.

When the requirements above are satisfied, the refrigerant according to the present disclosure has a refrigerating capacity ratio of 93.5% or more relative to that of R410A, and a COP ratio of 93.5% or more relative to that of R410A.

The refrigerant A according to the present disclosure is preferably a refrigerant wherein when the mass % of HFO-1132(E), HFO-1123, and R1234yf based on their sum is respectively represented by x, y, and z, coordinates (x,y,z) in a ternary composition diagram in which the sum of HFO-1132(E), HFO-1123, and R1234yf is 100 mass % are within the range of a figure surrounded by line segments le, ef, fi, and il that connect the following 4 points:

point l (72.5, 10.2, 17.3),
point e (31.1, 42.9, 26.0),
point f (65.5, 34.5, 0.0), and
point i (72.5, 27.5, 0.0),
or on the line segments le, ef, and il (excluding the points f and i);

the line segment le is represented by coordinates $(0.0047y^2-1.5177y+87.598, y, -0.0047y^2+0.5177y+12.402)$, the line segment of is represented by coordinates $(-0.0134z^2-1.0825z+56.692, 0.0134z^2+0.0825z+43.308, z)$, and the line segments fi and it are straight lines.

When the requirements above are satisfied, the refrigerant according to the present disclosure has a refrigerating capacity ratio of 93.5% or more relative to that of R410A, and a COP ratio of 93.5% or more relative to that of R410A; furthermore, the refrigerant has a lower flammability (Class 2L) according to the ASHRAE Standard.

The refrigerant A according to the present disclosure is preferably a refrigerant wherein when the mass % of HFO-1132(E), HFO-1123, and R1234yf based on their sum is respectively represented by x, y, and z, coordinates (x,y,z) in a ternary composition diagram in which the sum of HFO-1132(E), HFO-1123, and R1234yf is 100 mass % are within the range of a figure surrounded by line segments Oa, ab, bc, and cO that connect the following 4 points:

point a (93.4, 0.0, 6.6),
point b (55.6, 26.6, 17.8),
point c (77.6, 22.4, 0.0), and
point O (100.0, 0.0, 0.0),
or on the line segments Oa, ab, and bc (excluding the points O and c);

the line segment ab is represented by coordinates $(0.0052y^2-1.5588y+93.385, y, -0.0052y^2+0.5588y+6.615)$, the line segment bc is represented by coordinates $(-0.0032z^2-1.1791z+77.593, 0.0032z^2+0.1791z+22.407, z)$, and the line segments cO and Oa are straight lines.

When the requirements above are satisfied, the refrigerant according to the present disclosure has a refrigerating capacity ratio of 95% or more relative to that of R410A, and a COP ratio of 95% or more relative to that of R410A.

The refrigerant A according to the present disclosure is preferably a refrigerant wherein when the mass % of HFO-1132(E), HFO-1123, and R1234yf based on their sum is respectively represented by x, y, and z, coordinates (x,y,z) in a ternary composition diagram in which the sum of HFO-1132(E), HFO-1123, and R1234yf is 100 mass % are within the range of a figure surrounded by line segments kb, bj, and jk that connect the following 3 points:

point k (72.5, 14.1, 13.4),
point b (55.6, 26.6, 17.8), and
point j (72.5, 23.2, 4.3),
or on the line segments kb, bj, and jk;

the line segment kb is represented by coordinates $(0.0052y^2-1.5588y+93.385, y, \text{ and } -0.0052y^2+0.5588y+6.615)$, the line segment bj is represented by coordinates $(-0.0032z^2-1.1791z+77.593, 0.0032z^2+0.1791z+22.407, z)$, and the line segment jk is a straight line.

When the requirements above are satisfied, the refrigerant according to the present disclosure has a refrigerating capacity ratio of 95% or more relative to that of R410A, and a COP ratio of 95% or more relative to that of R410A; furthermore, the refrigerant has a lower flammability (Class 2L) according to the ASHRAE Standard.

The refrigerant according to the present disclosure may further comprise other additional refrigerants in addition to HFO-1132(E), HFO-1123, and R1234yf, as long as the above properties and effects are not impaired. In this respect, the refrigerant according to the present disclosure preferably comprises HFO-1132(E), HFO-1123, and R1234yf in a total amount of 99.5 mass % or more, more preferably 99.75 mass % or more, and still more preferably 99.9 mass % or more, based on the entire refrigerant.

The refrigerant according to the present disclosure may comprise HFO-1132(E), HFO-1123, and R1234yf in a total amount of 99.5 mass % or more, 99.75 mass % or more, or 99.9 mass % or more, based on the entire refrigerant.

Additional refrigerants are not particularly limited and can be widely selected. The mixed refrigerant may contain one additional refrigerant, or two or more additional refrigerants.

(Examples of Refrigerant A)

The present disclosure is described in more detail below with reference to Examples of refrigerant A. However, refrigerant A is not limited to the Examples.

The GWP of R1234yf and a composition consisting of a mixed refrigerant R410A (R32=50%/R125=50%) was evaluated based on the values stated in the Intergovernmental Panel on Climate Change (IPCC), fourth report. The GWP of HFO-1132(E), which was not stated therein, was assumed to be 1 from HFO-1132a (GWP=1 or less) and HFO-1123 (GWP=0.3, described in Patent Literature 1). The refrigerating capacity of R410A and compositions each comprising a mixture of HFO-1132(E), HFO-1123, and R1234yf was determined by performing theoretical refrigeration cycle calculations for the mixed refrigerants using the National Institute of Science and Technology (NIST) and Reference Fluid Thermodynamic and Transport Properties Database (Refprop 9.0) under the following conditions.

Further, the RCL of the mixture was calculated with the LFL of HFO-1132(E) being 4.7 vol. %, the LFL of HFO-1123 being 10 vol. %, and the LFL of R1234yf being 6.2 vol. %, in accordance with the ASHRAE Standard 34-2013.

Evaporating temperature: 5° C.
Condensation temperature: 45° C.
Degree of superheating: 5 K
Degree of subcooling: 5 K
Compressor efficiency: 70%

Tables 1 to 34 show these values together with the GWP of each mixed refrigerant.

TABLE 1

| Item | Unit | Comp. Ex. 1 | Comp. Ex. 2 O | Comp. Ex. 3 A | Example 1 | Example 2 A' | Example 3 | Comp. Ex. 4 B |
|---|---|---|---|---|---|---|---|---|
| HFO-1132(E) | mass % | R410A | 100.0 | 68.6 | 49.0 | 30.6 | 14.1 | 0.0 |
| HFO-1123 | mass % | | 0.0 | 0.0 | 14.9 | 30.0 | 44.8 | 58.7 |
| R1234yf | mass % | | 0.0 | 31.4 | 36.1 | 39.4 | 41.1 | 41.3 |
| GWP | — | 2088 | 1 | 2 | 2 | 2 | 2 | 2 |
| COP ratio | % (relative to 410A) | 100 | 99.7 | 100.0 | 98.6 | 97.3 | 96.3 | 95.5 |
| Refrigerating capacity ratio | % (relative to 410A) | 100 | 98.3 | 85.0 | 85.0 | 85.0 | 85.0 | 85.0 |
| Condensation glide | ° C. | | 0.1 | 0.00 | 1.98 | 3.36 | 4.46 | 5.15 | 5.35 |
| Discharge pressure | % (relative to 410A) | 100.0 | 99.3 | 87.1 | 88.9 | 90.6 | 92.1 | 93.2 |
| RCL | g/m³ | — | 30.7 | 37.5 | 44.0 | 52.7 | 64.0 | 78.6 |

TABLE 2

| Item | Unit | Comp. Ex. 5 C | Example 4 | Example 5 C' | Example 6 | Comp. Ex. 6 D | Comp. Ex. 7 E | Example 7 E' | Comp. Ex. 8 F |
|---|---|---|---|---|---|---|---|---|---|
| HFO-1132(E) | mass % | 32.9 | 26.6 | 19.5 | 10.9 | 0.0 | 58.0 | 23.4 | 0.0 |
| HFO-1123 | mass % | 67.1 | 68.4 | 70.5 | 74.1 | 80.4 | 42.0 | 48.5 | 61.8 |
| R1234yf | mass % | 0.0 | 5.0 | 10.0 | 15.0 | 19.6 | 0.0 | 28.1 | 38.2 |
| GWP | — | 1 | 1 | 1 | 1 | 2 | 1 | 2 | 2 |
| COP ratio | % (relative to 410A) | 92.5 | 92.5 | 92.5 | 92.5 | 92.5 | 95.0 | 95.0 | 95.0 |
| Refrigerating capacity ratio | % (relative to 410A) | 107.4 | 105.2 | 102.9 | 100.5 | 97.9 | 105.0 | 92.5 | 86.9 |
| Condensation glide | ° C. | 0.16 | 0.52 | 0.94 | 1.42 | 1.90 | 0.42 | 3.16 | 4.80 |
| Discharge pressure | % (relative to 410A) | 119.5 | 117.4 | 115.3 | 113.0 | 115.9 | 112.7 | 101.0 | 95.8 |
| RCL | g/m³ | 53.5 | 57.1 | 62.0 | 69.1 | 81.3 | 41.9 | 46.3 | 79.0 |

TABLE 3

| Item | Unit | Comp. Ex. 9 J | Example 8 P | Example 9 L | Example 10 N | Example 11 N' | Example 12 K |
|---|---|---|---|---|---|---|---|
| HFO-1132(E) | mass % | 47.1 | 55.8 | 63.1 | 68.6 | 65.0 | 61.3 |
| HFO-1123 | mass % | 52.9 | 42.0 | 31.9 | 16.3 | 7.7 | 5.4 |
| R1234yf | mass % | 0.0 | 2.2 | 5.0 | 15.1 | 27.3 | 33.3 |
| GWP | — | 1 | 1 | 1 | 1 | 2 | 2 |
| COP ratio | % (relative to 410A) | 93.8 | 95.0 | 96.1 | 97.9 | 99.1 | 99.5 |
| Refrigerating capacity ratio | % (relative to 410A) | 106.2 | 104.1 | 101.6 | 95.0 | 88.2 | 85.0 |

TABLE 3-continued

| Item | Unit | Comp. Ex. 9 J | Example 8 P | Example 9 L | Example 10 N | Example 11 N' | Example 12 K |
|---|---|---|---|---|---|---|---|
| Condensation glide | °C. | 0.31 | 0.57 | 0.81 | 1.41 | 2.11 | 2.51 |
| Discharge pressure | % (relative to 410A) | 115.8 | 111.9 | 107.8 | 99.0 | 91.2 | 87.7 |
| RCL | g/m$^3$ | 46.2 | 42.6 | 40.0 | 38.0 | 38.7 | 39.7 |

TABLE 4

| Item | Unit | Example 13 L | Example 14 M | Example 15 Q | Example 16 R | Example 17 S | Example 18 S' | Example 19 T |
|---|---|---|---|---|---|---|---|---|
| HFO-1132(E) | mass % | 63.1 | 60.3 | 62.8 | 49.8 | 62.6 | 50.0 | 35.8 |
| HFO-1123 | mass % | 31.9 | 6.2 | 29.6 | 42.3 | 28.3 | 35.8 | 44.9 |
| R1234yf | mass % | 5.0 | 33.5 | 7.6 | 7.9 | 9.1 | 14.2 | 19.3 |
| GWP | — | 1 | 2 | 1 | 1 | 1 | 1 | 2 |
| COP ratio | % (relative to 410A) | 96.1 | 99.4 | 96.4 | 95.0 | 96.6 | 95.8 | 95.0 |
| Refrigerating capacity ratio | % (relative to 410A) | 101.6 | 85.0 | 100.2 | 101.7 | 99.4 | 98.1 | 96.7 |
| Condensation glide | °C. | 0.81 | 2.58 | 1.00 | 1.00 | 1.10 | 1.55 | 2.07 |
| Discharge pressure | % (relative to 410A) | 107.8 | 87.9 | 106.0 | 109.6 | 105.0 | 105.0 | 105.0 |
| RCL | g/m$^3$ | 40.0 | 40.0 | 40.0 | 44.8 | 40.0 | 44.4 | 50.8 |

TABLE 5

| Item | Unit | Comp. Ex. 10 G | Example 20 H | Example 21 I |
|---|---|---|---|---|
| HFO-1132(E) | mass % | 72.0 | 72.0 | 72.0 |
| HFO-1123 | mass % | 28.0 | 14.0 | 0.0 |
| R1234yf | mass % | 0.0 | 14.0 | 28.0 |
| GWP | — | 1 | 1 | 2 |
| COP ratio | % (relative to 410A) | 96.6 | 98.2 | 99.9 |
| Refrigerating capacity ratio | % (relative to 410A) | 103.1 | 95.1 | 86.6 |
| Condensation glide | °C. | 0.46 | 1.27 | 1.71 |
| Discharge pressure | % (relative to 410A) | 108.4 | 98.7 | 88.6 |
| RCL | g/m$^3$ | 37.4 | 37.0 | 36.6 |

TABLE 6

| Item | Unit | Comp. Ex. 11 | Comp. Ex. 12 | Example 22 | Example 23 | Example 24 | Example 25 | Example 26 | Comp. Ex. 13 |
|---|---|---|---|---|---|---|---|---|---|
| HFO-1132(E) | mass % | 10.0 | 20.0 | 30.0 | 40.0 | 50.0 | 60.0 | 70.0 | 80.0 |
| HFO-1123 | mass % | 85.0 | 75.0 | 65.0 | 55.0 | 45.0 | 35.0 | 25.0 | 15.0 |
| R1234yf | mass % | 5.0 | 5.0 | 5.0 | 5.0 | 5.0 | 5.0 | 5.0 | 5.0 |
| GWP | — | 1 | 1 | 1 | 1 | 1 | 1 | 1 | 1 |
| COP ratio | % (relative to 410A) | 91.4 | 92.0 | 92.8 | 93.7 | 94.7 | 95.8 | 96.9 | 98.0 |
| Refrigerating capacity ratio | % (relative to 410A) | 105.7 | 105.5 | 105.0 | 104.3 | 103.3 | 102.0 | 100.6 | 99.1 |
| Condensation glide | °C. | 0.40 | 0.46 | 0.55 | 0.66 | 0.75 | 0.80 | 0.79 | 0.67 |
| Discharge pressure | % (relative to 410A) | 120.1 | 118.7 | 116.7 | 114.3 | 111.6 | 108.7 | 105.6 | 102.5 |
| RCL | g/m$^3$ | 71.0 | 61.9 | 54.9 | 49.3 | 44.8 | 41.0 | 37.8 | 35.1 |

TABLE 7

| Item | Unit | Comp. Ex. 14 | Example 27 | Example 28 | Example 29 | Example 30 | Example 31 | Example 32 | Comp. Ex. 15 |
|---|---|---|---|---|---|---|---|---|---|
| HFO-1132(E) | mass % | 10.0 | 20.0 | 30.0 | 40.0 | 50.0 | 60.0 | 70.0 | 80.0 |
| HFO-1123 | mass % | 80.0 | 70.0 | 60.0 | 50.0 | 40.0 | 30.0 | 20.0 | 10.0 |

TABLE 7-continued

| Item | Unit | Comp. Ex. 14 | Example 27 | Example 28 | Example 29 | Example 30 | Example 31 | Example 32 | Comp. Ex. 15 |
|---|---|---|---|---|---|---|---|---|---|
| R1234yf | mass % | 10.0 | 10.0 | 10.0 | 10.0 | 10.0 | 10.0 | 10.0 | 10.0 |
| GWP | — | 1 | 1 | 1 | 1 | 1 | 1 | 1 | 1 |
| COP ratio | % (relative to 410A) | 91.9 | 92.5 | 93.3 | 94.3 | 95.3 | 96.4 | 97.5 | 98.6 |
| Refrigerating capacity ratio | % (relative to 410A) | 103.2 | 102.9 | 102.4 | 101.5 | 100.5 | 99.2 | 97.8 | 96.2 |
| Condensation glide | ° C. | 0.87 | 0.94 | 1.03 | 1.12 | 1.18 | 1.18 | 1.09 | 0.88 |
| Discharge pressure | % (relative to 410A) | 116.7 | 115.2 | 113.2 | 110.8 | 108.1 | 105.2 | 102.1 | 99.0 |
| RCL | g/m$^3$ | 70.5 | 61.6 | 54.6 | 49.1 | 44.6 | 40.8 | 37.7 | 35.0 |

TABLE 8

| Item | Unit | Comp. Ex. 16 | Example 33 | Example 34 | Example 35 | Example 36 | Example 37 | Example 38 | Comp. Ex. 17 |
|---|---|---|---|---|---|---|---|---|---|
| HFO-1132(E) | mass % | 10.0 | 20.0 | 30.0 | 40.0 | 50.0 | 60.0 | 70.0 | 80.0 |
| HFO-1123 | mass % | 75.0 | 65.0 | 55.0 | 45.0 | 35.0 | 25.0 | 15.0 | 5.0 |
| R1234yf | mass % | 15.0 | 15.0 | 15.0 | 15.0 | 15.0 | 15.0 | 15.0 | 15.0 |
| GWP | — | 1 | 1 | 1 | 1 | 1 | 1 | 1 | 1 |
| COP ratio | % (relative to 410A) | 92.4 | 93.1 | 93.9 | 94.8 | 95.9 | 97.0 | 98.1 | 99.2 |
| Refrigerating capacity ratio | % (relative to 410A) | 100.5 | 100.2 | 99.6 | 98.7 | 97.7 | 96.4 | 94.9 | 93.2 |
| Condensation glide | ° C. | 1.41 | 1.49 | 1.56 | 1.62 | 1.63 | 1.55 | 1.37 | 1.05 |
| Discharge pressure | % (relative to 410A) | 113.1 | 111.6 | 109.6 | 107.2 | 104.5 | 101.6 | 98.6 | 95.5 |
| RCL | g/m$^3$ | 70.0 | 61.2 | 54.4 | 48.9 | 44.4 | 40.7 | 37.5 | 34.8 |

TABLE 9

| Item | Unit | Example 39 | Example 40 | Example 41 | Example 42 | Example 43 | Example 44 | Example 45 |
|---|---|---|---|---|---|---|---|---|
| HFO-1132(E) | mass % | 10.0 | 20.0 | 30.0 | 40.0 | 50.0 | 60.0 | 70.0 |
| HFO-1123 | mass % | 70.0 | 60.0 | 50.0 | 40.0 | 30.0 | 20.0 | 10.0 |
| R1234yf | mass % | 20.0 | 20.0 | 20.0 | 20.0 | 20.0 | 20.0 | 20.0 |
| GWP | — | 2 | 2 | 2 | 2 | 2 | 2 | 2 |
| COP ratio | % (relative to 410A) | 93.0 | 93.7 | 94.5 | 95.5 | 96.5 | 97.6 | 98.7 |
| Refrigerating capacity ratio | % (relative to 410A) | 97.7 | 97.4 | 96.8 | 95.9 | 94.7 | 93.4 | 91.9 |
| Condensation glide | ° C. | 2.03 | 2.09 | 2.13 | 2.14 | 2.07 | 1.91 | 1.61 |
| Discharge pressure | % (relative to 410A) | 109.4 | 107.9 | 105.9 | 103.5 | 100.8 | 98.0 | 95.0 |
| RCL | g/m$^3$ | 69.6 | 60.9 | 54.1 | 48.7 | 44.2 | 40.5 | 37.4 |

TABLE 10

| Item | Unit | Example 46 | Example 47 | Example 48 | Example 49 | Example 50 | Example 51 | Example 52 |
|---|---|---|---|---|---|---|---|---|
| HFO-1132(E) | mass % | 10.0 | 20.0 | 30.0 | 40.0 | 50.0 | 60.0 | 70.0 |
| HFO-1123 | mass % | 65.0 | 55.0 | 45.0 | 35.0 | 25.0 | 15.0 | 5.0 |
| R1234yf | mass % | 25.0 | 25.0 | 25.0 | 25.0 | 25.0 | 25.0 | 25.0 |
| GWP | — | 2 | 2 | 2 | 2 | 2 | 2 | 2 |
| COP ratio | % (relative to 410A) | 93.6 | 94.3 | 95.2 | 96.1 | 97.2 | 98.2 | 99.3 |
| Refrigerating capacity ratio | % (relative to 410A) | 94.8 | 94.5 | 93.8 | 92.9 | 91.8 | 90.4 | 88.8 |
| Condensation glide | ° C. | 2.71 | 2.74 | 2.73 | 2.66 | 2.50 | 2.22 | 1.78 |
| Discharge pressure | % (relative to 410A) | 105.5 | 104.0 | 102.1 | 99.7 | 97.1 | 94.3 | 91.4 |
| RCL | g/m$^3$ | 69.1 | 60.5 | 53.8 | 48.4 | 44.0 | 40.4 | 37.3 |

TABLE 11

| Item | Unit | Example 53 | Example 54 | Example 55 | Example 56 | Example 57 | Example 58 |
|---|---|---|---|---|---|---|---|
| HFO-1132(E) | mass % | 10.0 | 20.0 | 30.0 | 40.0 | 50.0 | 60.0 |
| HFO-1123 | mass % | 60.0 | 50.0 | 40.0 | 30.0 | 20.0 | 10.0 |
| R1234yf | mass % | 30.0 | 30.0 | 30.0 | 30.0 | 30.0 | 30.0 |
| GWP | — | 2 | 2 | 2 | 2 | 2 | 2 |
| COP ratio | % (relative to 410A) | 94.3 | 95.0 | 95.9 | 96.8 | 97.8 | 98.9 |
| Refrigerating capacity ratio | % (relative to 410A) | 91.9 | 91.5 | 90.8 | 89.9 | 88.7 | 87.3 |
| Condensation glide | ° C. | 3.46 | 3.43 | 3.35 | 3.18 | 2.90 | 2.47 |
| Discharge pressure | % (relative to 410A) | 101.6 | 100.1 | 98.2 | 95.9 | 93.3 | 90.6 |
| RCL | g/m$^3$ | 68.7 | 60.2 | 53.5 | 48.2 | 43.9 | 40.2 |

TABLE 12

| Item | Unit | Example 59 | Example 60 | Example 61 | Example 62 | Example 63 | Comp. Ex. 18 |
|---|---|---|---|---|---|---|---|
| HFO-1132(E) | mass % | 10.0 | 20.0 | 30.0 | 40.0 | 50.0 | 60.0 |
| HFO-1123 | mass % | 55.0 | 45.0 | 35.0 | 25.0 | 15.0 | 5.0 |
| R1234yf | mass % | 35.0 | 35.0 | 35.0 | 35.0 | 35.0 | 35.0 |
| GWP | — | 2 | 2 | 2 | 2 | 2 | 2 |
| COP ratio | % (relative to 410A) | 95.0 | 95.8 | 96.6 | 97.5 | 98.5 | 99.6 |
| Refrigerating capacity ratio | % (relative to 410A) | 88.9 | 88.5 | 87.8 | 86.8 | 85.6 | 84.1 |
| Condensation glide | ° C. | 4.24 | 4.15 | 3.96 | 3.67 | 3.24 | 2.64 |
| Discharge pressure | % (relative to 410A) | 97.6 | 96.1 | 94.2 | 92.0 | 89.5 | 86.8 |
| RCL | g/m$^3$ | 68.2 | 59.8 | 53.2 | 48.0 | 43.7 | 40.1 |

TABLE 13

| Item | Unit | Example 64 | Example 65 | Comp. Ex. 19 | Comp. Ex. 20 | Comp. Ex. 21 |
|---|---|---|---|---|---|---|
| HFO-1132(E) | mass % | 10.0 | 20.0 | 30.0 | 40.0 | 50.0 |
| HFO-1123 | mass % | 50.0 | 40.0 | 30.0 | 20.0 | 10.0 |
| R1234yf | mass % | 40.0 | 40.0 | 40.0 | 40.0 | 40.0 |
| GWP | — | 2 | 2 | 2 | 2 | 2 |
| COP ratio | % (relative to 410A) | 95.9 | 96.6 | 97.4 | 98.3 | 99.2 |
| Refrigerating capacity ratio | % (relative to 410A) | 85.8 | 85.4 | 84.7 | 83.6 | 82.4 |
| Condensation glide | ° C. | 5.05 | 4.85 | 4.55 | 4.10 | 3.50 |
| Discharge pressure | % (relative to 410A) | 93.5 | 92.1 | 90.3 | 88.1 | 85.6 |
| RCL | g/m$^3$ | 67.8 | 59.5 | 53.0 | 47.8 | 43.5 |

TABLE 14

| Item | Unit | Example 66 | Example 67 | Example 68 | Example 69 | Example 70 | Example 71 | Example 72 | Example 73 |
|---|---|---|---|---|---|---|---|---|---|
| HFO-1132(E) | mass % | 54.0 | 56.0 | 58.0 | 62.0 | 52.0 | 54.0 | 56.0 | 58.0 |
| HFO-1123 | mass % | 41.0 | 39.0 | 37.0 | 33.0 | 41.0 | 39.0 | 37.0 | 35.0 |
| R1234yf | mass % | 5.0 | 5.0 | 5.0 | 5.0 | 7.0 | 7.0 | 7.0 | 7.0 |
| GWP | — | 1 | 1 | 1 | 1 | 1 | 1 | 1 | 1 |
| COP ratio | % (relative to 410A) | 95.1 | 95.3 | 95.6 | 96.0 | 95.1 | 95.4 | 95.6 | 95.8 |
| Refrigerating capacity ratio | % (relative to 410A) | 102.8 | 102.6 | 102.3 | 101.8 | 101.9 | 101.7 | 101.5 | 101.2 |

TABLE 14-continued

| Item | Unit | Example 66 | Example 67 | Example 68 | Example 69 | Example 70 | Example 71 | Example 72 | Example 73 |
|---|---|---|---|---|---|---|---|---|---|
| Condensation glide | °C. | 0.78 | 0.79 | 0.80 | 0.81 | 0.93 | 0.94 | 0.95 | 0.95 |
| Discharge pressure | % (relative to 410A) | 110.5 | 109.9 | 109.3 | 108.1 | 109.7 | 109.1 | 108.5 | 107.9 |
| RCL | g/m$^3$ | 43.2 | 42.4 | 41.7 | 40.3 | 43.9 | 43.1 | 42.4 | 41.6 |

TABLE 15

| Item | Unit | Example 74 | Example 75 | Example 76 | Example 77 | Example 78 | Example 79 | Example 80 | Example 81 |
|---|---|---|---|---|---|---|---|---|---|
| HFO-1132(E) | mass % | 60.0 | 62.0 | 61.0 | 58.0 | 60.0 | 62.0 | 52.0 | 54.0 |
| HFO-1123 | mass % | 33.0 | 31.0 | 29.0 | 30.0 | 28.0 | 26.0 | 34.0 | 32.0 |
| R1234yf | mass % | 7.0 | 7.0 | 10.0 | 12.0 | 12.0 | 12.0 | 14.0 | 14.0 |
| GWP | — | 1 | 1 | 1 | 1 | 1 | 1 | 1 | 1 |
| COP ratio | % (relative to 410A) | 96.0 | 96.2 | 96.5 | 96.4 | 96.6 | 96.8 | 96.0 | 96.2 |
| Refrigerating capacity ratio | % (relative to 410A) | 100.9 | 100.7 | 99.1 | 98.4 | 98.1 | 97.8 | 98.0 | 97.7 |
| Condensation glide | °C. | 0.95 | 0.95 | 1.18 | 1.34 | 1.33 | 1.32 | 1.53 | 1.53 |
| Discharge pressure | % (relative to 410A) | 107.3 | 106.7 | 104.9 | 104.4 | 103.8 | 103.2 | 104.7 | 104.1 |
| RCL | g/m$^3$ | 40.9 | 40.3 | 40.5 | 41.5 | 40.8 | 40.1 | 43.6 | 42.9 |

TABLE 16

| Item | Unit | Example 82 | Example 83 | Example 84 | Example 85 | Example 86 | Example 87 | Example 88 | Example 89 |
|---|---|---|---|---|---|---|---|---|---|
| HFO-1132(E) | mass % | 56.0 | 58.0 | 60.0 | 48.0 | 50.0 | 52.0 | 54.0 | 56.0 |
| HFO-1123 | mass % | 30.0 | 28.0 | 26.0 | 36.0 | 34.0 | 32.0 | 30.0 | 28.0 |
| R1234yf | mass % | 14.0 | 14.0 | 14.0 | 16.0 | 16.0 | 16.0 | 16.0 | 16.0 |
| GWP | — | 1 | 1 | 1 | 1 | 1 | 1 | 1 | 1 |
| COP ratio | % (relative to 410A) | 96.4 | 96.6 | 96.9 | 95.8 | 96.0 | 96.2 | 96.4 | 96.7 |
| Refrigerating capacity ratio | % (relative to 410A) | 97.5 | 97.2 | 96.9 | 97.3 | 97.1 | 96.8 | 96.6 | 96.3 |
| Condensation glide | °C. | 1.51 | 1.50 | 1.48 | 1.72 | 1.72 | 1.71 | 1.69 | 1.67 |
| Discharge pressure | % (relative to 410A) | 103.5 | 102.9 | 102.3 | 104.3 | 103.8 | 103.2 | 102.7 | 102.1 |
| RCL | g/m$^3$ | 42.1 | 41.4 | 40.7 | 45.2 | 44.4 | 43.6 | 42.8 | 42.1 |

TABLE 17

| Item | Unit | Example 90 | Example 91 | Example 92 | Example 93 | Example 94 | Example 95 | Example 96 | Example 97 |
|---|---|---|---|---|---|---|---|---|---|
| HFO-1132(E) | mass % | 58.0 | 60.0 | 42.0 | 44.0 | 46.0 | 48.0 | 50.0 | 52.0 |
| HFO-1123 | mass % | 26.0 | 24.0 | 40.0 | 38.0 | 36.0 | 34.0 | 32.0 | 30.0 |
| R1234yf | mass % | 16.0 | 16.0 | 18.0 | 18.0 | 18.0 | 18.0 | 18.0 | 18.0 |
| GWP | — | 1 | 1 | 2 | 2 | 2 | 2 | 2 | 2 |
| COP ratio | % (relative to 410A) | 96.9 | 97.1 | 95.4 | 95.6 | 95.8 | 96.0 | 96.3 | 96.5 |
| Refrigerating capacity ratio | % (relative to 410A) | 96.1 | 95.8 | 96.8 | 96.6 | 96.4 | 96.2 | 95.9 | 95.7 |
| Condensation glide | °C. | 1.65 | 1.63 | 1.93 | 1.92 | 1.92 | 1.91 | 1.89 | 1.88 |
| Discharge pressure | % (relative to 410A) | 101.5 | 100.9 | 104.5 | 103.9 | 103.4 | 102.9 | 102.3 | 101.8 |
| RCL | g/m$^3$ | 41.4 | 40.7 | 47.8 | 46.9 | 46.0 | 45.1 | 44.3 | 43.5 |

TABLE 18

| Item | Unit | Example 98 | Example 99 | Example 100 | Example 101 | Example 102 | Example 103 | Example 104 | Example 105 |
|---|---|---|---|---|---|---|---|---|---|
| HFO-1132(E) | mass % | 54.0 | 56.0 | 58.0 | 60.0 | 36.0 | 38.0 | 42.0 | 44.0 |
| HFO-1123 | mass % | 28.0 | 26.0 | 24.0 | 22.0 | 44.0 | 42.0 | 38.0 | 36.0 |
| R1234yf | mass % | 18.0 | 18.0 | 18.0 | 18.0 | 20.0 | 20.0 | 20.0 | 20.0 |
| GWP | — | 2 | 2 | 2 | 2 | 2 | 2 | 2 | 2 |
| COP ratio | % (relative to 410A) | 96.7 | 96.9 | 97.1 | 97.3 | 95.1 | 95.3 | 95.7 | 95.9 |
| Refrigerating capacity ratio | % (relative to 410A) | 95.4 | 95.2 | 94.9 | 94.6 | 96.3 | 96.1 | 95.7 | 95.4 |
| Condensation glide | ° C. | 1.86 | 1.83 | 1.80 | 1.77 | 2.14 | 2.14 | 2.13 | 2.12 |
| Discharge pressure | % (relative to 410A) | 101.2 | 100.6 | 100.0 | 99.5 | 104.5 | 104.0 | 103.0 | 102.5 |
| RCL | g/m$^3$ | 42.7 | 42.0 | 41.3 | 40.6 | 50.7 | 49.7 | 47.7 | 46.8 |

TABLE 19

| Item | Unit | Example 106 | Example 107 | Example 108 | Example 109 | Example 110 | Example 111 | Example 112 | Example 113 |
|---|---|---|---|---|---|---|---|---|---|
| HFO-1132(E) | mass % | 46.0 | 48.0 | 52.0 | 54.0 | 56.0 | 58.0 | 34.0 | 36.0 |
| HFO-1123 | mass % | 34.0 | 32.0 | 28.0 | 26.0 | 24.0 | 22.0 | 44.0 | 42.0 |
| R1234yf | mass % | 20.0 | 20.0 | 20.0 | 20.0 | 20.0 | 20.0 | 22.0 | 22.0 |
| GWP | — | 2 | 2 | 2 | 2 | 2 | 2 | 2 | 2 |
| COP ratio | % (relative to 410A) | 96.1 | 96.3 | 96.7 | 96.9 | 97.2 | 97.4 | 95.1 | 95.3 |
| Refrigerating capacity ratio | % (relative to 410A) | 95.2 | 95.0 | 94.5 | 94.2 | 94.0 | 93.7 | 95.3 | 95.1 |
| Condensation glide | ° C. | 2.11 | 2.09 | 2.05 | 2.02 | 1.99 | 1.95 | 2.37 | 2.36 |
| Discharge pressure | % (relative to 410A) | 101.9 | 101.4 | 100.3 | 99.7 | 99.2 | 98.6 | 103.4 | 103.0 |
| RCL | g/m$^3$ | 45.9 | 45.0 | 43.4 | 42.7 | 41.9 | 41.2 | 51.7 | 50.6 |

TABLE 20

| Item | Unit | Example 114 | Example 115 | Example 116 | Example 117 | Example 118 | Example 119 | Example 120 | Example 121 |
|---|---|---|---|---|---|---|---|---|---|
| HFO-1132(E) | mass % | 38.0 | 40.0 | 42.0 | 44.0 | 46.0 | 48.0 | 50.0 | 52.0 |
| HFO-1123 | mass % | 40.0 | 38.0 | 36.0 | 34.0 | 32.0 | 30.0 | 28.0 | 26.0 |
| R1234yf | mass % | 22.0 | 22.0 | 22.0 | 22.0 | 22.0 | 22.0 | 22.0 | 22.0 |
| GWP | — | 2 | 2 | 2 | 2 | 2 | 2 | 2 | 2 |
| COP ratio | % (relative to 410A) | 95.5 | 95.7 | 95.9 | 96.1 | 96.4 | 96.6 | 96.8 | 97.0 |
| Refrigerating capacity ratio | % (relative to 410A) | 94.9 | 94.7 | 94.5 | 94.3 | 94.0 | 93.8 | 93.6 | 93.3 |
| Condensation glide | ° C. | 2.36 | 2.35 | 2.33 | 2.32 | 2.30 | 2.27 | 2.25 | 2.21 |
| Discharge pressure | % (relative to 410A) | 102.5 | 102.0 | 101.5 | 101.0 | 100.4 | 99.9 | 99.4 | 98.8 |
| RCL | g/m$^3$ | 49.6 | 48.6 | 47.6 | 46.7 | 45.8 | 45.0 | 44.1 | 43.4 |

TABLE 21

| Item | Unit | Example 122 | Example 123 | Example 124 | Example 125 | Example 126 | Example 127 | Example 128 | Example 129 |
|---|---|---|---|---|---|---|---|---|---|
| HFO-1132(E) | mass % | 54.0 | 56.0 | 58.0 | 60.0 | 32.0 | 34.0 | 36.0 | 38.0 |
| HFO-1123 | mass % | 24.0 | 22.0 | 20.0 | 18.0 | 44.0 | 42.0 | 40.0 | 38.0 |
| R1234yf | mass % | 22.0 | 22.0 | 22.0 | 22.0 | 24.0 | 24.0 | 24.0 | 24.0 |
| GWP | — | 2 | 2 | 2 | 2 | 2 | 2 | 2 | 2 |
| COP ratio | % (relative to 410A) | 97.2 | 97.4 | 97.6 | 97.9 | 95.2 | 95.4 | 95.6 | 95.8 |
| Refrigerating capacity ratio | % (relative to 410A) | 93.0 | 92.8 | 92.5 | 92.2 | 94.3 | 94.1 | 93.9 | 93.7 |

TABLE 21-continued

| Item | Unit | Example 122 | Example 123 | Example 124 | Example 125 | Example 126 | Example 127 | Example 128 | Example 129 |
|---|---|---|---|---|---|---|---|---|---|
| Condensation glide | °C. | 2.18 | 2.14 | 2.09 | 2.04 | 2.61 | 2.60 | 2.59 | 2.58 |
| Discharge pressure | % (relative to 410A) | 98.2 | 97.7 | 97.1 | 96.5 | 102.4 | 101.9 | 101.5 | 101.0 |
| RCL | g/m³ | 42.6 | 41.9 | 41.2 | 40.5 | 52.7 | 51.6 | 50.5 | 49.5 |

TABLE 22

| Item | Unit | Example 130 | Example 131 | Example 132 | Example 133 | Example 134 | Example 135 | Example 136 | Example 137 |
|---|---|---|---|---|---|---|---|---|---|
| HFO-1132(E) | mass % | 40.0 | 42.0 | 44.0 | 46.0 | 48.0 | 50.0 | 52.0 | 54.0 |
| HFO-1123 | mass % | 36.0 | 34.0 | 32.0 | 30.0 | 28.0 | 26.0 | 24.0 | 22.0 |
| R1234yf | mass % | 24.0 | 24.0 | 24.0 | 24.0 | 24.0 | 24.0 | 24.0 | 24.0 |
| GWP | — | 2 | 2 | 2 | 2 | 2 | 2 | 2 | 2 |
| COP ratio | % (relative to 410A) | 96.0 | 96.2 | 96.4 | 96.6 | 96.8 | 97.0 | 97.2 | 97.5 |
| Refrigerating capacity ratio | % (relative to 410A) | 93.5 | 93.3 | 93.1 | 92.8 | 92.6 | 92.4 | 92.1 | 91.8 |
| Condensation glide | °C. | 2.56 | 2.54 | 2.51 | 2.49 | 2.45 | 2.42 | 2.38 | 2.33 |
| Discharge pressure | % (relative to 410A) | 100.5 | 100.0 | 99.5 | 98.9 | 98.4 | 97.9 | 97.3 | 96.8 |
| RCL | g/m³ | 48.5 | 47.5 | 46.6 | 45.7 | 44.9 | 44.1 | 43.3 | 42.5 |

TABLE 23

| Item | Unit | Example 138 | Example 139 | Example 140 | Example 141 | Example 142 | Example 143 | Example 144 | Example 145 |
|---|---|---|---|---|---|---|---|---|---|
| HFO-1132(E) | mass % | 56.0 | 58.0 | 60.0 | 30.0 | 32.0 | 34.0 | 36.0 | 38.0 |
| HFO-1123 | mass % | 20.0 | 18.0 | 16.0 | 44.0 | 42.0 | 40.0 | 38.0 | 36.0 |
| R1234yf | mass % | 24.0 | 24.0 | 24.0 | 26.0 | 26.0 | 26.0 | 26.0 | 26.0 |
| GWP | — | 2 | 2 | 2 | 2 | 2 | 2 | 2 | 2 |
| COP ratio | % (relative to 410A) | 97.7 | 97.9 | 98.1 | 95.3 | 95.5 | 95.7 | 95.9 | 96.1 |
| Refrigerating capacity ratio | % (relative to 410A) | 91.6 | 91.3 | 91.0 | 93.2 | 93.1 | 92.9 | 92.7 | 92.5 |
| Condensation glide | °C. | 2.28 | 2.22 | 2.16 | 2.86 | 2.85 | 2.83 | 2.81 | 2.79 |
| Discharge pressure | % (relative to 410A) | 96.2 | 95.6 | 95.1 | 101.3 | 100.8 | 100.4 | 99.9 | 99.4 |
| RCL | g/m³ | 41.8 | 41.1 | 40.4 | 53.7 | 52.6 | 51.5 | 50.4 | 49.4 |

TABLE 24

| Item | Unit | Example 146 | Example 147 | Example 148 | Example 149 | Example 150 | Example 151 | Example 152 | Example 153 |
|---|---|---|---|---|---|---|---|---|---|
| HFO-1132(E) | mass % | 40.0 | 42.0 | 44.0 | 46.0 | 48.0 | 50.0 | 52.0 | 54.0 |
| HFO-1123 | mass % | 34.0 | 32.0 | 30.0 | 28.0 | 26.0 | 24.0 | 22.0 | 20.0 |
| R1234yf | mass % | 26.0 | 26.0 | 26.0 | 26.0 | 26.0 | 26.0 | 26.0 | 26.0 |
| GWP | — | 2 | 2 | 2 | 2 | 2 | 2 | 2 | 2 |
| COP ratio | % (relative to 410A) | 96.3 | 96.5 | 96.7 | 96.9 | 97.1 | 97.3 | 97.5 | 97.7 |
| Refrigerating capacity ratio | % (relative to 410A) | 92.3 | 92.1 | 91.9 | 91.6 | 91.4 | 91.2 | 90.9 | 90.6 |
| Condensation glide | °C. | 2.77 | 2.74 | 2.71 | 2.67 | 2.63 | 2.59 | 2.53 | 2.48 |
| Discharge pressure | % (relative to 410A) | 99.0 | 98.5 | 97.9 | 97.4 | 96.9 | 96.4 | 95.8 | 95.3 |
| RCL | g/m³ | 48.4 | 47.4 | 46.5 | 45.7 | 44.8 | 44.0 | 43.2 | 42.5 |

TABLE 25

| Item | Unit | Example 154 | Example 155 | Example 156 | Example 157 | Example 158 | Example 159 | Example 160 | Example 161 |
|---|---|---|---|---|---|---|---|---|---|
| HFO-1132(E) | mass % | 56.0 | 58.0 | 60.0 | 30.0 | 32.0 | 34.0 | 36.0 | 38.0 |
| HFO-1123 | mass % | 18.0 | 16.0 | 14.0 | 42.0 | 40.0 | 38.0 | 36.0 | 34.0 |
| R1234yf | mass % | 26.0 | 26.0 | 26.0 | 28.0 | 28.0 | 28.0 | 28.0 | 28.0 |
| GWP | — | 2 | 2 | 2 | 2 | 2 | 2 | 2 | 2 |
| COP ratio | % (relative to 410A) | 97.9 | 98.2 | 98.4 | 95.6 | 95.8 | 96.0 | 96.2 | 96.3 |
| Refrigerating capacity ratio | % (relative to 410A) | 90.3 | 90.1 | 89.8 | 92.1 | 91.9 | 91.7 | 91.5 | 91.3 |
| Condensation glide | ° C. | 2.42 | 2.35 | 2.27 | 3.10 | 3.09 | 3.06 | 3.04 | 3.01 |
| Discharge pressure | % (relative to 410A) | 94.7 | 94.1 | 93.6 | 99.7 | 99.3 | 98.8 | 98.4 | 97.9 |
| RCL | g/m$^3$ | 41.7 | 41.0 | 40.3 | 53.6 | 52.5 | 51.4 | 50.3 | 49.3 |

TABLE 26

| Item | Unit | Example 162 | Example 163 | Example 164 | Example 165 | Example 166 | Example 167 | Example 168 | Example 169 |
|---|---|---|---|---|---|---|---|---|---|
| HFO-1132(E) | mass % | 40.0 | 42.0 | 44.0 | 46.0 | 48.0 | 50.0 | 52.0 | 54.0 |
| HFO-1123 | mass % | 32.0 | 30.0 | 28.0 | 26.0 | 24.0 | 22.0 | 20.0 | 18.0 |
| R1234yf | mass % | 28.0 | 28.0 | 28.0 | 28.0 | 28.0 | 28.0 | 28.0 | 28.0 |
| GWP | — | 2 | 2 | 2 | 2 | 2 | 2 | 2 | 2 |
| COP ratio | % (relative to 410A) | 96.5 | 96.7 | 96.9 | 97.2 | 97.4 | 97.6 | 97.8 | 98.0 |
| Refrigerating capacity ratio | % (relative to 410A) | 91.1 | 90.9 | 90.7 | 90.4 | 90.2 | 89.9 | 89.7 | 89.4 |
| Condensation glide | ° C. | 2.98 | 2.94 | 2.90 | 2.85 | 2.80 | 2.75 | 2.68 | 2.62 |
| Discharge pressure | % (relative to 410A) | 97.4 | 96.9 | 96.4 | 95.9 | 95.4 | 94.9 | 94.3 | 93.8 |
| RCL | g/m$^3$ | 48.3 | 47.4 | 46.4 | 45.6 | 44.7 | 43.9 | 43.1 | 42.4 |

TABLE 27

| Item | Unit | Example 170 | Example 171 | Example 172 | Example 173 | Example 174 | Example 175 | Example 176 | Example 177 |
|---|---|---|---|---|---|---|---|---|---|
| HFO-1132(E) | mass % | 56.0 | 58.0 | 60.0 | 32.0 | 34.0 | 36.0 | 38.0 | 42.0 |
| HFO-1123 | mass % | 16.0 | 14.0 | 12.0 | 38.0 | 36.0 | 34.0 | 32.0 | 28.0 |
| R1234yf | mass % | 28.0 | 28.0 | 28.0 | 30.0 | 30.0 | 30.0 | 30.0 | 30.0 |
| GWP | — | 2 | 2 | 2 | 2 | 2 | 2 | 2 | 2 |
| COP ratio | % (relative to 410A) | 98.2 | 98.4 | 98.6 | 96.1 | 96.2 | 96.4 | 96.6 | 97.0 |
| Refrigerating capacity ratio | % (relative to 410A) | 89.1 | 88.8 | 88.5 | 90.7 | 90.5 | 90.3 | 90.1 | 89.7 |
| Condensation glide | ° C. | 2.54 | 2.46 | 2.38 | 3.32 | 3.30 | 3.26 | 3.22 | 3.14 |
| Discharge pressure | % (relative to 410A) | 93.2 | 92.6 | 92.1 | 97.7 | 97.3 | 96.8 | 96.4 | 95.4 |
| RCL | g/m$^3$ | 41.7 | 41.0 | 40.3 | 52.4 | 51.3 | 50.2 | 49.2 | 47.3 |

TABLE 28

| Item | Unit | Example 178 | Example 179 | Example 180 | Example 181 | Example 182 | Example 183 | Example 184 | Example 185 |
|---|---|---|---|---|---|---|---|---|---|
| HFO-1132(E) | mass % | 44.0 | 46.0 | 48.0 | 50.0 | 52.0 | 54.0 | 56.0 | 58.0 |
| HFO-1123 | mass % | 26.0 | 24.0 | 22.0 | 20.0 | 18.0 | 16.0 | 14.0 | 12.0 |
| R1234yf | mass % | 30.0 | 30.0 | 30.0 | 30.0 | 30.0 | 30.0 | 30.0 | 30.0 |
| GWP | — | 2 | 2 | 2 | 2 | 2 | 2 | 2 | 2 |
| COP ratio | % (relative to 410A) | 97.2 | 97.4 | 97.6 | 97.8 | 98.0 | 98.3 | 98.5 | 98.7 |

TABLE 28-continued

| Item | Unit | Example 178 | Example 179 | Example 180 | Example 181 | Example 182 | Example 183 | Example 184 | Example 185 |
|---|---|---|---|---|---|---|---|---|---|
| Refrigerating capacity ratio | % (relative to 410A) | 89.4 | 89.2 | 89.0 | 88.7 | 88.4 | 88.2 | 87.9 | 87.6 |
| Condensation glide | ° C. | 3.08 | 3.03 | 2.97 | 2.90 | 2.83 | 2.75 | 2.66 | 2.57 |
| Discharge pressure | % (relative to 410A) | 94.9 | 94.4 | 93.9 | 93.3 | 92.8 | 92.3 | 91.7 | 91.1 |
| RCL | g/m$^3$ | 46.4 | 45.5 | 44.7 | 43.9 | 43.1 | 42.3 | 41.6 | 40.9 |

TABLE 29

| Item | Unit | Example 186 | Example 187 | Example 188 | Example 189 | Example 190 | Example 191 | Example 192 | Example 193 |
|---|---|---|---|---|---|---|---|---|---|
| HFO-1132(E) | mass % | 30.0 | 32.0 | 34.0 | 36.0 | 38.0 | 40.0 | 42.0 | 44.0 |
| HFO-1123 | mass % | 38.0 | 36.0 | 34.0 | 32.0 | 30.0 | 28.0 | 26.0 | 24.0 |
| R1234yf | mass % | 32.0 | 32.0 | 32.0 | 32.0 | 32.0 | 32.0 | 32.0 | 32.0 |
| GWP | — | 2 | 2 | 2 | 2 | 2 | 2 | 2 | 2 |
| COP ratio | % (relative to 410A) | 96.2 | 96.3 | 96.5 | 96.7 | 96.9 | 97.1 | 97.3 | 97.5 |
| Refrigerating capacity ratio | % (relative to 410A) | 89.6 | 89.5 | 89.3 | 89.1 | 88.9 | 88.7 | 88.4 | 88.2 |
| Condensation glide | ° C. | 3.60 | 3.56 | 3.52 | 3.48 | 3.43 | 3.38 | 3.33 | 3.26 |
| Discharge pressure | % (relative to 410A) | 96.6 | 96.2 | 95.7 | 95.3 | 94.8 | 94.3 | 93.9 | 93.4 |
| RCL | g/m$^3$ | 53.4 | 52.3 | 51.2 | 50.1 | 49.1 | 48.1 | 47.2 | 46.3 |

TABLE 30

| Item | Unit | Example 194 | Example 195 | Example 196 | Example 197 | Example 198 | Example 199 | Example 200 | Example 201 |
|---|---|---|---|---|---|---|---|---|---|
| HFO-1132(E) | mass % | 46.0 | 48.0 | 50.0 | 52.0 | 54.0 | 56.0 | 58.0 | 60.0 |
| HFO-1123 | mass % | 22.0 | 20.0 | 18.0 | 16.0 | 14.0 | 12.0 | 10.0 | 8.0 |
| R1234yf | mass % | 32.0 | 32.0 | 32.0 | 32.0 | 32.0 | 32.0 | 32.0 | 32.0 |
| GWP | — | 2 | 2 | 2 | 2 | 2 | 2 | 2 | 2 |
| COP ratio | % (relative to 410A) | 97.7 | 97.9 | 98.1 | 98.3 | 98.5 | 98.7 | 98.9 | 99.2 |
| Refrigerating capacity ratio | % (relative to 410A) | 88.0 | 87.7 | 87.5 | 87.2 | 86.9 | 86.6 | 86.3 | 86.0 |
| Condensation glide | ° C. | 3.20 | 3.12 | 3.04 | 2.96 | 2.87 | 2.77 | 2.66 | 2.55 |
| Discharge pressure | % (relative to 410A) | 92.8 | 92.3 | 91.8 | 91.3 | 90.7 | 90.2 | 89.6 | 89.1 |
| RCL | g/m$^3$ | 45.4 | 44.6 | 43.8 | 43.0 | 42.3 | 41.5 | 40.8 | 40.2 |

TABLE 31

| Item | Unit | Example 202 | Example 203 | Example 204 | Example 205 | Example 206 | Example 207 | Example 208 | Example 209 |
|---|---|---|---|---|---|---|---|---|---|
| HFO-1132(E) | mass % | 30.0 | 32.0 | 34.0 | 36.0 | 38.0 | 40.0 | 42.0 | 44.0 |
| HFO-1123 | mass % | 36.0 | 34.0 | 32.0 | 30.0 | 28.0 | 26.0 | 24.0 | 22.0 |
| R1234yf | mass % | 34.0 | 34.0 | 34.0 | 34.0 | 34.0 | 34.0 | 34.0 | 34.0 |
| GWP | — | 2 | 2 | 2 | 2 | 2 | 2 | 2 | 2 |
| COP ratio | % (relative to 410A) | 96.5 | 96.6 | 96.8 | 97.0 | 97.2 | 97.4 | 97.6 | 97.8 |
| Refrigerating capacity ratio | % (relative to 410A) | 88.4 | 88.2 | 88.0 | 87.8 | 87.6 | 87.4 | 87.2 | 87.0 |
| Condensation glide | ° C. | 3.84 | 3.80 | 3.75 | 3.70 | 3.64 | 3.58 | 3.51 | 3.43 |
| Discharge pressure | % (relative to 410A) | 95.0 | 94.6 | 94.2 | 93.7 | 93.3 | 92.8 | 92.3 | 91.8 |
| RCL | g/m$^3$ | 53.3 | 52.2 | 51.1 | 50.0 | 49.0 | 48.0 | 47.1 | 46.2 |

TABLE 32

| Item | Unit | Example 210 | Example 211 | Example 212 | Example 213 | Example 214 | Example 215 | Example 216 | Example 217 |
|---|---|---|---|---|---|---|---|---|---|
| HFO-1132(E) | mass % | 46.0 | 48.0 | 50.0 | 52.0 | 54.0 | 30.0 | 32.0 | 34.0 |
| HFO-1123 | mass % | 20.0 | 18.0 | 16.0 | 14.0 | 12.0 | 34.0 | 32.0 | 30.0 |
| R1234yf | mass % | 34.0 | 34.0 | 34.0 | 34.0 | 34.0 | 36.0 | 36.0 | 36.0 |
| GWP | — | 2 | 2 | 2 | 2 | 2 | 2 | 2 | 2 |
| COP ratio | % (relative to 410A) | 98.0 | 98.2 | 98.4 | 98.6 | 98.8 | 96.8 | 96.9 | 97.1 |
| Refrigerating capacity ratio | % (relative to 410A) | 86.7 | 86.5 | 86.2 | 85.9 | 85.6 | 87.2 | 87.0 | 86.8 |
| Condensation glide | °C. | 3.36 | 3.27 | 3.18 | 3.08 | 2.97 | 4.08 | 4.03 | 3.97 |
| Discharge pressure | % (relative to 410A) | 91.3 | 90.8 | 90.3 | 89.7 | 89.2 | 93.4 | 93.0 | 92.6 |
| RCL | g/m$^3$ | 45.3 | 44.5 | 43.7 | 42.9 | 42.2 | 53.2 | 52.1 | 51.0 |

TABLE 33

| Item | Unit | Example 218 | Example 219 | Example 220 | Example 221 | Example 222 | Example 223 | Example 224 | Example 225 |
|---|---|---|---|---|---|---|---|---|---|
| HFO-1132(E) | mass % | 36.0 | 38.0 | 40.0 | 42.0 | 44.0 | 46.0 | 30.0 | 32.0 |
| HFO-1123 | mass % | 28.0 | 26.0 | 24.0 | 22.0 | 20.0 | 18.0 | 32.0 | 30.0 |
| R1234yf | mass % | 36.0 | 36.0 | 36.0 | 36.0 | 36.0 | 36.0 | 38.0 | 38.0 |
| GWP | — | 2 | 2 | 2 | 2 | 2 | 2 | 2 | 2 |
| COP ratio | % (relative to 410A) | 97.3 | 97.5 | 97.7 | 97.9 | 98.1 | 98.3 | 97.1 | 97.2 |
| Refrigerating capacity ratio | % (relative to 410A) | 86.6 | 86.4 | 86.2 | 85.9 | 85.7 | 85.5 | 85.9 | 85.7 |
| Condensation glide | °C. | 3.91 | 3.84 | 3.76 | 3.68 | 3.60 | 3.50 | 4.32 | 4.25 |
| Discharge pressure | % (relative to 410A) | 92.1 | 91.7 | 91.2 | 90.7 | 90.3 | 89.8 | 91.9 | 91.4 |
| RCL | g/m$^3$ | 49.9 | 48.9 | 47.9 | 47.0 | 46.1 | 45.3 | 53.1 | 52.0 |

TABLE 34

| Item | Unit | Example 226 | Example 227 |
|---|---|---|---|
| HFO-1132(E) | mass % | 34.0 | 36.0 |
| HFO-1123 | mass % | 28.0 | 26.0 |
| R1234yf | mass % | 38.0 | 38.0 |
| GWP | — | 2 | 2 |
| COP ratio | % (relative to 410A) | 97.4 | 97.6 |
| Refrigerating capacity ratio | % (relative to 410A) | 85.6 | 85.3 |
| Condensation glide | °C. | 4.18 | 4.11 |
| Discharge pressure | % (relative to 410A) | 91.0 | 90.6 |
| RCL | g/m$^3$ | 50.9 | 49.8 |

These results indicate that under the condition that the mass % of HFO-1132(E), HFO-1123, and R1234yf based on their sum is respectively represented by x, y, and z, when coordinates (x,y,z) in a ternary composition diagram in which the sum of HFO-1132(E), HFO-1123, and R1234yf is 100 mass % are within the range of a figure surrounded by line segments AA', A'B, BD, DC', C'C, CO, and OA that connect the following 7 points:
point A (68.6, 0.0, 31.4),
point A' (30.6, 30.0, 39.4),
point B (0.0, 58.7, 41.3),
point D (0.0, 80.4, 19.6),
point C' (19.5, 70.5, 10.0),
point C (32.9, 67.1, 0.0), and
point O (100.0, 0.0, 0.0),
or on the above line segments (excluding the points on the line segment CO);

the line segment AA' is represented by coordinates (x, $0.0016x^2-0.9473x+57.497$, $-0.0016x^2-0.0527x+42.503$),
the line segment A'B is represented by coordinates (x, $0.0029x^2-1.0268x+58.7$, $-0.0029x^2+0.0268x+41.3$),
the line segment DC' is represented by coordinates (x, $0.0082x^2-0.6671x+80.4$, $-0.0082x^2-0.3329x+19.6$),
the line segment C'C is represented by coordinates (x, $0.0067x^2-0.6034x+79.729$, $-0.0067x^2-0.3966x+20.271$), and
the line segments BD, CO, and OA are straight lines,
the refrigerant has a refrigerating capacity ratio of 85% or more relative to that of R410A, and a COP of 92.5% or more relative to that of R410A.

The point on the line segment AA' was determined by obtaining an approximate curve connecting point A, Example 1, and point A' by the least square method.

The point on the line segment A'B was determined by obtaining an approximate curve connecting point A', Example 3, and point B by the least square method.

The point on the line segment DC' was determined by obtaining an approximate curve connecting point D, Example 6, and point C' by the least square method.

The point on the line segment C'C was determined by obtaining an approximate curve connecting point C', Example 4, and point C by the least square method.

Likewise, the results indicate that when coordinates (x,y, z) are within the range of a figure surrounded by line segments AA', A'B, BF, FT, TE, EO, and OA that connect the following 7 points:
point A (68.6, 0.0, 31.4),
point A' (30.6, 30.0, 39.4), point B (0.0, 58.7, 41.3),
point F (0.0, 61.8, 38.2),
point T (35.8, 44.9, 19.3),
point E (58.0, 42.0, 0.0) and
point O (100.0, 0.0, 0.0),
or on the above line segments (excluding the points on the line EO);
the line segment AA' is represented by coordinates (x, $0.0016x^2-0.9473x+57.497$, $-0.0016x^2-0.0527x+42.503$),
the line segment A'B is represented by coordinates (x, $0.0029x^2-1.0268x+58.7$, $-0.0029x^2+0.0268x+41.3$),
the line segment FT is represented by coordinates (x, $0.0078x^2-0.7501x+61.8$, $-0.0078x^2-0.2499x+38.2$), and
the line segment TE is represented by coordinates (x, $0.0067x^2-0.7607x+63.525$, $-0.0067x^2-0.2393x+36.475$), and
the line segments BF, FO, and OA are straight lines,
the refrigerant has a refrigerating capacity ratio of 85% or more relative to that of R410A, and a COP of 95% or more relative to that of R410A.

The point on the line segment FT was determined by obtaining an approximate curve connecting three points, i.e., points T, E', and F, by the least square method.

The point on the line segment TE was determined by obtaining an approximate curve connecting three points, i.e., points E, R, and T, by the least square method.

The results in Tables 1 to 34 clearly indicate that in a ternary composition diagram of the mixed refrigerant of HFO-1132(E), HFO-1123, and R1234yf in which the sum of these components is 100 mass %, a line segment connecting a point (0.0, 100.0, 0.0) and a point (0.0, 0.0, 100.0) is the base, the point (0.0, 100.0, 0.0) is on the left side, and the point (0.0, 0.0, 100.0) is on the right side, when coordinates (x,y,z) are on or below the line segment LM connecting point L (63.1, 31.9, 5.0) and point M (60.3, 6.2, 33.5), the refrigerant has an RCL of 40 g/m$^3$ or more.

The results in Tables 1 to 34 clearly indicate that in a ternary composition diagram of the mixed refrigerant of HFO-1132(E), HFO-1123 and R1234yf in which their sum is 100 mass %, a line segment connecting a point (0.0, 100.0, 0.0) and a point (0.0, 0.0, 100.0) is the base, the point (0.0, 100.0, 0.0) is on the left side, and the point (0.0, 0.0, 100.0) is on the right side, when coordinates (x,y,z) are on the line segment QR connecting point Q (62.8, 29.6, 7.6) and point R (49.8, 42.3, 7.9) or on the left side of the line segment, the refrigerant has a temperature glide of 1° C. or less.

The results in Tables 1 to 34 clearly indicate that in a ternary composition diagram of the mixed refrigerant of HFO-1132(E), HFO-1123, and R1234yf in which their sum is 100 mass %, a line segment connecting a point (0.0, 100.0, 0.0) and a point (0.0, 0.0, 100.0) is the base, the point (0.0, 100.0, 0.0) is on the left side, and the point (0.0, 0.0, 100.0) is on the right side, when coordinates (x,y,z) are on the line segment ST connecting point S (62.6, 28.3, 9.1) and point T (35.8, 44.9, 19.3) or on the right side of the line segment, the refrigerant has a discharge pressure of 105% or less relative to that of 410A.

In these compositions, R1234yf contributes to reducing flammability, and suppressing deterioration of polymerization etc. Therefore, the composition preferably contains R1234yf.

Further, the burning velocity of these mixed refrigerants whose mixed formulations were adjusted to WCF concentrations was measured according to the ANSI/ASHRAE Standard 34-2013. Compositions having a burning velocity of 10 cm/s or less were determined to be classified as "Class 2L (lower flammability)."

A burning velocity test was performed using the apparatus shown in FIG. 1 in the following manner. In FIG. 1, reference numeral 901 refers to a sample cell, 902 refers to a high-speed camera, 903 refers to a xenon lamp, 904 refers to a collimating lens, 905 refers to a collimating lens, and 906 refers to a ring filter. First, the mixed refrigerants used had a purity of 99.5% or more, and were degassed by repeating a cycle of freezing, pumping, and thawing until no traces of air were observed on the vacuum gauge. The burning velocity was measured by the closed method. The initial temperature was ambient temperature. Ignition was performed by generating an electric spark between the electrodes in the center of a sample cell. The duration of the discharge was 1.0 to 9.9 ms, and the ignition energy was typically about 0.1 to 1.0 J. The spread of the flame was visualized using schlieren photographs. A cylindrical container (inner diameter: 155 mm, length: 198 mm) equipped with two light transmission acrylic windows was used as the sample cell, and a xenon lamp was used as the light source. Schlieren images of the flame were recorded by a high-speed digital video camera at a frame rate of 600 fps and stored on a PC.

Each WCFF concentration was obtained by using the WCF concentration as the initial concentration and performing a leak simulation using NIST Standard Reference Database REFLEAK Version 4.0.

Tables 35 and 36 show the results.

TABLE 35

| Item | | Unit | G | H | I |
|---|---|---|---|---|---|
| WCF | HFO-1132(E) | mass % | 72.0 | 72.0 | 72.0 |
| | HFO-1123 | mass % | 28.0 | 9.6 | 0.0 |
| | R1234yf | mass % | 0.0 | 18.4 | 28.0 |
| Burning velocity (WCF) | | cm/s | 10 | 10 | 10 |

TABLE 36

| Item | | Unit | J | P | L | N | N' | K |
|---|---|---|---|---|---|---|---|---|
| WCF | HFO-1132(E) | mass % | 47.1 | 55.8 | 63.1 | 68.6 | 65.0 | 61.3 |
| | HFO-1123 | mass % | 52.9 | 42.0 | 31.9 | 16.3 | 7.7 | 5.4 |
| | R1234yf | mass % | 0.0 | 2.2 | 5.0 | 15.1 | 27.3 | 33.3 |
| Leak condition that results in WCFF | | | Storage/Shipping −40° C., 92% release, liquid phase side | Storage/Shipping −40° C., 90% release, liquid phase side | Storage/Shipping −40° C., 90% release, gas phase side | Storage/Shipping −40° C., 66% release, gas phase side | Storage/Shipping −40° C., 12% release, gas phase side | Storage/Shipping, −40° C., 0% release, gas phase side |

TABLE 36-continued

| Item | | Unit | J | P | L | N | N' | K |
|---|---|---|---|---|---|---|---|---|
| WCFF | HFO-1132(E) | mass % | 72.0 | 72.0 | 72.0 | 72.0 | 72.0 | 72.0 |
| | HFO-1123 | mass % | 28.0 | 17.8 | 17.4 | 13.6 | 12.3 | 9.8 |
| | R1234yf | mass % | 0.0 | 10.2 | 10.6 | 14.4 | 15.7 | 18.2 |
| Burning velocity (WCF) | | cm/s | 8 or less | 8 or less | 8 or less | 9 | 9 | 8 or less |
| Burning velocity (WCFF) | | cm/s | 10 | 10 | 10 | 10 | 10 | 10 |

The results in Table 35 clearly indicate that when a mixed refrigerant of HFO-1132(E), HFO-1123, and R1234yf contains HFO-1132(E) in a proportion of 72.0 mass % or less based on their sum, the refrigerant can be determined to have a WCF lower flammability.

The results in Tables 36 clearly indicate that in a ternary composition diagram of a mixed refrigerant of HFO-1132 (E), HFO-1123, and R1234yf in which their sum is 100 mass %, and a line segment connecting a point (0.0, 100.0, 0.0) and a point (0.0, 0.0, 100.0) is the base, when coordinates (x,y,z) are on or below the line segments JP, PN, and NK connecting the following 6 points:
point J (47.1, 52.9, 0.0),
point P (55.8, 42.0, 2.2),
point L (63.1, 31.9, 5.0)
point N' (65.0, 7.7, 27.3) and
point K (61.3, 5.4, 33.3),
the refrigerant can be determined to have a WCF lower flammability, and a WCFF lower flammability.
In the diagram, the line segment PN is represented by coordinates (x, $-0.1135x^2+12.112x-280.43$, $0.1135x^2-13.112x+380.43$),
and the line segment NK is represented by coordinates (x, $0.2421x^2-29.955x+931.91$, $-0.2421x^2+28.955x-831.91$).

The point on the line segment PN was determined by obtaining an approximate curve connecting three points, i.e., points P, L, and N, by the least square method.

The point on the line segment NK was determined by obtaining an approximate curve connecting three points, i.e., points N, N', and K, by the least square method.

(5-2) Refrigerant B

The refrigerant B according to the present disclosure is a mixed refrigerant comprising trans-1,2-difluoroethylene (HFO-1132(E)) and trifluoroethylene (HFO-1123) in a total amount of 99.5 mass % or more based on the entire refrigerant, and the refrigerant comprising 62.0 mass % to 72.0 mass % or 45.1 mass % to 47.1 mass % of HFO-1132 (E) based on the entire refrigerant, or a mixed refrigerant comprising HFO-1132(E) and HFO-1123 in a total amount of 99.5 mass % or more based on the entire refrigerant, and the refrigerant comprising 45.1 mass % to 47.1 mass % of HFO-1132(E) based on the entire refrigerant.

The refrigerant B according to the present disclosure has various properties that are desirable as an R410A-alternative refrigerant, i.e., (1) a coefficient of performance equivalent to that of R410A, (2) a refrigerating capacity equivalent to that of R410A, (3) a sufficiently low GWP, and (4) a lower flammability (Class 2L) according to the ASHRAE standard.

When the refrigerant B according to the present disclosure is a mixed refrigerant comprising 72.0 mass % or less of HFO-1132(E), it has WCF lower flammability. When the refrigerant B according to the present disclosure is a composition comprising 47.1% or less of HFO-1132(E), it has WCF lower flammability and WCFF lower flammability, and is determined to be "Class 2L," which is a lower flammable refrigerant according to the ASHRAE standard, and which is further easier to handle.

When the refrigerant B according to the present disclosure comprises 62.0 mass % or more of HFO-1132(E), it becomes superior with a coefficient of performance of 95% or more relative to that of R410A, the polymerization reaction of HFO-1132(E) and/or HFO-1123 is further suppressed, and the stability is further improved. When the refrigerant B according to the present disclosure comprises 45.1 mass % or more of HFO-1132(E), it becomes superior with a coefficient of performance of 93% or more relative to that of R410A, the polymerization reaction of HFO-1132(E) and/or HFO-1123 is further suppressed, and the stability is further improved.

The refrigerant B according to the present disclosure may further comprise other additional refrigerants in addition to HFO-1132(E) and HFO-1123, as long as the above properties and effects are not impaired. In this respect, the refrigerant according to the present disclosure preferably comprises HFO-1132(E) and HFO-1123 in a total amount of 99.75 mass % or more, and more preferably 99.9 mass % or more, based on the entire refrigerant.

Such additional refrigerants are not limited, and can be selected from a wide range of refrigerants. The mixed refrigerant may comprise a single additional refrigerant, or two or more additional refrigerants.

(Examples of Refrigerant B)

The present disclosure is described in more detail below with reference to Examples of refrigerant B. However, the refrigerant B is not limited to the Examples.

Mixed refrigerants were prepared by mixing HFO-1132 (E) and HFO-1123 at mass % based on their sum shown in Tables 37 and 38.

The GWP of compositions each comprising a mixture of R410A (R32=50%/R125=50%) was evaluated based on the values stated in the Intergovernmental Panel on Climate Change (IPCC), fourth report. The GWP of HFO-1132(E), which was not stated therein, was assumed to be 1 from HFO-1132a (GWP=1 or less) and HFO-1123 (GWP=0.3, described in Patent Literature 1). The refrigerating capacity of compositions each comprising R410A and a mixture of HFO-1132(E) and HFO-1123 was determined by performing theoretical refrigeration cycle calculations for the mixed refrigerants using the National Institute of Science and Technology (NIST) and Reference Fluid Thermodynamic and Transport Properties Database (Refprop 9.0) under the following conditions:
Evaporating temperature: 5° C.
Condensation temperature: 45° C.
Superheating temperature: 5 K Subcooling temperature: 5 K
Compressor efficiency: 70%

The composition of each mixture was defined as WCF. A leak simulation was performed using NIST Standard Reference Data Base Refleak Version 4.0 under the conditions of Equipment, Storage, Shipping, Leak, and Recharge according to the ASHRAE Standard 34-2013. The most flammable fraction was defined as WCFF.

Tables 1 and 2 show GWP, COP, and refrigerating capacity, which were calculated based on these results. The COP and refrigerating capacity are ratios relative to R410A.

The coefficient of performance (COP) was determined by the following formula.

COP=(refrigerating capacity or heating capacity)/power consumption

For the flammability, the burning velocity was measured according to the ANSI/ASHRAE Standard 34-2013. Both WCF and WCFF having a burning velocity of 10 cm/s or less were determined to be "Class 2L (lower flammability)."

A burning velocity test was performed using the apparatus shown in FIG. 1 in the following manner. First, the mixed refrigerants used had a purity of 99.5% or more, and were degassed by repeating a cycle of freezing, pumping, and thawing until no traces of air were observed on the vacuum gauge. The burning velocity was measured by the closed method. The initial temperature was ambient temperature. Ignition was performed by generating an electric spark between the electrodes in the center of a sample cell. The duration of the discharge was 1.0 to 9.9 ms, and the ignition energy was typically about 0.1 to 1.0 J. The spread of the flame was visualized using schlieren photographs. A cylindrical container (inner diameter: 155 mm, length: 198 mm) equipped with two light transmission acrylic windows was used as the sample cell, and a xenon lamp was used as the light source. Schlieren images of the flame were recorded by a high-speed digital video camera at a frame rate of 600 fps and stored on a PC.

TABLE 37

| Item | Unit | Comparative Example 1 R410A | Comparative Example 2 HFO-1132E | Comparative Example 3 | Example 1 | Example 2 | Example 3 | Example 4 | Example 5 | Comparative Example 4 |
|---|---|---|---|---|---|---|---|---|---|---|
| HFO-1132E (WCF) | mass % | — | 100 | 80 | 72 | 70 | 68 | 65 | 62 | 60 |
| HFO-1132 (WCF) | mass % | | 0 | 20 | 28 | 30 | 32 | 35 | 38 | 40 |
| GWP | — | 2088 | 1 | 1 | 1 | 1 | 1 | 1 | 1 | 1 |
| COP ratio | % (relative to R410A) | 100 | 99.7 | 97.5 | 96.6 | 96.3 | 96.1 | 95.8 | 95.4 | 95.2 |
| Refrigerating capacity ratio | % (relative to R410A) | 100 | 98.3 | 101.9 | 103.1 | 103.4 | 103.8 | 104.1 | 104.5 | 104.8 |
| Discharge pressure | Mpa | 2.73 | 2.71 | 2.89 | 2.96 | 2.98 | 3.00 | 3.02 | 3.04 | 3.06 |
| Burning velocity (WCF) | cm/sec | Non-flammable | 20 | 13 | 10 | 9 | 9 | 8 | 8 or less | 8 or less |

TABLE 38

| Item | Unit | Comparative Example 5 | Comparative Example 6 | Example 7 | Example 8 | Example 9 | Comparative Example 7 | Comparative Example 8 | Comparative Example 9 | Comparative Example 10 HFO-1123 |
|---|---|---|---|---|---|---|---|---|---|---|
| HFO-1132E (WCF) | mass % | 50 | 48 | 47.1 | 46.1 | 45.1 | 43 | 40 | 25 | 0 |
| HFO-1123 (WCF) | mass % | 50 | 52 | 52.9 | 53.9 | 54.9 | 57 | 60 | 75 | 100 |
| GWP | — | 1 | 1 | 1 | 1 | 1 | 1 | 1 | 1 | 1 |
| COP ratio | % (relative to R410A) | 94.1 | 93.9 | 93.8 | 93.7 | 93.6 | 93.4 | 93.1 | 91.9 | 90.6 |
| Refrigerating capacity ratio | % (relative to R410A) | 105.9 | 106.1 | 106.2 | 106.3 | 106.4 | 106.6 | 106.9 | 107.9 | 108.0 |

TABLE 38-continued

| Item | Unit | Comparative Example 5 | Comparative Example 6 | Example 7 | Example 8 | Example 9 | Comparative Example 7 | Comparative Example 8 | Comparative Example 9 | Comparative Example 10 HFO-1123 |
|---|---|---|---|---|---|---|---|---|---|---|
| Discharge pressure | Mpa | 3.14 | 3.16 | 3.16 | 3.17 | 3.18 | 3.20 | 3.21 | 3.31 | 3.39 |
| Leakage test conditions (WCFF) | | Storage/Shipping −40° C., 92% release, liquid phase side | Storage/Shipping −40° C., 92% release, liquid phase side | Storage/Shipping −40° C., 92% release, liquid phase side | Storage/Shipping −40° C., 92% release, liquid phase side | Storage/Shipping −40° C., 92% release, liquid phase side | Storage/Shipping −40° C., 92% release, liquid phase side | Storage/Shipping −40° C., 92% release, liquid phase side | Storage/Shipping −40° C., 92% release, liquid phase side | |
| HFO-1132E (WCFF) | mass % | 74 | 73 | 72 | 71 | 70 | 67 | 63 | 38 | — |
| HFO-1123 (WCFF) | mass % | 26 | 27 | 28 | 29 | 30 | 33 | 37 | 62 | |
| Burning velocity (WCF) | cm/sec | 8 or less | 8 or less | 8 or less | 8 or less | 8 or less | 8 or less | 8 or less | 8 or less | 5 |
| Burning velocity (WCFF) | cm/sec | 11 | 10.5 | 10.0 | 9.5 | 9.5 | 8.5 | 8 or less | 8 or less | |
| ASHRAE flammability classification | | 2 | 2 | 2L | 2L | 2L | 2L | 2L | 2L | 2L |

The compositions each comprising 62.0 mass % to 72.0 mass % of HFO-1132(E) based on the entire composition are stable while having a low GWP (GWP=1), and they ensure WCF lower flammability. Further, surprisingly, they can ensure performance equivalent to that of R410A. Moreover, compositions each comprising 45.1 mass % to 47.1 mass % of HFO-1132(E) based on the entire composition are stable while having a low GWP (GWP=1), and they ensure WCFF lower flammability. Further, surprisingly, they can ensure performance equivalent to that of R410A.

(5-3) Refrigerant C

The refrigerant C according to the present disclosure is a composition comprising trans-1,2-difluoroethylene (HFO-1132(E)), trifluoroethylene (HFO-1123), 2,3,3,3-tetrafluoro-1-propene (R1234yf), and difluoromethane (R32), and satisfies the following requirements. The refrigerant C according to the present disclosure has various properties that are desirable as an alternative refrigerant for R410A; i.e. it has a coefficient of performance and a refrigerating capacity that are equivalent to those of R410A, and a sufficiently low GWP.

Requirements

Preferable refrigerant C is as follows:

When the mass % of HFO-1132(E), HFO-1123, R1234yf, and R32 based on their sum is respectively represented by x, y, z, and a, if $0 < a \leq 11.1$, coordinates (x,y,z) in a ternary composition diagram in which the sum of HFO-1132(E), HFO-1123, and R1234yf is (100−a) mass % are within the range of a figure surrounded by straight lines GI, IA, AB, BD', D'C, and CG that connect the following 6 points:

point G $(0.026a^2 - 1.7478a + 72.0, -0.026a^2 + 0.7478a + 28.0, 0.0)$, point I $(0.026a^2 - 1.7478a + 72.0, 0.0, -0.026a^2 + 0.7478a + 28.0)$, point A $(0.0134a^2 - 1.9681a + 68.6, 0.0, -0.0134a^2 + 0.9681a + 31.4)$, point B $(0.0, 0.0144a^2 - 1.6377a + 58.7, -0.0144a^2 + 0.6377a + 41.3)$, point D' $(0.0, 0.0224a^2 + 0.968a + 75.4, -0.0224a^2 - 1.968a + 24.6)$, and point C $(-0.2304a^2 - 0.4062a + 32.9, 0.2304a^2 - 0.5938a + 67.1, 0.0)$, or on the straight lines GI, AB, and D'C (excluding point G, point I, point A, point B, point D', and point C);

if $11.1 < a \leq 18.2$, coordinates (x,y,z) in the ternary composition diagram are within the range of a figure surrounded by straight lines GI, IA, AB, BW, and WG that connect the following 5 points:

point G $(0.02a^2 - 1.6013a + 71.105, -0.02a^2 + 0.6013a + 28.895, 0.0)$, point I $(0.02a^2 - 1.6013a + 71.105, 0.0, -0.02a^2 + 0.6013a + 28.895)$, point A $(0.0112a^2 - 1.9337a + 68.484, 0.0, -0.0112a^2 + 0.9337a + 31.516)$, point B $(0.0, 0.0075a^2 - 1.5156a + 58.199, -0.0075a^2 + 0.5156a + 41.801)$ and point W $(0.0, 100.0 - a, 0.0)$, or on the straight lines GI and AB (excluding point G, point I, point A, point B, and point W);

if $18.2 < a \leq 26.7$, coordinates (x,y,z) in the ternary composition diagram are within the range of a figure surrounded by straight lines GI, IA, AB, BW, and WG that connect the following 5 points:

point G $(0.0135a^2 - 1.4068a + 69.727, -0.0135a^2 + 0.4068a + 30.273, 0.0)$, point I ($0.0135a^2-1.4068a+69.727$, 0.0, $-0.0135a^2+0.4068a+30.273$),
point A ($0.0107a^2-1.9142a+68.305$, 0.0, $-0.0107a^2+0.9142a+31.695$),
point B (0.0, $0.009a^2-1.6045a+59.318$, $-0.009a^2+0.6045a+40.682$) and
point W (0.0, $100.0-a$, 0.0),
or on the straight lines GI and AB (excluding point G, point I, point A, point B, and point W);
  if $26.7<a\leq36.7$, coordinates (x,y,z) in the ternary composition diagram are within the range of a figure surrounded by straight lines GI, IA, AB, BW, and WG that connect the following 5 points:
point G ($0.0111a^2-1.3152a+68.986$, $-0.0111a^2+0.3152a+31.014$, 0.0),
point I ($0.0111a^2-1.3152a+68.986$, 0.0, $-0.0111a^2+0.3152a+31.014$),
point A ($0.0103a^2-1.9225a+68.793$, 0.0, $-0.0103a^2+0.9225a+31.207$),
point B (0.0, $0.0046a^2-1.41a+57.286$, $-0.0046a^2+0.41a+42.714$) and
point W (0.0, $100.0-a$, 0.0),
or on the straight lines GI and AB (excluding point G, point I, point A, point B, and point W);
and
  if $36.7<a\leq46.7$, coordinates (x,y,z) in the ternary composition diagram are within the range of a figure surrounded by straight lines GI, IA, AB, BW, and WG that connect the following 5 points:
point G ($0.0061a^2-0.9918a+63.902$, $-0.0061a^2-0.0082a+36.098$, 0.0),
point I ($0.0061a^2-0.9918a+63.902$, 0.0, $-0.0061a^2-0.0082a+36.098$),
point A ($0.0085a^2-1.8102a+67.1$, 0.0, $-0.0085a^2+0.8102a+32.9$),
point B (0.0, $0.0012a^2-1.1659a+52.95$, $-0.0012a^2+0.1659a+47.05$) and
point W (0.0, $100.0-a$, 0.0),
or on the straight lines GI and AB (excluding point G, point I, point A, point B, and point W). When the refrigerant according to the present disclosure satisfies the above requirements, it has a refrigerating capacity ratio of 85% or more relative to that of R410A, and a COP ratio of 92.5% or more relative to that of R410A, and further ensures a WCF lower flammability.

The refrigerant C according to the present disclosure is preferably a refrigerant wherein
  when the mass % of HFO-1132(E), HFO-1123, and R1234yf based on their sum is respectively represented by x, y, and z,
  if $0<a\leq11.1$, coordinates (x,y,z) in a ternary composition diagram in which the sum of HFO-1132(E), HFO-1123, and R1234yf is $(100-a)$ mass % are within the range of a figure surrounded by straight lines JK', K'B, BD', D'C, and CJ that connect the following 5 points:
point J ($0.0049a^2-0.9645a+47.1$, $-0.0049a^2-0.0355a+52.9$, 0.0),
point K' ($0.0514a^2-2.4353a+61.7$, $-0.0323a^2+0.4122a+5.9$, $-0.0191a^2+1.0231a+32.4$),
point B (0.0, $0.0144a^2-1.6377a+58.7$, $-0.0144a^2+0.6377a+41.3$),
point D' (0.0, $0.0224a^2+0.968a+75.4$, $-0.0224a^2-1.968a+24.6$), and
point C ($-0.2304a^2-0.4062a+32.9$, $0.2304a^2-0.5938a+67.1$, 0.0),
or on the straight lines JK', K'B, and D'C (excluding point J, point B, point D', and point C);
  if $11.1<a\leq18.2$, coordinates (x,y,z) in the ternary composition diagram are within the range of a figure surrounded by straight lines JK', K'B, BW, and WJ that connect the following 4 points:
point J ($0.0243a^2-1.4161a+49.725$, $-0.0243a^2+0.4161a+50.275$, 0.0),
point K' ($0.0341a^2-2.1977a+61.187$, $-0.0236a^2+0.34a+5.636$, $-0.0105a^2+0.8577a+33.177$),
point B (0.0, $0.0075a^2-1.5156a+58.199$, $-0.0075a^2+0.5156a+41.801$) and
point W (0.0, $100.0-a$, 0.0),
or on the straight lines JK' and K'B (excluding point J, point B, and point W);
  if $18.2<a\leq26.7$, coordinates (x,y,z) in the ternary composition diagram are within the range of a figure surrounded by straight lines JK', K'B, BW, and WJ that connect the following 4 points:
point J ($0.0246a^2-1.4476a+50.184$, $-0.0246a^2+0.4476a+49.816$, 0.0),
point K' ($0.0196a^2-1.7863a+58.515$, $-0.0079a^2-0.1136a+8.702$, $-0.0117a^2+0.8999a+32.783$),
point B (0.0, $0.009a^2-1.6045a+59.318$, $-0.009a^2+0.6045a+40.682$) and
point W (0.0, $100.0-a$, 0.0),
or on the straight lines JK' and K'B (excluding point J, point B, and point W);
  if $26.7<a\leq36.7$, coordinates (x,y,z) in the ternary composition diagram are within the range of a figure surrounded by straight lines JK', K'A, AB, BW, and WJ that connect the following 5 points:
point J ($0.0183a^2-1.1399a+46.493$, $-0.0183a^2+0.1399a+53.507$, 0.0),
point K' ($-0.0051a^2+0.0929a+25.95$, 0.0, $0.0051a^2-1.0929a+74.05$),
point A ($0.0103a^2-1.9225a+68.793$, 0.0, $-0.0103a^2+0.9225a+31.207$),
point B (0.0, $0.0046a^2-1.41a+57.286$, $-0.0046a^2+0.41a+42.714$) and
point W (0.0, $100.0-a$, 0.0),
or on the straight lines JK', K'A, and AB (excluding point J, point B, and point W); and
  if $36.7<a\leq46.7$, coordinates (x,y,z) in the ternary composition diagram are within the range of a figure surrounded by straight lines JK', K'A, AB, BW, and WJ that connect the following 5 points:
point J ($-0.0134a^2+1.0956a+7.13$, $0.0134a^2-2.0956a+92.87$, 0.0),
point K' ($-1.892a+29.443$, 0.0, $0.892a+70.557$),
point A ($0.0085a^2-1.8102a+67.1$, 0.0, $-0.0085a^2+0.8102a+32.9$),
point B (0.0, $0.0012a^2-1.1659a+52.95$, $-0.0012a^2+0.1659a+47.05$) and
point W (0.0, $100.0-a$, 0.0),
or on the straight lines JK', K'A, and AB (excluding point J, point B, and point W). When the refrigerant according to the present disclosure satisfies the above requirements, it has a refrigerating capacity ratio of 85% or more relative to that of R410A, and a COP ratio of 92.5% or more relative to that of R410A. Additionally, the refrigerant has a WCF lower flammability and a WCFF lower flammability, and is classified as "Class 2L," which is a lower flammable refrigerant according to the ASHRAE standard.

When the refrigerant C according to the present disclosure further contains R32 in addition to HFO-1132 (E), HFO-1123, and R1234yf, the refrigerant may be a refrigerant wherein when the mass % of HFO-1132(E), HFO-1123, R1234yf, and R32 based on their sum is respectively represented by x, y, z, and a, if 0<a≤10.0, coordinates (x,y,z) in a ternary composition diagram in which the sum of HFO-1132(E), HFO-1123, and R1234yf is (100−a) mass % are within the range of a figure surrounded by straight lines that connect the following 4 points:
point a $(0.02a^2-2.46a+93.4, 0, -0.02a^2+2.46a+6.6)$,
point b' $(-0.008a^2-1.38a+56, 0.018a^2-0.53a+26.3, -0.01a^2+1.91a+17.7)$,
point c $(-0.016a^2+1.02a+77.6, 0.016a^2-1.02a+22.4, 0)$, and
point o $(100.0-a, 0.0, 0.0)$
or on the straight lines oa, ab', and b'c (excluding point o and point c);

if 10.0<a≤16.5, coordinates (x,y,z) in the ternary composition diagram are within the range of a figure surrounded by straight lines that connect the following 4 points:
point a $(0.0244a^2-2.5695a+94.056, 0, -0.0244a^2+2.5695a+5.944)$,
point b' $(0.1161a^2-1.9959a+59.749, 0.014a^2-0.3399a+24.8, -0.1301a^2+2.3358a+15.451)$,
point c $(-0.0161a^2+1.02a+77.6, 0.0161a^2-1.02a+22.4, 0)$, and
point o $(100.0-a, 0.0, 0.0)$,
or on the straight lines oa, ab', and b'c (excluding point o and point c); or if 16.5<a≤21.8, coordinates (x,y,z) in the ternary composition diagram are within the range of a figure surrounded by straight lines that connect the following 4 points:
point a $(0.0161a^2-2.3535a+92.742, 0, -0.0161a^2+2.3535a+7.258)$,
point b' $(-0.0435a^2-0.0435a+50.406, 0.0304a^2+1.8991a-0.0661, 0.0739a^2-1.8556a+49.6601)$,
point c $(-0.0161a^2+0.9959a+77.851, 0.0161a^2-0.9959a+22.149, 0)$, and
point o $(100.0-a, 0.0, 0.0)$,
or on the straight lines oa, ab', and b'c (excluding point o and point c). Note that when point b in the ternary composition diagram is defined as a point where a refrigerating capacity ratio of 95% relative to that of R410A and a COP ratio of 95% relative to that of R410A are both achieved, point b' is the intersection of straight line ab and an approximate line formed by connecting the points where the COP ratio relative to that of R410A is 95%. When the refrigerant according to the present disclosure meets the above requirements, the refrigerant has a refrigerating capacity ratio of 95% or more relative to that of R410A, and a COP ratio of 95% or more relative to that of R410A.

The refrigerant C according to the present disclosure may further comprise other additional refrigerants in addition to HFO-1132(E), HFO-1123, R1234yf, and R32 as long as the above properties and effects are not impaired. In this respect, the refrigerant according to the present disclosure preferably comprises HFO-1132(E), HFO-1123, R1234yf, and R32 in a total amount of 99.5 mass % or more, more preferably 99.75 mass % or more, and still more preferably 99.9 mass % or more, based on the entire refrigerant.

The refrigerant C according to the present disclosure may comprise HFO-1132(E), HFO-1123, R1234yf, and R32 in a total amount of 99.5 mass % or more, 99.75 mass % or more, or 99.9 mass % or more, based on the entire refrigerant.

Additional refrigerants are not particularly limited and can be widely selected. The mixed refrigerant may contain one additional refrigerant, or two or more additional refrigerants.

(Examples of Refrigerant C)

The present disclosure is described in more detail below with reference to Examples of refrigerant C. However, the refrigerant C is not limited to the Examples.

Mixed refrigerants were prepared by mixing HFO-1132 (E), HFO-1123, R1234yf, and R32 at mass % based on their sum shown in Tables 39 to 96.

The GWP of compositions each comprising a mixture of R410A (R32=50%/R125=50%) was evaluated based on the values stated in the Intergovernmental Panel on Climate Change (IPCC), fourth report. The GWP of HFO-1132(E), which was not stated therein, was assumed to be 1 from HFO-1132a (GWP=1 or less) and HFO-1123 (GWP=0.3, described in Patent Literature 1). The refrigerating capacity of compositions each comprising R410A and a mixture of HFO-1132(E) and HFO-1123 was determined by performing theoretical refrigeration cycle calculations for the mixed refrigerants using the National Institute of Science and Technology (NIST) and Reference Fluid Thermodynamic and Transport Properties Database (Refprop 9.0) under the following conditions.

For each of these mixed refrigerants, the COP ratio and the refrigerating capacity ratio relative to those of R410 were obtained. Calculation was conducted under the following conditions.

Evaporating temperature: 5° C.
Condensation temperature: 45° C.
Superheating temperature: 5 K
Subcooling temperature: 5 K
Compressor efficiency: 70%

Tables 39 to 96 show the resulting values together with the GWP of each mixed refrigerant. The COP and refrigerating capacity are ratios relative to R410A.

The coefficient of performance (COP) was determined by the following formula.

$$COP = (\text{refrigerating capacity or heating capacity}) / \text{power consumption}$$

TABLE 39

| Item | Unit | Comp. Ex. 1 | Comp. Ex. 2 A | Comp. Ex. 3 B | Comp. Ex. 4 C | Comp. Ex. 5 D' | Comp. Ex. 6 G | Comp. Ex. 7 I | Comp. Ex. 8 J | Ex. 1 K' |
|---|---|---|---|---|---|---|---|---|---|---|
| HFO-1132 (E) | Mass % | R410A | 68.6 | 0.0 | 32.9 | 0.0 | 72.0 | 72.0 | 47.1 | 61.7 |
| HFO-1123 | Mass % | | 0.0 | 58.7 | 67.1 | 75.4 | 28.0 | 0.0 | 52.9 | 5.9 |
| R1234yf | Mass % | | 31.4 | 41.3 | 0.0 | 24.6 | 0.0 | 28.0 | 0.0 | 32.4 |
| R32 | Mass % | | 0.0 | 0.0 | 0.0 | 0.0 | 0.0 | 0.0 | 0.0 | 0.0 |
| GWP | — | 2088 | 2 | 2 | 1 | 2 | 1 | 2 | 1 | 2 |
| COP ratio | % (relative to R410A) | 100 | 100.0 | 95.5 | 92.5 | 93.1 | 96.6 | 99.9 | 93.8 | 99.4 |

TABLE 39-continued

| Item | Unit | Comp. Ex. 1 | Comp. Ex. 2 A | Comp. Ex. 3 B | Comp. Ex. 4 C | Comp. Ex. 5 D' | Comp. Ex. 6 G | Comp. Ex. 7 I | Comp. Ex. 8 J | Ex. 1 K' |
|---|---|---|---|---|---|---|---|---|---|---|
| Refrigerating capacity ratio | % (relative to R410A) | 100 | 85.0 | 85.0 | 107.4 | 95.0 | 103.1 | 86.6 | 106.2 | 85.5 |

TABLE 40

| Item | Unit | Comp. Ex. 9 A | Comp. Ex. 10 B | Comp. Ex. 11 C | Comp. Ex. 12 D' | Comp. Ex. 13 G | Comp. Ex. 14 I | Comp. Ex. 15 J | Ex. 2 K' |
|---|---|---|---|---|---|---|---|---|---|
| HFO-1132(E) | Mass % | 55.3 | 0.0 | 18.4 | 0.0 | 60.9 | 60.9 | 40.5 | 47.0 |
| HFO-1123 | Mass % | 0.0 | 47.8 | 74.5 | 83.4 | 32.0 | 0.0 | 52.4 | 7.2 |
| R1234yf | Mass % | 37.6 | 45.1 | 0.0 | 9.5 | 0.0 | 32.0 | 0.0 | 38.7 |
| R32 | Mass % | 7.1 | 7.1 | 7.1 | 7.1 | 7.1 | 7.1 | 7.1 | 7.1 |
| GWP | — | 50 | 50 | 49 | 49 | 49 | 50 | 49 | 50 |
| COP ratio | % (relative to R410A) | 99.8 | 96.9 | 92.5 | 92.5 | 95.9 | 99.6 | 94.0 | 99.2 |
| Refrigerating capacity ratio | % (relative to R410A) | 85.0 | 85.0 | 110.5 | 106.0 | 106.5 | 87.7 | 108.9 | 85.5 |

TABLE 41

| Item | Unit | Comp. Ex. 16 A | Comp. Ex. 17 B | Comp. Ex. 18 C = D' | Comp. Ex. 19 G | Comp. Ex. 20 I | Comp. Ex. 21 J | Ex. 3 K' |
|---|---|---|---|---|---|---|---|---|
| HFO-1132(E) | Mass % | 48.4 | 0.0 | 0.0 | 55.8 | 55.8 | 37.0 | 41.0 |
| HFO-1123 | Mass % | 0.0 | 42.3 | 88.9 | 33.1 | 0.0 | 51.9 | 6.5 |
| R1234yf | Mass % | 40.5 | 46.6 | 0.0 | 0.0 | 33.1 | 0.0 | 41.4 |
| R32 | Mass % | 11.1 | 11.1 | 11.1 | 11.1 | 11.1 | 11.1 | 11.1 |
| GWP | — | 77 | 77 | 76 | 76 | 77 | 76 | 77 |
| COP ratio | % (relative to R410A) | 99.8 | 97.6 | 92.5 | 95.8 | 99.5 | 94.2 | 99.3 |
| Refrigerating capacity ratio | % (relative to R410A) | 85.0 | 85.0 | 112.0 | 108.0 | 88.6 | 110.2 | 85.4 |

TABLE 42

| Item | Unit | Comp. Ex. 22 A | Comp. Ex. 23 B | Comp. Ex. 24 G | Comp. Ex. 25 I | Comp. Ex. 26 J | Ex. 4 K' |
|---|---|---|---|---|---|---|---|
| HFO-1132(E) | Mass % | 42.8 | 0.0 | 52.1 | 52.1 | 34.3 | 36.5 |
| HFO-1123 | Mass % | 0.0 | 37.8 | 33.4 | 0.0 | 51.2 | 5.6 |
| R1234yf | Mass % | 42.7 | 47.7 | 0.0 | 33.4 | 0.0 | 43.4 |
| R32 | Mass % | 14.5 | 14.5 | 14.5 | 14.5 | 14.5 | 14.5 |
| GWP | — | 100 | 100 | 99 | 100 | 99 | 100 |
| COP ratio | % (relative to R410A) | 99.9 | 98.1 | 95.8 | 99.5 | 94.4 | 99.5 |
| Refrigerating capacity ratio | % (relative to R410A) | 85.0 | 85.0 | 109.1 | 89.6 | 111.1 | 85.3 |

TABLE 43

| Item | Unit | Comp. Ex. 27 A | Comp. Ex. 28 B | Comp. Ex. 29 G | Comp. Ex. 30 I | Comp. Ex. 31 J | Ex. 5 K' |
|---|---|---|---|---|---|---|---|
| HFO-1132(E) | Mass % | 37.0 | 0.0 | 48.6 | 48.6 | 32.0 | 32.5 |
| HFO-1123 | Mass % | 0.0 | 33.1 | 33.2 | 0.0 | 49.8 | 4.0 |
| R1234yf | Mass % | 44.8 | 48.7 | 0.0 | 33.2 | 0.0 | 45.3 |
| R32 | Mass % | 18.2 | 18.2 | 18.2 | 18.2 | 18.2 | 18.2 |
| GWP | — | 125 | 125 | 124 | 125 | 124 | 125 |
| COP ratio | % (relative to R410A) | 100.0 | 98.6 | 95.9 | 99.4 | 94.7 | 99.8 |
| Refrigerating capacity ratio | % (relative to R410A) | 85.0 | 85.0 | 110.1 | 90.8 | 111.9 | 85.2 |

TABLE 44

| Item | Unit | Comp. Ex. 32 A | Comp. Ex. 33 B | Comp. Ex. 34 G | Comp. Ex. 35 I | Comp. Ex. 36 J | Ex. 6 K' |
|---|---|---|---|---|---|---|---|
| HFO-1132(E) | Mass % | 31.5 | 0.0 | 45.4 | 45.4 | 30.3 | 28.8 |
| HFO-1123 | Mass % | 0.0 | 28.5 | 32.7 | 0.0 | 47.8 | 2.4 |
| R1234yf | Mass % | 46.6 | 49.6 | 0.0 | 32.7 | 0.0 | 46.9 |
| R32 | Mass % | 21.9 | 21.9 | 21.9 | 21.9 | 21.9 | 21.9 |
| GWP | — | 150 | 150 | 149 | 150 | 149 | 150 |
| COP ratio | % (relative to R410A) | 100.2 | 99.1 | 96.0 | 99.4 | 95.1 | 100.0 |
| Refrigerating capacity ratio | % (relative to R410A) | 85.0 | 85.0 | 111.0 | 92.1 | 112.6 | 85.1 |

TABLE 45

| Item | Unit | Comp. Ex. 37 A | Comp. Ex. 38 B | Comp. Ex. 39 G | Comp. Ex. 40 I | Comp. Ex. 41 J | Comp. Ex. 42 K' |
|---|---|---|---|---|---|---|---|
| HFO-1132(E) | Mass % | 24.8 | 0.0 | 41.8 | 41.8 | 29.1 | 24.8 |
| HFO-1123 | Mass % | 0.0 | 22.9 | 31.5 | 0.0 | 44.2 | 0.0 |
| R1234yf | Mass % | 48.5 | 50.4 | 0.0 | 31.5 | 0.0 | 48.5 |
| R32 | Mass % | 26.7 | 26.7 | 26.7 | 26.7 | 26.7 | 26.7 |
| GWP | — | 182 | 182 | 181 | 182 | 181 | 182 |
| COP ratio | % (relative to R410A) | 100.4 | 99.8 | 96.3 | 99.4 | 95.6 | 100.4 |
| Refrigerating capacity ratio | % (relative to R410A) | 85.0 | 85.0 | 111.9 | 93.8 | 113.2 | 85.0 |

TABLE 46

| Item | Unit | Comp. Ex. 43 A | Comp. Ex. 44 B | Comp. Ex. 45 G | Comp. Ex. 46 I | Comp. Ex. 47 J | Comp. Ex. 48 K' |
|---|---|---|---|---|---|---|---|
| HFO-1132(E) | Mass % | 21.3 | 0.0 | 40.0 | 40.0 | 28.8 | 24.3 |
| HFO-1123 | Mass % | 0 | 19.9 | 30.7 | 0.0 | 41.9 | 0.0 |
| R1234yf | Mass % | 49.4 | 50.8 | 0.0 | 30.7 | 0.0 | 46.4 |
| R32 | Mass % | 29.3 | 29.3 | 29.3 | 29.3 | 29.3 | 29.3 |
| GWP | — | 200 | 200 | 198 | 199 | 198 | 200 |
| COP ratio | % (relative to R410A) | 100.6 | 100.1 | 96.6 | 99.5 | 96.1 | 100.4 |
| Refrigerating capacity ratio | % (relative to R410A) | 85.0 | 85.0 | 112.4 | 94.8 | 113.6 | 86.7 |

TABLE 47

| Item | Unit | Comp. Ex. 49 A | Comp. Ex. 50 B | Comp. Ex. 51 G | Comp. Ex. 52 I | Comp. Ex. 53 J | Comp. Ex. 54 K' |
|---|---|---|---|---|---|---|---|
| HFO-1132(E) | Mass % | 12.1 | 0.0 | 35.7 | 35.7 | 29.3 | 22.5 |
| HFO-1123 | Mass % | 0.0 | 11.7 | 27.6 | 0.0 | 34.0 | 0.0 |
| R1234yf | Mass % | 51.2 | 51.6 | 0.0 | 27.6 | 0.0 | 40.8 |
| R32 | Mass % | 36.7 | 36.7 | 36.7 | 36.7 | 36.7 | 36.7 |
| GWP | — | 250 | 250 | 248 | 249 | 248 | 250 |
| COP ratio | % (relative to R410A) | 101.2 | 101.0 | 96.4 | 99.6 | 97.0 | 100.4 |
| Refrigerating capacity ratio | % (relative to R410A) | 85.0 | 85.0 | 113.2 | 97.6 | 113.9 | 90.9 |

TABLE 48

| Item | Unit | Comp. Ex. 55 A | Comp. Ex. 56 B | Comp. Ex. 57 G | Comp. Ex. 58 I | Comp. Ex. 59 J | Comp. Ex. 60 K' |
|---|---|---|---|---|---|---|---|
| HFO-1132(E) | Mass % | 3.8 | 0.0 | 32.0 | 32.0 | 29.4 | 21.1 |
| HFO-1123 | Mass % | 0.0 | 3.9 | 23.9 | 0.0 | 26.5 | 0.0 |
| R1234yf | Mass % | 52.1 | 52.0 | 0.0 | 23.9 | 0.0 | 34.8 |
| R32 | Mass % | 44.1 | 44.1 | 44.1 | 44.1 | 44.1 | 44.1 |
| GWP | — | 300 | 300 | 298 | 299 | 298 | 299 |
| COP ratio | % (relative to R410A) | 101.8 | 101.8 | 97.9 | 99.8 | 97.8 | 100.5 |
| Refrigerating capacity ratio | % (relative to R410A) | 85.0 | 85.0 | 113.7 | 100.4 | 113.9 | 94.9 |

TABLE 49

| Item | Unit | Comp. Ex. 61 A = B | Comp. Ex. 62 G | Comp. Ex. 63 I | Comp. Ex. 64 J | Comp. Ex. 65 K' |
|---|---|---|---|---|---|---|
| HFO-1132 (E) | Mass % | 0.0 | 30.4 | 30.4 | 28.9 | 20.4 |
| HFO-1123 | Mass % | 0.0 | 21.8 | 0.0 | 23.3 | 0.0 |
| R1234yf | Mass % | 52.2 | 0.0 | 21.8 | 0.0 | 31.8 |
| R32 | Mass % | 47.8 | 47.8 | 47.8 | 47.8 | 47.8 |
| GWP | — | 325 | 323 | 324 | 323 | 324 |
| COP ratio | % (relative to R410A) | 102.1 | 98.2 | 100.0 | 98.2 | 100.6 |
| Refrigerating capacity ratio | % relative to R410A | 85.0 | 113.8 | 101.8 | 113.9 | 96.8 |

TABLE 50

| Item | Unit | Comp. Ex. 66 | Ex. 7 | Ex. 8 | Ex. 9 | Ex. 10 | Ex. 11 | Ex. 12 | Ex. 13 |
|---|---|---|---|---|---|---|---|---|---|
| HFO-1132 (E) | Mass % | 5.0 | 10.0 | 15.0 | 20.0 | 25.0 | 30.0 | 35.0 | 40.0 |
| HFO-1123 | Mass % | 82.9 | 77.9 | 72.9 | 67.9 | 62.9 | 57.9 | 52.9 | 47.9 |
| R1234yf | Mass % | 5.0 | 5.0 | 5.0 | 5.0 | 5.0 | 5.0 | 5.0 | 5.0 |
| R32 | Mass % | 7.1 | 7.1 | 7.1 | 7.1 | 7.1 | 7.1 | 7.1 | 7.1 |
| GWP | — | 49 | 49 | 49 | 49 | 49 | 49 | 49 | 49 |
| COP ratio | % (relative to R410A) | 92.4 | 92.6 | 92.8 | 93.1 | 93.4 | 93.7 | 94.1 | 94.5 |
| Refrigerating capacity ratio | % (relative to R410A) | 108.4 | 108.3 | 108.2 | 107.9 | 107.6 | 107.2 | 106.8 | 106.3 |

TABLE 51

| Item | Unit | Ex. 14 | Ex. 15 | Ex. 16 | Ex. 17 | Comp. Ex. 67 | Ex. 18 | Ex. 19 | Ex. 20 |
|---|---|---|---|---|---|---|---|---|---|
| HFO-1132 (E) | Mass % | 45.0 | 50.0 | 55.0 | 60.0 | 65.0 | 10.0 | 15.0 | 20.0 |
| HFO-1123 | Mass % | 42.9 | 37.9 | 32.9 | 27.9 | 22.9 | 72.9 | 67.9 | 62.9 |
| R1234yf | Mass % | 5.0 | 5.0 | 5.0 | 5.0 | 5.0 | 10.0 | 10.0 | 10.0 |
| R32 | Mass % | 7.1 | 7.1 | 7.1 | 7.1 | 7.1 | 7.1 | 7.1 | 7.1 |
| GWP | — | 49 | 49 | 49 | 49 | 49 | 49 | 49 | 49 |
| COP ratio | % (relative to R410A) | 95.0 | 95.4 | 95.9 | 96.4 | 96.9 | 93.0 | 93.3 | 93.6 |
| Refrigerating capacity ratio | % (relative to R410A) | 105.8 | 105.2 | 104.5 | 103.9 | 103.1 | 105.7 | 105.5 | 105.2 |

TABLE 52

| Item | Unit | Ex. 21 | Ex. 22 | Ex. 23 | Ex. 24 | Ex. 25 | Ex. 26 | Ex. 27 | Ex. 28 |
|---|---|---|---|---|---|---|---|---|---|
| HFO-1132(E) | Mass % | 25.0 | 30.0 | 35.0 | 40.0 | 45.0 | 50.0 | 55.0 | 60.0 |
| HFO-1123 | Mass % | 57.9 | 52.9 | 47.9 | 42.9 | 37.9 | 32.9 | 27.9 | 22.9 |
| R1234yf | Mass % | 10.0 | 10.0 | 10.0 | 10.0 | 10.0 | 10.0 | 10.0 | 10.0 |
| R32 | Mass % | 7.1 | 7.1 | 7.1 | 7.1 | 7.1 | 7.1 | 7.1 | 7.1 |
| GWP | — | 49 | 49 | 49 | 49 | 49 | 49 | 49 | 49 |
| COP ratio | % (relative to R410A) | 93.9 | 94.2 | 94.6 | 95.0 | 95.5 | 96.0 | 96.4 | 96.9 |
| Refrigerating capacity ratio | % (relative to R410A) | 104.9 | 104.5 | 104.1 | 103.6 | 103.0 | 102.4 | 101.7 | 101.0 |

TABLE 53

| Item | Unit | Comp. Ex. 68 | Ex. 29 | Ex. 30 | Ex. 31 | Ex. 32 | Ex. 33 | Ex. 34 | Ex. 35 |
|---|---|---|---|---|---|---|---|---|---|
| HFO-1132(E) | Mass % | 65.0 | 10.0 | 15.0 | 20.0 | 25.0 | 30.0 | 35.0 | 40.0 |
| HFO-1123 | Mass % | 17.9 | 67.9 | 62.9 | 57.9 | 52.9 | 47.9 | 42.9 | 37.9 |
| R1234yf | Mass % | 10.0 | 15.0 | 15.0 | 15.0 | 15.0 | 15.0 | 15.0 | 15.0 |
| R32 | Mass % | 7.1 | 7.1 | 7.1 | 7.1 | 7.1 | 7.1 | 7.1 | 7.1 |
| GWP | — | 49 | 49 | 49 | 49 | 49 | 49 | 49 | 49 |
| COP ratio | % (relative to R410A) | 97.4 | 93.5 | 93.8 | 94.1 | 94.4 | 94.8 | 95.2 | 95.6 |
| Refrigerating capacity ratio | % (relative to R410A) | 100.3 | 102.9 | 102.7 | 102.5 | 102.1 | 101.7 | 101.2 | 100.7 |

TABLE 54

| Item | Unit | Ex. 36 | Ex. 37 | Ex. 38 | Ex. 39 | Comp. Ex. 69 | Ex. 40 | Ex. 41 | Ex. 42 |
|---|---|---|---|---|---|---|---|---|---|
| HFO-1132(E) | Mass % | 45.0 | 50.0 | 55.0 | 60.0 | 65.0 | 10.0 | 15.0 | 20.0 |
| HFO-1123 | Mass % | 32.9 | 27.9 | 22.9 | 17.9 | 12.9 | 62.9 | 57.9 | 52.9 |
| R1234yf | Mass % | 15.0 | 15.0 | 15.0 | 15.0 | 15.0 | 20.0 | 20.0 | 20.0 |
| R32 | Mass % | 7.1 | 7.1 | 7.1 | 7.1 | 7.1 | 7.1 | 7.1 | 7.1 |
| GWP | — | 49 | 49 | 49 | 49 | 49 | 49 | 49 | 49 |
| COP ratio | % (relative to R410A) | 96.0 | 96.5 | 97.0 | 97.5 | 98.0 | 94.0 | 94.3 | 94.6 |
| Refrigerating capacity ratio | % (relative to R410A) | 100.1 | 99.5 | 98.9 | 98.1 | 97.4 | 100.1 | 99.9 | 99.6 |

TABLE 55

| Item | Unit | Ex. 43 | Ex. 44 | Ex. 45 | Ex. 46 | Ex. 47 | Ex. 48 | Ex. 49 | Ex. 50 |
|---|---|---|---|---|---|---|---|---|---|
| HFO-1132(E) | Mass % | 25.0 | 30.0 | 35.0 | 40.0 | 45.0 | 50.0 | 55.0 | 60.0 |
| HFO-1123 | Mass % | 47.9 | 42.9 | 37.9 | 32.9 | 27.9 | 22.9 | 17.9 | 12.9 |
| R1234yf | Mass % | 20.0 | 20.0 | 20.0 | 20.0 | 20.0 | 20.0 | 20.0 | 20.0 |
| R32 | Mass % | 7.1 | 7.1 | 7.1 | 7.1 | 7.1 | 7.1 | 7.1 | 7.1 |
| GWP | — | 49 | 49 | 49 | 49 | 49 | 49 | 49 | 49 |
| COP ratio | % (relative to R410A) | 95.0 | 95.3 | 95.7 | 96.2 | 96.6 | 97.1 | 97.6 | 98.1 |
| Refrigerating capacity ratio | % (relative to R410A) | 99.2 | 98.8 | 98.3 | 97.8 | 97.2 | 96.6 | 95.9 | 95.2 |

TABLE 56

| Item | Unit | Comp. Ex. 70 | Ex. 51 | Ex. 52 | Ex. 53 | Ex. 54 | Ex. 55 | Ex. 56 | Ex. 57 |
|---|---|---|---|---|---|---|---|---|---|
| HFO-1132(E) | Mass % | 65.0 | 10.0 | 15.0 | 20.0 | 25.0 | 30.0 | 35.0 | 40.0 |
| HFO-1123 | Mass % | 7.9 | 57.9 | 52.9 | 47.9 | 42.9 | 37.9 | 32.9 | 27.9 |
| R1234yf | Mass % | 20.0 | 25.0 | 25.0 | 25.0 | 25.0 | 25.0 | 25.0 | 25.0 |
| R32 | Mass % | 7.1 | 7.1 | 7.1 | 7.1 | 7.1 | 7.1 | 7.1 | 7.1 |
| GWP | — | 49 | 50 | 50 | 50 | 50 | 50 | 50 | 50 |
| COP ratio | % (relative to R410A) | 98.6 | 94.6 | 94.9 | 95.2 | 95.5 | 95.9 | 96.3 | 96.8 |
| Refrigerating capacity ratio | % (relative to R410A) | 94.4 | 97.1 | 96.9 | 96.7 | 96.3 | 95.9 | 95.4 | 94.8 |

TABLE 57

| Item | Unit | Ex. 58 | Ex. 59 | Ex. 60 | Ex. 61 | Comp. Ex. 71 | Ex. 62 | Ex. 63 | Ex. 64 |
|---|---|---|---|---|---|---|---|---|---|
| HFO-1132(E) | Mass % | 45.0 | 50.0 | 55.0 | 60.0 | 65.0 | 10.0 | 15.0 | 20.0 |
| HFO-1123 | Mass % | 7.1 | 7.1 | 7.1 | 7.1 | 7.1 | 7.1 | 7.1 | 7.1 |

TABLE 57-continued

| Item | Unit | Ex. 58 | Ex. 59 | Ex. 60 | Ex. 61 | Comp. Ex. 71 | Ex. 62 | Ex. 63 | Ex. 64 |
|---|---|---|---|---|---|---|---|---|---|
| R1234yf | Mass % | 25.0 | 25.0 | 25.0 | 25.0 | 25.0 | 30.0 | 30.0 | 30.0 |
| R32 | Mass % | 7.1 | 7.1 | 7.1 | 7.1 | 7.1 | 7.1 | 7.1 | 7.1 |
| GWP | — | 50 | 50 | 50 | 50 | 50 | 50 | 50 | 50 |
| COP ratio | % (relative to R410A) | 97.2 | 97.7 | 98.2 | 98.7 | 99.2 | 95.2 | 95.5 | 95.8 |
| Refrigerating capacity ratio | % (relative to R410A) | 94.2 | 93.6 | 92.9 | 92.2 | 91.4 | 94.2 | 93.9 | 93.7 |

TABLE 58

| Item | Unit | Ex. 65 | Ex. 66 | Ex. 67 | Ex. 68 | Ex. 69 | Ex. 70 | Ex. 71 | Ex. 72 |
|---|---|---|---|---|---|---|---|---|---|
| HFO-1132(E) | Mass % | 25.0 | 30.0 | 35.0 | 40.0 | 45.0 | 50.0 | 55.0 | 60.0 |
| HFO-1123 | Mass % | 37.9 | 32.9 | 27.9 | 22.9 | 17.9 | 12.9 | 7.9 | 2.9 |
| R1234yf | Mass % | 30.0 | 30.0 | 30.0 | 30.0 | 30.0 | 30.0 | 30.0 | 30.0 |
| R32 | Mass % | 7.1 | 7.1 | 7.1 | 7.1 | 7.1 | 7.1 | 7.1 | 7.1 |
| GWP | — | 50 | 50 | 50 | 50 | 50 | 50 | 50 | 50 |
| COP ratio | % (relative to R410A) | 96.2 | 96.6 | 97.0 | 97.4 | 97.9 | 98.3 | 98.8 | 99.3 |
| Refrigerating capacity ratio | % (relative to R410A) | 93.3 | 92.9 | 92.4 | 91.8 | 91.2 | 90.5 | 89.8 | 89.1 |

TABLE 59

| Item | Unit | Ex. 73 | Ex. 74 | Ex. 75 | Ex. 76 | Ex. 77 | Ex. 78 | Ex. 79 | Ex. 80 |
|---|---|---|---|---|---|---|---|---|---|
| HFO-1132(E) | Mass % | 10.0 | 15.0 | 20.0 | 25.0 | 30.0 | 35.0 | 40.0 | 45.0 |
| HFO-1123 | Mass % | 47.9 | 42.9 | 37.9 | 32.9 | 27.9 | 22.9 | 17.9 | 12.9 |
| R1234yf | Mass % | 35.0 | 35.0 | 35.0 | 35.0 | 35.0 | 35.0 | 35.0 | 35.0 |
| R32 | Mass % | 7.1 | 7.1 | 7.1 | 7.1 | 7.1 | 7.1 | 7.1 | 7.1 |
| GWP | — | 50 | 50 | 50 | 50 | 50 | 50 | 50 | 50 |
| COP ratio | % (relative to R410A) | 95.9 | 96.2 | 96.5 | 96.9 | 97.2 | 97.7 | 98.1 | 98.5 |
| Refrigerating capacity ratio | % (relative to R410A) | 91.1 | 90.9 | 90.6 | 90.2 | 89.8 | 89.3 | 88.7 | 88.1 |

TABLE 60

| Item | Unit | Ex. 81 | Ex. 82 | Ex. 83 | Ex. 84 | Ex. 85 | Ex. 86 | Ex. 87 | Ex. 88 |
|---|---|---|---|---|---|---|---|---|---|
| HFO-1132(E) | Mass % | 50.0 | 55.0 | 10.0 | 15.0 | 20.0 | 25.0 | 30.0 | 35.0 |
| HFO-1123 | Mass % | 7.9 | 2.9 | 42.9 | 37.9 | 32.9 | 27.9 | 22.9 | 17.9 |
| R1234yf | Mass % | 35.0 | 35.0 | 40.0 | 40.0 | 40.0 | 40.0 | 40.0 | 40.0 |
| R32 | Mass % | 7.1 | 7.1 | 7.1 | 7.1 | 7.1 | 7.1 | 7.1 | 7.1 |
| GWP | — | 50 | 50 | 50 | 50 | 50 | 50 | 50 | 50 |
| COP ratio | % (relative to R410A) | 99.0 | 99.4 | 96.6 | 96.9 | 97.2 | 97.6 | 98.0 | 98.4 |
| Refrigerating capacity ratio | % (relative to R410A) | 87.4 | 86.7 | 88.0 | 87.8 | 87.5 | 87.1 | 86.6 | 86.1 |

TABLE 61

| Item | Unit | Comp. Ex. 72 | Comp. Ex. 73 | Comp. Ex. 74 | Comp. Ex. 75 | Comp. Ex. 76 | Comp. Ex. 77 | Comp. Ex. 78 | Comp. Ex. 79 |
|---|---|---|---|---|---|---|---|---|---|
| HFO-1132(E) | Mass % | 40.0 | 45.0 | 50.0 | 10.0 | 15.0 | 20.0 | 25.0 | 30.0 |
| HFO-1123 | Mass % | 12.9 | 7.9 | 2.9 | 37.9 | 32.9 | 27.9 | 22.9 | 17.9 |

TABLE 61-continued

| Item | Unit | Comp. Ex. 72 | Comp. Ex. 73 | Comp. Ex. 74 | Comp. Ex. 75 | Comp. Ex. 76 | Comp. Ex. 77 | Comp. Ex. 78 | Comp. Ex. 79 |
|---|---|---|---|---|---|---|---|---|---|
| R1234yf | Mass % | 40.0 | 40.0 | 40.0 | 45.0 | 45.0 | 45.0 | 45.0 | 45.0 |
| R32 | Mass % | 7.1 | 7.1 | 7.1 | 7.1 | 7.1 | 7.1 | 7.1 | 7.1 |
| GWP | — | 50 | 50 | 50 | 50 | 50 | 50 | 50 | 50 |
| COP ratio | % (relative to R410A) | 98.8 | 99.2 | 99.6 | 97.4 | 97.7 | 98.0 | 98.3 | 98.7 |
| Refrigerating capacity ratio | % (relative to R410A) | 85.5 | 84.9 | 84.2 | 84.9 | 84.6 | 84.3 | 83.9 | 83.5 |

TABLE 62

| Item | Unit | Comp. Ex. 80 | Comp. Ex. 81 | Comp. Ex. 82 |
|---|---|---|---|---|
| HFO-1132(E) | Mass % | 35.0 | 40.0 | 45.0 |
| HFO-1123 | Mass % | 12.9 | 7.9 | 2.9 |
| R1234yf | Mass % | 45.0 | 45.0 | 45.0 |
| R32 | Mass % | 7.1 | 7.1 | 7.1 |
| GWP | — | 50 | 50 | 50 |
| COP ratio | % (relative to R410A) | 99.1 | 99.5 | 99.9 |
| Refrigerating capacity ratio | % (relative to R410A) | 82.9 | 82.3 | 81.7 |

TABLE 63

| Item | Unit | Ex. 89 | Ex. 90 | Ex. 91 | Ex. 92 | Ex. 93 | Ex. 94 | Ex. 95 | Ex. 96 |
|---|---|---|---|---|---|---|---|---|---|
| HFO-1132(E) | Mass % | 10.0 | 15.0 | 20.0 | 25.0 | 30.0 | 35.0 | 40.0 | 45.0 |
| HFO-1123 | Mass % | 70.5 | 65.5 | 60.5 | 55.5 | 50.5 | 45.5 | 40.5 | 35.5 |
| R1234yf | Mass % | 5.0 | 5.0 | 5.0 | 5.0 | 5.0 | 5.0 | 5.0 | 5.0 |
| R32 | Mass % | 14.5 | 14.5 | 14.5 | 14.5 | 14.5 | 14.5 | 14.5 | 14.5 |
| GWP | — | 99 | 99 | 99 | 99 | 99 | 99 | 99 | 99 |
| COP ratio | % (relative to R410A) | 93.7 | 93.9 | 94.1 | 94.4 | 94.7 | 95.0 | 95.4 | 95.8 |
| Refrigerating capacity ratio | % (relative to R410A) | 110.2 | 110.0 | 109.7 | 109.3 | 108.9 | 108.4 | 107.9 | 107.3 |

TABLE 64

| Item | Unit | Ex. 97 | Comp. Ex. 83 | Ex. 98 | Ex. 99 | Ex. 100 | Ex. 101 | Ex. 102 | Ex. 103 |
|---|---|---|---|---|---|---|---|---|---|
| HFO-1132(E) | Mass % | 50.0 | 55.0 | 10.0 | 15.0 | 20.0 | 25.0 | 30.0 | 35.0 |
| HFO-1123 | Mass % | 30.5 | 25.5 | 65.5 | 60.5 | 55.5 | 50.5 | 45.5 | 40.5 |
| R1234yf | Mass % | 5.0 | 5.0 | 10.0 | 10.0 | 10.0 | 10.0 | 10.0 | 10.0 |
| R32 | Mass % | 14.5 | 14.5 | 14.5 | 14.5 | 14.5 | 14.5 | 14.5 | 14.5 |
| GWP | — | 99 | 99 | 99 | 99 | 99 | 99 | 99 | 99 |
| COP ratio | % (relative to R410A) | 96.2 | 96.6 | 94.2 | 94.4 | 94.6 | 94.9 | 95.2 | 95.5 |
| Refrigerating capacity ratio | % (relative to R410A) | 106.6 | 106.0 | 107.5 | 107.3 | 107.0 | 106.6 | 106.1 | 105.6 |

TABLE 65

| Item | Unit | Ex. 104 | Ex. 105 | Ex. 106 | Comp. Ex. 84 | Ex. 107 | Ex. 108 | Ex. 109 | Ex. 110 |
|---|---|---|---|---|---|---|---|---|---|
| HFO-1132(E) | Mass % | 40.0 | 45.0 | 50.0 | 55.0 | 10.0 | 15.0 | 20.0 | 25.0 |
| HFO-1123 | Mass % | 35.5 | 30.5 | 25.5 | 20.5 | 60.5 | 55.5 | 50.5 | 45.5 |

TABLE 65-continued

| Item | Unit | Ex. 104 | Ex. 105 | Ex. 106 | Comp. Ex. 84 | Ex. 107 | Ex. 108 | Ex. 109 | Ex. 110 |
|---|---|---|---|---|---|---|---|---|---|
| R1234yf | Mass % | 10.0 | 10.0 | 10.0 | 10.0 | 15.0 | 15.0 | 15.0 | 15.0 |
| R32 | Mass % | 14.5 | 14.5 | 14.5 | 14.5 | 14.5 | 14.5 | 14.5 | 14.5 |
| GWP | — | 99 | 99 | 99 | 99 | 99 | 99 | 99 | 99 |
| COP ratio | % (relative to R410A) | 95.9 | 96.3 | 96.7 | 97.1 | 94.6 | 94.8 | 95.1 | 95.4 |
| Refrigerating capacity ratio | % (relative to R410A) | 105.1 | 104.5 | 103.8 | 103.1 | 104.7 | 104.5 | 104.1 | 103.7 |

TABLE 66

| Item | Unit | Ex. 111 | Ex. 112 | Ex. 113 | Ex. 114 | Ex. 115 | Comp. Ex. 85 | Ex. 116 | Ex. 117 |
|---|---|---|---|---|---|---|---|---|---|
| HFO-1132(E) | Mass % | 30.0 | 35.0 | 40.0 | 45.0 | 50.0 | 55.0 | 10.0 | 15.0 |
| HFO-1123 | Mass % | 40.5 | 35.5 | 30.5 | 25.5 | 20.5 | 15.5 | 55.5 | 50.5 |
| R1234yf | Mass % | 15.0 | 15.0 | 15.0 | 15.0 | 15.0 | 15.0 | 20.0 | 20.0 |
| R32 | Mass % | 14.5 | 14.5 | 14.5 | 14.5 | 14.5 | 14.5 | 14.5 | 14.5 |
| GWP | — | 99 | 99 | 99 | 99 | 99 | 99 | 99 | 99 |
| COP ratio | % (relative to R410A) | 95.7 | 96.0 | 96.4 | 96.8 | 97.2 | 97.6 | 95.1 | 95.3 |
| Refrigerating capacity ratio | % (relative to R410A) | 103.3 | 102.8 | 102.2 | 101.6 | 101.0 | 100.3 | 101.8 | 101.6 |

TABLE 67

| Item | Unit | Ex. 118 | Ex. 119 | Ex. 120 | Ex. 121 | Ex. 122 | Ex. 123 | Ex. 124 | Comp. Ex. 86 |
|---|---|---|---|---|---|---|---|---|---|
| HFO-1132(E) | Mass % | 20.0 | 25.0 | 30.0 | 35.0 | 40.0 | 45.0 | 50.0 | 55.0 |
| HFO-1123 | Mass % | 45.5 | 40.5 | 35.5 | 30.5 | 25.5 | 20.5 | 15.5 | 10.5 |
| R1234yf | Mass % | 20.0 | 20.0 | 20.0 | 20.0 | 20.0 | 20.0 | 20.0 | 20.0 |
| R32 | Mass % | 14.5 | 14.5 | 14.5 | 14.5 | 14.5 | 14.5 | 14.5 | 14.5 |
| GWP | — | 99 | 99 | 99 | 99 | 99 | 99 | 99 | 99 |
| COP ratio | % (relative to R410A) | 95.6 | 95.9 | 96.2 | 96.5 | 96.9 | 97.3 | 97.7 | 98.2 |
| Refrigerating capacity ratio | % (relative to R410A) | 101.2 | 100.8 | 100.4 | 99.9 | 99.3 | 98.7 | 98.0 | 97.3 |

TABLE 68

| Item | Unit | Ex. 125 | Ex. 126 | Ex. 127 | Ex. 128 | Ex. 129 | Ex. 130 | Ex. 131 | Ex. 132 |
|---|---|---|---|---|---|---|---|---|---|
| HFO-1132(E) | Mass % | 10.0 | 15.0 | 20.0 | 25.0 | 30.0 | 35.0 | 40.0 | 45.0 |
| HFO-1123 | Mass % | 50.5 | 45.5 | 40.5 | 35.5 | 30.5 | 25.5 | 20.5 | 15.5 |
| R1234yf | Mass % | 25.0 | 25.0 | 25.0 | 25.0 | 25.0 | 25.0 | 25.0 | 25.0 |
| R32 | Mass % | 14.5 | 14.5 | 14.5 | 14.5 | 14.5 | 14.5 | 14.5 | 14.5 |
| GWP | — | 99 | 99 | 99 | 99 | 99 | 99 | 99 | 99 |
| COP ratio | % (relative to R410A) | 95.6 | 95.9 | 96.1 | 96.4 | 96.7 | 97.1 | 97.5 | 97.9 |
| Refrigerating capacity ratio | % (relative to R410A) | 98.9 | 98.6 | 98.3 | 97.9 | 97.4 | 96.9 | 96.3 | 95.7 |

TABLE 69

| Item | Unit | Ex. 133 | Comp. Ex. 87 | Ex. 134 | Ex. 135 | Ex. 136 | Ex. 137 | Ex. 138 | Ex. 139 |
|---|---|---|---|---|---|---|---|---|---|
| HFO-1132(E) | Mass % | 50.0 | 55.0 | 10.0 | 15.0 | 20.0 | 25.0 | 30.0 | 35.0 |
| HFO-1123 | Mass % | 10.5 | 5.5 | 45.5 | 40.5 | 35.5 | 30.5 | 25.5 | 20.5 |
| R1234yf | Mass % | 25.0 | 25.0 | 30.0 | 30.0 | 30.0 | 30.0 | 30.0 | 30.0 |
| R32 | Mass % | 14.5 | 14.5 | 14.5 | 14.5 | 14.5 | 14.5 | 14.5 | 14.5 |
| GWP | — | 99 | 99 | 100 | 100 | 100 | 100 | 100 | 100 |
| COP ratio | % (relative to R410A) | 98.3 | 98.7 | 96.2 | 96.4 | 96.7 | 97.0 | 97.3 | 97.7 |
| Refrigerating capacity ratio | % (relative to R410A) | 95.0 | 94.3 | 95.8 | 95.6 | 95.2 | 94.8 | 94.4 | 93.8 |

TABLE 70

| Item | Unit | Ex. 140 | Ex. 141 | Ex. 142 | Ex. 143 | Ex. 144 | Ex. 145 | Ex. 146 | Ex. 147 |
|---|---|---|---|---|---|---|---|---|---|
| HFO-1132(E) | Mass % | 40.0 | 45.0 | 50.0 | 10.0 | 15.0 | 20.0 | 25.0 | 30.0 |
| HFO-1123 | Mass % | 15.5 | 10.5 | 5.5 | 40.5 | 35.5 | 30.5 | 25.5 | 20.5 |
| R1234yf | Mass % | 30.0 | 30.0 | 30.0 | 35.0 | 35.0 | 35.0 | 35.0 | 35.0 |
| R32 | Mass % | 14.5 | 14.5 | 14.5 | 14.5 | 14.5 | 14.5 | 14.5 | 14.5 |
| GWP | — | 100 | 100 | 100 | 100 | 100 | 100 | 100 | 100 |
| COP ratio | % (relative to R410A) | 98.1 | 98.5 | 98.9 | 96.8 | 97.0 | 97.3 | 97.6 | 97.9 |
| Refrigerating capacity ratio | % (relative to R410A) | 93.3 | 92.6 | 92.0 | 92.8 | 92.5 | 92.2 | 91.8 | 91.3 |

TABLE 71

| Item | Unit | Ex. 148 | Ex. 149 | Ex. 150 | Ex. 151 | Ex. 152 | Ex. 153 | Ex. 154 | Ex. 155 |
|---|---|---|---|---|---|---|---|---|---|
| HFO-1132(E) | Mass % | 35.0 | 40.0 | 45.0 | 10.0 | 15.0 | 20.0 | 25.0 | 30.0 |
| HFO-1123 | Mass % | 15.5 | 10.5 | 5.5 | 35.5 | 30.5 | 25.5 | 20.5 | 15.5 |
| R1234yf | Mass % | 35.0 | 35.0 | 35.0 | 40.0 | 40.0 | 40.0 | 40.0 | 40.0 |
| R32 | Mass % | 14.5 | 14.5 | 14.5 | 14.5 | 14.5 | 14.5 | 14.5 | 14.5 |
| GWP | — | 100 | 100 | 100 | 100 | 100 | 100 | 100 | 100 |
| COP ratio | % (relative to R410A) | 98.3 | 98.7 | 99.1 | 97.4 | 97.7 | 98.0 | 98.3 | 98.6 |
| Refrigerating capacity ratio | % (relative to R410A) | 90.8 | 90.2 | 89.6 | 89.6 | 89.4 | 89.0 | 88.6 | 88.2 |

TABLE 72

| Item | Unit | Ex. 156 | Ex. 157 | Ex. 158 | Ex. 159 | Ex. 160 | Comp. Ex. 88 | Comp. Ex. 89 | Comp. Ex. 90 |
|---|---|---|---|---|---|---|---|---|---|
| HFO-1132(E) | Mass % | 35.0 | 40.0 | 10.0 | 15.0 | 20.0 | 25.0 | 30.0 | 35.0 |
| HFO-1123 | Mass % | 10.5 | 5.5 | 30.5 | 25.5 | 20.5 | 15.5 | 10.5 | 5.5 |
| R1234yf | Mass % | 40.0 | 40.0 | 45.0 | 45.0 | 45.0 | 45.0 | 45.0 | 45.0 |
| R32 | Mass % | 14.5 | 14.5 | 14.5 | 14.5 | 14.5 | 14.5 | 14.5 | 14.5 |
| GWP | — | 100 | 100 | 100 | 100 | 100 | 100 | 100 | 100 |
| COP ratio | % (relative to R410A) | 98.9 | 99.3 | 98.1 | 98.4 | 98.7 | 98.9 | 99.3 | 99.6 |
| Refrigerating capacity ratio | % (relative to R410A) | 87.6 | 87.1 | 86.5 | 86.2 | 85.9 | 85.5 | 85.0 | 84.5 |

TABLE 73

| Item | Unit | Comp. Ex. 91 | Comp. Ex. 92 | Comp. Ex. 93 | Comp. Ex. 94 | Comp. Ex. 95 |
|---|---|---|---|---|---|---|
| HFO-1132(E) | Mass % | 10.0 | 15.0 | 20.0 | 25.0 | 30.0 |
| HFO-1123 | Mass % | 25.5 | 20.5 | 15.5 | 10.5 | 5.5 |
| R1234yf | Mass % | 50.0 | 50.0 | 50.0 | 50.0 | 50.0 |
| R32 | Mass % | 14.5 | 14.5 | 14.5 | 14.5 | 14.5 |
| GWP | — | 100 | 100 | 100 | 100 | 100 |
| COP ratio | % (relative to R410A) | 98.9 | 99.1 | 99.4 | 99.7 | 100.0 |
| Refrigerating capacity ratio | % (relative to R410A) | 83.3 | 83.0 | 82.7 | 82.2 | 81.8 |

TABLE 74

| Item | Unit | Ex. 161 | Ex. 162 | Ex. 163 | Ex. 164 | Ex. 165 | Ex. 166 | Ex. 167 | Ex. 168 |
|---|---|---|---|---|---|---|---|---|---|
| HFO-1132(E) | Mass % | 10.0 | 15.0 | 20.0 | 25.0 | 30.0 | 35.0 | 40.0 | 45.0 |
| HFO-1123 | Mass % | 63.1 | 58.1 | 53.1 | 48.1 | 43.1 | 38.1 | 33.1 | 28.1 |
| R1234yf | Mass % | 5.0 | 5.0 | 5.0 | 5.0 | 5.0 | 5.0 | 5.0 | 5.0 |
| R32 | Mass % | 21.9 | 21.9 | 21.9 | 21.9 | 21.9 | 21.9 | 21.9 | 21.9 |
| GWP | — | 149 | 149 | 149 | 149 | 149 | 149 | 149 | 149 |
| COP ratio | % (relative to R410A) | 94.8 | 95.0 | 95.2 | 95.4 | 95.7 | 95.9 | 96.2 | 96.6 |
| Refrigerating capacity ratio | % (relative to R410A) | 111.5 | 111.2 | 110.9 | 110.5 | 110.0 | 109.5 | 108.9 | 108.3 |

TABLE 75

| Item | Unit | Comp. Ex. 96 | Ex. 169 | Ex. 170 | Ex. 171 | Ex. 172 | Ex. 173 | Ex. 174 | Ex. 175 |
|---|---|---|---|---|---|---|---|---|---|
| HFO-1132(E) | Mass % | 50.0 | 10.0 | 15.0 | 20.0 | 25.0 | 30.0 | 35.0 | 40.0 |
| HFO-1123 | Mass % | 23.1 | 58.1 | 53.1 | 48.1 | 43.1 | 38.1 | 33.1 | 28.1 |
| R1234yf | Mass % | 5.0 | 10.0 | 10.0 | 10.0 | 10.0 | 10.0 | 10.0 | 10.0 |
| R32 | Mass % | 21.9 | 21.9 | 21.9 | 21.9 | 21.9 | 21.9 | 21.9 | 21.9 |
| GWP | — | 149 | 149 | 149 | 149 | 149 | 149 | 149 | 149 |
| COP ratio | % (relative to R410A) | 96.9 | 95.3 | 95.4 | 95.6 | 95.8 | 96.1 | 96.4 | 96.7 |
| Refrigerating capacity ratio | % (relative to R410A) | 107.7 | 108.7 | 108.5 | 108.1 | 107.7 | 107.2 | 106.7 | 106.1 |

TABLE 76

| Item | Unit | Ex. 176 | Comp. Ex. 97 | Ex. 177 | Ex. 178 | Ex. 179 | Ex. 180 | Ex. 181 | Ex. 182 |
|---|---|---|---|---|---|---|---|---|---|
| HFO-1132(E) | Mass % | 45.0 | 50.0 | 10.0 | 15.0 | 20.0 | 25.0 | 30.0 | 35.0 |
| HFO-1123 | Mass % | 23.1 | 18.1 | 53.1 | 48.1 | 43.1 | 38.1 | 33.1 | 28.1 |
| R1234yf | Mass % | 10.0 | 10.0 | 15.0 | 15.0 | 15.0 | 15.0 | 15.0 | 15.0 |
| R32 | Mass % | 21.9 | 21.9 | 21.9 | 21.9 | 21.9 | 21.9 | 21.9 | 21.9 |
| GWP | — | 149 | 149 | 149 | 149 | 149 | 149 | 149 | 149 |
| COP ratio | % (relative to R410A) | 97.0 | 97.4 | 95.7 | 95.9 | 96.1 | 96.3 | 96.6 | 96.9 |
| Refrigerating capacity ratio | % (relative to R410A) | 105.5 | 104.9 | 105.9 | 105.6 | 105.3 | 104.8 | 104.4 | 103.8 |

TABLE 77

| Item | Unit | Ex. 183 | Ex. 184 | Comp. Ex. 98 | Ex. 185 | Ex. 186 | Ex. 187 | Ex. 188 | Ex. 189 |
|---|---|---|---|---|---|---|---|---|---|
| HFO-1132(E) | Mass % | 40.0 | 45.0 | 50.0 | 10.0 | 15.0 | 20.0 | 25.0 | 30.0 |
| HFO-1123 | Mass % | 23.1 | 18.1 | 13.1 | 48.1 | 43.1 | 38.1 | 33.1 | 28.1 |
| R1234yf | Mass % | 15.0 | 15.0 | 15.0 | 20.0 | 20.0 | 20.0 | 20.0 | 20.0 |
| R32 | Mass % | 21.9 | 21.9 | 21.9 | 21.9 | 21.9 | 21.9 | 21.9 | 21.9 |
| GWP | — | 149 | 149 | 149 | 149 | 149 | 149 | 149 | 149 |
| COP ratio | % (relative to R410A) | 97.2 | 97.5 | 97.9 | 96.1 | 96.3 | 96.5 | 96.8 | 97.1 |
| Refrigerating capacity ratio | % (relative to R410A) | 103.3 | 102.6 | 102.0 | 103.0 | 102.7 | 102.3 | 101.9 | 101.4 |

TABLE 78

| Item | Unit | Ex. 190 | Ex. 191 | Ex. 192 | Comp. Ex. 99 | Ex. 193 | Ex. 194 | Ex. 195 | Ex. 196 |
|---|---|---|---|---|---|---|---|---|---|
| HFO-1132(E) | Mass % | 35.0 | 40.0 | 45.0 | 50.0 | 10.0 | 15.0 | 20.0 | 25.0 |
| HFO-1123 | Mass % | 23.1 | 18.1 | 13.1 | 8.1 | 43.1 | 38.1 | 33.1 | 28.1 |
| R1234yf | Mass % | 20.0 | 20.0 | 20.0 | 20.0 | 25.0 | 25.0 | 25.0 | 25.0 |
| R32 | Mass % | 21.9 | 21.9 | 21.9 | 21.9 | 21.9 | 21.9 | 21.9 | 21.9 |
| GWP | — | 149 | 149 | 149 | 149 | 149 | 149 | 149 | 149 |
| COP ratio | % (relative to R410A) | 97.4 | 97.7 | 98.0 | 98.4 | 96.6 | 96.8 | 97.0 | 97.3 |
| Refrigerating capacity ratio | % (relative to R410A) | 100.9 | 100.3 | 99.7 | 99.1 | 100.0 | 99.7 | 99.4 | 98.9 |

TABLE 79

| Item | Unit | Ex. 197 | Ex. 198 | Ex. 199 | Ex. 200 | Comp. Ex. 100 | Ex. 201 | Ex. 202 | Ex. 203 |
|---|---|---|---|---|---|---|---|---|---|
| HFO-1132(E) | Mass % | 30.0 | 35.0 | 40.0 | 45.0 | 50.0 | 10.0 | 15.0 | 20.0 |
| HFO-1123 | Mass % | 23.1 | 18.1 | 13.1 | 8.1 | 3.1 | 38.1 | 33.1 | 28.1 |
| R1234yf | Mass % | 25.0 | 25.0 | 25.0 | 25.0 | 25.0 | 30.0 | 30.0 | 30.0 |
| R32 | Mass % | 21.9 | 21.9 | 21.9 | 21.9 | 21.9 | 21.9 | 21.9 | 21.9 |
| GWP | — | 149 | 149 | 149 | 149 | 149 | 150 | 150 | 150 |
| COP ratio | % (relative to R410A) | 97.6 | 97.9 | 98.2 | 98.5 | 98.9 | 97.1 | 97.3 | 97.6 |
| Refrigerating capacity ratio | % (relative to R410A) | 98.5 | 97.9 | 97.4 | 96.8 | 96.1 | 97.0 | 96.7 | 96.3 |

TABLE 80

| Item | Unit | Ex. 204 | Ex. 205 | Ex. 206 | Ex. 207 | Ex. 208 | Ex. 209 | Ex. 210 | Ex. 211 |
|---|---|---|---|---|---|---|---|---|---|
| HFO-1132(E) | Mass % | 25.0 | 30.0 | 35.0 | 40.0 | 45.0 | 10.0 | 15.0 | 20.0 |
| HFO-1123 | Mass % | 23.1 | 18.1 | 13.1 | 8.1 | 3.1 | 33.1 | 28.1 | 23.1 |
| R1234yf | Mass % | 30.0 | 30.0 | 30.0 | 30.0 | 30.0 | 35.0 | 35.0 | 35.0 |
| R32 | Mass % | 21.9 | 21.9 | 21.9 | 21.9 | 21.9 | 21.9 | 21.9 | 21.9 |
| GWP | — | 150 | 150 | 150 | 150 | 150 | 150 | 150 | 150 |
| COP ratio | % (relative to R410A) | 97.8 | 98.1 | 98.4 | 98.7 | 99.1 | 97.7 | 97.9 | 98.1 |
| Refrigerating capacity ratio | % (relative to R410A) | 95.9 | 95.4 | 94.9 | 94.4 | 93.8 | 93.9 | 93.6 | 93.3 |

TABLE 81

| Item | Unit | Ex. 212 | Ex. 213 | Ex. 214 | Ex. 215 | Ex. 216 | Ex. 217 | Ex. 218 | Ex. 219 |
|---|---|---|---|---|---|---|---|---|---|
| HFO-1132(E) | Mass % | 25.0 | 30.0 | 35.0 | 40.0 | 10.0 | 15.0 | 20.0 | 25.0 |
| HFO-1123 | Mass % | 18.1 | 13.1 | 8.1 | 3.1 | 28.1 | 23.1 | 18.1 | 13.1 |

TABLE 81-continued

| Item | Unit | Ex. 212 | Ex. 213 | Ex. 214 | Ex. 215 | Ex. 216 | Ex. 217 | Ex. 218 | Ex. 219 |
|---|---|---|---|---|---|---|---|---|---|
| R1234yf | Mass % | 35.0 | 35.0 | 35.0 | 35.0 | 40.0 | 40.0 | 40.0 | 40.0 |
| R32 | Mass % | 21.9 | 21.9 | 21.9 | 21.9 | 21.9 | 21.9 | 21.9 | 21.9 |
| GWP | — | 150 | 150 | 150 | 150 | 150 | 150 | 150 | 150 |
| COP ratio | % (relative to R410A) | 98.4 | 98.7 | 99.0 | 99.3 | 98.3 | 98.5 | 98.7 | 99.0 |
| Refrigerating capacity ratio | % (relative to R410A) | 92.9 | 92.4 | 91.9 | 91.3 | 90.8 | 90.5 | 90.2 | 89.7 |

TABLE 82

| Item | Unit | Ex. 220 | Ex. 221 | Ex. 222 | Ex. 223 | Ex. 224 | Ex. 225 | Ex. 226 | Comp. Ex. 101 |
|---|---|---|---|---|---|---|---|---|---|
| HFO-1132(E) | Mass % | 30.0 | 35.0 | 10.0 | 15.0 | 20.0 | 25.0 | 30.0 | 10.0 |
| HFO-1123 | Mass % | 8.1 | 3.1 | 23.1 | 18.1 | 13.1 | 8.1 | 3.1 | 18.1 |
| R1234yf | Mass % | 40.0 | 40.0 | 45.0 | 45.0 | 45.0 | 45.0 | 45.0 | 50.0 |
| R32 | Mass % | 21.9 | 21.9 | 21.9 | 21.9 | 21.9 | 21.9 | 21.9 | 21.9 |
| GWP | — | 150 | 150 | 150 | 150 | 150 | 150 | 150 | 150 |
| COP ratio | % (relative to R410A) | 99.3 | 99.6 | 98.9 | 99.1 | 99.3 | 99.6 | 99.9 | 99.6 |
| Refrigerating capacity ratio | % (relative to R410A) | 89.3 | 88.8 | 87.6 | 87.3 | 87.0 | 86.6 | 86.2 | 84.4 |

TABLE 83

| Item | Unit | Comp. Ex. 102 | Comp. Ex. 103 | Comp. Ex. 104 |
|---|---|---|---|---|
| HFO-1132(E) | Mass % | 15.0 | 20.0 | 25.0 |
| HFO-1123 | Mass % | 13.1 | 8.1 | 3.1 |
| R1234yf | Mass % | 50.0 | 50.0 | 50.0 |
| R32 | Mass % | 21.9 | 21.9 | 21.9 |
| GWP | — | 150 | 150 | 150 |
| COP ratio | % (relative to R410A) | 99.8 | 100.0 | 100.2 |
| Refrigerating capacity ratio | % (relative to R410A) | 84.1 | 83.8 | 83.4 |

TABLE 84

| Item | Unit | Ex. 227 | Ex. 228 | Ex. 229 | Ex. 230 | Ex. 231 | Ex. 232 | Ex. 233 | Comp. Ex. 105 |
|---|---|---|---|---|---|---|---|---|---|
| HFO-1132(E) | Mass % | 10.0 | 15.0 | 20.0 | 25.0 | 30.0 | 35.0 | 40.0 | 45.0 |
| HFO-1123 | Mass % | 55.7 | 50.7 | 45.7 | 40.7 | 35.7 | 30.7 | 25.7 | 20.7 |
| R1234yf | Mass % | 5.0 | 5.0 | 5.0 | 5.0 | 5.0 | 5.0 | 5.0 | 5.0 |
| R32 | Mass % | 29.3 | 29.3 | 29.3 | 29.3 | 29.3 | 29.3 | 29.3 | 29.3 |
| GWP | — | 199 | 199 | 199 | 199 | 199 | 199 | 199 | 199 |
| COP ratio | % (relative to R410A) | 95.9 | 96.0 | 96.2 | 96.3 | 96.6 | 96.8 | 97.1 | 97.3 |
| Refrigerating capacity ratio | % (relative to R410A) | 112.2 | 111.9 | 111.6 | 111.2 | 110.7 | 110.2 | 109.6 | 109.0 |

TABLE 85

| Item | Unit | Ex. 234 | Ex. 235 | Ex. 236 | Ex. 237 | Ex. 238 | Ex. 239 | Ex. 240 | Comp. Ex. 106 |
|---|---|---|---|---|---|---|---|---|---|
| HFO-1132(E) | Mass % | 10.0 | 15.0 | 20.0 | 25.0 | 30.0 | 35.0 | 40.0 | 45.0 |
| HFO-1123 | Mass % | 50.7 | 45.7 | 40.7 | 35.7 | 30.7 | 25.7 | 20.7 | 15.7 |
| R1234yf | Mass % | 10.0 | 10.0 | 10.0 | 10.0 | 10.0 | 10.0 | 10.0 | 10.0 |
| R32 | Mass % | 29.3 | 29.3 | 29.3 | 29.3 | 29.3 | 29.3 | 29.3 | 29.3 |
| GWP | — | 199 | 199 | 199 | 199 | 199 | 199 | 199 | 199 |
| | % (relative | | | | | | | | |

TABLE 85-continued

| Item | Unit | Ex. 234 | Ex. 235 | Ex. 236 | Ex. 237 | Ex. 238 | Ex. 239 | Ex. 240 | Comp. Ex. 106 |
|---|---|---|---|---|---|---|---|---|---|
| COP ratio | to R410A) | 96.3 | 96.4 | 96.6 | 96.8 | 97.0 | 97.2 | 97.5 | 97.8 |
| Refrigerating capacity ratio | % (relative to R410A) | 109.4 | 109.2 | 108.8 | 108.4 | 107.9 | 107.4 | 106.8 | 106.2 |

TABLE 86

| Item | Unit | Ex. 241 | Ex. 242 | Ex. 243 | Ex. 244 | Ex. 245 | Ex. 246 | Ex. 247 | Comp. Ex. 107 |
|---|---|---|---|---|---|---|---|---|---|
| HFO-1132(E) | Mass % | 10.0 | 15.0 | 20.0 | 25.0 | 30.0 | 35.0 | 40.0 | 45.0 |
| HFO-1123 | Mass % | 45.7 | 40.7 | 35.7 | 30.7 | 25.7 | 20.7 | 15.7 | 10.7 |
| R1234yf | Mass % | 15.0 | 15.0 | 15.0 | 15.0 | 15.0 | 15.0 | 15.0 | 15.0 |
| R32 | Mass % | 29.3 | 29.3 | 29.3 | 29.3 | 29.3 | 29.3 | 29.3 | 29.3 |
| GWP | — | 199 | 199 | 199 | 199 | 199 | 199 | 199 | 199 |
| COP ratio | % (relative to R410A) | 96.7 | 96.8 | 97.0 | 97.2 | 97.4 | 97.7 | 97.9 | 98.2 |
| Refrigerating capacity ratio | % (relative to R410A) | 106.6 | 106.3 | 106.0 | 105.5 | 105.1 | 104.5 | 104.0 | 103.4 |

TABLE 87

| Item | Unit | Ex. 248 | Ex. 249 | Ex. 250 | Ex. 251 | Ex. 252 | Ex. 253 | Ex. 254 | Comp. Ex. 108 |
|---|---|---|---|---|---|---|---|---|---|
| HFO-1132(E) | Mass % | 10.0 | 15.0 | 20.0 | 25.0 | 30.0 | 35.0 | 40.0 | 45.0 |
| HFO-1123 | Mass % | 40.7 | 35.7 | 30.7 | 25.7 | 20.7 | 15.7 | 10.7 | 5.7 |
| R1234yf | Mass % | 20.0 | 20.0 | 20.0 | 20.0 | 20.0 | 20.0 | 20.0 | 20.0 |
| R32 | Mass % | 29.3 | 29.3 | 29.3 | 29.3 | 29.3 | 29.3 | 29.3 | 29.3 |
| GWP | — | 199 | 199 | 199 | 199 | 199 | 199 | 199 | 199 |
| COP ratio | % (relative to R410A) | 97.1 | 97.3 | 97.5 | 97.7 | 97.9 | 98.1 | 98.4 | 98.7 |
| Refrigerating capacity ratio | % (relative to R410A) | 103.7 | 103.4 | 103.0 | 102.6 | 102.2 | 101.6 | 101.1 | 100.5 |

TABLE 88

| Item | Unit | Ex. 255 | Ex. 256 | Ex. 257 | Ex. 258 | Ex. 259 | Ex. 260 | Ex. 261 | Ex. 262 |
|---|---|---|---|---|---|---|---|---|---|
| HFO-1132(E) | Mass % | 10.0 | 15.0 | 20.0 | 25.0 | 30.0 | 35.0 | 40.0 | 10.0 |
| HFO-1123 | Mass % | 35.7 | 30.7 | 25.7 | 20.7 | 15.7 | 10.7 | 5.7 | 30.7 |
| R1234yf | Mass % | 25.0 | 25.0 | 25.0 | 25.0 | 25.0 | 25.0 | 25.0 | 30.0 |
| R32 | Mass % | 29.3 | 29.3 | 29.3 | 29.3 | 29.3 | 29.3 | 29.3 | 29.3 |
| GWP | — | 199 | 199 | 199 | 199 | 199 | 199 | 199 | 199 |
| COP ratio | % (relative to R410A) | 97.6 | 97.7 | 97.9 | 98.1 | 98.4 | 98.6 | 98.9 | 98.1 |
| Refrigerating capacity ratio | % (relative to R410A) | 100.7 | 100.4 | 100.1 | 99.7 | 99.2 | 98.7 | 98.2 | 97.7 |

TABLE 89

| Item | Unit | Ex. 263 | Ex. 264 | Ex. 265 | Ex. 266 | Ex. 267 | Ex. 268 | Ex. 269 | Ex. 270 |
|---|---|---|---|---|---|---|---|---|---|
| HFO-1132(E) | Mass % | 15.0 | 20.0 | 25.0 | 30.0 | 35.0 | 10.0 | 15.0 | 20.0 |
| HFO-1123 | Mass % | 25.7 | 20.7 | 15.7 | 10.7 | 5.7 | 25.7 | 20.7 | 15.7 |
| R1234yf | Mass % | 30.0 | 30.0 | 30.0 | 30.0 | 30.0 | 35.0 | 35.0 | 35.0 |
| R32 | Mass % | 29.3 | 29.3 | 29.3 | 29.3 | 29.3 | 29.3 | 29.3 | 29.3 |
| GWP | — | 199 | 199 | 199 | 199 | 199 | 200 | 200 | 200 |

TABLE 89-continued

| Item | Unit | Ex. 263 | Ex. 264 | Ex. 265 | Ex. 266 | Ex. 267 | Ex. 268 | Ex. 269 | Ex. 270 |
|---|---|---|---|---|---|---|---|---|---|
| COP ratio | % (relative to R410A) | 98.2 | 98.4 | 98.6 | 98.9 | 99.1 | 98.6 | 98.7 | 98.9 |
| Refrigerating capacity ratio | % (relative to R410A) | 97.4 | 97.1 | 96.7 | 96.2 | 95.7 | 94.7 | 94.4 | 94.0 |

TABLE 90

| Item | Unit | Ex. 271 | Ex. 272 | Ex. 273 | Ex. 274 | Ex. 275 | Ex. 276 | Ex. 277 | Ex. 278 |
|---|---|---|---|---|---|---|---|---|---|
| HFO-1132(E) | Mass % | 25.0 | 30.0 | 10.0 | 15.0 | 20.0 | 25.0 | 10.0 | 15.0 |
| HFO-1123 | Mass % | 10.7 | 5.7 | 20.7 | 15.7 | 10.7 | 5.7 | 15.7 | 10.7 |
| R1234yf | Mass % | 35.0 | 35.0 | 40.0 | 40.0 | 40.0 | 40.0 | 45.0 | 45.0 |
| R32 | Mass % | 29.3 | 29.3 | 29.3 | 29.3 | 29.3 | 29.3 | 29.3 | 29.3 |
| GWP | — | 200 | 200 | 200 | 200 | 200 | 200 | 200 | 200 |
| COP ratio | % (relative to R410A) | 99.2 | 99.4 | 99.1 | 99.3 | 99.5 | 99.7 | 99.7 | 99.8 |
| Refrigerating capacity ratio | % (relative to R410A) | 93.6 | 93.2 | 91.5 | 91.3 | 90.9 | 90.6 | 88.4 | 88.1 |

TABLE 91

| Item | Unit | Ex. 279 | Ex. 280 | Comp. Ex. 109 | Comp. Ex. 110 |
|---|---|---|---|---|---|
| HFO-1132(E) | Mass % | 20.0 | 10.0 | 15.0 | 10.0 |
| HFO-1123 | Mass % | 5.7 | 10.7 | 5.7 | 5.7 |
| R1234yf | Mass % | 45.0 | 50.0 | 50.0 | 55.0 |
| R32 | Mass % | 29.3 | 29.3 | 29.3 | 29.3 |
| GWP | — | 200 | 200 | 200 | 200 |
| COP ratio | % (relative to R410A) | 100.0 | 100.3 | 100.4 | 100.9 |
| Refrigerating capacity ratio | % (relative to R410A) | 87.8 | 85.2 | 85.0 | 82.0 |

TABLE 92

| Item | Unit | Ex. 281 | Ex. 282 | Ex. 283 | Ex. 284 | Ex. 285 | Comp. Ex. 111 | Ex. 286 | Ex. 287 |
|---|---|---|---|---|---|---|---|---|---|
| HFO-1132(E) | Mass % | 10.0 | 15.0 | 20.0 | 25.0 | 30.0 | 35.0 | 10.0 | 15.0 |
| HFO-1123 | Mass % | 40.9 | 35.9 | 30.9 | 25.9 | 20.9 | 15.9 | 35.9 | 30.9 |
| R1234yf | Mass % | 5.0 | 5.0 | 5.0 | 5.0 | 5.0 | 5.0 | 10.0 | 10.0 |
| R32 | Mass % | 44.1 | 44.1 | 44.1 | 44.1 | 44.1 | 44.1 | 44.1 | 44.1 |
| GWP | — | 298 | 298 | 298 | 298 | 298 | 298 | 299 | 299 |
| COP ratio | % (relative to R410A) | 97.8 | 97.9 | 97.9 | 98.1 | 98.2 | 98.4 | 98.2 | 98.2 |
| Refrigerating capacity ratio | % (relative to R410A) | 112.5 | 112.3 | 111.9 | 111.6 | 111.2 | 110.7 | 109.8 | 109.5 |

TABLE 93

| Item | Unit | Ex. 288 | Ex. 289 | Ex. 290 | Comp. Ex. 112 | Ex. 291 | Ex. 292 | Ex. 293 | Ex. 294 |
|---|---|---|---|---|---|---|---|---|---|
| HFO-1132(E) | Mass % | 20.0 | 25.0 | 30.0 | 35.0 | 10.0 | 15.0 | 20.0 | 25.0 |
| HFO-1123 | Mass % | 25.9 | 20.9 | 15.9 | 10.9 | 30.9 | 25.9 | 20.9 | 15.9 |
| R1234yf | Mass % | 10.0 | 10.0 | 10.0 | 10.0 | 15.0 | 15.0 | 15.0 | 15.0 |
| R32 | Mass % | 44.1 | 44.1 | 44.1 | 44.1 | 44.1 | 44.1 | 44.1 | 44.1 |
| GWP | — | 299 | 299 | 299 | 299 | 299 | 299 | 299 | 299 |
| COP ratio | % (relative to R410A) | 98.3 | 98.5 | 98.6 | 98.8 | 98.6 | 98.6 | 98.7 | 98.9 |
| Refrigerating capacity ratio | % (relative to R410A) | 109.2 | 108.8 | 108.4 | 108.0 | 107.0 | 106.7 | 106.4 | 106.0 |

TABLE 94

| Item | Unit | Ex. 295 | Comp. Ex. 113 | Ex. 296 | Ex. 297 | Ex. 298 | Ex. 299 | Ex. 300 | Ex. 301 |
|---|---|---|---|---|---|---|---|---|---|
| HFO-1132(E) | Mass % | 30.0 | 35.0 | 10.0 | 15.0 | 20.0 | 25.0 | 30.0 | 10.0 |
| HFO-1123 | Mass % | 10.9 | 5.9 | 25.9 | 20.9 | 15.9 | 10.9 | 5.9 | 20.9 |
| R1234yf | Mass % | 15.0 | 15.0 | 20.0 | 20.0 | 20.0 | 20.0 | 20.0 | 25.0 |
| R32 | Mass % | 44.1 | 44.1 | 44.1 | 44.1 | 44.1 | 44.1 | 44.1 | 44.1 |
| GWP | — | 299 | 299 | 299 | 299 | 299 | 299 | 299 | 299 |
| COP ratio | % (relative to R410A) | 99.0 | 99.2 | 99.0 | 99.0 | 99.2 | 99.3 | 99.4 | 99.4 |
| Refrigerating capacity ratio | % (relative to R410A) | 105.6 | 105.2 | 104.1 | 103.9 | 103.6 | 103.2 | 102.8 | 101.2 |

TABLE 95

| Item | Unit | Ex. 302 | Ex. 303 | Ex. 304 | Ex. 305 | Ex. 306 | Ex. 307 | Ex. 308 | Ex. 309 |
|---|---|---|---|---|---|---|---|---|---|
| HFO-1132(E) | Mass % | 15.0 | 20.0 | 25.0 | 10.0 | 15.0 | 20.0 | 10.0 | 15.0 |
| HFO-1123 | Mass % | 15.9 | 10.9 | 5.9 | 15.9 | 10.9 | 5.9 | 10.9 | 5.9 |
| R1234yf | Mass % | 25.0 | 25.0 | 25.0 | 30.0 | 30.0 | 30.0 | 35.0 | 35.0 |
| R32 | Mass % | 44.1 | 44.1 | 44.1 | 44.1 | 44.1 | 44.1 | 44.1 | 44.1 |
| GWP | — | 299 | 299 | 299 | 299 | 299 | 299 | 299 | 299 |
| COP ratio | % (relative to R410A) | 99.5 | 99.6 | 99.7 | 99.8 | 99.9 | 100.0 | 100.3 | 100.4 |
| Refrigerating capacity ratio | % (relative to R410A) | 101.0 | 100.7 | 100.3 | 98.3 | 98.0 | 97.8 | 95.3 | 95.1 |

TABLE 96

| Item | Unit | Ex. 400 |
|---|---|---|
| HFO-1132(E) | Mass % | 10.0 |
| HFO-1123 | Mass % | 5.9 |
| R1234yf | Mass % | 40.0 |
| R32 | Mass % | 44.1 |
| GWP | — | 299 |
| COP ratio | % (relative to R410A) | 100.7 |
| Refrigerating capacity ratio | % (relative to R410A) | 92.3 |

The above results indicate that the refrigerating capacity ratio relative to R410A is 85% or more in the following cases:

When the mass % of HFO-1132(E), HFO-1123, R1234yf, and R32 based on their sum is respectively represented by x, y, z, and a, in a ternary composition diagram in which the sum of HFO-1132(E), HFO-1123, and R1234yf is (100−a) mass %, a straight line connecting a point (0.0, 100.0−a, 0.0) and a point (0.0, 0.0, 100.0−a) is the base, and the point (0.0, 100.0−a, 0.0) is on the left side, if 0<a≤11.1, coordinates (x,y,z) in the ternary composition diagram are on, or on the left side of, a straight line AB that connects point A $(0.0134a^2-1.9681a+68.6, 0.0, -0.0134a^2+0.9681a+31.4)$ and point B $(0.0, 0.0144a^2-1.6377a+58.7, -0.0144a^2+0.6377a+41.3)$;

if 11.1<a≤18.2, coordinates (x,y,z) in the ternary composition diagram are on, or on the left side of, a straight line AB that connects point A $(0.0112a^2-1.9337a+68.484, 0.0, -0.0112a^2+0.9337a+31.516)$ and point B $(0.0, 0.0075a^2-1.5156a+58.199, -0.0075a^2+0.5156a+41.801)$;

if 18.2<a≤26.7, coordinates (x,y,z) in the ternary composition diagram are on, or on the left side of, a straight line AB that connects point A $(0.0107a^2-1.9142a+68.305, 0.0, -0.0107a^2+0.9142a+31.695)$ and point B $(0.0, 0.009a^2-1.6045a+59.318, -0.009a^2+0.6045a+40.682)$;

if 26.7<a≤36.7, coordinates (x,y,z) in the ternary composition diagram are on, or on the left side of, a straight line AB that connects point A $(0.0103a^2-1.9225a+68.793, 0.0, -0.0103a^2+0.9225a+31.207)$ and point B $(0.0, 0.0046a^2-1.41a+57.286, -0.0046a^2+0.41a+42.714)$; and if 36.7<a≤46.7, coordinates (x,y,z) in the ternary composition diagram are on, or on the left side of, a straight line AB that connects point A $(0.0085a^2-1.8102a+67.1, 0.0, -0.0085a^2+0.8102a+32.9)$ and point B $(0.0, 0.0012a^2-1.1659a+52.95, -0.0012a^2+0.1659a+47.05)$.

Figure 3:
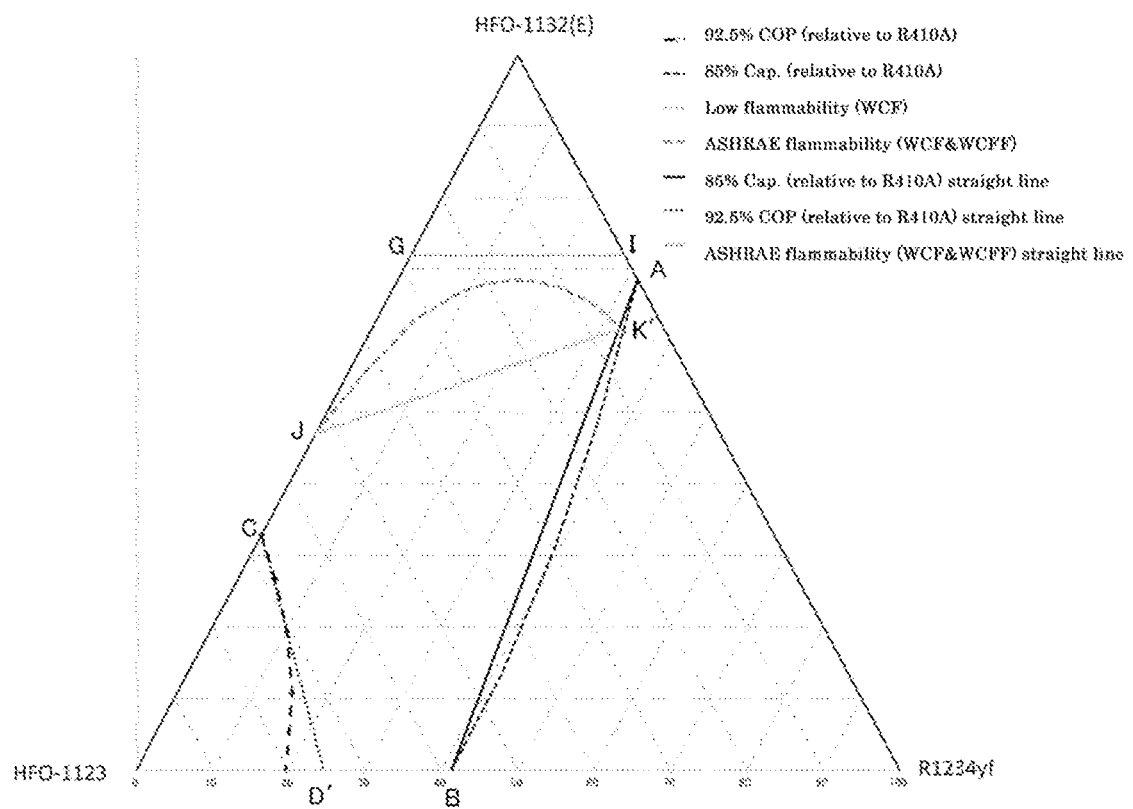
FIG. 3 is a diagram showing points A to C, D', G, I, J, and K', and line segments that connect these points to each other in a ternary composition diagram in which the sum of HFO-1132(E), HFO-1123, and R1234yf is (100–a) mass %.

Actual points having a refrigerating capacity ratio of 85% or more form a curved line that connects point A and point B in FIG. 3, and that extends toward the 1234yf side. Accordingly, when coordinates are on, or on the left side of, the straight line AB, the refrigerating capacity ratio relative to R410A is 85% or more.

Similarly, it was also found that in the ternary composition diagram, if 0<a≤11.1, when coordinates (x,y,z) are on, or on the left side of, a straight line D'C that connects point D' $(0.0, 0.0224a^2+0.968a+75.4, -0.0224a^2-1.968a+24.6)$ and point C $(-0.2304a^2-0.4062a+32.9, 0.2304a^2-0.5938a+67.1, 0.0)$; or if 11.1<a≤46.7, when coordinates are in the entire region, the COP ratio relative to that of R410A is 92.5% or more.

Figure 4:
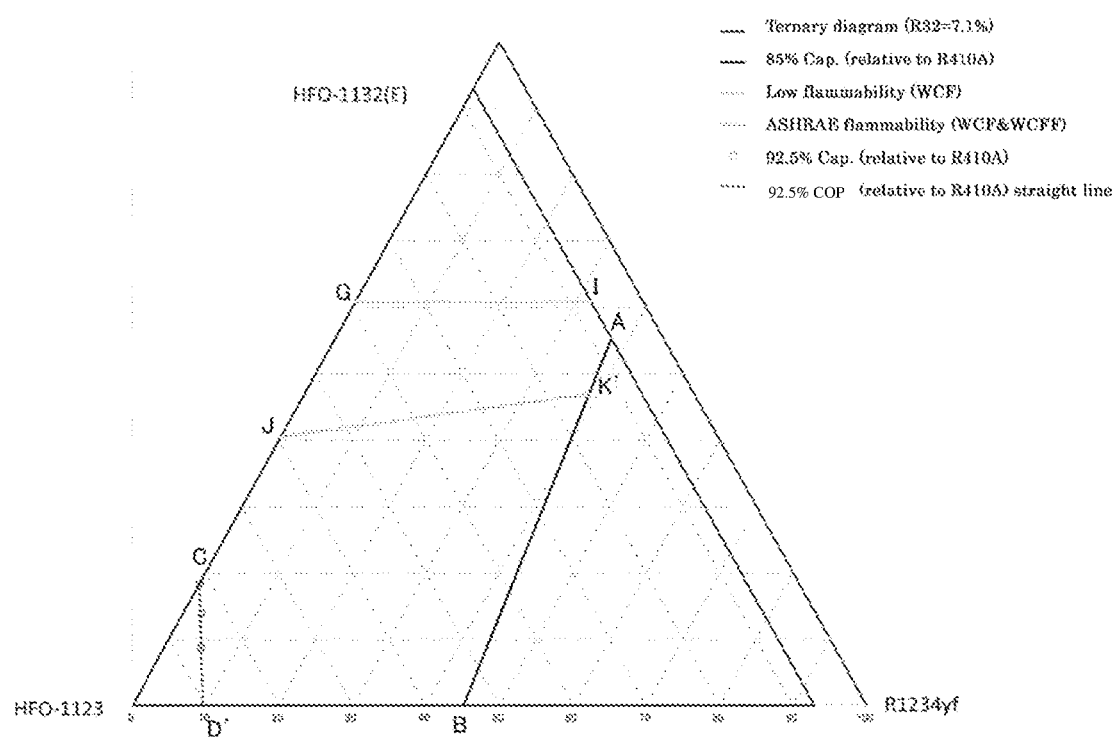
FIG. 4 is a diagram showing points A to C, D', G, I, J, and K', and line segments that connect these points to each other in a ternary composition diagram in which the sum of HFO-1132(E), HFO-1123, and R1234yf is 92.9 mass % (the content of R32 is 7.1 mass %).
Figure 5:
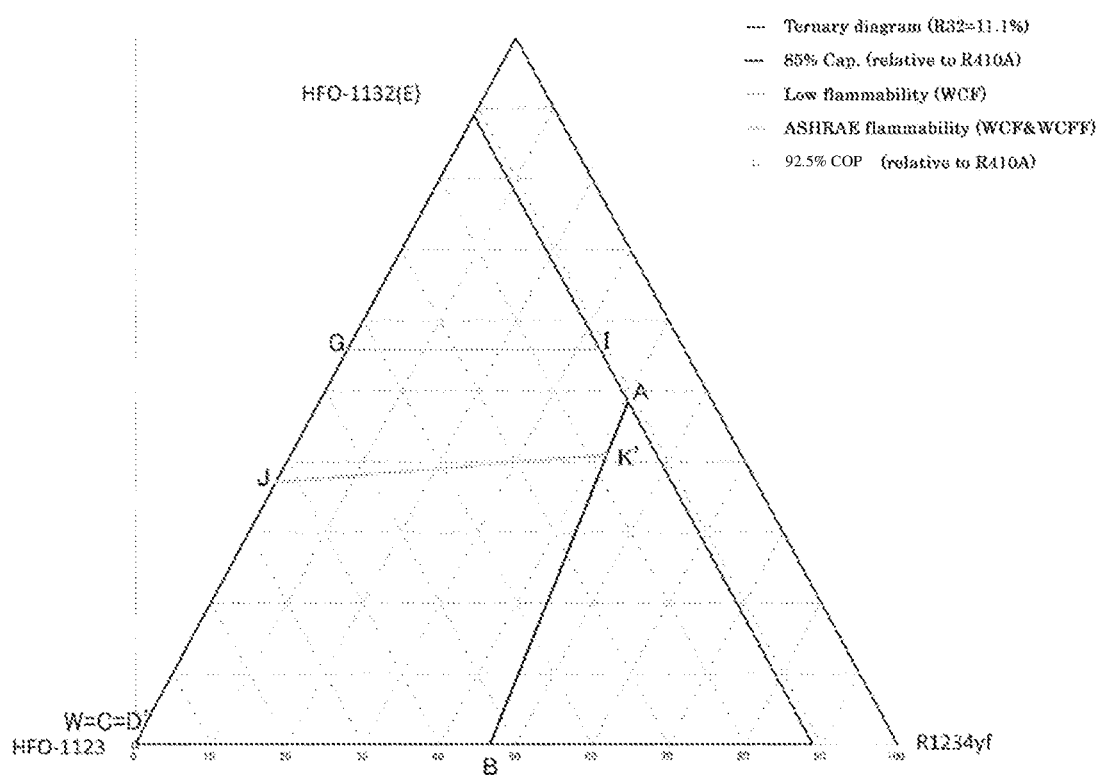
FIG. 5 is a diagram showing points A to C, D', G, I, J, K', and W, and line segments that connect these points to each other in a ternary composition diagram in which the sum of HFO-1132(E), HFO-1123, and R1234yf is 88.9 mass % (the content of R32 is 11.1 mass %).
Figure 6:
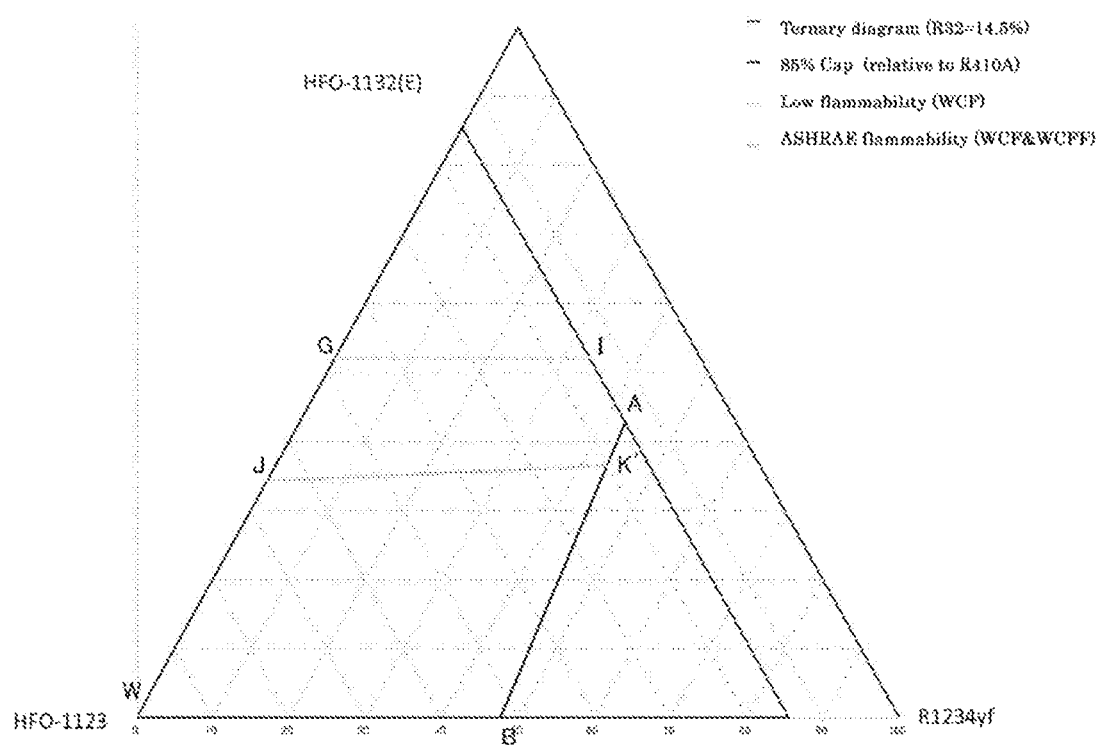
FIG. 6 is a diagram showing points A, B, G, I, J, K', and W, and line segments that connect these points to each other in a ternary composition diagram in which the sum of HFO-1132(E), HFO-1123, and R1234yf is 85.5 mass % (the content of R32 is 14.5 mass %).
Figure 7:
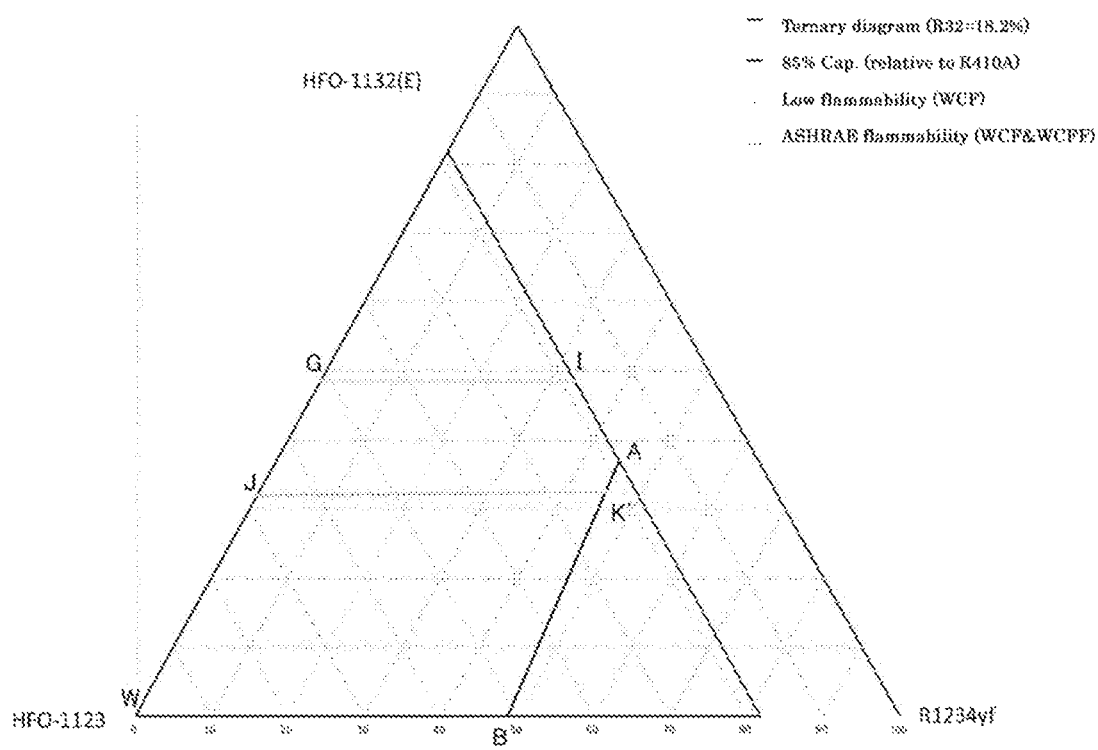
FIG. 7 is a diagram showing points A, B, G, I, J, K', and W, and line segments that connect these points to each other in a ternary composition diagram in which the sum of HFO-1132(E), HFO-1123, and R1234yf is 81.8 mass % (the content of R32 is 18.2 mass %).
Figure 8:
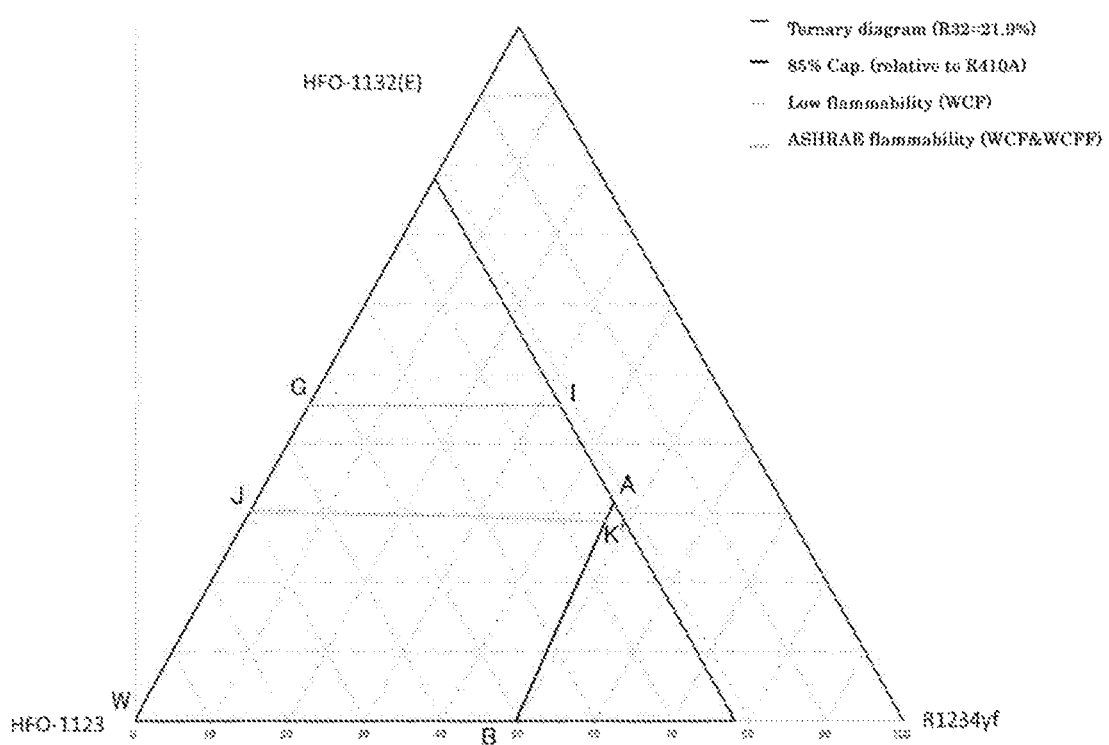
FIG. 8 is a diagram showing points A, B, G, I, J, K', and W, and line segments that connect these points to each other in a ternary composition diagram in which the sum of HFO-1132(E), HFO-1123, and R1234yf is 78.1 mass % (the content of R32 is 21.9 mass %).
Figure 9:
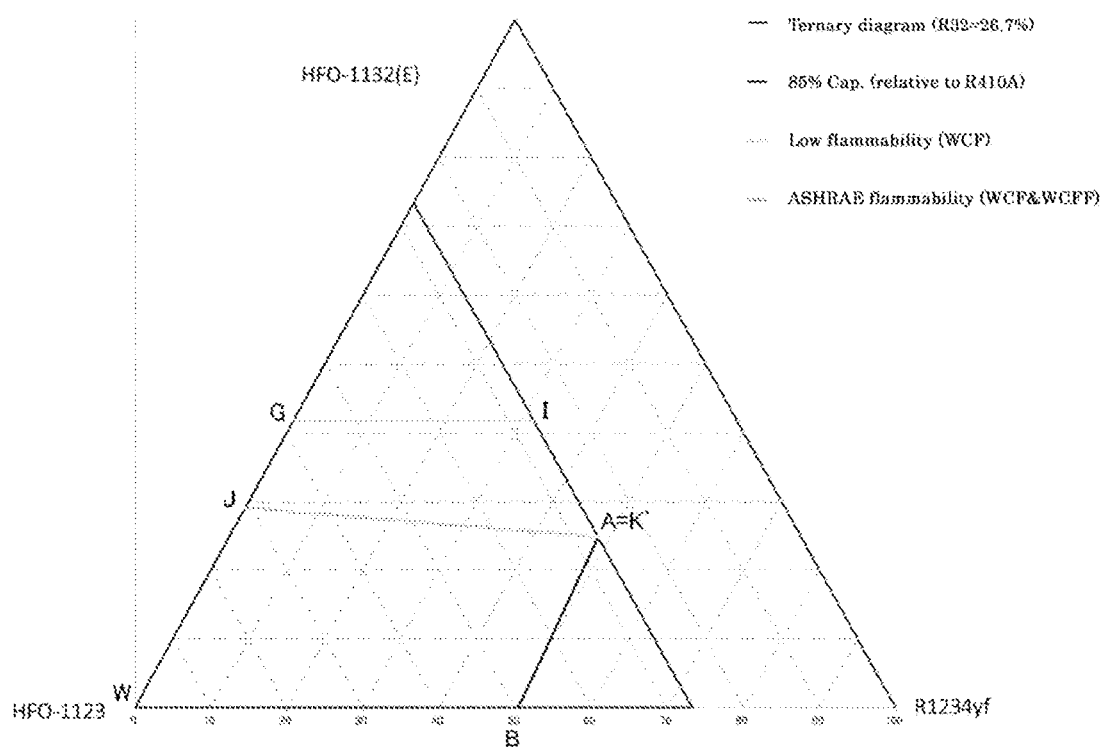
FIG. 9 is a diagram showing points A, B, G, I, J, K', and W, and line segments that connect these points to each other in a ternary composition diagram in which the sum of HFO-1132(E), HFO-1123, and R1234yf is 73.3 mass % (the content of R32 is 26.7 mass %).
Figure 10:
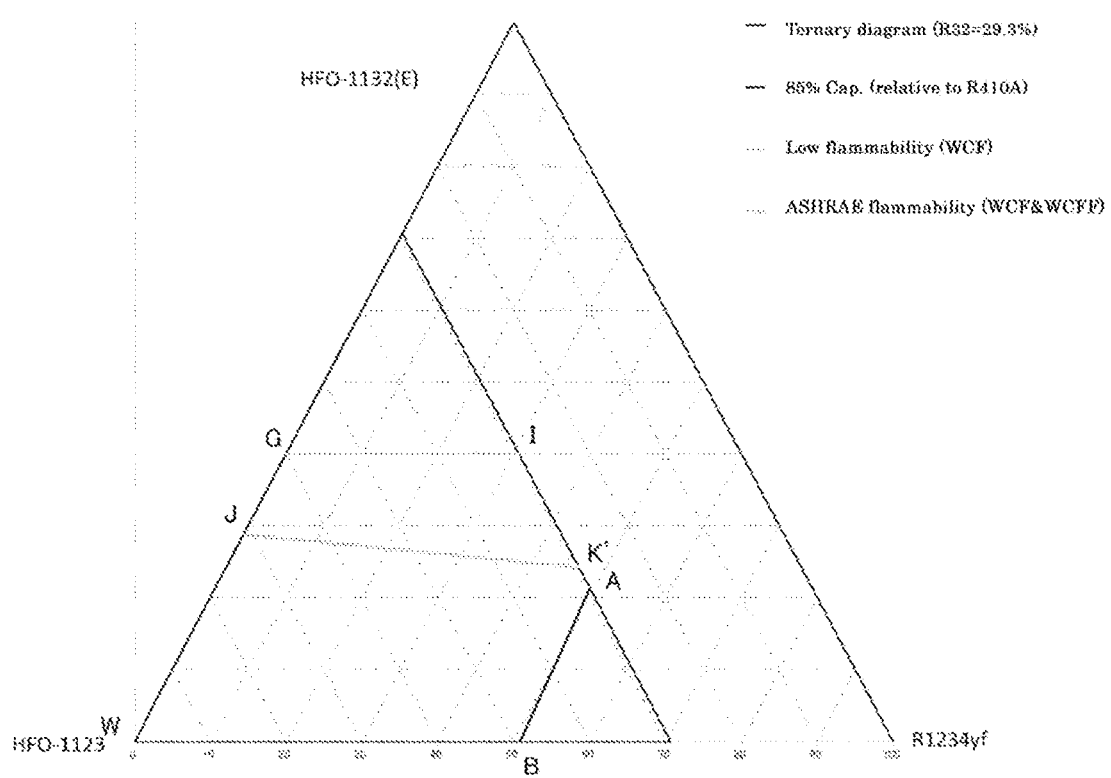
FIG. 10 is a diagram showing points A, B, G, I, J, K', and W, and line segments that connect these points to each other in a ternary composition diagram in which the sum of HFO-1132(E), HFO-1123, and R1234yf is 70.7 mass % (the content of R32 is 29.3 mass %).
Figure 11:
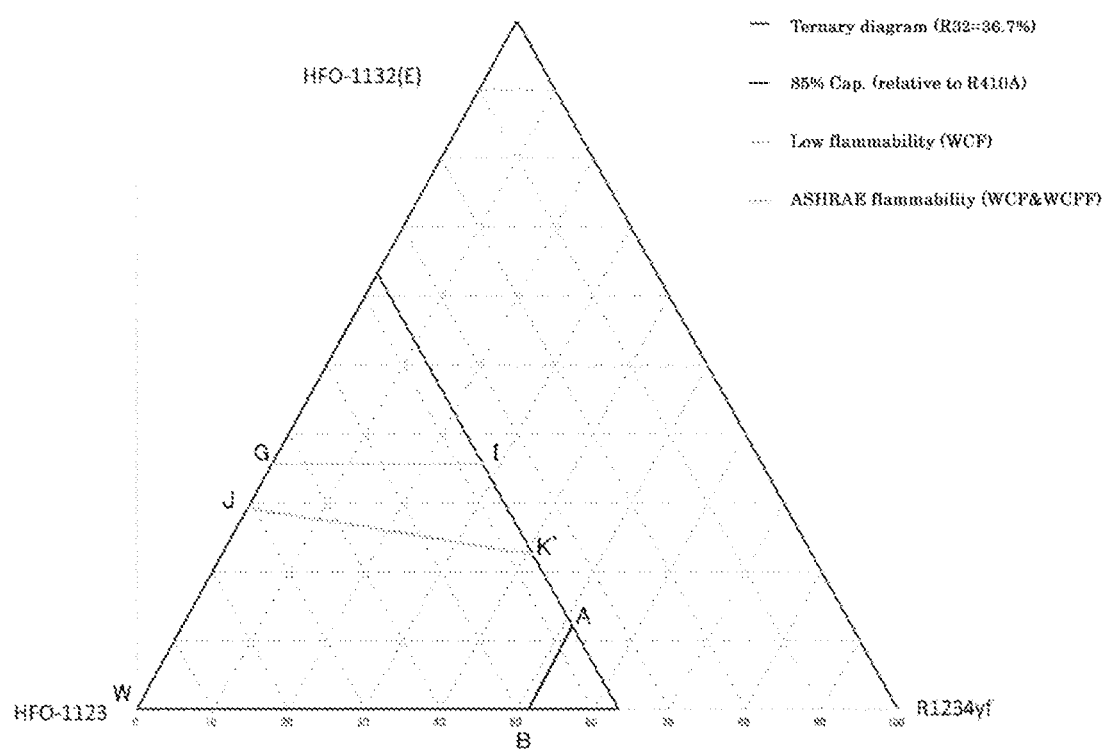
FIG. 11 is a diagram showing points A, B, G, I, J, K', and W, and line segments that connect these points to each other in a ternary composition diagram in which the sum of HFO-1132(E), HFO-1123, and R1234yf is 63.3 mass % (the content of R32 is 36.7 mass %).
Figure 12:
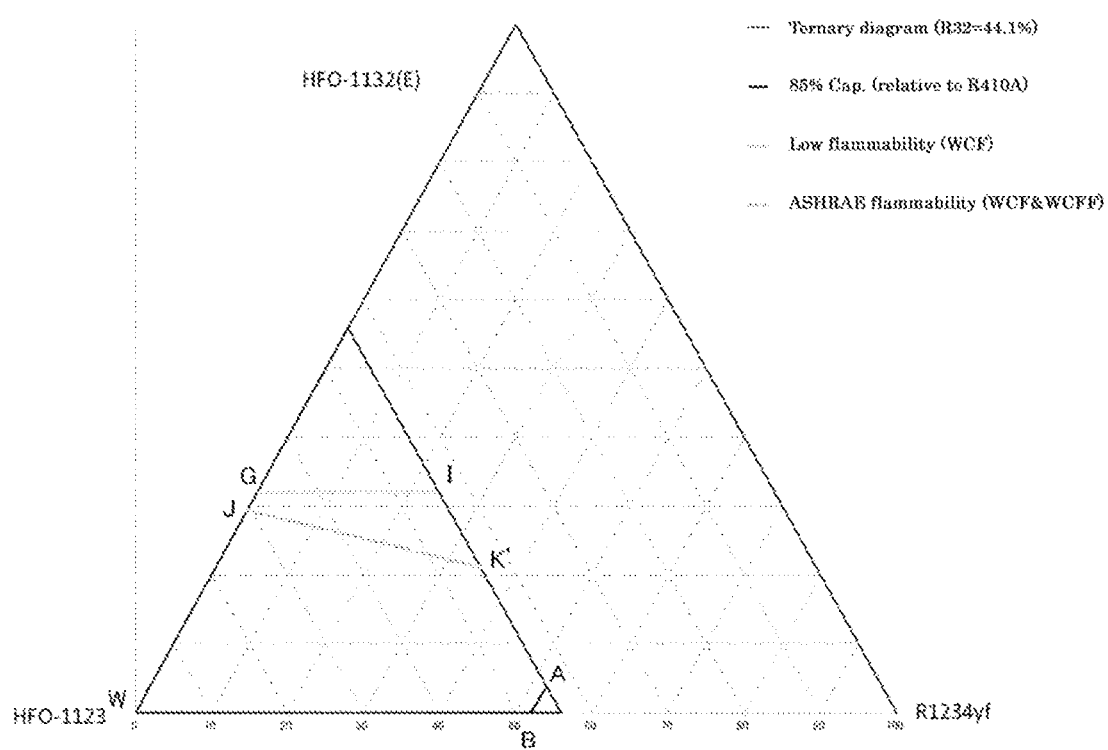
FIG. 12 is a diagram showing points A, B, G, I, J, K', and W, and line segments that connect these points to each other in a ternary composition diagram in which the sum of HFO-1132(E), HFO-1123, and R1234yf is 55.9 mass % (the content of R32 is 44.1 mass %).
Figure 13:
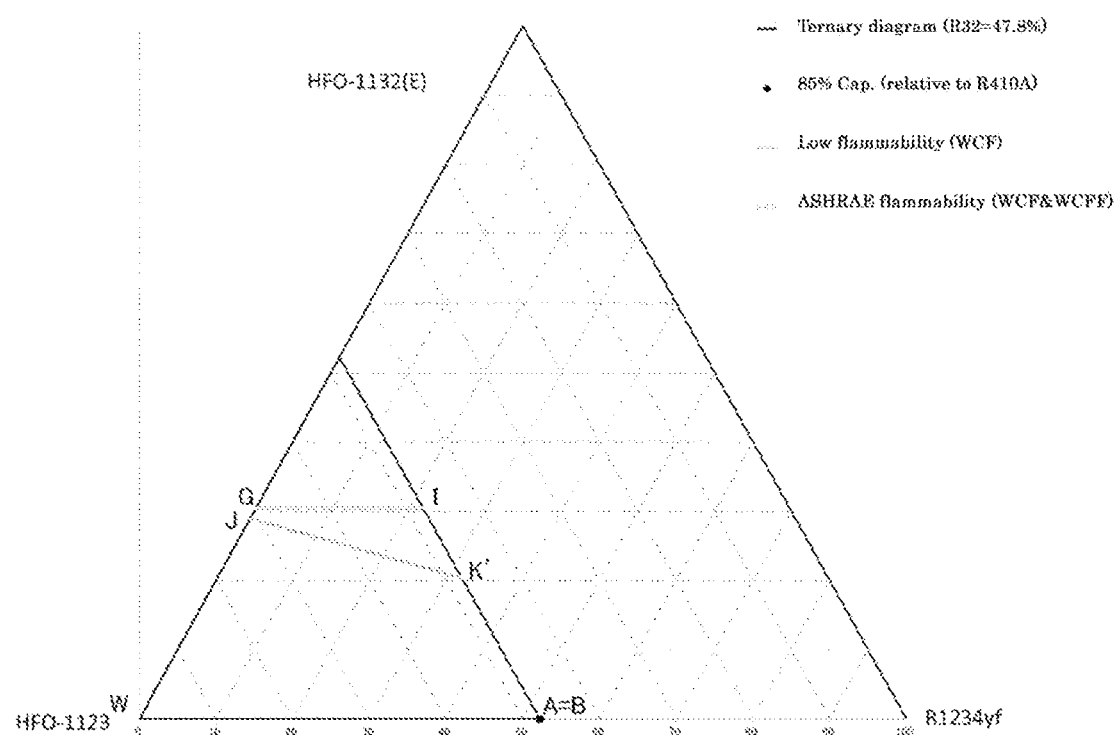
FIG. 13 is a diagram showing points A, B, G, I, J, K', and W, and line segments that connect these points to each other in a ternary composition diagram in which the sum of HFO-1132(E), HFO-1123, and R1234yf is 52.2 mass % (the content of R32 is 47.8 mass %).

In FIG. 3, the COP ratio of 92.5% or more forms a curved line CD. In FIG. 3, an approximate line formed by connecting three points: point C (32.9, 67.1, 0.0) and points (26.6, 68.4, 5) (19.5, 70.5, 10) where the COP ratio is 92.5% when the concentration of R1234yf is 5 mass % and 10 mass was obtained, and a straight line that connects point C and point D' (0, 75.4, 24.6), which is the intersection of the approximate line and a point where the concentration of HFO-1132 (E) is 0.0 mass % was defined as a line segment D'C. In FIG. 4, point D'(0, 83.4, 9.5) was similarly obtained from an approximate curve formed by connecting point C (18.4, 74.5, 0) and points (13.9, 76.5, 2.5) (8.7, 79.2, 5) where the COP ratio is 92.5%, and a straight line that connects point C and point D' was defined as the straight line D'C.

The composition of each mixture was defined as WCF. A leak simulation was performed using NIST Standard Reference Database REFLEAK Version 4.0 under the conditions of Equipment, Storage, Shipping, Leak, and Recharge according to the ASHRAE Standard 34-2013. The most flammable fraction was defined as WCFF.

For the flammability, the burning velocity was measured according to the ANSI/ASHRAE Standard 34-2013. Both WCF and WCFF having a burning velocity of 10 cm/s or less were determined to be classified as "Class 2L (lower flammability)."

A burning velocity test was performed using the apparatus shown in FIG. 1 in the following manner. First, the mixed refrigerants used had a purity of 99.5% or more, and were degassed by repeating a cycle of freezing, pumping, and thawing until no traces of air were observed on the vacuum gauge. The burning velocity was measured by the closed method. The initial temperature was ambient temperature. Ignition was performed by generating an electric spark between the electrodes in the center of a sample cell. The duration of the discharge was 1.0 to 9.9 ms, and the ignition energy was typically about 0.1 to 1.0 J. The spread of the flame was visualized using schlieren photographs. A cylindrical container (inner diameter: 155 mm, length: 198 mm) equipped with two light transmission acrylic windows was used as the sample cell, and a xenon lamp was used as the light source. Schlieren images of the flame were recorded by a high-speed digital video camera at a frame rate of 600 fps and stored on a PC.

The results are shown in Tables 97 to 104.

TABLE 97

| | Item | | Comp. Ex. 6 | Comp. Ex. 13 | Comp. Ex. 19 | Comp. Ex. 24 | Comp. Ex. 29 | Comp. Ex. 34 |
|---|---|---|---|---|---|---|---|---|
| WCF | HFO-1132(E) | Mass % | 72.0 | 60.9 | 55.8 | 52.1 | 48.6 | 45.4 |
| | HFO-1123 | Mass % | 28.0 | 32.0 | 33.1 | 33.4 | 33.2 | 32.7 |
| | R1234yf | Mass % | 0.0 | 0.0 | 0.0 | 0 | 0 | 0 |
| | R32 | Mass % | 0.0 | 7.1 | 11.1 | 14.5 | 18.2 | 21.9 |
| Burning velocity (WCF) | | cm/s | 10 | 10 | 10 | 10 | 10 | 10 |

TABLE 98

| | Item | | Comp. Ex. 39 | Comp. Ex. 45 | Comp. Ex. 51 | Comp. Ex. 57 | Comp. Ex. 62 |
|---|---|---|---|---|---|---|---|
| WCF | HFO-1132(E) | Mass % | 41.8 | 40 | 35.7 | 32 | 30.4 |
| | HFO-1123 | Mass % | 31.5 | 30.7 | 23.6 | 23.9 | 21.8 |
| | R1234yf | Mass % | 0 | 0 | 0 | 0 | 0 |
| | R32 | Mass % | 26.7 | 29.3 | 36.7 | 44.1 | 47.8 |
| Burning velocity (WCF) | | cm/s | 10 | 10 | 10 | 10 | 10 |

TABLE 99

| | Item | | Comp. Ex. 7 | Comp. Ex. 14 | Comp. Ex. 20 | Comp. Ex. 25 | Comp. Ex. 30 | Comp. Ex. 35 |
|---|---|---|---|---|---|---|---|---|
| WCF | HFO-1132(E) | Mass % | 72.0 | 60.9 | 55.8 | 52.1 | 48.6 | 45.4 |
| | HFO-1123 | Mass % | 0.0 | 0.0 | 0.0 | 0 | 0 | 0 |
| | R1234yf | Mass % | 28.0 | 32.0 | 33.1 | 33.4 | 33.2 | 32.7 |
| | R32 | Mass % | 0.0 | 7.1 | 11.1 | 14.5 | 18.2 | 21.9 |
| Burning velocity (WCF) | | cm/s | 10 | 10 | 10 | 10 | 10 | 10 |

TABLE 100

| | Item | | Comp. Ex. 40 | Comp. Ex. 46 | Comp. Ex. 52 | Comp. Ex. 58 | Comp. Ex. 63 |
|---|---|---|---|---|---|---|---|
| WCF | HFO-1132(E) | Mass % | 41.8 | 40 | 35.7 | 32 | 30.4 |
| | HFO-1123 | Mass % | 0 | 0 | 0 | 0 | 0 |
| | R1234yf | Mass % | 31.5 | 30.7 | 23.6 | 23.9 | 21.8 |
| | R32 | Mass % | 26.7 | 29.3 | 36.7 | 44.1 | 47.8 |
| Burning velocity (WCF) | | cm/s | 10 | 10 | 10 | 10 | 10 |

TABLE 101

| | Item | | Comp. Ex. 8 | Comp. Ex. 15 | Comp. Ex. 21 | Comp. Ex. 26 | Comp. Ex. 31 | Comp. Ex. 36 |
|---|---|---|---|---|---|---|---|---|
| WCF | HFO-1132 (E) | Mass % | 47.1 | 40.5 | 37.0 | 34.3 | 32.0 | 30.3 |
| | HFO-1123 | Mass % | 52.9 | 52.4 | 51.9 | 51.2 | 49.8 | 47.8 |
| | R1234yf | Mass % | 0.0 | 0.0 | 0.0 | 0.0 | 0.0 | 0.0 |
| | R32 | Mass % | 0.0 | 7.1 | 11.1 | 14.5 | 18.2 | 21.9 |
| | Leak condition that results in WCFF | | Storage/Shipping −40° C., 92% release, liquid phase side | Storage/Shipping −40° C., 92% release, liquid phase side | Storage/Shipping −40° C., 92% release, liquid phase side | Storage/Shipping −40° C., 92% release, liquid phase side | Storage/Shipping −40° C., 92% release, liquid phase side | Storage/Shipping −40° C., 92% release, liquid phase side |
| WCFF | HFO-1132 (E) | Mass % | 72.0 | 62.4 | 56.2 | 50.6 | 45.1 | 40.0 |
| | HFO-1123 | Mass % | 28.0 | 31.6 | 33.0 | 33.4 | 32.5 | 30.5 |
| | R1234yf | Mass % | 0.0 | 0.0 | 0.0 | 20.4 | 0.0 | 0.0 |
| | R32 | Mass % | 0.0 | 50.9 | 10.8 | 16.0 | 22.4 | 29.5 |
| | Burning velocity (WCF) | cm/s | 8 or less | 8 or less | 8 or less | 8 or less | 8 or less | 8 or less |
| | Burning velocity (WCFF) | cm/s | 10 | 10 | 10 | 10 | 10 | 10 |

TABLE 102

| | Item | | Comp. Ex. 41 | Comp. Ex. 47 | Comp. Ex. 53 | Comp. Ex. 59 | Comp. Ex. 64 |
|---|---|---|---|---|---|---|---|
| WCF | HFO-1132(E) | Mass % | 29.1 | 28.8 | 29.3 | 29.4 | 28.9 |
| | HFO-1123 | Mass % | 44.2 | 41.9 | 34.0 | 26.5 | 23.3 |
| | R1234yf | Mass % | 0.0 | 0.0 | 0.0 | 0.0 | 0.0 |
| | R32 | Mass % | 26.7 | 29.3 | 36.7 | 44.1 | 47.8 |
| | Leak condition that results in WCFF | | Storage/Shipping −40° C., 92% release, liquid phase side | Storage/Shipping −40° C., 92% release, liquid phase side | Storage/Shipping −40° C., 92% release, liquid phase side | Storage/Shipping −40° C., 90% release, gas phase side | Storage/Shipping −40° C., 86% release, gas phase side |
| WCFF | HFO-1132(E) | Mass % | 34.6 | 32.2 | 27.7 | 28.3 | 27.5 |
| | HFO-1123 | Mass % | 26.5 | 23.9 | 17.5 | 18.2 | 16.7 |
| | R1234yf | Mass % | 0.0 | 0.0 | 0.0 | 0.0 | 0.0 |
| | R32 | Mass % | 38.9 | 43.9 | 54.8 | 53.5 | 55.8 |
| | Burning velocity (WCF) | cm/s | 8 or less | 8 or less | 8.3 | 9.3 | 9.6 |
| | Burning velocity (WCFF) | cm/s | 10 | 10 | 10 | 10 | 10 |

TABLE 103

| | Item | | Comp. Ex. 9 | Comp. Ex. 16 | Comp. Ex. 22 | Comp. Ex. 27 | Comp. Ex. 32 | Comp. Ex. 37 |
|---|---|---|---|---|---|---|---|---|
| WCF | HFO-1132(E) | Mass % | 61.7 | 47.0 | 41.0 | 36.5 | 32.5 | 28.8 |
| | HFO-1123 | Mass % | 5.9 | 7.2 | 6.5 | 5.6 | 4.0 | 2.4 |
| | R1234yf | Mass % | 32.4 | 38.7 | 41.4 | 43.4 | 45.3 | 46.9 |
| | R32 | Mass % | 0.0 | 7.1 | 11.1 | 14.5 | 18.2 | 21.9 |
| | Leak condition that results in WCFF | | Storage/Shipping −40° C., 0% release, gas phase side | Storage/Shipping −40° C., 0% release, gas phase side | Storage/Shipping −40° C., 0% release, gas phase side | Storage/Shipping −40° C., 92% release, liquid phase side | Storage/Shipping −40° C., 0% release, gas phase side | Storage/Shipping −40° C., 0% release, gas phase side |
| WCFF | HFO-1132(E) | Mass % | 72.0 | 56.2 | 50.4 | 46.0 | 42.4 | 39.1 |
| | HFO-1123 | Mass % | 10.5 | 12.6 | 11.4 | 10.1 | 7.4 | 4.4 |
| | R1234yf | Mass % | 17.5 | 20.4 | 21.8 | 22.9 | 24.3 | 25.7 |
| | R32 | Mass % | 0.0 | 10.8 | 16.3 | 21.0 | 25.9 | 30.8 |
| | Burning velocity (WCF) | cm/s | 8 or less | 8 or less | 8 or less | 8 or less | 8 or less | 8 or less |
| | Burning velocity (WCFF) | cm/s | 10 | 10 | 10 | 10 | 10 | 10 |

TABLE 104

| | Item | | Comp. Ex. 42 | Comp. Ex. 48 | Comp. Ex. 54 | Comp. Ex. 60 | Comp. Ex. 65 |
|---|---|---|---|---|---|---|---|
| WCF | HFO-1132(E) | Mass % | 24.8 | 24.3 | 22.5 | 21.1 | 20.4 |
| | HFO-1123 | Mass % | 0.0 | 0.0 | 0.0 | 0.0 | 0.0 |
| | R1234yf | Mass % | 48.5 | 46.4 | 40.8 | 34.8 | 31.8 |
| | R32 | Mass % | 26.7 | 29.3 | 36.7 | 44.1 | 47.8 |
| | Leak conditions that results in WCFF | | Storage/ Shipping −40° C., 0% release, gas phase side | Storage/ Shipping −40° C., 0% release, gas phase side | Storage/ Shipping −40° C., 0% release, gas phase side | Storage/ Shipping −40° C., 0% release, gas phase side | Storage/ Shipping −40° C., 0% release, gas phase side |
| WCFF | HFO-1132(E) | Mass % | 35.3 | 34.3 | 31.3 | 29.1 | 28.1 |
| | HFO-1123 | Mass % | 0.0 | 0.0 | 0.0 | 0.0 | 0.0 |
| | R1234yf | Mass % | 27.4 | 26.2 | 23.1 | 19.8 | 18.2 |
| | R32 | Mass % | 37.3 | 39.6 | 45.6 | 51.1 | 53.7 |
| | Burning velocity (WCF) | cm/s | 8 or less | 8 or less | 8 or less | 8 or less | 8 or less |
| | Burning velocity (WCFF) | cm/s | 10 | 10 | 10 | 10 | 10 |

The results in Tables 97 to 100 indicate that the refrigerant has a WCF lower flammability in the following cases:

When the mass % of HFO-1132(E), HFO-1123, R1234yf, and R32 based on their sum in the mixed refrigerant of HFO-1132(E), HFO-1123, R1234yf, and R32 is respectively represented by x, y, z, and a, coordinates (x,y,z) in a ternary composition diagram in which the sum of HFO-1132(E), HFO-1123, and R1234yf is (100−a) mass % and a straight line connecting a point (0.0, 100.0−a, 0.0) and a point (0.0, 0.0, 100.0−a) is the base, if 0<a≤11.1, coordinates (x,y,z) in the ternary composition diagram are on or below a straight line GI that connects point G ($0.026a^2-1.7478a+72.0$, $-0.026a^2+0.7478a+28.0$, 0.0) and point I ($0.026a^2-1.7478a+72.0$, 0.0, $-0.026a^2+0.7478a+28.0$);

if 11.1<a≤18.2, coordinates (x,y,z) in the ternary composition diagram are on or below a straight line GI that connects point G ($0.02a^2-1.6013a+71.105$, $-0.02a^2+0.6013a+28.895$, 0.0) and point I ($0.02a^2-1.6013a+71.105$, 0.0, $-0.02a^2+0.6013a+28.895$); if 18.2<a≤26.7, coordinates (x,y,z) in the ternary composition diagram are on or below a straight line GI that connects point G ($0.0135a^2-1.4068a+69.727$, $-0.0135a^2+0.4068a+30.273$, 0.0) and point I ($0.0135a^2-1.4068a+69.727$, 0.0, $-0.0135a^2+0.4068a+30.273$); if 26.7<a≤36.7, coordinates (x,y,z) in the ternary composition diagram are on or below a straight line GI that connects point G ($0.0111a^2-1.3152a+68.986$, $-0.0111a^2+0.3152a+31.014$, 0.0) and point I ($0.0111a^2-1.3152a+68.986$, 0.0, $-0.0111a^2+0.3152a+31.014$); and if 36.7<a≤46.7, coordinates (x,y,z) in the ternary composition diagram are on or below a straight line GI that connects point G ($0.0061a^2-0.9918a+63.902$, $-0.0061a^2-0.0082a+36.098$, 0.0) and point I ($0.0061a^2-0.9918a+63.902$, 0.0, $-0.0061a^2-0.0082a+36.098$).

Three points corresponding to point G (Table 105) and point I (Table 106) were individually obtained in each of the following five ranges by calculation, and their approximate expressions were obtained.

TABLE 105

| Item | 11.1 ≥ R32 > 0 | | | 18.2 ≥ R32 ≥ 11.1 | | | 26.7 ≥ R32 ≥ 18.2 | | |
|---|---|---|---|---|---|---|---|---|---|
| R32 | 0 | 7.1 | 11.1 | 11.1 | 14.5 | 18.2 | 18.2 | 21.9 | 26.7 |
| HFO-1132(E) | 72.0 | 60.9 | 55.8 | 55.8 | 52.1 | 48.6 | 48.6 | 45.4 | 41.8 |
| HFO-1123 | 28.0 | 32.0 | 33.1 | 33.1 | 33.4 | 33.2 | 33.2 | 32.7 | 31.5 |
| R1234yf | 0 | 0 | 0 | 0 | 0 | 0 | 0 | 0 | 0 |
| R32 | | a | | | a | | | a | |
| HFO-1132(E) Approximate expression | $0.026a^2 - 1.7478a + 72.0$ | | | $0.02a^2 - 1.6013a + 71.105$ | | | $0.0135a^2 - 1.4068a + 69.727$ | | |
| HFO-1123 Approximate expression | $-0.026a^2 + 0.7478a + 28.0$ | | | $-0.02a^2 + 0.6013a + 28.895$ | | | $-0.0135a^2 + 0.4068a + 30.273$ | | |
| R1234yf Approximate expression | 0 | | | 0 | | | 0 | | |

| Item | 36.7 ≥ R32 ≥ 26.7 | | | 46.7 ≥ R32 ≥ 36.7 | | |
|---|---|---|---|---|---|---|
| R32 | 26.7 | 29.3 | 36.7 | 36.7 | 44.1 | 47.8 |
| HFO-1132(E) | 41.8 | 40.0 | 35.7 | 35.7 | 32.0 | 30.4 |
| HFO-1123 | 31.5 | 30.7 | 27.6 | 27.6 | 23.9 | 21.8 |
| R1234yf | 0 | 0 | 0 | 0 | 0 | 0 |
| R32 | | a | | | a | |
| HFO-1132(E) Approximate expression | $0.0111a2 - 1.3152a + 68.986$ | | | $0.0061a^2 - 0.9918a + 63.902$ | | |
| HFO-1123 Approximate expression | $-0.0111a2 + 0.3152a + 31.014$ | | | $-0.0061a^2 - 0.0082a + 36.098$ | | |

TABLE 105-continued

| | | |
|---|---|---|
| R1234yf Approximate expression | 0 | 0 |

TABLE 106

| Item | 11.1 ≥ R32 > 0 | | | 18.2 ≥ R32 ≥ 11.1 | | | 26.7 ≥ R32 ≥ 18.2 | | |
|---|---|---|---|---|---|---|---|---|---|
| R32 | 0 | 7.1 | 11.1 | 11.1 | 14.5 | 18.2 | 18.2 | 21.9 | 26.7 |
| HFO-1132(E) | 72.0 | 60.9 | 55.8 | 55.8 | 52.1 | 48.6 | 48.6 | 45.4 | 41.8 |
| HFO-1123 | 0 | 0 | 0 | 0 | 0 | 0 | 0 | 0 | 0 |
| R1234yf | 28.0 | 32.0 | 33.1 | 33.1 | 33.4 | 33.2 | 33.2 | 32.7 | 31.5 |
| R32 | $a$ | | | $a$ | | | $a$ | | |
| HFO-1132(E) Approximate expression | $0.026a^2 - 1.7478a + 72.0$ | | | $0.02a^2 - 1.6013a + 71.105$ | | | $0.0135a^2 - 1.4068a + 69.727$ | | |
| HFO-1123 Approximate expression | 0 | | | 0 | | | 0 | | |
| R1234yf Approximate expression | $-0.026a^2 + 0.7478a + 28.0$ | | | $-0.02a^2 + 0.6013a + 28.895$ | | | $-0.0135a^2 + 0.4068a + 30.273$ | | |

| Item | 36.7 ≥ R32 ≥ 26.7 | | | 46.7 ≥ R32 ≥ 36.7 | | |
|---|---|---|---|---|---|---|
| R32 | 26.7 | 29.3 | 36.7 | 36.7 | 44.1 | 47.8 |
| HFO-1132(E) | 41.8 | 40.0 | 35.7 | 35.7 | 32.0 | 30.4 |
| HFO-1123 | 0 | 0 | 0 | 0 | 0 | 0 |
| R1234yf | 31.5 | 30.7 | 23.6 | 23.6 | 23.5 | 21.8 |
| R32 | $x$ | | | $x$ | | |
| HFO-1132(E) Approximate expression | $0.0111a^2 - 1.3152a + 68.986$ | | | $0.0061a^2 - 0.9918a + 63.902$ | | |
| HFO-1123 Approximate expression | 0 | | | 0 | | |
| R1234yf Approximate expression | $-0.0111a^2 + 0.3152a + 31.014$ | | | $-0.0061a^2 - 0.0082a + 36.098$ | | |

The results in Tables 101 to 104 indicate that the refrigerant is determined to have a WCFF lower flammability, and the flammability classification according to the ASHRAE Standard is "2L (flammability)" in the following cases:

When the mass % of HFO-1132(E), HFO-1123, R1234yf, and R32 based on their sum in the mixed refrigerant of HFO-1132(E), HFO-1123, R1234yf, and R32 is respectively represented by x, y, z, and a, in a ternary composition diagram in which the sum of HFO-1132(E), HFO-1123, and R1234yf is (100–a) mass % and a straight line connecting a point (0.0, 100.0–a, 0.0) and a point (0.0, 0.0, 100.0–a) is the base, if 0<a≤11.1, coordinates (x,y,z) in the ternary composition diagram are on or below a straight line JK' that connects point J ($0.0049a^2 - 0.9645a + 47.1$, $-0.0049a^2 - 0.0355a + 52.9$, 0.0) and point K'($0.0514a^2 - 2.4353a + 61.7$, $-0.0323a^2 + 0.4122a + 5.9$, $-0.0191a^2 + 1.0231a + 32.4$); if 11.1<a≤18.2, coordinates are on a straight line JK' that connects point J ($0.0243a^2 - 1.4161a + 49.725$, $-0.0243a^2 + 0.4161a + 50.275$, 0.0) and point K'($0.0341a^2 - 2.1977a + 61.187$, $-0.0236a^2 + 0.34a + 5.636$, $-0.0105a^2 + 0.8577a + 33.177$); if 18.2<a≤26.7, coordinates are on or below a straight line JK' that connects point J ($0.0246a^2 - 1.4476a + 50.184$, $-0.0246a^2 + 0.4476a + 49.816$, 0.0) and point K' ($0.0196a^2 - 1.7863a + 58.515$, $-0.0079a^2 - 0.1136a + 8.702$, $-0.0117a^2 + 0.8999a + 32.783$); if 26.7<a≤36.7, coordinates are on or below a straight line JK' that connects point J ($0.0183a^2 - 1.1399a + 46.493$, $-0.0183a^2 + 0.1399a + 53.507$, 0.0) and point K' ($-0.0051a^2 + 0.0929a + 25.95$, 0.0, $0.0051a^2 - 1.0929a + 74.05$); and if 36.7<a≤46.7, coordinates are on or below a straight line JK' that connects point J ($-0.0134a^2 + 1.0956a + 7.13$, $0.0134a^2 - 2.0956a + 92.87$, 0.0) and point K'($-1.892a + 29.443$, 0.0, $0.892a + 70.557$).

Actual points having a WCFF lower flammability form a curved line that connects point J and point K' (on the straight line AB) in FIG. 3 and extends toward the HFO-1132(E) side. Accordingly, when coordinates are on or below the straight line JK', WCFF lower flammability is achieved.

Three points corresponding to point J (Table 107) and point K' (Table 108) were individually obtained in each of the following five ranges by calculation, and their approximate expressions were obtained.

TABLE 107

| Item | 11.1 ≥ R32 > 0 | | | 18.2 ≥ R32 ≥ 11.1 | | | 26.7 ≥ R32 ≥ 18.2 | | |
|---|---|---|---|---|---|---|---|---|---|
| R32 | 0 | 7.1 | 11.1 | 11.1 | 14.5 | 18.2 | 18.2 | 21.9 | 26.7 |
| HFO-1132(E) | 47.1 | 40.5 | 37 | 37.0 | 34.3 | 32.0 | 32.0 | 30.3 | 29.1 |
| HFO-1123 | 52.9 | 52.4 | 51.9 | 51.9 | 51.2 | 49.8 | 49.8 | 47.8 | 44.2 |

TABLE 107-continued

| | | | | | | | | | |
|---|---|---|---|---|---|---|---|---|---|
| R1234yf | 0 | 0 | 0 | 0 | 0 | 0 | 0 | 0 | 0 |
| R32 | | a | | | a | | | a | |
| HFO-1132(E) Approximate expression | $0.0049a^2 - 0.9645a + 47.1$ | | | $0.0243a^2 - 1.4161a + 49.725$ | | | $0.0246a^2 - 1.4476a + 50.184$ | | |
| HFO-1123 Approximate expression | $-0.0049a^2 - 0.0355a + 52.9$ | | | $-0.0243a^2 + 0.4161a + 50.275$ | | | $-0.0246a^2 + 0.4476a + 49.816$ | | |
| R1234yf Approximate expression | | 0 | | | 0 | | | 0 | |

| Item | 36.7 ≥ R32 ≥ 26.7 | | | 47.8 ≥ R32 ≥ 36.7 | | |
|---|---|---|---|---|---|---|
| R32 | 26.7 | 29.3 | 36.7 | 36.7 | 44.1 | 47.8 |
| HFO-1132(E) | 29.1 | 28.8 | 29.3 | 29.3 | 29.4 | 28.9 |
| HFO-1123 | 44.2 | 41.9 | 34.0 | 34.0 | 26.5 | 23.3 |
| R1234yf | 0 | 0 | 0 | 0 | 0 | 0 |
| R32 | | a | | | a | |
| HFO-1132(E) Approximate expression | $0.0183a^2 - 1.1399a + 46.493$ | | | $-0.0134a^2 + 1.0956a + 7.13$ | | |
| HFO-1123 Approximate expression | $-0.0183a^2 + 0.1399a + 53.507$ | | | $0.0134a^2 - 2.0956a + 92.87$ | | |
| R1234yf Approximate expression | | 0 | | | 0 | |

TABLE 108

| Item | 11.1 ≥ R32 > 0 | | | 18.2 ≥ R32 ≥ 11.1 | | | 26.7 ≥ R32 ≥ 18.2 | | |
|---|---|---|---|---|---|---|---|---|---|
| R32 | 0 | 7.1 | 11.1 | 11.1 | 14.5 | 18.2 | 18.2 | 21.9 | 26.7 |
| HFO-1132(E) | 61.7 | 47.0 | 41.0 | 41.0 | 36.5 | 32.5 | 32.5 | 28.8 | 24.8 |
| HFO-1123 | 5.9 | 7.2 | 6.5 | 6.5 | 5.6 | 4.0 | 4.0 | 2.4 | 0 |
| R1234yf | 32.4 | 38.7 | 41.4 | 41.4 | 43.4 | 45.3 | 45.3 | 46.9 | 48.5 |
| R32 | | x | | | x | | | x | |
| HFO-1132(E) Approximate expression | $0.0514a^2 - 2.4353a + 61.7$ | | | $0.0341a^2 - 2.1977a + 61.187$ | | | $0.0196a^2 - 1.7863a + 58.515$ | | |
| HFO-1123 Approximate expression | $-0.0323a^2 + 0.4122a + 5.9$ | | | $-0.0236a^2 + 0.34a + 5.636$ | | | $-0.0079a^2 - 0.1136a + 8.702$ | | |
| R1234yf Approximate expression | $-0.0191a^2 + 1.0231a + 32.4$ | | | $-0.0105a^2 + 0.8577a + 33.177$ | | | $-0.0117a^2 + 0.8999a + 32.783$ | | |

| Item | 36.7 ≥ R32 ≥ 26.7 | | | 46.7 ≥ R32 ≥ 36.7 | | |
|---|---|---|---|---|---|---|
| R32 | 26.7 | 29.3 | 36.7 | 36.7 | 44.1 | 47.8 |
| HFO-1132(E) | 24.8 | 24.3 | 22.5 | 22.5 | 21.1 | 20.4 |
| HFO-1123 | 0 | 0 | 0 | 0 | 0 | 0 |
| R1234yf | 48.5 | 46.4 | 40.8 | 40.8 | 34.8 | 31.8 |
| R32 | | x | | | x | |
| HFO-1132(E) Approximate expression | $-0.0051a^2 + 0.0929a + 25.95$ | | | $-1.892a + 29.443$ | | |
| HFO-1123 Approximate expression | | 0 | | | 0 | |
| R1234yf Approximate expression | $0.0051a^2 - 1.0929a + 74.05$ | | | $0.892a + 70.557$ | | |

FIGS. 3 to 13 show compositions whose R32 content a (mass %) is 0 mass %, 7.1 mass %, 11.1 mass %, 14.5 mass %, 18.2 mass %, 21.9 mass %, 26.7 mass %, 29.3 mass %, 36.7 mass %, 44.1 mass %, and 47.8 mass %, respectively.

Points A, B, C, and D' were obtained in the following manner according to approximate calculation.

Point A is a point where the content of HFO-1123 is 0 mass %, and a refrigerating capacity ratio of 85% relative to that of R410A is achieved. Three points corresponding to point A were obtained in each of the following five ranges by calculation, and their approximate expressions were obtained (Table 109).

TABLE 109

| Item | 11.1 ≥ R32 > 0 | | | 18.2 ≥ R32 ≥ 11.1 | | | 26.7 ≥ R32 ≥ 18.2 | | |
|---|---|---|---|---|---|---|---|---|---|
| R32 | 0 | 7.1 | 11.1 | 11.1 | 14.5 | 18.2 | 18.2 | 21.9 | 26.7 |
| HFO-1132(E) | 68.6 | 55.3 | 48.4 | 48.4 | 42.8 | 37 | 37 | 31.5 | 24.8 |
| HFO-1123 | 0 | 0 | 0 | 0 | 0 | 0 | 0 | 0 | 0 |
| R1234yf | 31.4 | 37.6 | 40.5 | 40.5 | 42.7 | 44.8 | 44.8 | 46.6 | 48.5 |
| R32 | a | | | a | | | a | | |
| HFO-1132(E) Approximate expression | $0.0134a^2 - 1.9681a + 68.6$ | | | $0.0112a^2 - 1.9337a + 68.484$ | | | $0.0107a^2 - 1.9142a + 68.305$ | | |
| HFO-1123 Approximate expression | 0 | | | 0 | | | 0 | | |
| R1234yf Approximate expression | $-0.0134a^2 + 0.9681a + 31.4$ | | | $-0.0112a^2 + 0.9337a + 31.516$ | | | $-0.0107a^2 + 0.9142a + 31.695$ | | |

| Item | 36.7 ≥ R32 ≥ 26.7 | | | 46.7 ≥ R32 ≥ 36.7 | | |
|---|---|---|---|---|---|---|
| R32 | 26.7 | 29.3 | 36.7 | 36.7 | 44.1 | 47.8 |
| HFO-1132(E) | 24.8 | 21.3 | 12.1 | 12.1 | 3.8 | 0 |
| HFO-1123 | 0 | 0 | 0 | 0 | 0 | 0 |
| R1234yf | 48.5 | 49.4 | 51.2 | 51.2 | 52.1 | 52.2 |
| R32 | a | | | a | | |
| HFO-1132(E) Approximate expression | $0.0103a^2 - 1.9225a + 68.793$ | | | $0.0085a^2 - 1.8102a + 67.1$ | | |
| HFO-1123 Approximate expression | 0 | | | 0 | | |
| R1234yf Approximate expression | $-0.0103a^2 + 0.9225a + 31.207$ | | | $-0.0085a^2 + 0.8102a + 32.9$ | | |

Point B is a point where the content of HFO-1132(E) is 0 mass %, and a refrigerating capacity ratio of 85% relative to that of R410A is achieved.

Three points corresponding to point B were obtained in each of the following five ranges by calculation, and their approximate expressions were obtained (Table 110).

TABLE 110

| Item | 11.1 ≥ R32 > 0 | | | 18.2 ≥ R32 ≥ 11.1 | | | 26.7 ≥ R32 ≥ 18.2 | | |
|---|---|---|---|---|---|---|---|---|---|
| R32 | 0 | 7.1 | 11.1 | 11.1 | 14.5 | 18.2 | 18.2 | 21.9 | 26.7 |
| HFO-1132(E) | 0 | 0 | 0 | 0 | 0 | 0 | 0 | 0 | 0 |
| HFO-1123 | 58.7 | 47.8 | 42.3 | 42.3 | 37.8 | 33.1 | 33.1 | 28.5 | 22.9 |
| R1234yf | 41.3 | 45.1 | 46.6 | 46.6 | 47.7 | 48.7 | 48.7 | 49.6 | 50.4 |
| R32 | a | | | a | | | a | | |
| HFO-1132(E) Approximate expression | 0 | | | 0 | | | 0 | | |
| HFO-1123 Approximate expression | $0.0144a^2 - 1.6377a + 58.7$ | | | $0.0075a^2 - 1.5156a + 58.199$ | | | $0.009a^2 - 1.6045a + 59.318$ | | |
| R1234yf Approximate expression | $-0.0144a^2 + 0.6377a + 41.3$ | | | $-0.0075a^2 + 0.5156a + 41.801$ | | | $-0.009a^2 + 0.6045a + 40.682$ | | |

| Item | 36.7 ≥ R32 ≥ 26.7 | | | 46.7 ≥ R32 ≥ 36.7 | | |
|---|---|---|---|---|---|---|
| R32 | 26.7 | 29.3 | 36.7 | 36.7 | 44.1 | 47.8 |
| HFO-1132(E) | 0 | 0 | 0 | 0 | 0 | 0 |
| HFO-1123 | 22.9 | 19.9 | 11.7 | 11.8 | 3.9 | 0 |
| R1234yf | 50.4 | 50.8 | 51.6 | 51.5 | 52.0 | 52.2 |
| R32 | a | | | a | | |
| HFO-1132(E) Approximate expression | 0 | | | 0 | | |
| HFO-1123 Approximate expression | $0.0046a^2 - 1.41a + 57.286$ | | | $0.0012a^2 - 1.1659a + 52.95$ | | |
| R1234yf Approximate expression | $-0.0046a^2 + 0.41a + 42.714$ | | | $-0.0012a^2 + 0.1659a + 47.05$ | | |

Point D' is a point where the content of HFO-1132(E) is 0 mass %, and a COP ratio of 95.5% relative to that of R410A is achieved.

Three points corresponding to point D' were obtained in each of the following by calculation, and their approximate expressions were obtained (Table 111).

TABLE 111

| Item | 11.1 ≥ R32 > 0 | | |
|---|---|---|---|
| R32 | 0 | 7.1 | 11.1 |
| HFO-1132(E) | 0 | 0 | 0 |
| HFO-1123 | 75.4 | 83.4 | 88.9 |
| R1234yf | 24.6 | 9.5 | 0 |
| R32 | a | | |
| HFO-1132(E) Approximate expression | 0 | | |
| HFO-1123 Approximate expression | $0.0224a^2 + 0.968a + 75.4$ | | |
| R1234yf Approximate expression | $-0.0224a^2 - 1.968a + 24.6$ | | |

Point C is a point where the content of R1234yf is 0 mass %, and a COP ratio of 95.5% relative to that of R410A is achieved.

Three points corresponding to point C were obtained in each of the following by calculation, and their approximate expressions were obtained (Table 112).

TABLE 112

| Item | 11.1 ≥ R32 > 0 | | |
|---|---|---|---|
| R32 | 0 | 7.1 | 11.1 |
| HFO-1132(E) | 32.9 | 18.4 | 0 |
| HFO-1123 | 67.1 | 74.5 | 88.9 |
| R1234yf | 0 | 0 | 0 |
| R32 | a | | |
| HFO-1132(E) Approximate expression | $-0.2304a^2 - 0.4062a + 32.9$ | | |
| HFO-1123 Approximate expression | $0.2304a^2 - 0.5938a + 67.1$ | | |
| R1234yf Approximate expression | 0 | | |

(5-4) Refrigerant D

The refrigerant D according to the present disclosure is a mixed refrigerant comprising trans-1,2-difluoroethylene (HFO-1132(E)), difluoromethane (R32), and 2,3,3,3-tetrafluoro-1-propene (R1234yf).

The refrigerant D according to the present disclosure has various properties that are desirable as an R410A-alternative refrigerant; i.e., a refrigerating capacity equivalent to that of R410A, a sufficiently low GWP, and a lower flammability (Class 2L) according to the ASHRAE standard.

The refrigerant D according to the present disclosure is preferably a refrigerant wherein when the mass % of HFO-1132(E), R32, and R1234yf based on their sum is respectively represented by x, y, and z, coordinates (x,y,z) in a ternary composition diagram in which the sum of HFO-1132(E), R32, and R1234yf is 100 mass % are within the range of a figure surrounded by line segments IJ, JN, NE, and EI that connect the following 4 points:
point I (72.0, 0.0, 28.0),
point J (48.5, 18.3, 33.2),
point N (27.7, 18.2, 54.1), and
point E (58.3, 0.0, 41.7),
or on these line segments (excluding the points on the line segment EI);

the line segment IJ is represented by coordinates $(0.0236y^2-1.7616y+72.0, y, -0.0236y^2+0.7616y+28.0)$;

the line segment NE is represented by coordinates $(0.012y^2-1.9003y+58.3, y, -0.012y^2+0.9003y+41.7)$; and the line segments JN and EI are straight lines. When the requirements above are satisfied, the refrigerant according to the present disclosure has a refrigerating capacity ratio of 80% or more relative to R410A, a GWP of 125 or less, and a WCF lower flammability.

The refrigerant D according to the present disclosure is preferably a refrigerant wherein when the mass % of HFO-1132(E), R32, and R1234yf based on their sum is respectively represented by x, y, and z, coordinates (x,y,z) in a ternary composition diagram in which the sum of HFO-1132(E), R32, and R1234yf is 100 mass % are within the range of a figure surrounded by line segments MM', M'N, NV, VG, and GM that connect the following 5 points:
point M (52.6, 0.0, 47.4),
point M' (39.2, 5.0, 55.8),
point N (27.7, 18.2, 54.1),
point V (11.0, 18.1, 70.9), and
point G (39.6, 0.0, 60.4),
or on these line segments (excluding the points on the line segment GM);

the line segment MM' is represented by coordinates $(0.132y^2-3.34y+52.6, y, -0.132y^2+2.34y+47.4)$;

the line segment MN is represented by coordinates $(0.0596y^2-2.2541y+48.98, y, -0.0596y^2+1.2541y+51.02)$;

the line segment VG is represented by coordinates $(0.0123y^2-1.8033y+39.6, y, -0.0123y^2+0.8033y+60.4)$; and the line segments NV and GM are straight lines. When the requirements above are satisfied, the refrigerant according to the present disclosure has a refrigerating capacity ratio of 70% or more relative to R410A, a GWP of 125 or less, and an ASHRAE lower flammability.

The refrigerant D according to the present disclosure is preferably a refrigerant wherein when the mass % of HFO-1132(E), R32, and R1234yf based on their sum is respectively represented by x, y, and z, coordinates (x,y,z) in a ternary composition diagram in which the sum of HFO-1132(E), R32, and R1234yf is 100 mass % are within the range of a figure surrounded by line segments ON, NU, and UO that connect the following 3 points:
point O (22.6, 36.8, 40.6),
point N (27.7, 18.2, 54.1), and
point U (3.9, 36.7, 59.4),
or on these line segments;

the line segment ON is represented by coordinates $(0.0072y^2-0.6701y+37.512, y, -0.0072y^2-0.3299y+62.488)$;

the line segment NU is represented by coordinates $(0.0083y^2-1.7403y+56.635, y, -0.0083y^2+0.7403y+43.365)$; and the line segment UO is a straight line. When the requirements above are satisfied, the refrigerant according to the present disclosure has a refrigerating capacity ratio of 80% or more relative to R410A, a GWP of 250 or less, and an ASHRAE lower flammability.

The refrigerant D according to the present disclosure is preferably a refrigerant wherein when the mass % of HFO-1132(E), R32, and R1234yf based on their sum is respectively represented by x, y, and z, coordinates (x,y,z) in a ternary composition diagram in which the sum of HFO-1132(E), R32, and R1234yf is 100 mass % are within the range of a figure surrounded by line segments QR, RT, TL, LK, and KQ that connect the following 5 points:
point Q (44.6, 23.0, 32.4),
point R (25.5, 36.8, 37.7),
point T (8.6, 51.6, 39.8),
point L (28.9, 51.7, 19.4), and
point K (35.6, 36.8, 27.6),
or on these line segments;
the line segment QR is represented by coordinates $(0.0099y^2-1.975y+84.765, y, -0.0099y^2+0.975y+15.235)$;
the line segment RT is represented by coordinates $(0.0082y^2-1.8683y+83.126, y, -0.0082y^2+0.8683y+16.874)$;
the line segment LK is represented by coordinates $(0.0049y^2-0.8842y+61.488, y, -0.0049y^2-0.1158y+38.512)$;
the line segment KQ is represented by coordinates $(0.0095y^2-1.2222y+67.676, y, -0.0095y^2+0.2222y+32.324)$; and
the line segment TL is a straight line. When the requirements above are satisfied, the refrigerant according to the present disclosure has a refrigerating capacity ratio of 92.5% or more relative to R410A, a GWP of 350 or less, and a WCF lower flammability.

The refrigerant D according to the present disclosure is preferably a refrigerant wherein
when the mass % of HFO-1132(E), R32, and R1234yf based on their sum is respectively represented by x, y, and z, coordinates (x,y,z) in a ternary composition diagram in which the sum of HFO-1132(E), R32, and R1234yf is 100 mass % are within the range of a figure surrounded by line segments PS, ST, and TP that connect the following 3 points:
point P (20.5, 51.7, 27.8),
point S (21.9, 39.7, 38.4), and
point T (8.6, 51.6, 39.8),
or on these line segments;
the line segment PS is represented by coordinates $(0.0064y^2-0.7103y+40.1, y, -0.0064y^2-0.2897y+59.9)$;
the line segment ST is represented by coordinates $(0.0082y^2-1.8683y+83.126, y, -0.0082y^2+0.8683y+16.874)$; and
the line segment TP is a straight line. When the requirements above are satisfied, the refrigerant according to the present disclosure has a refrigerating capacity ratio of 92.5% or more relative to R410A, a GWP of 350 or less, and an ASHRAE lower flammability.

The refrigerant D according to the present disclosure is preferably a refrigerant wherein
when the mass % of HFO-1132(E), R32, and R1234yf based on their sum is respectively represented by x, y, and z, coordinates (x,y,z) in a ternary composition diagram in which the sum of HFO-1132(E), R32, and R1234yf is 100 mass % are within the range of a figure surrounded by line segments ac, cf, fd, and da that connect the following 4 points:
point a (71.1, 0.0, 28.9),
point c (36.5, 18.2, 45.3),
point f (47.6, 18.3, 34.1), and
point d (72.0, 0.0, 28.0),
or on these line segments;
the line segment ac is represented by coordinates $(0.0181y^2-2.2288y+71.096, y, -0.0181y^2+1.2288y+28.904)$;
the line segment fd is represented by coordinates $(0.02y^2-1.7y+72, y, -0.02y^2+0.7y+28)$; and
the line segments cf and da are straight lines. When the requirements above are satisfied, the refrigerant according to the present disclosure has a refrigerating capacity ratio of 85% or more relative to R410A, a GWP of 125 or less, and a lower flammability (Class 2L) according to the ASHRAE standard.

The refrigerant D according to the present disclosure is preferably a refrigerant wherein
when the mass % of HFO-1132(E), R32, and R1234yf based on their sum is respectively represented by x, y, and z, coordinates (x,y,z) in a ternary composition diagram in which the sum of HFO-1132(E), R32, and R1234yf is 100 mass % are within the range of a figure surrounded by line segments ab, be, ed, and da that connect the following 4 points:
point a (71.1, 0.0, 28.9),
point b (42.6, 14.5, 42.9),
point e (51.4, 14.6, 34.0), and
point d (72.0, 0.0, 28.0),
or on these line segments;
the line segment ab is represented by coordinates $(0.0181y^2-2.2288y+71.096, y, -0.0181y^2+1.2288y+28.904)$;
the line segment ed is represented by coordinates $(0.02y^2-1.7y+72, y, -0.02y^2+0.7y+28)$; and
the line segments be and da are straight lines. When the requirements above are satisfied, the refrigerant according to the present disclosure has a refrigerating capacity ratio of 85% or more relative to R410A, a GWP of 100 or less, and a lower flammability (Class 2L) according to the ASHRAE standard.

The refrigerant D according to the present disclosure is preferably a refrigerant wherein
when the mass % of HFO-1132(E), R32, and R1234yf based on their sum is respectively represented by x, y, and z, coordinates (x,y,z) in a ternary composition diagram in which the sum of HFO-1132(E), R32, and R1234yf is 100 mass % are within the range of a figure surrounded by line segments gi, ij, and jg that connect the following 3 points:
point g (77.5, 6.9, 15.6),
point i (55.1, 18.3, 26.6), and
point j (77.5, 18.4, 4.1),
or on these line segments;
the line segment gi is represented by coordinates $(0.02y^2-2.4583y+93.396, y, -0.02y^2+1.4583y+6.604)$; and
the line segments ij and jg are straight lines. When the requirements above are satisfied, the refrigerant according to the present disclosure has a refrigerating capacity ratio of 95% or more relative to R410A and a GWP of 100 or less, undergoes fewer or no changes such as polymerization or decomposition, and also has excellent stability.

The refrigerant D according to the present disclosure is preferably a refrigerant wherein
when the mass % of HFO-1132(E), R32, and R1234yf based on their sum is respectively represented by x, y, and z, coordinates (x,y,z) in a ternary composition diagram in which the sum of HFO-1132(E), R32, and R1234yf is 100 mass % are within the range of a figure surrounded by line segments gh, hk, and kg that connect the following 3 points:
point g (77.5, 6.9, 15.6),
point h (61.8, 14.6, 23.6), and
point k (77.5, 14.6, 7.9),
or on these line segments;
the line segment gh is represented by coordinates $(0.02y^2-2.4583y+93.396, y, -0.02y^2+1.4583y+6.604)$; and the line segments hk and kg are straight lines. When the requirements above are satisfied, the refrigerant according to the present disclosure has a refrigerating capacity ratio of 95% or more relative to R410A and a GWP of 100 or less, undergoes fewer or no changes such as polymerization or decomposition, and also has excellent stability.

The refrigerant D according to the present disclosure may further comprise other additional refrigerants in addition to HFO-1132(E), R32, and R1234yf, as long as the above properties and effects are not impaired. In this respect, the refrigerant according to the present disclosure preferably comprises HFO-1132(E), R32, and R1234yf in a total amount of 99.5 mass % or more, more preferably 99.75 mass % or more, and still more preferably 99.9 mass % or more based on the entire refrigerant.

Such additional refrigerants are not limited, and can be selected from a wide range of refrigerants. The mixed refrigerant may comprise a single additional refrigerant, or two or more additional refrigerants.

(Examples of Refrigerant D)

The present disclosure is described in more detail below with reference to Examples of refrigerant D. However, the refrigerant D is not limited to the Examples.

The composition of each mixed refrigerant of HFO-1132 (E), R32, and R1234yf was defined as WCF. A leak simulation was performed using the NIST Standard Reference Database REFLEAK Version 4.0 under the conditions of Equipment, Storage, Shipping, Leak, and Recharge according to the ASHRAE Standard 34-2013. The most flammable fraction was defined as WCFF.

A burning velocity test was performed using the apparatus shown in FIG. 1 in the following manner. First, the mixed refrigerants used had a purity of 99.5% or more, and were degassed by repeating a cycle of freezing, pumping, and thawing until no traces of air were observed on the vacuum gauge. The burning velocity was measured by the closed method. The initial temperature was ambient temperature. Ignition was performed by generating an electric spark between the electrodes in the center of a sample cell. The duration of the discharge was 1.0 to 9.9 ms, and the ignition energy was typically about 0.1 to 1.0 J. The spread of the flame was visualized using schlieren photographs. A cylindrical container (inner diameter: 155 mm, length: 198 mm) equipped with two light transmission acrylic windows was used as the sample cell, and a xenon lamp was used as the light source. Schlieren images of the flame were recorded by a high-speed digital video camera at a frame rate of 600 fps and stored on a PC. Tables 113 to 115 show the results.

TABLE 113

| | Item | Unit | Comparative Example 13 I | Example 11 | Example 12 J | Example 13 | Example 14 K | Example 15 | Example 16 L |
|---|---|---|---|---|---|---|---|---|---|
| WCF | HFO-1132 (E) | Mass % | 72 | 57.2 | 48.5 | 41.2 | 35.6 | 32 | 28.9 |
| | R32 | Mass % | 0 | 10 | 18.3 | 27.6 | 36.8 | 44.2 | 51.7 |
| | R1234yf | Mass % | 28 | 32.8 | 33.2 | 31.2 | 27.6 | 23.8 | 19.4 |
| | Burning Velocity (WCF) | cm/s | 10 | 10 | 10 | 10 | 10 | 10 | 10 |

TABLE 114

| | Item | Unit | Comparative Example 14 M | Example 18 | Example 19 W | Example 20 | Example 21 N | Example 22 |
|---|---|---|---|---|---|---|---|---|
| WCF | HFO-1132 (E) | Mass % | 52.6 | 39.2 | 32.4 | 29.3 | 27.7 | 24.6 |
| | R32 | Mass % | 0.0 | 5.0 | 10.0 | 14.5 | 18.2 | 27.6 |
| | R1234yf | Mass % | 47.4 | 55.8 | 57.6 | 56.2 | 54.1 | 47.8 |
| | Leak condition that results in WCFF | | Storage, Shipping, −40° C., 0% release, on the gas phase side | Storage, Shipping, −40° C., 0% release, on the gas phase side | Storage, Shipping, −40° C., 0% release, on the gas phase side | Storage, Shipping, −40° C., 0% release, on the gas phase side | Storage, Shipping, −40° C., 0% release, on the gas phase side | Storage, Shipping, −40° C., 0% release, on the gas phase side |
| WCF | HFO-1132 (E) | Mass % | 72.0 | 57.8 | 48.7 | 43.6 | 40.6 | 34.9 |
| | R32 | Mass % | 0.0 | 9.5 | 17.9 | 24.2 | 28.7 | 38.1 |
| | R1234yf | Mass % | 28.0 | 32.7 | 33.4 | 32.2 | 30.7 | 27.0 |
| | Burning Velocity (WCF) | cm/s | 8 or less | 8 or less | 8 or less | 8 or less | 8 or less | 8 or less |
| | Burning Velocity (WCFF) | cm/s | 10 | 10 | 10 | 10 | 10 | 10 |

TABLE 115

| | Item | Unit | Example 23 O | Example 24 | Example 25 P |
|---|---|---|---|---|---|
| WCF | HFO-1132 (E) | Mass % | 22.6 | 21.2 | 20.5 |
| | HFO-1123 | Mass % | 36.8 | 44.2 | 51.7 |
| | R1234yf | Mass % | 40.6 | 34.6 | 27.8 |

TABLE 115-continued

| Item | Unit | Example 23 O | Example 24 | Example 25 P |
|---|---|---|---|---|
| Leak condition that results in WCFF | | Storage, Shipping, −40° C., 0% release, on the gas phase side | Storage, Shipping, −40° C., 0% release, on the gas phase side | Storage, Shipping, −40° C., 0% release, on the gas phase side |
| WCFF HFO-1132 (E) | Mass % | 31.4 | 29.2 | 27.1 |
| HFO-1123 | Mass % | 45.7 | 51.1 | 56.4 |
| R1234yf | Mass % | 23.0 | 19.7 | 16.5 |
| Burning Velocity (WCF) | cm/s | 8 or less | 8 or less | 8 or less |
| Burning Velocity (WCFF) | cm/s | 10 | 10 | 10 |

The results indicate that under the condition that the mass % of HFO-1132(E), R32, and R1234yf based on their sum is respectively represented by x, y, and z, when coordinates (x,y,z) in the ternary composition diagram shown in FIG. 14 in which the sum of HFO-1132(E), R32, and R1234yf is 100 mass % are on the line segment that connects point I, point J, point K, and point L, or below these line segments, the refrigerant has a WCF lower flammability.

Figure 14:
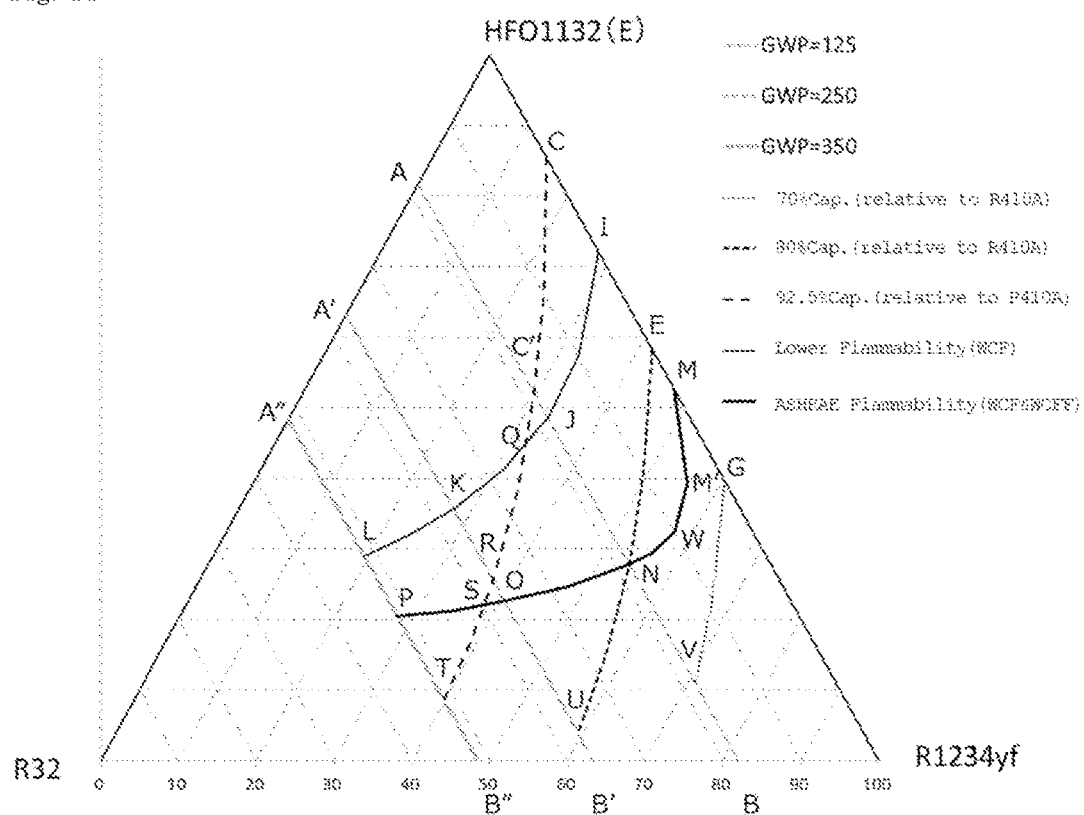
FIG. 14 is a view showing points A to C, E, G, and I to W; and line segments that connect points A to C, E, G, and I to W in a ternary composition diagram in which the sum of HFO-1132(E), R32, and R1234yf is 100 mass %.
Figure 15:
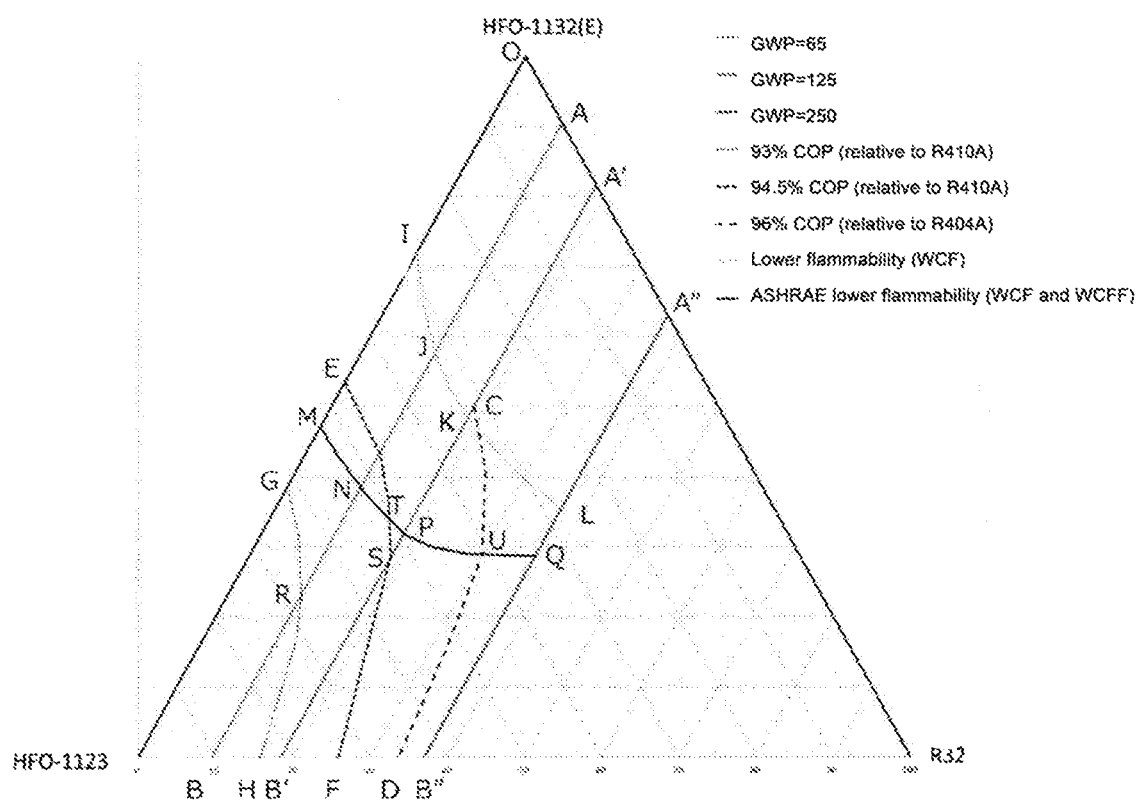
FIG. 15 is a view showing points A to U; and line segments that connect the points in a ternary composition diagram in which the sum of HFO-1132(E), HFO-1123, and R32 is 100 mass %.

The results also indicate that when coordinates (x,y,z) in the ternary composition diagram shown in FIG. 14 are on the line segments that connect point M, point M', point W, point J, point N, and point P, or below these line segments, the refrigerant has an ASHRAE lower flammability.

Mixed refrigerants were prepared by mixing HFO-1132 (E), R32, and R1234yf in amounts (mass %) shown in Tables 116 to 144 based on the sum of HFO-1132(E), R32, and R1234yf. The coefficient of performance (COP) ratio and the refrigerating capacity ratio relative to R410 of the mixed refrigerants shown in Tables 116 to 144 were determined. The conditions for calculation were as described below.

Evaporating temperature: 5° C.

Condensation temperature: 45° C.

Degree of superheating: 5 K

Degree of subcooling: 5 K

Compressor efficiency: 70%

Tables 116 to 144 show these values together with the GWP of each mixed refrigerant.

TABLE 116

| Item | Unit | Comparative Example 1 | Comparative Example 2 A | Comparative Example 3 B | Comparative Example 4 A' | Comparative Example 5 B' | Comparative Example 6 A" | Comparative Example 7 B" |
|---|---|---|---|---|---|---|---|---|
| HFO-1132(E) | Mass % | | 81.6 | 0.0 | 63.1 | 0.0 | 48.2 | 0.0 |
| R32 | Mass % | R410A | 18.4 | 18.1 | 36.9 | 36.7 | 51.8 | 51.5 |
| R1234yf | Mass % | | 0.0 | 81.9 | 0.0 | 63.3 | 0.0 | 48.5 |
| GWP | — | 2088 | 125 | 125 | 250 | 250 | 350 | 350 |
| COP Ratio | % (relative to R410A) | 100 | 98.7 | 103.6 | 98.7 | 102.3 | 99.2 | 102.2 |
| Refrigerating Capacity Ratio | % (relative to R410A) | 100 | 105.3 | 62.5 | 109.9 | 77.5 | 112.1 | 87.3 |

TABLE 117

| Item | Unit | Comparative Example 8 C | Comparative Example 9 | Comparative Example 10 C' | Example 1 | Example 2 R | Example 3 | Example 4 T |
|---|---|---|---|---|---|---|---|---|
| HFO-1132(E) | Mass % | 85.5 | 66.1 | 52.1 | 37.8 | 25.5 | 16.6 | 8.6 |
| R32 | Mass % | 0.0 | 10.0 | 18.2 | 27.6 | 36.8 | 44.2 | 51.6 |
| R1234yf | Mass % | 14.5 | 23.9 | 29.7 | 34.6 | 37.7 | 39.2 | 39.8 |
| GWP | — | 1 | 69 | 125 | 188 | 250 | 300 | 350 |
| COP Ratio | % (relative to R410A) | 99.8 | 99.3 | 99.3 | 99.6 | 100.2 | 100.8 | 101.4 |
| Refrigerating Capacity Ratio | % (relative to R410A) | 92.5 | 92.5 | 92.5 | 92.5 | 92.5 | 92.5 | 92.5 |

TABLE 118

| Item | Unit | Comparative Example 11 E | Example 5 | Example 6 N | Example 7 | Example 8 U | Comparative Example 12 G | Example 9 | Example 10 V |
|---|---|---|---|---|---|---|---|---|---|
| HFO-1132(E) | Mass % | 58.3 | 40.5 | 27.7 | 14.9 | 3.9 | 39.6 | 22.8 | 11.0 |
| R32 | Mass % | 0.0 | 10.0 | 18.2 | 27.6 | 36.7 | 0.0 | 10.0 | 18.1 |
| R1234yf | Mass % | 41.7 | 49.5 | 54.1 | 57.5 | 59.4 | 60.4 | 67.2 | 70.9 |
| GWP | — | 2 | 70 | 125 | 189 | 250 | 3 | 70 | 125 |
| COP Ratio | % (relative to R410A) | 100.3 | 100.3 | 100.7 | 101.2 | 101.9 | 101.4 | 101.8 | 102.3 |
| Refrigerating Capacity Ratio | % (relative to R410A) | 80.0 | 80.0 | 80.0 | 80.0 | 80.0 | 70.0 | 70.0 | 70.0 |

TABLE 119

| Item | Unit | Comparative Example 13 I | Example 11 | Example 12 J | Example 13 | Example 14 K | Example 15 | Example 16 L | Example 17 Q |
|---|---|---|---|---|---|---|---|---|---|
| HFO-1132(E) | Mass % | 72.0 | 57.2 | 48.5 | 41.2 | 35.6 | 32.0 | 28.9 | 44.6 |
| R32 | Mass % | 0.0 | 10.0 | 18.3 | 27.6 | 36.8 | 44.2 | 51.7 | 23.0 |
| R1234yf | Mass % | 28.0 | 32.8 | 33.2 | 31.2 | 27.6 | 23.8 | 19.4 | 32.4 |
| GWP | — | 2 | 69 | 125 | 188 | 250 | 300 | 350 | 157 |
| COP Ratio | % (relative to R410A) | 99.9 | 99.5 | 99.4 | 99.5 | 99.6 | 99.8 | 100.1 | 99.4 |
| Refrigerating Capacity Ratio | % (relative to R410A) | 86.6 | 88.4 | 90.9 | 94.2 | 97.7 | 100.5 | 103.3 | 92.5 |

TABLE 120

| Item | Unit | Comparative Example 14 M | Example 18 | Example 19 W | Example 20 | Example 21 N | Example 22 |
|---|---|---|---|---|---|---|---|
| HFO-1132(E) | Mass % | 52.6 | 39.2 | 32.4 | 29.3 | 27.7 | 24.5 |
| R32 | Mass % | 0.0 | 5.0 | 10.0 | 14.5 | 18.2 | 27.6 |
| R1234yf | Mass % | 47.4 | 55.8 | 57.6 | 56.2 | 54.1 | 47.9 |
| GWP | — | 2 | 36 | 70 | 100 | 125 | 188 |
| COP Ratio | % (relative to R410A) | 100.5 | 100.9 | 100.9 | 100.8 | 100.7 | 100.4 |
| Refrigerating Capacity Ratio | % (relative to R410A) | 77.1 | 74.8 | 75.6 | 77.8 | 80.0 | 85.5 |

TABLE 121

| Item | Unit | Example 23 O | Example 24 | Example 25 P | Example 26 S |
|---|---|---|---|---|---|
| HFO-1132(E) | Mass % | 22.6 | 21.2 | 20.5 | 21.9 |
| R32 | Mass % | 36.8 | 44.2 | 51.7 | 39.7 |
| R1234yf | Mass % | 40.6 | 34.6 | 27.8 | 38.4 |
| GWP | — | 250 | 300 | 350 | 270 |
| COP Ratio | % (relative to R410A) | 100.4 | 100.5 | 100.6 | 100.4 |
| Refrigerating Capacity Ratio | % (relative to R410A) | 91.0 | 95.0 | 99.1 | 92.5 |

TABLE 122

| Item | Unit | Comparative Example 15 | Comparative Example 16 | Comparative Example 17 | Comparative Example 18 | Example 27 | Example 28 | Comparative Example 19 | Comparative Example 20 |
|---|---|---|---|---|---|---|---|---|---|
| HFO-1132(E) | Mass % | 10.0 | 20.0 | 30.0 | 40.0 | 50.0 | 60.0 | 70.0 | 80.0 |
| R32 | Mass % | 5.0 | 5.0 | 5.0 | 5.0 | 5.0 | 5.0 | 5.0 | 5.0 |
| R1234yf | Mass % | 85.0 | 75.0 | 65.0 | 55.0 | 45.0 | 35.0 | 25.0 | 15.0 |
| GWP | — | 37 | 37 | 37 | 36 | 36 | 36 | 35 | 35 |
| COP Ratio | % (relative to R410A) | 103.4 | 102.6 | 101.6 | 100.8 | 100.2 | 99.8 | 99.6 | 99.4 |

TABLE 122-continued

| Item | Unit | Comparative Example 15 | Comparative Example 16 | Comparative Example 17 | Comparative Example 18 | Example 27 | Example 28 | Comparative Example 19 | Comparative Example 20 |
|---|---|---|---|---|---|---|---|---|---|
| Refrigerating Capacity Ratio | % (relative to R410A) | 56.4 | 63.3 | 69.5 | 75.2 | 80.5 | 85.4 | 90.1 | 94.4 |

TABLE 123

| Item | Unit | Comparative Example 21 | Comparative Example 22 | Example 29 | Comparative Example 23 | Example 30 | Comparative Example 24 | Comparative Example 25 | Comparative Example 26 |
|---|---|---|---|---|---|---|---|---|---|
| HFO-1132(E) | Mass % | 10.0 | 20.0 | 30.0 | 40.0 | 50.0 | 60.0 | 70.0 | 80.0 |
| R32 | Mass % | 10.0 | 10.0 | 10.0 | 10.0 | 10.0 | 10.0 | 10.0 | 10.0 |
| R1234yf | Mass % | 80.0 | 70.0 | 60.0 | 50.0 | 40.0 | 30.0 | 20.0 | 10.0 |
| GWP | — | 71 | 71 | 70 | 70 | 70 | 69 | 69 | 69 |
| COP Ratio | % (relative to R410A) | 103.1 | 102.1 | 101.1 | 100.4 | 99.8 | 99.5 | 99.2 | 99.1 |
| Refrigerating Capacity Ratio | % (relative to R410A) | 61.8 | 68.3 | 74.3 | 79.7 | 84.9 | 89.7 | 94.2 | 98.4 |

TABLE 124

| Item | Unit | Comparative Example 27 | Example 31 | Comparative Example 28 | Example 32 | Example 33 | Comparative Example 29 | Comparative Example 30 | Comparative Example 31 |
|---|---|---|---|---|---|---|---|---|---|
| HFO-1132(E) | Mass % | 10.0 | 20.0 | 30.0 | 40.0 | 50.0 | 60.0 | 70.0 | 80.0 |
| R32 | Mass % | 15.0 | 15.0 | 15.0 | 15.0 | 15.0 | 15.0 | 15.0 | 15.0 |
| R1234yf | Mass % | 75.0 | 65.0 | 55.0 | 45.0 | 35.0 | 25.0 | 15.0 | 5.0 |
| GWP | — | 104 | 104 | 104 | 103 | 103 | 103 | 103 | 102 |
| COP Ratio | % (relative to R410A) | 102.7 | 101.6 | 100.7 | 100.0 | 99.5 | 99.2 | 99.0 | 98.9 |
| Refrigerating Capacity Ratio | % (relative to R410A) | 66.6 | 72.9 | 78.6 | 84.0 | 89.0 | 93.7 | 98.1 | 102.2 |

TABLE 125

| Item | Unit | Comparative Example 32 | Comparative Example 33 | Comparative Example 34 | Comparative Example 35 | Comparative Example 36 | Comparative Example 37 | Comparative Example 38 | Comparative Example 39 |
|---|---|---|---|---|---|---|---|---|---|
| HFO-1132(E) | Mass % | 10.0 | 20.0 | 30.0 | 40.0 | 50.0 | 60.0 | 70.0 | 10.0 |
| R32 | Mass % | 20.0 | 20.0 | 20.0 | 20.0 | 20.0 | 20.0 | 20.0 | 25.0 |
| R1234yf | Mass % | 70.0 | 60.0 | 50.0 | 40.0 | 30.0 | 20.0 | 10.0 | 65.0 |
| GWP | — | 138 | 138 | 137 | 137 | 137 | 136 | 136 | 171 |
| COP Ratio | % (relative to R410A) | 102.3 | 101.2 | 100.4 | 99.7 | 99.3 | 99.0 | 98.8 | 101.9 |
| Refrigerating Capacity Ratio | % (relative to R410A) | 71.0 | 77.1 | 82.7 | 88.0 | 92.9 | 97.5 | 101.7 | 75.0 |

TABLE 126

| Item | Unit | Example 34 | Comparative Example 40 | Comparative Example 41 | Comparative Example 42 | Comparative Example 43 | Comparative Example 44 | Comparative Example 45 | Example 35 |
|---|---|---|---|---|---|---|---|---|---|
| HFO-1132(E) | Mass % | 20.0 | 30.0 | 40.0 | 50.0 | 60.0 | 70.0 | 10.0 | 20.0 |
| R32 | Mass % | 25.0 | 25.0 | 25.0 | 25.0 | 25.0 | 25.0 | 30.0 | 30.0 |
| R1234yf | Mass % | 55.0 | 45.0 | 35.0 | 25.0 | 15.0 | 5.0 | 60.0 | 50.0 |
| GWP | — | 171 | 171 | 171 | 170 | 170 | 170 | 205 | 205 |
| COP Ratio | % (relative to R410A) | 100.9 | 100.1 | 99.6 | 99.2 | 98.9 | 98.7 | 101.6 | 100.7 |
| Refrigerating Capacity Ratio | % (relative to R410A) | 81.0 | 86.6 | 91.7 | 96.5 | 101.0 | 105.2 | 78.9 | 84.8 |

TABLE 127

| Item | Unit | Comparative Example 46 | Comparative Example 47 | Comparative Example 48 | Comparative Example 49 | Example 36 | Example 37 | Example 38 | Comparative Example 50 |
|---|---|---|---|---|---|---|---|---|---|
| HFO-1132(E) | Mass % | 30.0 | 40.0 | 50.0 | 60.0 | 10.0 | 20.0 | 30.0 | 40.0 |
| R32 | Mass % | 30.0 | 30.0 | 30.0 | 30.0 | 35.0 | 35.0 | 35.0 | 35.0 |
| R1234yf | Mass % | 40.0 | 30.0 | 20.0 | 10.0 | 55.0 | 45.0 | 35.0 | 25.0 |
| GWP | — | 204 | 204 | 204 | 204 | 239 | 238 | 238 | 238 |
| COP Ratio | % (relative to R410A) | 100.0 | 99.5 | 99.1 | 98.8 | 101.4 | 100.6 | 99.9 | 99.4 |
| Refrigerating Capacity Ratio | % (relative to R410A) | 90.2 | 95.3 | 100.0 | 104.4 | 82.5 | 88.3 | 93.7 | 98.6 |

TABLE 128

| Item | Unit | Comparative Example 51 | Comparative Example 52 | Comparative Example 53 | Comparative Example 54 | Example 39 | Comparative Example 55 | Comparative Example 56 | Comparative Example 57 |
|---|---|---|---|---|---|---|---|---|---|
| HFO-1132(E) | Mass % | 50.0 | 60.0 | 10.0 | 20.0 | 30.0 | 40.0 | 50.0 | 10.0 |
| R32 | Mass % | 35.0 | 35.0 | 40.0 | 40.0 | 40.0 | 40.0 | 40.0 | 45.0 |
| R1234yf | Mass % | 15.0 | 5.0 | 50.0 | 40.0 | 30.0 | 20.0 | 10.0 | 45.0 |
| GWP | — | 237 | 237 | 272 | 272 | 272 | 271 | 271 | 306 |
| COP Ratio | % (relative to R410A) | 99.0 | 98.8 | 101.3 | 100.6 | 99.9 | 99.4 | 99.0 | 101.3 |
| Refrigerating Capacity Ratio | % (relative to R410A) | 103.2 | 107.5 | 86.0 | 91.7 | 96.9 | 101.8 | 106.3 | 89.3 |

TABLE 129

| Item | Unit | Example 40 | Example 41 | Comparative Example 58 | Comparative Example 59 | Comparative Example 60 | Example 42 | Comparative Example 61 | Comparative Example 62 |
|---|---|---|---|---|---|---|---|---|---|
| HFO-1132(E) | Mass % | 20.0 | 30.0 | 40.0 | 50.0 | 10.0 | 20.0 | 30.0 | 40.0 |
| R32 | Mass % | 45.0 | 45.0 | 45.0 | 45.0 | 50.0 | 50.0 | 50.0 | 50.0 |
| R1234yf | Mass % | 35.0 | 25.0 | 15.0 | 5.0 | 40.0 | 30.0 | 20.0 | 10.0 |
| GWP | — | 305 | 305 | 305 | 304 | 339 | 339 | 339 | 338 |
| COP Ratio | % (relative to R410A) | 100.6 | 100.0 | 99.5 | 99.1 | 101.3 | 100.6 | 100.0 | 99.5 |
| Refrigerating Capacity Ratio | % (relative to R410A) | 94.9 | 100.0 | 104.7 | 109.2 | 92.4 | 97.8 | 102.9 | 107.5 |

TABLE 130

| Item | Unit | Comparative Example 63 | Comparative Example 64 | Comparative Example 65 | Comparative Example 66 | Example 43 | Example 44 | Example 45 | Example 46 |
|---|---|---|---|---|---|---|---|---|---|
| HFO-1132(E) | Mass % | 10.0 | 20.0 | 30.0 | 40.0 | 56.0 | 59.0 | 62.0 | 65.0 |
| R32 | Mass % | 55.0 | 55.0 | 55.0 | 55.0 | 3.0 | 3.0 | 3.0 | 3.0 |
| R1234yf | Mass % | 35.0 | 25.0 | 15.0 | 5.0 | 41.0 | 38.0 | 35.0 | 32.0 |
| GWP | — | 373 | 372 | 372 | 372 | 22 | 22 | 22 | 22 |
| COP Ratio | % (relative to R410A) | 101.4 | 100.7 | 100.1 | 99.6 | 100.1 | 100.0 | 99.9 | 99.8 |
| Refrigerating Capacity Ratio | % (relative to R410A) | 95.3 | 100.6 | 105.6 | 110.2 | 81.7 | 83.2 | 84.6 | 86.0 |

TABLE 131

| Item | Unit | Example 47 | Example 48 | Example 49 | Example 50 | Example 51 | Example 52 | Example 53 | Example 54 |
|---|---|---|---|---|---|---|---|---|---|
| HFO-1132(E) | Mass % | 49.0 | 52.0 | 55.0 | 58.0 | 61.0 | 43.0 | 46.0 | 49.0 |
| R32 | Mass % | 6.0 | 6.0 | 6.0 | 6.0 | 6.0 | 9.0 | 9.0 | 9.0 |
| R1234yf | Mass % | 45.0 | 42.0 | 39.0 | 36.0 | 33.0 | 48.0 | 45.0 | 42.0 |
| GWP | — | 43 | 43 | 43 | 43 | 42 | 63 | 63 | 63 |

TABLE 131-continued

| Item | Unit | Example 47 | Example 48 | Example 49 | Example 50 | Example 51 | Example 52 | Example 53 | Example 54 |
|---|---|---|---|---|---|---|---|---|---|
| COP Ratio | % (relative to R410A) | 100.2 | 100.0 | 99.9 | 99.8 | 99.7 | 100.3 | 100.1 | 99.9 |
| Refrigerating Capacity Ratio | % (relative to R410A) | 80.9 | 82.4 | 83.9 | 85.4 | 86.8 | 80.4 | 82.0 | 83.5 |

TABLE 132

| Item | Unit | Example 55 | Example 56 | Example 57 | Example 58 | Example 59 | Example 60 | Example 61 | Example 62 |
|---|---|---|---|---|---|---|---|---|---|
| HFO-1132(E) | Mass % | 52.0 | 55.0 | 58.0 | 38.0 | 41.0 | 44.0 | 47.0 | 50.0 |
| R32 | Mass % | 9.0 | 9.0 | 9.0 | 12.0 | 12.0 | 12.0 | 12.0 | 12.0 |
| R1234yf | Mass % | 39.0 | 36.0 | 33.0 | 50.0 | 47.0 | 44.0 | 41.0 | 38.0 |
| GWP | — | 63 | 63 | 63 | 83 | 83 | 83 | 83 | 83 |
| COP Ratio | % (relative to R410A) | 99.8 | 99.7 | 99.6 | 100.3 | 100.1 | 100.0 | 99.8 | 99.7 |
| Refrigerating Capacity Ratio | % (relative to R410A) | 85.0 | 86.5 | 87.9 | 80.4 | 82.0 | 83.5 | 85.1 | 86.6 |

TABLE 133

| Item | Unit | Example 63 | Example 64 | Example 65 | Example 66 | Example 67 | Example 68 | Example 69 | Example 70 |
|---|---|---|---|---|---|---|---|---|---|
| HFO-1132(E) | Mass % | 53.0 | 33.0 | 36.0 | 39.0 | 42.0 | 45.0 | 48.0 | 51.0 |
| R32 | Mass % | 12.0 | 15.0 | 15.0 | 15.0 | 15.0 | 15.0 | 15.0 | 15.0 |
| R1234yf | Mass % | 35.0 | 52.0 | 49.0 | 46.0 | 43.0 | 40.0 | 37.0 | 34.0 |
| GWP | — | 83 | 104 | 104 | 103 | 103 | 103 | 103 | 103 |
| COP Ratio | % (relative to R410A) | 99.6 | 100.5 | 100.3 | 100.1 | 99.9 | 99.7 | 99.6 | 99.5 |
| Refrigerating Capacity Ratio | % (relative to R410A) | 88.0 | 80.3 | 81.9 | 83.5 | 85.0 | 86.5 | 88.0 | 89.5 |

TABLE 134

| Item | Unit | Example 71 | Example 72 | Example 73 | Example 74 | Example 75 | Example 76 | Example 77 | Example 78 |
|---|---|---|---|---|---|---|---|---|---|
| HFO-1132(E) | Mass % | 29.0 | 32.0 | 35.0 | 38.0 | 41.0 | 44.0 | 47.0 | 36.0 |
| R32 | Mass % | 18.0 | 18.0 | 18.0 | 18.0 | 18.0 | 18.0 | 18.0 | 3.0 |
| R1234yf | Mass % | 53.0 | 50.0 | 47.0 | 44.0 | 41.0 | 38.0 | 35.0 | 61.0 |
| GWP | — | 124 | 124 | 124 | 124 | 124 | 123 | 123 | 23 |
| COP Ratio | % (relative to R410A) | 100.6 | 100.3 | 100.1 | 99.9 | 99.8 | 99.6 | 99.5 | 101.3 |
| Refrigerating Capacity Ratio | % (relative to R410A) | 80.6 | 82.2 | 83.8 | 85.4 | 86.9 | 88.4 | 89.9 | 71.0 |

TABLE 135

| Item | Unit | Example 79 | Example 80 | Example 81 | Example 82 | Example 83 | Example 84 | Example 85 | Example 86 |
|---|---|---|---|---|---|---|---|---|---|
| HFO-1132(E) | Mass % | 39.0 | 42.0 | 30.0 | 33.0 | 36.0 | 26.0 | 29.0 | 32.0 |
| R32 | Mass % | 3.0 | 3.0 | 6.0 | 6.0 | 6.0 | 9.0 | 9.0 | 9.0 |
| R1234yf | Mass % | 58.0 | 55.0 | 64.0 | 61.0 | 58.0 | 65.0 | 62.0 | 59.0 |
| GWP | — | 23 | 23 | 43 | 43 | 43 | 64 | 64 | 63 |
| COP Ratio | % (relative to R410A) | 101.1 | 100.9 | 101.5 | 101.3 | 101.0 | 101.6 | 101.3 | 101.1 |
| Refrigerating Capacity Ratio | % (relative to R410A) | 72.7 | 74.4 | 70.5 | 72.2 | 73.9 | 71.0 | 72.8 | 74.5 |

TABLE 136

| Item | Unit | Example 87 | Example 88 | Example 89 | Example 90 | Example 91 | Example 92 | Example 93 | Example 94 |
|---|---|---|---|---|---|---|---|---|---|
| HFO-1132(E) | Mass % | 21.0 | 24.0 | 27.0 | 30.0 | 16.0 | 19.0 | 22.0 | 25.0 |
| R32 | Mass % | 12.0 | 12.0 | 12.0 | 12.0 | 15.0 | 15.0 | 15.0 | 15.0 |
| R1234yf | Mass % | 67.0 | 64.0 | 61.0 | 58.0 | 69.0 | 66.0 | 63.0 | 60.0 |
| GWP | — | 84 | 84 | 84 | 84 | 104 | 104 | 104 | 104 |
| COP Ratio | % (relative to R410A) | 101.8 | 101.5 | 101.2 | 101.0 | 102.1 | 101.8 | 101.4 | 101.2 |
| Refrigerating Capacity Ratio | % (relative to R410A) | 70.8 | 72.6 | 74.3 | 76.0 | 70.4 | 72.3 | 74.0 | 75.8 |

TABLE 137

| Item | Unit | Example 95 | Example 96 | Example 97 | Example 98 | Example 99 | Example 100 | Example 101 | Example 102 |
|---|---|---|---|---|---|---|---|---|---|
| HFO-1132(E) | Mass % | 28.0 | 12.0 | 15.0 | 18.0 | 21.0 | 24.0 | 27.0 | 25.0 |
| R32 | Mass % | 15.0 | 18.0 | 18.0 | 18.0 | 18.0 | 18.0 | 18.0 | 21.0 |
| R1234yf | Mass % | 57.0 | 70.0 | 67.0 | 64.0 | 61.0 | 58.0 | 55.0 | 54.0 |
| GWP | — | 104 | 124 | 124 | 124 | 124 | 124 | 124 | 144 |
| COP Ratio | % (relative to R410A) | 100.9 | 102.2 | 101.9 | 101.6 | 101.3 | 101.0 | 100.7 | 100.7 |
| Refrigerating Capacity Ratio | % (relative to R410A) | 77.5 | 70.5 | 72.4 | 74.2 | 76.0 | 77.7 | 79.4 | 80.7 |

TABLE 138

| Item | Unit | Example 103 | Example 104 | Example 105 | Example 106 | Example 107 | Example 108 | Example 109 | Example 110 |
|---|---|---|---|---|---|---|---|---|---|
| HFO-1132(E) | Mass % | 21.0 | 24.0 | 17.0 | 20.0 | 23.0 | 13.0 | 16.0 | 19.0 |
| R32 | Mass % | 24.0 | 24.0 | 27.0 | 27.0 | 27.0 | 30.0 | 30.0 | 30.0 |
| R1234yf | Mass % | 55.0 | 52.0 | 56.0 | 53.0 | 50.0 | 57.0 | 54.0 | 51.0 |
| GWP | — | 164 | 164 | 185 | 185 | 184 | 205 | 205 | 205 |
| COP Ratio | % (relative to R410A) | 100.9 | 100.6 | 101.1 | 100.8 | 100.6 | 101.3 | 101.0 | 100.8 |
| Refrigerating Capacity Ratio | % (relative to R410A) | 80.8 | 82.5 | 80.8 | 82.5 | 84.2 | 80.7 | 82.5 | 84.2 |

TABLE 139

| Item | Unit | Example 111 | Example 112 | Example 113 | Example 114 | Example 115 | Example 116 | Example 117 | Example 118 |
|---|---|---|---|---|---|---|---|---|---|
| HFO-1132(E) | Mass % | 22.0 | 9.0 | 12.0 | 15.0 | 18.0 | 21.0 | 8.0 | 12.0 |
| R32 | Mass % | 30.0 | 33.0 | 33.0 | 33.0 | 33.0 | 33.0 | 36.0 | 36.0 |
| R1234yf | Mass % | 48.0 | 58.0 | 55.0 | 52.0 | 49.0 | 46.0 | 56.0 | 52.0 |
| GWP | — | 205 | 225 | 225 | 225 | 225 | 225 | 245 | 245 |
| COP Ratio | % (relative to R410A) | 100.5 | 101.6 | 101.3 | 101.0 | 100.8 | 100.5 | 101.6 | 101.2 |
| Refrigerating Capacity Ratio | % (relative to R410A) | 85.9 | 80.5 | 82.3 | 84.1 | 85.8 | 87.5 | 82.0 | 84.4 |

TABLE 140

| Item | Unit | Example 119 | Example 120 | Example 121 | Example 122 | Example 123 | Example 124 | Example 125 | Example 126 |
|---|---|---|---|---|---|---|---|---|---|
| HFO-1132(E) | Mass % | 15.0 | 18.0 | 21.0 | 42.0 | 39.0 | 34.0 | 37.0 | 30.0 |
| R32 | Mass % | 36.0 | 36.0 | 36.0 | 25.0 | 28.0 | 31.0 | 31.0 | 34.0 |
| R1234yf | Mass % | 49.0 | 46.0 | 43.0 | 33.0 | 33.0 | 35.0 | 32.0 | 36.0 |
| GWP | — | 245 | 245 | 245 | 170 | 191 | 211 | 211 | 231 |

TABLE 140-continued

| Item | Unit | Example 119 | Example 120 | Example 121 | Example 122 | Example 123 | Example 124 | Example 125 | Example 126 |
|---|---|---|---|---|---|---|---|---|---|
| COP Ratio | % (relative to R410A) | 101.0 | 100.7 | 100.5 | 99.5 | 99.5 | 99.8 | 99.6 | 99.9 |
| Refrigerating Capacity Ratio | % (relative to R410A) | 86.2 | 87.9 | 89.6 | 92.7 | 93.4 | 93.0 | 94.5 | 93.0 |

TABLE 141

| Item | Unit | Example 127 | Example 128 | Example 129 | Example 130 | Example 131 | Example 132 | Example 133 | Example 134 |
|---|---|---|---|---|---|---|---|---|---|
| HFO-1132(E) | Mass % | 33.0 | 36.0 | 24.0 | 27.0 | 30.0 | 33.0 | 23.0 | 26.0 |
| R32 | Mass % | 34.0 | 34.0 | 37.0 | 37.0 | 37.0 | 37.0 | 40.0 | 40.0 |
| R1234yf | Mass % | 33.0 | 30.0 | 39.0 | 36.0 | 33.0 | 30.0 | 37.0 | 34.0 |
| GWP | — | — | 231 | 231 | 252 | 251 | 251 | 251 | 272 | 272 |
| COP Ratio | % (relative to R410A) | 99.8 | 99.6 | 100.3 | 100.1 | 99.9 | 99.8 | 100.4 | 100.2 |
| Refrigerating Capacity Ratio | % (relative to R410A) | 94.5 | 96.0 | 91.9 | 93.4 | 95.0 | 96.5 | 93.3 | 94.9 |

TABLE 142

| Item | Unit | Example 135 | Example 136 | Example 137 | Example 138 | Example 139 | Example 140 | Example 141 | Example 142 |
|---|---|---|---|---|---|---|---|---|---|
| HFO-1132(E) | Mass % | 29.0 | 32.0 | 19.0 | 22.0 | 25.0 | 28.0 | 31.0 | 18.0 |
| R32 | Mass % | 40.0 | 40.0 | 43.0 | 43.0 | 43.0 | 43.0 | 43.0 | 46.0 |
| R1234yf | Mass % | 31.0 | 28.0 | 38.0 | 35.0 | 32.0 | 29.0 | 26.0 | 36.0 |
| GWP | — | 272 | 271 | 292 | 292 | 292 | 292 | 292 | 312 |
| COP Ratio | % (relative to R410A) | 100.0 | 99.8 | 100.6 | 100.4 | 100.2 | 100.1 | 99.9 | 100.7 |
| Refrigerating Capacity Ratio | % (relative to R410A) | 96.4 | 97.9 | 93.1 | 94.7 | 96.2 | 97.8 | 99.3 | 94.4 |

TABLE 143

| Item | Unit | Example 143 | Example 144 | Example 145 | Example 146 | Example 147 | Example 148 | Example 149 | Example 150 |
|---|---|---|---|---|---|---|---|---|---|
| HFO-1132(E) | Mass % | 21.0 | 23.0 | 26.0 | 29.0 | 13.0 | 16.0 | 19.0 | 22.0 |
| R32 | Mass % | 46.0 | 46.0 | 46.0 | 46.0 | 49.0 | 49.0 | 49.0 | 49.0 |
| R1234yf | Mass % | 33.0 | 31.0 | 28.0 | 25.0 | 38.0 | 35.0 | 32.0 | 29.0 |
| GWP | — | 312 | 312 | 312 | 312 | 332 | 332 | 332 | 332 |
| COP Ratio | % (relative to R410A) | 100.5 | 100.4 | 100.2 | 100.0 | 101.1 | 100.9 | 100.7 | 100.5 |
| Refrigerating Capacity Ratio | % (relative to R410A) | 96.0 | 97.0 | 98.6 | 100.1 | 93.5 | 95.1 | 96.7 | 98.3 |

TABLE 144

| Item | Unit | Example 151 | Example 152 |
|---|---|---|---|
| HFO-1132(E) | Mass % | 25.0 | 28.0 |
| R32 | Mass % | 49.0 | 49.0 |
| R1234yf | Mass % | 26.0 | 23.0 |
| GWP | — | 332 | 332 |
| COP Ratio | % (relative to R410A) | 100.3 | 100.1 |
| Refrigerating Capacity Ratio | % (relative to R410A) | 99.8 | 101.3 |

The results also indicate that under the condition that the mass % of HFO-1132(E), R32, and R1234yf based on their sum is respectively represented by x, y, and z, when coordinates (x,y,z) in a ternary composition diagram in which the sum of HFO-1132(E), R32, and R1234yf is 100 mass % are within the range of a figure surrounded by line segments IJ, JN, NE, and EI that connect the following 4 points:

point I (72.0, 0.0, 28.0),
point J (48.5, 18.3, 33.2),
point N (27.7, 18.2, 54.1), and
point E (58.3, 0.0, 41.7),
or on these line segments (excluding the points on the line segment EI), the line segment U is represented by coordinates $(0.0236y^2-1.7616y+72.0, y, -0.0236y^2+0.7616y+28.0)$, the line segment NE is represented by coordinates $(0.012y^2-1.9003y+58.3, y, -0.012y^2+0.9003y+41.7)$, and the line segments JN and EI are straight lines, the refrigerant D has a refrigerating capacity ratio of 80% or more relative to R410A, a GWP of 125 or less, and a WCF lower flammability.

The results also indicate that under the condition that the mass % of HFO-1132(E), R32, and R1234yf based on their sum is respectively represented by x, y, and z, when coordinates (x,y,z) in a ternary composition diagram in which the sum of HFO-1132(E), R32, and R1234yf is 100 mass % are within the range of a figure surrounded by line segments MM', M'N, NV, VG, and GM that connect the following 5 points:

point M (52.6, 0.0, 47.4),
point M' (39.2, 5.0, 55.8),
point N (27.7, 18.2, 54.1),
point V (11.0, 18.1, 70.9), and
point G (39.6, 0.0, 60.4), or on these line segments (excluding the points on the line segment GM), the line segment MM' is represented by coordinates $(0.132y^2-3.34y+52.6, y, -0.132y^2+2.34y+47.4)$, the line segment M'N is represented by coordinates $(0.0596y^2-2.2541y+48.98, y, -0.0596y^2+1.2541y+51.02)$, the line segment VG is represented by coordinates $(0.0123y^2-1.8033y+39.6, y, -0.0123y^2+0.8033y+60.4)$, and the line segments NV and GM are straight lines, the refrigerant D according to the present disclosure has a refrigerating capacity ratio of 70% or more relative to R410A, a GWP of 125 or less, and an ASHRAE lower flammability.

The results also indicate that under the condition that the mass % of HFO-1132(E), R32, and R1234yf based on their sum is respectively represented by x, y, and z, when coordinates (x,y,z) in a ternary composition diagram in which the sum of HFO-1132(E), R32, and R1234yf is 100 mass % are within the range of a figure surrounded by line segments ON, NU, and UO that connect the following 3 points:

point O (22.6, 36.8, 40.6),
point N (27.7, 18.2, 54.1), and
point U (3.9, 36.7, 59.4), or on these line segments, the line segment ON is represented by coordinates $(0.0072y^2-0.6701y+37.512, y, -0.0072y^2-0.3299y+62.488)$, the line segment NU is represented by coordinates $(0.0083y^2-1.7403y+56.635, y, -0.0083y^2+0.7403y+43.365)$, and the line segment UO is a straight line, the refrigerant D according to the present disclosure has a refrigerating capacity ratio of 80% or more relative to R410A, a GWP of 250 or less, and an ASHRAE lower flammability.

The results also indicate that under the condition that the mass % of HFO-1132(E), R32, and R1234yf based on their sum is respectively represented by x, y, and z, when coordinates (x,y,z) in a ternary composition diagram in which the sum of HFO-1132(E), R32, and R1234yf is 100 mass % are within the range of a figure surrounded by line segments QR, RT, TL, LK, and KQ that connect the following 5 points:

point Q (44.6, 23.0, 32.4),
point R (25.5, 36.8, 37.7),
point T (8.6, 51.6, 39.8),
point L (28.9, 51.7, 19.4), and
point K (35.6, 36.8, 27.6), or on these line segments, the line segment QR is represented by coordinates $(0.0099y^2-1.975y+84.765, y, -0.0099y^2+0.975y+15.235)$, the line segment RT is represented by coordinates $(0.0082y^2-1.8683y+83.126, y, -0.0082y^2+0.8683y+16.874)$, the line segment LK is represented by coordinates $(0.0049y^2-0.8842y+61.488, y, -0.0049y^2-0.1158y+38.512)$, the line segment KQ is represented by coordinates $(0.0095y^2-1.2222y+67.676, y, -0.0095y^2+0.2222y+32.324)$, and the line segment TL is a straight line, the refrigerant D according to the present disclosure has a refrigerating capacity ratio of 92.5% or more relative to R410A, a GWP of 350 or less, and a WCF lower flammability.

The results further indicate that under the condition that the mass % of HFO-1132(E), R32, and R1234yf based on their sum is respectively represented by x, y, and z, when coordinates (x,y,z) in a ternary composition diagram in which the sum of HFO-1132(E), R32, and R1234yf is 100 mass % are within the range of a figure surrounded by line segments PS, ST, and TP that connect the following 3 points:

point P (20.5, 51.7, 27.8),
point S (21.9, 39.7, 38.4), and
point T (8.6, 51.6, 39.8), or on these line segments, the line segment PS is represented by coordinates $(0.0064y^2-0.7103y+40.1, y, -0.0064y^2-0.2897y+59.9)$, the line segment ST is represented by coordinates $(0.0082y^2-1.8683y+83.126, y, -0.0082y^2+0.8683y+16.874)$, and the line segment TP is a straight line, the refrigerant D according to the present disclosure has a refrigerating capacity ratio of 92.5% or more relative to R410A, a GWP of 350 or less, and an ASHRAE lower flammability.

(5-5) Refrigerant E

The refrigerant E according to the present disclosure is a mixed refrigerant comprising trans-1,2-difluoroethylene (HFO-1132(E)), trifluoroethylene (HFO-1123), and difluoromethane (R32).

The refrigerant E according to the present disclosure has various properties that are desirable as an R410A-alternative refrigerant, i.e., a coefficient of performance equivalent to that of R410A and a sufficiently low GWP.

The refrigerant E according to the present disclosure is preferably a refrigerant wherein when the mass % of HFO-1132(E), HFO-1123, and R32 based on their sum is respectively represented by x, y, and z, coordinates (x,y,z) in a ternary composition diagram in which the sum of HFO-1132(E), HFO-1123, and R32 is 100 mass % are within the range of a figure surrounded by line segments IK, KB', B'H, HR, RG, and GI that connect the following 6 points:

point I (72.0, 28.0, 0.0),
point K (48.4, 33.2, 18.4),
point B' (0.0, 81.6, 18.4),
point H (0.0, 84.2, 15.8),
point R (23.1, 67.4, 9.5), and
point G (38.5, 61.5, 0.0), or on these line segments (excluding the points on the line segments B'H and GI);

the line segment IK is represented by coordinates $(0.025z^2-1.7429z+72.00, -0.025z^2+0.7429z+28.0, z)$, the line segment HR is represented by coordinates $(-0.3123z^2+4.234z+11.06, 0.3123z^2-5.234z+88.94, z)$, the line segment RG is represented by coordinates $(-0.0491z^2-1.1544z+38.5, 0.0491z^2+0.1544z+61.5, z)$, and the line segments KB' and GI are straight lines. When the requirements above are satisfied, the refrigerant according to the present disclosure has WCF lower flammability, a COP ratio of 93% or more relative to that of R410A, and a GWP of 125 or less.

The refrigerant E according to the present disclosure is preferably a refrigerant wherein when the mass % of HFO-1132(E), HFO-1123, and R32 based on their sum is respectively represented by x, y, and z, coordinates (x,y,z) in a ternary composition diagram in which the sum of HFO-1132(E), HFO-1123, and R32 is 100 mass % are within the range of a figure surrounded by line segments IJ, JR, RG, and GI that connect the following 4 points:
point I (72.0, 28.0, 0.0),
point J (57.7, 32.8, 9.5),
point R (23.1, 67.4, 9.5), and
point G (38.5, 61.5, 0.0),
or on these line segments (excluding the points on the line segment GI);

the line segment IJ is represented by coordinates $(0.025z^2-1.7429z+72.0, -0.025z^2+0.7429z+28.0, z)$, the line segment RG is represented by coordinates $(-0.0491z^2-1.1544z+38.5, 0.0491z^2+0.1544z+61.5, z)$, and the line segments JR and GI are straight lines. When the requirements above are satisfied, the refrigerant according to the present disclosure has WCF lower flammability, a COP ratio of 93% or more relative to that of R410A, and a GWP of 125 or less.

The refrigerant E according to the present disclosure is preferably a refrigerant wherein when the mass % of HFO-1132(E), HFO-1123, and R32 based on their sum is respectively represented by x, y, and z, coordinates (x,y,z) in a ternary composition diagram in which the sum of HFO-1132(E), HFO-1123, and R32 is 100 mass % are within the range of a figure surrounded by line segments MP, PB', B'H, HR, RG, and GM that connect the following 6 points:
point M (47.1, 52.9, 0.0),
point P (31.8, 49.8, 18.4),
point B' (0.0, 81.6, 18.4),
point H (0.0, 84.2, 15.8),
point R (23.1, 67.4, 9.5), and
point G (38.5, 61.5, 0.0),
or on these line segments (excluding the points on the line segments B'H and GM);

the line segment MP is represented by coordinates $(0.0083z^2-0.984z+47.1, -0.0083z^2-0.016z+52.9, z)$, the line segment HR is represented by coordinates $(-0.3123z^2+4.234z+11.06, 0.3123z^2-5.234z+88.94, z)$, the line segment RG is represented by coordinates $(-0.0491z^2-1.1544z+38.5, 0.0491z^2+0.1544z+61.5, z)$, and the line segments PB' and GM are straight lines. When the requirements above are satisfied, the refrigerant according to the present disclosure has ASHRAE lower flammability, a COP ratio of 93% or more relative to that of R410A, and a GWP of 125 or less.

The refrigerant E according to the present disclosure is preferably a refrigerant wherein when the mass % of HFO-1132(E), HFO-1123, and R32 based on their sum is respectively represented by x, y, and z, coordinates (x,y,z) in a ternary composition diagram in which the sum of HFO-1132(E), HFO-1123, and R32 is 100 mass % are within the range of a figure surrounded by line segments MN, NR, RG, and GM that connect the following 4 points:
point M (47.1, 52.9, 0.0),
point N (38.5, 52.1, 9.5),
point R (23.1, 67.4, 9.5), and
point G (38.5, 61.5, 0.0),
or on these line segments (excluding the points on the line segment GM);

the line segment MN is represented by coordinates $(0.0083z^2-0.984z+47.1, -0.0083z^2-0.016z+52.9, z)$, the line segment RG is represented by coordinates $(-0.0491z^2-1.1544z+38.5, 0.0491z^2+0.1544z+61.5, z)$, the line segments NR and GM are straight lines. When the requirements above are satisfied, the refrigerant according to the present disclosure has ASHRAE lower flammability, a COP ratio of 93% or more relative to that of R410A, and a GWP of 65 or less.

The refrigerant E according to the present disclosure is preferably a refrigerant wherein when the mass % of HFO-1132(E), HFO-1123, and R32 based on their sum is respectively represented by x, y, and z, coordinates (x,y,z) in a ternary composition diagram in which the sum of HFO-1132(E), HFO-1123, and R32 is 100 mass % are within the range of a figure surrounded by line segments PS, ST, and TP that connect the following 3 points:
point P (31.8, 49.8, 18.4),
point S (25.4, 56.2, 18.4), and
point T (34.8, 51.0, 14.2),
or on these line segments;

the line segment ST is represented by coordinates $(-0.0982z^2+0.9622z+40.931, 0.0982z^2-1.9622z+59.069, z)$, the line segment TP is represented by coordinates $(0.0083z^2-0.984z+47.1, -0.0083z^2-0.016z+52.9, z)$, and the line segment PS is a straight line. When the requirements above are satisfied, the refrigerant according to the present disclosure has ASHRAE lower flammability, a COP ratio of 94.5% or more relative to that of R410A, and a GWP of 125 or less.

The refrigerant E according to the present disclosure is preferably a refrigerant wherein when the mass % of HFO-1132(E), HFO-1123, and R32 based on their sum is respectively represented by x, y, and z, coordinates (x,y,z) in a ternary composition diagram in which the sum of HFO-1132(E), HFO-1123, and R32 is 100 mass % are within the range of a figure surrounded by line segments QB", B"D, DU, and UQ that connect the following 4 points:
point Q (28.6, 34.4, 37.0),
point B" (0.0, 63.0, 37.0),
point D (0.0, 67.0, 33.0), and
point U (28.7, 41.2, 30.1),
or on these line segments (excluding the points on the line segment B"D);

the line segment DU is represented by coordinates $(-3.4962z^2+210.71z-3146.1, 3.4962z^2-211.71z+3246.1, z)$, the line segment UQ is represented by coordinates $(0.0135z^2-0.9181z+44.133, -0.0135z^2-0.0819z+55.867, z)$, and the line segments QB" and B"D are straight lines. When the requirements above are satisfied, the refrigerant according to the present disclosure has ASHRAE lower flammability, a COP ratio of 96% or more relative to that of R410A, and a GWP of 250 or less.

The refrigerant E according to the present disclosure is preferably a refrigerant wherein when the mass % of HFO-1132(E), HFO-1123, and R32 based on their sum is respectively represented by x, y, and z, coordinates (x,y,z) in a ternary composition diagram in which the sum of HFO-1132(E), HFO-1123, and R32 is 100 mass % are within the range of a figure surrounded by line segments Oc', c'd', d'e', e'a', and a'O that connect the following 5 points:
point O (100.0, 0.0, 0.0),
point c' (56.7, 43.3, 0.0),
point d' (52.2, 38.3, 9.5),
point e' (41.8, 39.8, 18.4), and
point a' (81.6, 0.0, 18.4),
or on the line segments c'd', d'e', and e'a' (excluding the points c' and a');
the line segment c'd' is represented by coordinates $(-0.0297z^2-0.1915z+56.7, 0.0297z^2+1.1915z+43.3, z)$,
the line segment d'e' is represented by coordinates $(-0.0535z^2+0.3229z+53.957, 0.0535z^2+0.6771z+46.043, z)$, and
the line segments Oc', e'a', and a'O are straight lines. When the requirements above are satisfied, the refrigerant according to the present disclosure has a COP ratio of 92.5% or more relative to that of R410A, and a GWP of 125 or less.

The refrigerant E according to the present disclosure is preferably a refrigerant wherein when the mass % of HFO-1132(E), HFO-1123, and R32 based on their sum is respectively represented by x, y, and z, coordinates (x,y,z) in a ternary composition diagram in which the sum of HFO-1132(E), HFO-1123, and R32 is 100 mass % are within the range of a figure surrounded by line segments Oc, cd, de, ea', and a'O that connect the following 5 points:
point O (100.0, 0.0, 0.0),
point c (77.7, 22.3, 0.0),
point d (76.3, 14.2, 9.5),
point e (72.2, 9.4, 18.4), and
point a' (81.6, 0.0, 18.4),
or on the line segments cd, de, and ea' (excluding the points c and a');
the line segment cde is represented by coordinates $(-0.017z^2+0.0148z+77.684, 0.017z^2+0.9852z+22.316, z)$, and
the line segments Oc, ea', and a'O are straight lines. When the requirements above are satisfied, the refrigerant according to the present disclosure has a COP ratio of 95% or more relative to that of R410A, and a GWP of 125 or less.

The refrigerant E according to the present disclosure is preferably a refrigerant wherein when the mass % of HFO-1132(E), HFO-1123, and R32 based on their sum is respectively represented by x, y, and z, coordinates (x,y,z) in a ternary composition diagram in which the sum of HFO-1132(E), HFO-1123, and R32 is 100 mass % are within the range of a figure surrounded by line segments Oc', c'd', d'a, and aO that connect the following 5 points:
point O (100.0, 0.0, 0.0),
point c' (56.7, 43.3, 0.0),
point d' (52.2, 38.3, 9.5), and
point a (90.5, 0.0, 9.5),
or on the line segments c'd' and d'a (excluding the points c' and a);
the line segment c'd' is represented by coordinates $(-0.0297z^2-0.1915z+56.7, 0.0297z^2+1.1915z+43.3, z)$, and
the line segments Oc', d'a, and aO are straight lines. When the requirements above are satisfied, the refrigerant according to the present disclosure has a COP ratio of 93.5% or more relative to that of R410A, and a GWP of 65 or less.

The refrigerant E according to the present disclosure is preferably a refrigerant wherein when the mass % of HFO-1132(E), HFO-1123, and R32 based on their sum is respectively represented by x, y, and z, coordinates (x,y,z) in a ternary composition diagram in which the sum of HFO-1132(E), HFO-1123, and R32 is 100 mass % are within the range of a figure surrounded by line segments Oc, cd, da, and aO that connect the following 4 points:
point O (100.0, 0.0, 0.0),
point c (77.7, 22.3, 0.0),
point d (76.3, 14.2, 9.5), and
point a (90.5, 0.0, 9.5),
or on the line segments cd and da (excluding the points c and a);
the line segment cd is represented by coordinates $(-0.017z^2+0.0148z+77.684, 0.017z^2+0.9852z+22.316, z)$, and
the line segments Oc, da, and aO are straight lines. When the requirements above are satisfied, the refrigerant according to the present disclosure has a COP ratio of 95% or more relative to that of R410A, and a GWP of 65 or less.

The refrigerant E according to the present disclosure may further comprise other additional refrigerants in addition to HFO-1132(E), HFO-1123, and R32, as long as the above properties and effects are not impaired. In this respect, the refrigerant according to the present disclosure preferably comprises HFO-1132(E), HFO-1123, and R32 in a total amount of 99.5 mass % or more, more preferably 99.75 mass % or more, and even more preferably 99.9 mass % or more, based on the entire refrigerant.

Such additional refrigerants are not limited, and can be selected from a wide range of refrigerants. The mixed refrigerant may comprise a single additional refrigerant, or two or more additional refrigerants.

(Examples of Refrigerant E)

The present disclosure is described in more detail below with reference to Examples of refrigerant E. However, the refrigerant E is not limited to the Examples.

Mixed refrigerants were prepared by mixing HFO-1132 (E), HFO-1123, and R32 at mass % based on their sum shown in Tables 145 and 146.

The composition of each mixture was defined as WCF. A leak simulation was performed using National Institute of Science and Technology (NIST) Standard Reference Data Base Refleak Version 4.0 under the conditions for equipment, storage, shipping, leak, and recharge according to the ASHRAE Standard 34-2013. The most flammable fraction was defined as WCFF.

For each mixed refrigerant, the burning velocity was measured according to the ANSI/ASHRAE Standard 34-2013. When the burning velocities of the WCF composition and the WCFF composition are 10 cm/s or less, the flammability of such a refrigerant is classified as Class 2L (lower flammability) in the ASHRAE flammability classification.

A burning velocity test was performed using the apparatus shown in FIG. 1 in the following manner. First, the mixed refrigerants used had a purity of 99.5% or more, and were degassed by repeating a cycle of freezing, pumping, and thawing until no traces of air were observed on the vacuum gauge. The burning velocity was measured by the closed method. The initial temperature was ambient temperature. Ignition was performed by generating an electric spark between the electrodes in the center of a sample cell. The duration of the discharge was 1.0 to 9.9 ms, and the ignition energy was typically about 0.1 to 1.0 J. The spread of the flame was visualized using schlieren photographs. A cylindrical container (inner diameter: 155 mm, length: 198 mm) equipped with two light transmission acrylic windows was used as the sample cell, and a xenon lamp was used as the light source. Schlieren images of the flame were recorded by a high-speed digital video camera at a frame rate of 600 fps and stored on a PC.

Tables 145 and 146 show the results.

TABLE 145

| Item | | Unit | I | J | K | L |
|---|---|---|---|---|---|---|
| WCF | HFO-1132(E) | mass % | 72.0 | 57.7 | 48.4 | 35.5 |
|  | HFO-1123 | mass % | 28.0 | 32.8 | 33.2 | 27.5 |
|  | R32 | mass % | 0.0 | 9.5 | 18.4 | 37.0 |
|  | Burning velocity (WCF) | cm/s | 10 | 10 | 10 | 10 |

TABLE 146

| Item | | Unit | M | N | T | P | U | Q |
|---|---|---|---|---|---|---|---|---|
| WCF | HFO-1132(E) | mass % | 47.1 | 38.5 | 34.8 | 31.8 | 28.7 | 28.6 |
|  | HFO-1123 | mass % | 52.9 | 52.1 | 51.0 | 49.8 | 41.2 | 34.4 |
|  | R32 | mass % | 0.0 | 9.5 | 14.2 | 18.4 | 30.1 | 37.0 |
|  | Leak condition that results in WCFF | | Storage, Shipping, −40° C., 92%, release, on the liquid phase side | Storage, Shipping, −40° C., 92%, release, on the liquid phase side | Storage, Shipping, −40° C., 92%, release, on the liquid phase side | Storage, Shipping, −40° C., 92%, release, on the liquid phase side | Storage, Shipping, −40° C., 92%, release, on the liquid phase side | Storage, Shipping, −40° C., 92%, release, on the liquid phase side |
| WCFF | HFO-1132(E) | mass % | 72.0 | 58.9 | 51.5 | 44.6 | 31.4 | 27.1 |
|  | HFO-1123 | mass % | 28.0 | 32.4 | 33.1 | 32.6 | 23.2 | 18.3 |
|  | R32 | mass % | 0.0 | 8.7 | 15.4 | 22.8 | 45.4 | 54.6 |
|  | Burning velocity (WCF) | cm/s | 8 or less | 8 or less | 8 or less | 8 or less | 8 or less | 8 or less |
|  | Burning velocity (WCFF) | cm/s | 10 | 10 | 10 | 10 | 10 | 10 |

The results in Table 1 indicate that in a ternary composition diagram of a mixed refrigerant of HFO-1132(E), HFO-1123, and R32 in which their sum is 100 mass %, a line segment connecting a point (0.0, 100.0, 0.0) and a point (0.0, 0.0, 100.0) is the base, the point (0.0, 100.0, 0.0) is on the left side, and the point (0.0, 0.0, 100.0) is on the right side, when coordinates (x,y,z) are on or below line segments IK and KL that connect the following 3 points:
point I (72.0, 28.0, 0.0),
point K (48.4, 33.2, 18.4), and
point L (35.5, 27.5, 37.0);
the line segment IK is represented by coordinates $(0.025z^2-1.7429z+72.00, -0.025z^2+0.7429z+28.00, z)$, and
the line segment KL is represented by coordinates $(0.0098z^2-1.238z+67.852, -0.0098z^2+0.238z+32.148, z)$,
it can be determined that the refrigerant has WCF lower flammability.

For the points on the line segment IK, an approximate curve $(x=0.025z^2-1.7429z+72.00)$ was obtained from three points, i.e., I (72.0, 28.0, 0.0), J (57.7, 32.8, 9.5), and K (48.4, 33.2, 18.4) by using the least-square method to determine coordinates $(x=0.025z^2-1.7429z+72.00, y=100-z-x=-0.00922z^2+0.2114z+32.443, z)$.

Likewise, for the points on the line segment KL, an approximate curve was determined from three points, i.e., K (48.4, 33.2, 18.4), Example 10 (41.1, 31.2, 27.7), and L (35.5, 27.5, 37.0) by using the least-square method to determine coordinates.

The results in Table 146 indicate that in a ternary composition diagram of a mixed refrigerant of HFO-1132(E), HFO-1123, and R32 in which their sum is 100 mass %, a line segment connecting a point (0.0, 100.0, 0.0) and a point (0.0, 0.0, 100.0) is the base, the point (0.0, 100.0, 0.0) is on the left side, and the point (0.0, 0.0, 100.0) is on the right side, when coordinates (x,y,z) are on or below line segments MP and PQ that connect the following 3 points:
point M (47.1, 52.9, 0.0),
point P (31.8, 49.8, 18.4), and
point Q (28.6, 34.4, 37.0),
it can be determined that the refrigerant has ASHRAE lower flammability.

In the above, the line segment MP is represented by coordinates $(0.0083z^2-0.984z+47.1, -0.0083z^2-0.016z+52.9, z)$, and the line segment PQ is represented by coordinates $(0.0135z^2-0.9181z+44.133, -0.0135z^2-0.0819z+55.867, z)$.

For the points on the line segment MP, an approximate curve was obtained from three points, i.e., points M, N, and P, by using the least-square method to determine coordinates. For the points on the line segment PQ, an approximate curve was obtained from three points, i.e., points P, U, and Q, by using the least-square method to determine coordinates.

The GWP of compositions each comprising a mixture of R410A (R32=50%/R125=50%) was evaluated based on the values stated in the Intergovernmental Panel on Climate Change (IPCC), fourth report. The GWP of HFO-1132(E), which was not stated therein, was assumed to be 1 from HFO-1132a (GWP=1 or less) and HFO-1123 (GWP=0.3, described in Patent Literature 1). The refrigerating capacity of compositions each comprising R410A and a mixture of HFO-1132(E) and HFO-1123 was determined by performing theoretical refrigeration cycle calculations for the mixed refrigerants using the National Institute of Science and Technology (NIST) and Reference Fluid Thermodynamic and Transport Properties Database (Refprop 9.0) under the following conditions.

The COP ratio and the refrigerating capacity (which may be referred to as "cooling capacity" or "capacity") ratio relative to those of R410 of the mixed refrigerants were determined. The conditions for calculation were as described below.
Evaporating temperature: 5° C.
Condensation temperature: 45° C.
Degree of superheating: 5K
Degree of subcooling: 5K
Compressor efficiency: 70%

Tables 147 to 166 show these values together with the GWP of each mixed refrigerant.

TABLE 147

| Item | Unit | Comparative Example 1 | Comparative Example 2 A | Comparative Example 3 B | Comparative Example 4 A' | Comparative Example 5 B' | Comparative Example 6 A'' | Comparative Example 7 B'' |
|---|---|---|---|---|---|---|---|---|
| HFO-1132(E) | mass % | R410A | 90.5 | 0.0 | 81.6 | 0.0 | 63.0 | 0.0 |
| HFO-1123 | mass % | | 0.0 | 90.5 | 0.0 | 81.6 | 0.0 | 63.0 |
| R32 | mass % | | 9.5 | 9.5 | 18.4 | 18.4 | 37.0 | 37.0 |
| GWP | — | 2088 | 65 | 65 | 125 | 125 | 250 | 250 |
| COP ratio | % (relative to R410A) | 100 | 99.1 | 92.0 | 98.7 | 93.4 | 98.7 | 96.1 |
| Refrigerating capacity ratio | % (relative to R410A) | 100 | 102.2 | 111.6 | 105.3 | 113.7 | 110.0 | 115.4 |

TABLE 148

| Item | Unit | Comparative Example 8 O | Comparative Example 9 C | Comparative Example 10 | Example 1 U | Example 2 | Comparative Example 11 D |
|---|---|---|---|---|---|---|---|
| HFO-1132(E) | mass % | 100.0 | 50.0 | 41.1 | 28.7 | 15.2 | 0.0 |
| HFO-1123 | mass % | 0.0 | 31.6 | 34.6 | 41.2 | 52.7 | 67.0 |
| R32 | mass % | 0.0 | 18.4 | 24.3 | 30.1 | 32.1 | 33.0 |
| GWP | — | 1 | 125 | 165 | 204 | 217 | 228 |
| COP ratio | % (relative to R410A) | 99.7 | 96.0 | 96.0 | 96.0 | 96.0 | 96.0 |
| Refrigerating capacity ratio | % (relative to R410A) | 98.3 | 109.9 | 111.7 | 113.5 | 114.8 | 115.4 |

TABLE 149

| Item | Unit | Comparative Example 12 E | Comparative Example 13 | Example 3 T | Example 4 S | Comparative Example 14 F |
|---|---|---|---|---|---|---|
| HFO-1132(E) | mass % | 53.4 | 43.4 | 34.8 | 25.4 | 0.0 |
| HFO-1123 | mass % | 46.6 | 47.1 | 51.0 | 56.2 | 74.1 |
| R32 | mass % | 0.0 | 9.5 | 14.2 | 18.4 | 25.9 |
| GWP | — | 1 | 65 | 97 | 125 | 176 |
| COP ratio | % (relative to R410A) | 94.5 | 94.5 | 94.5 | 94.5 | 94.5 |
| Refrigerating capacity ratio | % (relative to R410A) | 105.6 | 109.2 | 110.8 | 112.3 | 114.8 |

TABLE 150

| Item | Unit | Comparative Example 15 G | Example 5 | Example 6 R | Example 7 | Comparative Example 16 H |
|---|---|---|---|---|---|---|
| HFO-1132(E) | mass % | 38.5 | 31.5 | 23.1 | 16.9 | 0.0 |
| HFO-1123 | mass % | 61.5 | 63.5 | 67.4 | 71.1 | 84.2 |
| R32 | mass % | 0.0 | 5.0 | 9.5 | 12.0 | 15.8 |
| GWP | — | 1 | 35 | 65 | 82 | 107 |
| COP ratio | % (relative to R410A) | 93.0 | 93.0 | 93.0 | 93.0 | 93.0 |
| Refrigerating capacity ratio | % (relative to R410A) | 107.0 | 109.1 | 110.9 | 111.9 | 113.2 |

TABLE 151

| Item | Unit | Comparative Example 17 I | Example 8 J | Example 9 K | Comparative Example 18 | Comparative Example 19 L |
|---|---|---|---|---|---|---|
| HFO-1132(E) | mass % | 72.0 | 57.7 | 48.4 | 41.1 | 35.5 |
| HFO-1123 | mass % | 28.0 | 32.8 | 33.2 | 31.2 | 27.5 |
| R32 | mass % | 0.0 | 9.5 | 18.4 | 27.7 | 37.0 |

TABLE 151-continued

| Item | Unit | Comparative Example 17 I | Example 8 J | Example 9 K | Comparative Example 18 | Comparative Example 19 L |
|---|---|---|---|---|---|---|
| GWP | — | 1 | 65 | 125 | 188 | 250 |
| COP ratio | % (relative to R410A) | 96.6 | 95.8 | 95.9 | 96.4 | 97.1 |
| Refrigerating capacity ratio | % (relative to R410A) | 103.1 | 107.4 | 110.1 | 112.1 | 113.2 |

TABLE 152

| Item | Unit | Comparative Example 20 M | Example 10 N | Example 11 P | Example 12 Q |
|---|---|---|---|---|---|
| HFO-1132(E) | mass % | 47.1 | 38.5 | 31.8 | 28.6 |
| HFO-1123 | mass % | 52.9 | 52.1 | 49.8 | 34.4 |
| R32 | mass % | 0.0 | 9.5 | 18.4 | 37.0 |
| GWP | — | 1 | 65 | 125 | 250 |
| COP ratio | % (relative to R410A) | 93.9 | 94.1 | 94.7 | 96.9 |
| Refrigerating capacity ratio | % (relative to R410A) | 106.2 | 109.7 | 112.0 | 114.1 |

TABLE 153

| Item | Unit | Comparative Example 22 | Comparative Example 23 | Comparative Example 24 | Example 14 | Example 15 | Example 16 | Comparative Example 25 | Comparative Example 26 |
|---|---|---|---|---|---|---|---|---|---|
| HFO-1132(E) | mass % | 10.0 | 20.0 | 30.0 | 40.0 | 50.0 | 60.0 | 70.0 | 80.0 |
| HFO-1123 | mass % | 85.0 | 75.0 | 65.0 | 55.0 | 45.0 | 35.0 | 25.0 | 15.0 |
| R32 | mass % | 5.0 | 5.0 | 5.0 | 5.0 | 5.0 | 5.0 | 5.0 | 5.0 |
| GWP | — | 35 | 35 | 35 | 35 | 35 | 35 | 35 | 35 |
| COP ratio | % (relative to R410A) | 91.7 | 92.2 | 92.9 | 93.7 | 94.6 | 95.6 | 96.7 | 97.7 |
| Refrigerating capacity ratio | % (relative to R410A) | 110.1 | 109.8 | 109.2 | 108.4 | 107.4 | 106.1 | 104.7 | 103.1 |

TABLE 154

| Item | Unit | Comparative Example 27 | Comparative Example 28 | Comparative Example 29 | Example 17 | Example 18 | Example 19 | Comparative Example 30 | Comparative Example 31 |
|---|---|---|---|---|---|---|---|---|---|
| HFO-1132(E) | mass % | 90.0 | 10.0 | 20.0 | 30.0 | 40.0 | 50.0 | 60.0 | 70.0 |
| HFO-1123 | mass % | 5.0 | 80.0 | 70.0 | 60.0 | 50.0 | 40.0 | 30.0 | 20.0 |
| R32 | mass % | 5.0 | 10.0 | 10.0 | 10.0 | 10.0 | 10.0 | 10.0 | 10.0 |
| GWP | — | 35 | 68 | 68 | 68 | 68 | 68 | 68 | 68 |
| COP ratio | % (relative to R410A) | 98.8 | 92.4 | 92.9 | 93.5 | 94.3 | 95.1 | 96.1 | 97.0 |
| Refrigerating capacity ratio | % (relative to R410A) | 101.4 | 111.7 | 111.3 | 110.6 | 109.6 | 108.5 | 107.2 | 105.7 |

TABLE 155

| Item | Unit | Comparative Example 32 | Example 20 | Example 21 | Example 22 | Example 23 | Example 24 | Comparative Example 33 | Comparative Example 34 |
|---|---|---|---|---|---|---|---|---|---|
| HFO-1132(E) | mass % | 80.0 | 10.0 | 20.0 | 30.0 | 40.0 | 50.0 | 60.0 | 70.0 |
| HFO-1123 | mass % | 10.0 | 75.0 | 65.0 | 55.0 | 45.0 | 35.0 | 25.0 | 15.0 |
| R32 | mass % | 10.0 | 15.0 | 15.0 | 15.0 | 15.0 | 15.0 | 15.0 | 15.0 |
| GWP | — | 68 | 102 | 102 | 102 | 102 | 102 | 102 | 102 |

TABLE 155-continued

| Item | Unit | Comparative Example 32 | Example 20 | Example 21 | Example 22 | Example 23 | Example 24 | Comparative Example 33 | Comparative Example 34 |
|---|---|---|---|---|---|---|---|---|---|
| COP ratio | % (relative to R410A) | 98.0 | 93.1 | 93.6 | 94.2 | 94.9 | 95.6 | 96.5 | 97.4 |
| Refrigerating capacity ratio | % (relative to R410A) | 104.1 | 112.9 | 112.4 | 111.6 | 110.6 | 109.4 | 108.1 | 106.6 |

TABLE 156

| Item | Unit | Comparative Example 35 | Comparative Example 36 | Comparative Example 37 | Comparative Example 38 | Comparative Example 39 | Comparative Example 40 | Comparative Example 41 | Comparative Example 42 |
|---|---|---|---|---|---|---|---|---|---|
| HFO-1132(E) | mass % | 80.0 | 10.0 | 20.0 | 30.0 | 40.0 | 50.0 | 60.0 | 70.0 |
| HFO-1123 | mass % | 5.0 | 70.0 | 60.0 | 50.0 | 40.0 | 30.0 | 20.0 | 10.0 |
| R32 | mass % | 15.0 | 20.0 | 20.0 | 20.0 | 20.0 | 20.0 | 20.0 | 20.0 |
| GWP | — | 102 | 136 | 136 | 136 | 136 | 136 | 136 | 136 |
| COP ratio | % (relative to R410A) | 98.3 | 93.9 | 94.3 | 94.8 | 95.4 | 96.2 | 97.0 | 97.8 |
| Refrigerating capacity ratio | % (relative to R410A) | 105.0 | 113.8 | 113.2 | 112.4 | 111.4 | 110.2 | 108.8 | 107.3 |

TABLE 157

| Item | Unit | Comparative Example 43 | Comparative Example 44 | Comparative Example 45 | Comparative Example 46 | Comparative Example 47 | Comparative Example 48 | Comparative Example 49 | Comparative Example 50 |
|---|---|---|---|---|---|---|---|---|---|
| HFO-1132(E) | mass % | 10.0 | 20.0 | 30.0 | 40.0 | 50.0 | 60.0 | 70.0 | 10.0 |
| HFO-1123 | mass % | 65.0 | 55.0 | 45.0 | 35.0 | 25.0 | 15.0 | 5.0 | 60.0 |
| R32 | mass % | 25.0 | 25.0 | 25.0 | 25.0 | 25.0 | 25.0 | 25.0 | 30.0 |
| GWP | — | 170 | 170 | 170 | 170 | 170 | 170 | 170 | 203 |
| COP ratio | % (relative to R410A) | 94.6 | 94.9 | 95.4 | 96.0 | 96.7 | 97.4 | 98.2 | 95.3 |
| Refrigerating capacity ratio | % (relative to R410A) | 114.4 | 113.8 | 113.0 | 111.9 | 110.7 | 109.4 | 107.9 | 114.8 |

TABLE 158

| Item | Unit | Comparative Example 51 | Comparative Example 52 | Comparative Example 53 | Comparative Example 54 | Comparative Example 55 | Example 25 | Example 26 | Comparative Example 56 |
|---|---|---|---|---|---|---|---|---|---|
| HFO-1132(E) | mass % | 20.0 | 30.0 | 40.0 | 50.0 | 60.0 | 10.0 | 20.0 | 30.0 |
| HFO-1123 | mass % | 50.0 | 40.0 | 30.0 | 20.0 | 10.0 | 55.0 | 45.0 | 35.0 |
| R32 | mass % | 30.0 | 30.0 | 30.0 | 30.0 | 30.0 | 35.0 | 35.0 | 35.0 |
| GWP | — | 203 | 203 | 203 | 203 | 203 | 237 | 237 | 237 |
| COP ratio | % (relative to R410A) | 95.6 | 96.0 | 96.6 | 97.2 | 97.9 | 96.0 | 96.3 | 96.6 |
| Refrigerating capacity ratio | % (relative to R410A) | 114.2 | 113.4 | 112.4 | 111.2 | 109.8 | 115.1 | 114.5 | 113.6 |

TABLE 159

| Item | Unit | Comparative Example 57 | Comparative Example 58 | Comparative Example 59 | Comparative Example 60 | Comparative Example 61 | Comparative Example 62 | Comparative Example 63 | Comparative Example 64 |
|---|---|---|---|---|---|---|---|---|---|
| HFO-1132(E) | mass % | 40.0 | 50.0 | 60.0 | 10.0 | 20.0 | 30.0 | 40.0 | 50.0 |
| HFO-1123 | mass % | 25.0 | 15.0 | 5.0 | 50.0 | 40.0 | 30.0 | 20.0 | 10.0 |
| R32 | mass % | 35.0 | 35.0 | 35.0 | 40.0 | 40.0 | 40.0 | 40.0 | 40.0 |
| GWP | — | 237 | 237 | 237 | 271 | 271 | 271 | 271 | 271 |
| COP ratio | % (relative to R410A) | 97.1 | 97.7 | 98.3 | 96.6 | 96.9 | 97.2 | 97.7 | 98.2 |
| Refrigerating capacity ratio | % (relative to R410A) | 112.6 | 111.5 | 110.2 | 115.1 | 114.6 | 113.8 | 112.8 | 111.7 |

TABLE 160

| Item | Unit | Example 27 | Example 28 | Example 29 | Example 30 | Example 31 | Example 32 | Example 33 | Example 34 |
|---|---|---|---|---|---|---|---|---|---|
| HFO-1132(E) | mass % | 38.0 | 40.0 | 42.0 | 44.0 | 35.0 | 37.0 | 39.0 | 41.0 |
| HFO-1123 | mass % | 60.0 | 58.0 | 56.0 | 54.0 | 61.0 | 59.0 | 57.0 | 55.0 |
| R32 | mass % | 2.0 | 2.0 | 2.0 | 2.0 | 4.0 | 4.0 | 4.0 | 4.0 |
| GWP | — | 14 | 14 | 14 | 14 | 28 | 28 | 28 | 28 |
| COP ratio | % (relative to R410A) | 93.2 | 93.4 | 93.6 | 93.7 | 93.2 | 93.3 | 93.5 | 93.7 |
| Refrigerating capacity ratio | % (relative to R410A) | 107.7 | 107.5 | 107.3 | 107.2 | 108.6 | 108.4 | 108.2 | 108.0 |

TABLE 161

| Item | Unit | Example 35 | Example 36 | Example 37 | Example 38 | Example 39 | Example 40 | Example 41 | Example 42 |
|---|---|---|---|---|---|---|---|---|---|
| HFO-1132(E) | mass % | 43.0 | 31.0 | 33.0 | 35.0 | 37.0 | 39.0 | 41.0 | 27.0 |
| HFO-1123 | mass % | 53.0 | 63.0 | 61.0 | 59.0 | 57.0 | 55.0 | 53.0 | 65.0 |
| R32 | mass % | 4.0 | 6.0 | 6.0 | 6.0 | 6.0 | 6.0 | 6.0 | 8.0 |
| GWP | — | 28 | 41 | 41 | 41 | 41 | 41 | 41 | 55 |
| COP ratio | % (relative to R410A) | 93.9 | 93.1 | 93.2 | 93.4 | 93.6 | 93.7 | 93.9 | 93.0 |
| Refrigerating capacity ratio | % (relative to R410A) | 107.8 | 109.5 | 109.3 | 109.1 | 109.0 | 108.8 | 108.6 | 110.3 |

TABLE 162

| Item | Unit | Example 43 | Example 44 | Example 45 | Example 46 | Example 47 | Example 48 | Example 49 | Example 50 |
|---|---|---|---|---|---|---|---|---|---|
| HFO-1132(E) | mass % | 29.0 | 31.0 | 33.0 | 35.0 | 37.0 | 39.0 | 32.0 | 32.0 |
| HFO-1123 | mass % | 63.0 | 61.0 | 59.0 | 57.0 | 55.0 | 53.0 | 51.0 | 50.0 |
| R32 | mass % | 8.0 | 8.0 | 8.0 | 8.0 | 8.0 | 8.0 | 17.0 | 18.0 |
| GWP | — | 55 | 55 | 55 | 55 | 55 | 55 | 116 | 122 |
| COP ratio | % (relative to R410A) | 93.2 | 93.3 | 93.5 | 93.6 | 93.8 | 94.0 | 94.5 | 94.7 |
| Refrigerating capacity ratio | % (relative to R410A) | 110.1 | 110.0 | 109.8 | 109.6 | 109.5 | 109.3 | 111.8 | 111.9 |

TABLE 163

| Item | Unit | Example 51 | Example 52 | Example 53 | Example 54 | Example 55 | Example 56 | Example 57 | Example 58 |
|---|---|---|---|---|---|---|---|---|---|
| HFO-1132(E) | mass % | 30.0 | 27.0 | 21.0 | 23.0 | 25.0 | 27.0 | 11.0 | 13.0 |
| HFO-1123 | mass % | 52.0 | 42.0 | 46.0 | 44.0 | 42.0 | 40.0 | 54.0 | 52.0 |
| R32 | mass % | 18.0 | 31.0 | 33.0 | 33.0 | 33.0 | 33.0 | 35.0 | 35.0 |
| GWP | — | 122 | 210 | 223 | 223 | 223 | 223 | 237 | 237 |
| COP ratio | % (relative to R410A) | 94.5 | 96.0 | 96.0 | 96.1 | 96.2 | 96.3 | 96.0 | 96.0 |
| Refrigerating capacity ratio | % (relative to R410A) | 112.1 | 113.7 | 114.3 | 114.2 | 114.0 | 113.8 | 115.0 | 114.9 |

TABLE 164

| Item | Unit | Example 59 | Example 60 | Example 61 | Example 62 | Example 63 | Example 64 | Example 65 | Example 66 |
|---|---|---|---|---|---|---|---|---|---|
| HFO-1132(E) | mass % | 15.0 | 17.0 | 19.0 | 21.0 | 23.0 | 25.0 | 27.0 | 11.0 |
| HFO-1123 | mass % | 50.0 | 48.0 | 46.0 | 44.0 | 42.0 | 40.0 | 38.0 | 52.0 |
| R32 | mass % | 35.0 | 35.0 | 35.0 | 35.0 | 35.0 | 35.0 | 35.0 | 37.0 |
| GWP | — | 237 | 237 | 237 | 237 | 237 | 237 | 237 | 250 |

TABLE 164-continued

| Item | Unit | Example 59 | Example 60 | Example 61 | Example 62 | Example 63 | Example 64 | Example 65 | Example 66 |
|---|---|---|---|---|---|---|---|---|---|
| COP ratio | % (relative to R410A) | 96.1 | 96.2 | 96.2 | 96.3 | 96.4 | 96.4 | 96.5 | 96.2 |
| Refrigerating capacity ratio | % (relative to R410A) | 114.8 | 114.7 | 114.5 | 114.4 | 114.2 | 114.1 | 113.9 | 115.1 |

TABLE 165

| Item | Unit | Example 67 | Example 68 | Example 69 | Example 70 | Example 71 | Example 72 | Example 73 | Example 74 |
|---|---|---|---|---|---|---|---|---|---|
| HFO-1132(E) | mass % | 13.0 | 15.0 | 17.0 | 15.0 | 17.0 | 19.0 | 21.0 | 23.0 |
| HFO-1123 | mass % | 50.0 | 48.0 | 46.0 | 50.0 | 48.0 | 46.0 | 44.0 | 42.0 |
| R32 | mass % | 37.0 | 37.0 | 37.0 | 0.0 | 0.0 | 0.0 | 0.0 | 0.0 |
| GWP | — | 250 | 250 | 250 | 237 | 237 | 237 | 237 | 237 |
| COP ratio | % (relative to R410A) | 96.3 | 96.4 | 96.4 | 96.1 | 96.2 | 96.2 | 96.3 | 96.4 |
| Refrigerating capacity ratio | % (relative to R410A) | 115.0 | 114.9 | 114.7 | 114.8 | 114.7 | 114.5 | 114.4 | 114.2 |

TABLE 166

| Item | Unit | Example 75 | Example 76 | Example 77 | Example 78 | Example 79 | Example 80 | Example 81 | Example 82 |
|---|---|---|---|---|---|---|---|---|---|
| HFO-1132(E) | mass % | 25.0 | 27.0 | 11.0 | 19.0 | 21.0 | 23.0 | 25.0 | 27.0 |
| HFO-1123 | mass % | 40.0 | 38.0 | 52.0 | 44.0 | 42.0 | 40.0 | 38.0 | 36.0 |
| R32 | mass % | 0.0 | 0.0 | 0.0 | 37.0 | 37.0 | 37.0 | 37.0 | 37.0 |
| GWP | — | 237 | 237 | 250 | 250 | 250 | 250 | 250 | 250 |
| COP ratio | % (relative to R410A) | 96.4 | 96.5 | 96.2 | 96.5 | 96.5 | 96.6 | 96.7 | 96.8 |
| Refrigerating capacity ratio | % (relative to R410A) | 114.1 | 113.9 | 115.1 | 114.6 | 114.5 | 114.3 | 114.1 | 114.0 |

The above results indicate that under the condition that the mass % of HFO-1132(E), HFO-1123, and R32 based on their sum is respectively represented by x, y, and z, when coordinates (x,y,z) in a ternary composition diagram in which the sum of HFO-1132(E), HFO-1123, and R32 is 100 mass %, a line segment connecting a point (0.0, 100.0, 0.0) and a point (0.0, 0.0, 100.0) is the base, and the point (0.0, 100.0, 0.0) is on the left side are within the range of a figure surrounded by line segments that connect the following 4 points:
point O (100.0, 0.0, 0.0),
point A" (63.0, 0.0, 37.0),
point B" (0.0, 63.0, 37.0), and
point (0.0, 100.0, 0.0),
or on these line segments,
the refrigerant has a GWP of 250 or less.

The results also indicate that when coordinates (x,y,z) are within the range of a figure surrounded by line segments that connect the following 4 points:
point O (100.0, 0.0, 0.0),
point A' (81.6, 0.0, 18.4),
point B' (0.0, 81.6, 18.4), and
point (0.0, 100.0, 0.0),
or on these line segments,
the refrigerant has a GWP of 125 or less.

The results also indicate that when coordinates (x,y,z) are within the range of a figure surrounded by line segments that connect the following 4 points:
point O (100.0, 0.0, 0.0),
point A (90.5, 0.0, 9.5),
point B (0.0, 90.5, 9.5), and
point (0.0, 100.0, 0.0),
or on these line segments,
the refrigerant has a GWP of 65 or less.

The results also indicate that when coordinates (x,y,z) are on the left side of line segments that connect the following 3 points:
point C (50.0, 31.6, 18.4),
point U (28.7, 41.2, 30.1), and
point D (52.2, 38.3, 9.5),
or on these line segments,
the refrigerant has a COP ratio of 96% or more relative to that of R410A.

In the above, the line segment CU is represented by coordinates $(-0.0538z^2+0.7888z+53.701, 0.0538z^2-1.7888z+46.299, z)$, and the line segment UD is represented by coordinates $(-3.4962z^2+210.71z-3146.1, 3.4962z^2-211.71z+3246.1, z)$.

The points on the line segment CU are determined from three points, i.e., point C, Comparative Example 10, and point U, by using the least-square method.

The points on the line segment UD are determined from three points, i.e., point U, Example 2, and point D, by using the least-square method.

The results also indicate that when coordinates (x,y,z) are on the left side of line segments that connect the following 3 points:
point E (55.2, 44.8, 0.0),
point T (34.8, 51.0, 14.2), and
point F (0.0, 76.7, 23.3),
or on these line segments,
the refrigerant has a COP ratio of 94.5% or more relative to that of R410A.

In the above, the line segment ET is represented by coordinates $(-0.0547z^2-0.5327z+53.4, 0.0547z^2-0.4673z+46.6, z)$, and the line segment TF is represented by coordinates $(-0.0982z^2+0.9622z+40.931, 0.0982z^2-1.9622z+59.069, z)$.

The points on the line segment ET are determined from three points, i.e., point E, Example 2, and point T, by using the least-square method.

The points on the line segment TF are determined from three points, i.e., points T, S, and F, by using the least-square method.

The results also indicate that when coordinates (x,y,z) are on the left side of line segments that connect the following 3 points:
point G (0.0, 76.7, 23.3),
point R (21.0, 69.5, 9.5), and
point H (0.0, 85.9, 14.1),
or on these line segments,
the refrigerant has a COP ratio of 93% or more relative to that of R410A.

In the above, the line segment GR is represented by coordinates $(-0.0491z^2-1.1544z+38.5, 0.0491z^2+0.1544z+61.5, z)$, and the line segment RH is represented by coordinates $(-0.3123z^2+4.234z+11.06, 0.3123z^2-5.234z+88.94, z)$.

The points on the line segment GR are determined from three points, i.e., point G, Example 5, and point R, by using the least-square method.

The points on the line segment RH are determined from three points, i.e., point R, Example 7, and point H, by using the least-square method.

In contrast, as shown in, for example, Comparative Examples 8, 9, 13, 15, 17, and 18, when R32 is not contained, the concentrations of HFO-1132(E) and HFO-1123, which have a double bond, become relatively high; this undesirably leads to deterioration, such as decomposition, or polymerization in the refrigerant compound.

(6) First Embodiment

Figure 16:
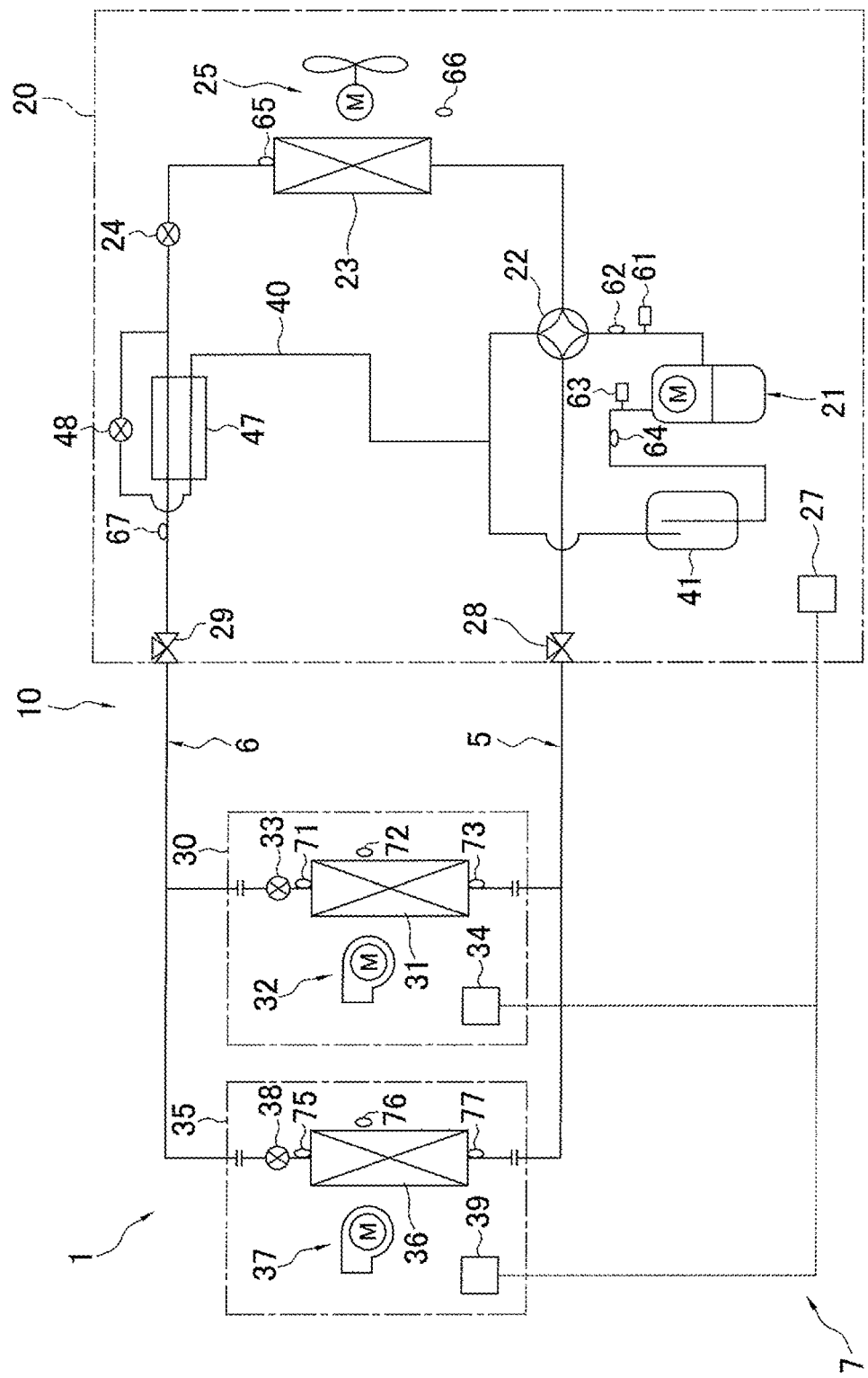
FIG. 16 is a schematic structural view of a refrigerant circuit according to a first embodiment.
Figure 17:
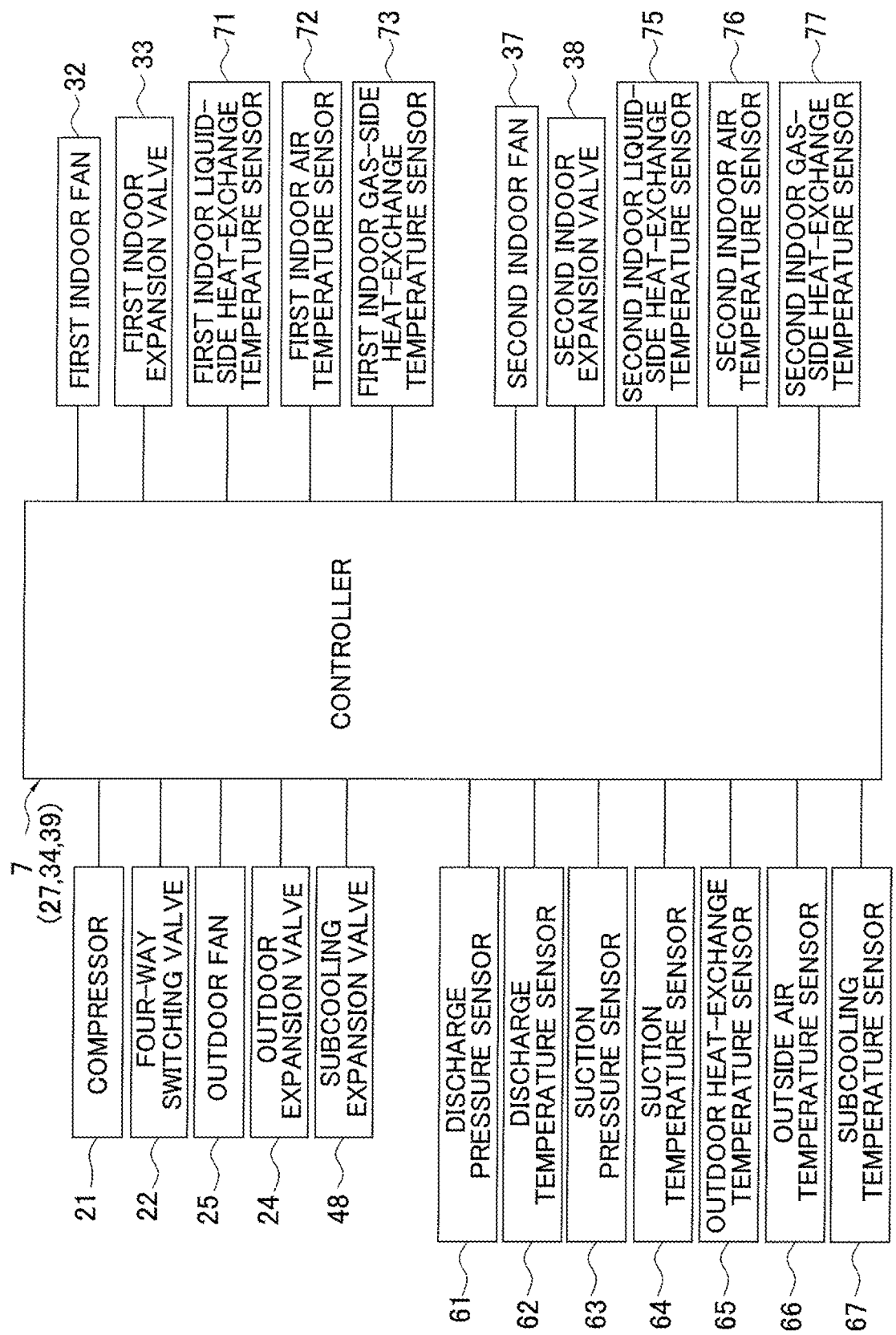
FIG. 17 is a schematic control block structural view of a refrigeration cycle apparatus according to the first embodiment.

An air conditioning apparatus 1 serving as a refrigeration cycle apparatus according to a first embodiment, is described with reference to FIG. 16, which is a schematic structural view of a refrigerant circuit, and FIG. 17, which is a schematic control block structural view.

The air conditioning apparatus 1 is a apparatus that air-conditions a target space by performing a vapor compression refrigeration cycle.

The air conditioning apparatus 1 primarily includes an outdoor unit 20, a first indoor unit 30, a second indoor unit 35, a liquid-side refrigerant connection pipe 6 and a gas-side refrigerant connection pipe 5 that connect the first indoor unit 30 and the second indoor unit 35 in parallel with respect to the outdoor unit 20, a remote controller (not shown) that serves as an input device and an output device, and a controller 7 that controls the operation of the air conditioning apparatus 1.

The air conditioning apparatus 1 performs a refrigeration cycle in which the refrigerant sealed in a refrigerant circuit 10 is compressed, cooled or condensed, decompressed, and heated or evaporated, and is then compressed again. In the present embodiment, the refrigerant circuit 10 is filled with a refrigerant for performing the vapor compression refrigeration cycle. The refrigerant is a mixed refrigerant containing 1,2-difluoroethylene, and any one of the refrigerants A to E above may be used. The refrigerant circuit 10 is filled with refrigerating-machine oil along with the mixed refrigerant.

(6-1) Outdoor Unit 20

The outdoor unit 20 is connected to the indoor unit 30 via the liquid-side refrigerant connection pipe 6 and the gas-side refrigerant connection pipe 5, and constitutes a part of the refrigerant circuit 10. The outdoor unit 20 primarily includes a compressor 21, a four-way switching valve 22, an outdoor heat exchanger 23, a subcooling heat exchanger 47, a suction injection pipe 40, a subcooling expansion valve 48, an outdoor expansion valve 24, an outdoor fan 25, a low-pressure receiver 41, a liquid-side shutoff valve 29, and a gas-side shutoff valve 28.

The compressor 21 is equipment that compresses a low-pressure refrigerant in the refrigeration cycle into a high-pressure refrigerant. Here, as the compressor 21, a compressor having a hermetic structure in which a displacement compression element (not shown) of, for example, a rotary type or scroll type is rotationally driven by a compressor motor is used. The compressor motor is a motor for changing capacity, and an operation frequency can be controlled by an inverter. An attachment accumulator (not shown) is provided on a suction side of the compressor 21 (the internal volume of the attachment accumulator is less than, and is desirably less than or equal to half of, the internal volume of refrigerant containers, such as low-pressure receivers, intermediate-pressure receivers, and high-pressure receivers).

The four-way switching valve 22 can be switched between a cooling operation connection state and a heating operation connection state by switching a connection state, the cooling operation connection state being a state in which the four-way switching valve 22 connects the suction side of the compressor 21 and the gas-side shutoff valve 28 to each other while connecting a discharge side of the compressor 21 and the outdoor heat exchanger 23, the heating operation connection state being a state in which the four-way switching valve 22 connects the suction side of the compressor 21 and the outdoor heat exchanger 23 to each other while connecting the discharge side of the compressor 21 and the gas-side shutoff valve 28.

The outdoor heat exchanger 23 is a heat exchanger that functions as a condenser for a high-pressure refrigerant in the refrigeration cycle during the cooling operation and that functions as an evaporator for a low-pressure refrigerant in the refrigeration cycle during the heating operation.

The outdoor expansion valve 24 is provided between a liquid-side outlet of the outdoor heat exchanger 23 and the liquid-side shutoff valve 29 in the refrigerant circuit 10. The outdoor expansion valve 24 is an electric expansion valve whose valve opening degree is adjustable.

The suction injection pipe 40 branches off from a branching portion between the outdoor expansion valve 24 and the liquid-side shutoff valve 29 in a main circuit of the refrigerant circuit 10, and is provided so as to merge at a merging portion between the low-pressure receiver 41 and one connection port of the four-way switching valve 22. The subcooling expansion valve 48 is provided at the suction injection pipe 40. The subcooling expansion valve 48 is an electric expansion valve whose valve opening degree is adjustable.

The subcooling heat exchanger 47 is a heat exchanger that causes heat to be exchanged between a refrigerant that flows along a portion of the refrigerant circuit 10 between the outdoor expansion valve 24 and the liquid-side shutoff valve 29 and a refrigerant that flows on a side of the merging portion of the subcooling expansion valve 48 in the suction injection pipe 40. In the present embodiment, the subcooling heat exchanger 47 is a portion between the outdoor expansion valve 24 and the liquid-side shutoff valve 29, and is provided closer than the branching portion of the suction injection pipe 40 to the liquid-side shutoff valve 29.

The outdoor fan 25 sucks outdoor air into the outdoor unit 20 and causes heat to be exchanged with a refrigerant in the outdoor heat exchanger 23, and then causes an air flow for discharge to the outside to be generated. The outdoor fan 25 is rotationally driven by an outdoor fan motor.

The low-pressure receiver 41 is provided between the suction side of the compressor 21 and the one connection port of the four-way switching valve 22, and is a refrigerant container that is capable of storing an excess refrigerant as a liquid refrigerant in the refrigerant circuit 10. The compressor 21 is provided with the attachment accumulator (not shown), and the low-pressure receiver 41 is connected on a downstream side of the attachment accumulator.

The liquid-side shutoff valve 29 is a manual valve disposed at a portion of the outdoor unit 20 that is connected to the liquid-side refrigerant connection pipe 6.

The gas-side shutoff valve 28 is a manual valve disposed at a portion of the outdoor unit 20 that is connected to the gas-side refrigerant connection pipe 5.

The outdoor unit 20 includes an outdoor unit control unit 27 that controls the operation of each portion that constitutes the outdoor unit 20. The outdoor unit control unit 27 includes a microcomputer including, for example, a CPU and a memory. The outdoor unit control unit 27 is connected to an indoor unit control units 34 and 39 of each indoor unit 30 and 35 via a communication line, and sends and receives, for example, control signals.

The outdoor unit 20 is provided with, for example, a discharge pressure sensor 61, a discharge temperature sensor 62, a suction pressure sensor 63, a suction temperature sensor 64, an outdoor heat-exchange temperature sensor 65, an outside air temperature sensor 66, and a subcooling temperature sensor 67. Each of these sensors is electrically connected to the outdoor unit control unit 27 and sends a detection signal to the outdoor unit control unit 27. The discharge pressure sensor 61 detects the pressure of a refrigerant that flows through a discharge tube that connects the discharge side of the compressor 21 and one connection port of the four-way switching valve 22. The discharge temperature sensor 62 detects the temperature of the refrigerant that flows through the discharge tube. The suction pressure sensor 63 detects the pressure of a refrigerant that flows through a suction tube that connects the suction side of the compressor 21 and the low-pressure receiver 41. The suction temperature sensor 64 detects the temperature of the refrigerant that flows through the suction tube. The outdoor heat-exchange temperature sensor 65 detects the temperature of a refrigerant that flows through the liquid-side outlet of the outdoor heat exchanger 23 on a side opposite to a side where the four-way switching valve 22 is connected. The outside air temperature sensor 66 detects the temperature of outdoor air that is air before passing through the outdoor heat exchanger 23. The subcooling temperature sensor 67 detects the temperature of a refrigerant that flows between the subcooling heat exchanger 47 and a second outdoor expansion valve 24 in the main circuit of the refrigerant circuit 10.

(6-2) First Indoor Unit 30 and Second Indoor Unit 35

The first indoor unit 30 and the second indoor unit 35 are installed on, for example, a ceiling or wall surfaces in a room corresponding to the same target space or different target spaces. The first indoor unit 30 and the second indoor unit 35 are connected to the outdoor unit 20 via the liquid-side refrigerant connection pipe 6 and the gas-side refrigerant connection pipe 5, and constitute a part of the refrigerant circuit 10.

The first indoor unit 30 includes a first indoor heat exchanger 31, a first indoor expansion valve 33, and a first indoor fan 32.

A liquid side of the first indoor heat exchanger 31 is connected to the liquid-side refrigerant connection pipe 6, and a gas side end of the first indoor heat exchanger 31 is connected to the gas-side refrigerant connection pipe 5. The first indoor heat exchanger 31 is a heat exchanger that functions as an evaporator for a low-pressure refrigerant in the refrigeration cycle during the cooling operation, and that functions as a condenser for a high-pressure refrigerant in the refrigeration cycle during the heating operation.

The first indoor expansion valve 33 is an electric expansion valve that is provided at a refrigerant pipe on a liquid refrigerant side of the first indoor heat exchanger 31 and whose valve opening degree is adjustable.

The first indoor fan 32 sucks indoor air into the first indoor unit 30 and causes heat to be exchanged with a refrigerant in the first indoor heat exchanger 31, and then causes an air flow for discharge to the outside to be generated. The first indoor fan 32 is rotationally driven by an indoor fan motor.

The first indoor unit 30 includes the first indoor unit control unit 34 that controls the operation of each portion that constitutes the first indoor unit 30. The first indoor unit control unit 34 includes a microcomputer including, for example, a CPU and a memory. The first indoor unit control unit 34 is connected to a second indoor unit control unit 39 and the outdoor unit control unit 27 via the communication line, and sends and receives, for example, control signals.

The first indoor unit 30 is provided with, for example, a first indoor liquid-side heat-exchange sensor 71, a first indoor air temperature sensor 72, and a first indoor gas-side heat-exchange temperature sensor 73. Each of these sensors is electrically connected to the first indoor unit control unit 34 and sends a detection signal to the indoor unit control unit 34. The first indoor liquid-side heat-exchange sensor 71 detects the temperature of a refrigerant that flows through a liquid-refrigerant-side outlet of the first indoor heat exchanger 31. The first indoor air temperature sensor 72 detects the temperature of indoor air that is air before passing through the first indoor heat exchanger 31. The first indoor gas-side heat-exchange temperature sensor 73 detects the temperature of a refrigerant that flows through a gas-refrigerant-side outlet of the first indoor heat exchanger 31.

The second indoor unit 35 is provided with a second indoor heat exchanger 36, a second indoor expansion valve 38, and a second indoor fan 37.

A liquid side of the second indoor heat exchanger 36 is connected to the liquid-side refrigerant connection pipe 6, and a gas side end of the second indoor heat exchanger 36 is connected to the gas-side refrigerant connection pipe 5. The second indoor heat exchanger 36 is a heat exchanger that functions as an evaporator for a low-pressure refrigerant in the refrigeration cycle during the cooling operation, and that functions as a condenser for a high-pressure refrigerant in the refrigeration cycle during the heating operation.

The second indoor expansion valve 38 is an electric expansion valve that is provided at a refrigerant pipe on a liquid refrigerant side of the second indoor heat exchanger 36 and whose valve opening degree is adjustable.

The second indoor fan 37 sucks indoor air into the second indoor unit 35 and causes heat to be exchanged with a refrigerant in the second indoor heat exchanger 36, and then causes an air flow for discharge to the outside to be generated. The second indoor fan 37 is rotationally driven by an indoor fan motor.

The second indoor unit 35 includes the second indoor unit control unit 39 that controls the operation of each portion that constitutes the second indoor unit 35. The second indoor unit control unit 39 includes a microcomputer including, for example, a CPU and a memory. The second indoor unit control unit 39 is connected to the first indoor unit control unit 34 and the outdoor unit control unit 27 via a communication line, and sends and receives, for example, control signals.

The second indoor unit 35 is provided with, for example, a second indoor liquid-side heat-exchange sensor 75, a second indoor air temperature sensor 76, and a second indoor gas-side heat-exchange temperature sensor 77. Each of these sensors is electrically connected to the second indoor unit control unit 39 and sends a detection signal to the second indoor unit control unit 39. The second indoor liquid-side heat-exchange sensor 75 detects the temperature of a refrigerant that flows through a liquid-refrigerant-side outlet of the second indoor heat exchanger 36. The second indoor air temperature sensor 76 detects the temperature of indoor air that is air before passing through the second indoor heat exchanger 36. The second indoor gas-side heat-exchange temperature sensor 77 detects the temperature of a refrigerant that flows through a gas-refrigerant-side outlet of the second indoor heat exchanger 36.

(6-3) Details of Controller 7

In the air conditioning apparatus 1, by connecting the outdoor unit control unit 27, the first indoor unit control unit 34, and the second indoor unit control unit 39 to each other via the communication lines, the controller 7 that controls the operation of the air conditioning apparatus 1 is formed.

The controller 7 primarily includes a CPU (central processing unit) and a memory, such as ROM or RAM. Various processing operations and control that are performed by the controller 7 are realized as a result of each portion included in the outdoor unit control unit 27 and/or the first indoor unit control unit 34 and/or the second indoor unit control unit 39 functioning together.

(6-4) Operation Modes

Operation modes are described below.

As the operation modes, a cooling operation mode and a heating operation mode are provided.

On the basis of an instruction received from, for example, a remote controller, the controller 7 determines whether or not a mode is the cooling operation mode or the heating operation mode, and executes the mode.

(6-4-1) Cooling Operation Mode

In the air conditioning apparatus 1, in the cooling operation mode, the compressor 21 is such that an operation frequency is capacity-controlled to cause the evaporation temperature of a refrigerant in the refrigerant circuit 10 to become a target evaporation temperature. Here, it is desirable that the target evaporation temperature be determined in accordance with the indoor unit 30 or 35 whichever has the largest difference between a set temperature and an indoor temperature (the indoor unit having the largest load).

A gas refrigerant discharged from the compressor 21 is condensed at the outdoor heat exchanger 23 via the four-way switching valve 22. The refrigerant that has flowed through the outdoor heat exchanger 23 passes through the outdoor expansion valve 24. In this case, the outdoor expansion valve 24 is controlled so as to be in a fully open state.

A portion of the refrigerant that has passed through the outdoor expansion valve 24 flows toward the liquid-side shutoff valve 29 and the other portion thereof flows into the branching portion of the suction injection pipe 40. The refrigerant that has flowed through the branching portion of the suction injection pipe 40 is decompressed at the subcooling expansion valve 48. At the subcooling heat exchanger 47, the refrigerant that flows toward the liquid-side shutoff valve 29 from the outdoor expansion valve 24 and the refrigerant that is decompressed at the subcooling expansion valve 48 and that flows in the suction injection pipe 40 exchange heat. After the refrigerant that flows in the suction injection pipe 40 has finished exchanging heat at the subcooling heat exchanger 47, the refrigerant flows so as to merge at the merging portion between the low-pressure receiver 41 and the one connection port of the four-way switching valve 22. The valve opening degree of the subcooling expansion valve 48 is controlled so as to satisfy predetermined conditions such as the subcooling degree of the refrigerant that has passed though the sub cooling heat exchanger 47 in the refrigerant circuit 10 becoming a predetermined target value.

After the refrigerant that flows toward the liquid-side shutoff valve 29 from the outdoor expansion valve 24 has finished exchanging heat at the subcooling heat exchanger 47, the refrigerant flows through the liquid-side refrigerant connection pipe 6 via the liquid-side shutoff valve 29, and is sent to the first indoor unit 30 and the second indoor unit 35.

Here, in the first indoor unit 30, the valve opening degree of the first indoor expansion valve 33 is controlled so as to satisfy predetermined conditions such as the superheating degree of a refrigerant that flows through a gas-side outlet of the first indoor heat exchanger 31 becoming a predetermined target value. Similarly to the first indoor expansion valve 33, the valve opening degree of the second indoor expansion valve 38 of the second indoor unit 35 is controlled so as to satisfy predetermined conditions such as the superheating degree of a refrigerant that flows through a gas-side outlet of the second indoor heat exchanger 36 becoming a predetermined target value. The valve opening degree of the first indoor expansion valve 33 and the valve opening degree of the second indoor expansion valve 38 may be controlled so as to satisfy predetermined conditions such as the superheating degree of the refrigerant that is obtained by subtracting the saturation temperature of the refrigerant that is equivalent to a detected pressure of the suction pressure sensor 63 from a detected temperature of the suction temperature sensor 64 becoming a target value. Further, the method of controlling the valve opening degree of the first indoor expansion valve 33 and the valve opening degree of the second indoor expansion valve 38 are not limited, so that, for example, the valve opening degrees may be controlled to cause the discharge temperature of the refrigerant that is discharged from the compressor 21 to become a predetermined temperature, or the superheating degree of the refrigerant that is discharged from the compressor 21 to satisfy a predetermined condition. The refrigerant decompressed at the first indoor expansion valve 33 evaporates at the first indoor heat exchanger 31, the refrigerant decompressed at the second indoor expansion valve 38 evaporates at the second indoor heat exchanger 36, and the refrigerants merge, after which the refrigerant flows to the gas-side refrigerant connection pipe 5. The refrigerant that has flowed through the gas-side refrigerant connection pipe 5 merges with the refrigerant that has flowed through the suction injection pipe 40 via the gas-side shutoff valve 28 and the four-way switching valve 22. The merged refrigerant is sucked into the compressor 21 again via the low-pressure receiver 41. Liquid refrigerants that could not be evaporated at the first indoor heat exchanger 31, the second indoor heat exchanger 36, and the subcooling heat exchanger 47 are stored as excess refrigerants in the low-pressure receiver 41.

(6-4-2) Heating Operation Mode

In the air conditioning apparatus 1, in the heating operation mode, the compressor 21 is such that an operation frequency is subjected to capacity control to cause the condensation temperature of a refrigerant in the refrigerant circuit 10 to become a target condensation temperature. Here, it is desirable that the target condensation temperature be determined in accordance with the indoor unit 30 or 35 whichever has the largest difference between a set temperature and an indoor temperature (the indoor unit having the largest load).

After a gas refrigerant discharged from the compressor 21 has flowed through the four-way switching valve 22 and the gas-side refrigerant connection pipe 5, a portion of the refrigerant flows into a gas-side end of the first indoor heat exchanger 31 of the first indoor unit 30 and is condensed at the first indoor heat exchanger 31, and the other portion of the refrigerant flows into a gas-side end of the second indoor heat exchanger 36 of the second indoor unit 35 and is condensed at the second indoor heat exchanger 36.

The valve opening degree of the first indoor expansion valve 33 of the first indoor unit 30 is controlled so as to satisfy predetermined conditions, such as the subcooling degree of a refrigerant that flows along the liquid side of the first indoor heat exchanger 31 becoming a predetermined target value. Similarly, the valve opening degree of the second indoor expansion valve 38 of the second indoor unit 35 is controlled so as to satisfy predetermined conditions, such as the subcooling degree of a refrigerant that flows along the liquid side of the second indoor heat exchanger 36 becoming a predetermined target value.

After the refrigerant decompressed at the first indoor expansion valve 33 and the refrigerant decompressed at the second indoor expansion valve 38 have merged, the refrigerant flows through the liquid-side refrigerant connection pipe 6 and flows into the outdoor unit 20.

After the refrigerant that has passed through the liquid-side shutoff valve 29 of the outdoor unit 20 has flowed through the subcooling heat exchanger 47, the refrigerant is decompressed at the outdoor expansion valve 24. Here, the valve opening degree of the outdoor expansion valve 24 is controlled so as to satisfy predetermined conditions, such as the superheating degree of a refrigerant that flows along the suction side of the compressor 21 becoming a target value. The method of controlling the valve opening degree of the outdoor expansion valve 24 is not limited, so that, for example, the valve opening degrees may be controlled to cause the discharge temperature of the refrigerant that is discharged from the compressor 21 to become a predetermined temperature, or the superheating degree of the refrigerant that is discharged from the compressor 21 to satisfy a predetermined condition.

In the heating operation mode, since the subcooling expansion valve 48 that is provided at the suction injection pipe 40 is controlled so as to be in a fully closed state, the refrigerant does not flow through the suction injection pipe 40 and heat is also not exchanged at the subcooling heat exchanger 47.

The refrigerant decompressed at the outdoor expansion valve 24 is evaporated at the outdoor heat exchanger 23, flows through the four-way switching valve 22 and the low-pressure receiver 41, and is sucked into the compressor 21 again. A liquid refrigerant that could not be evaporated at the outdoor heat exchanger 23 is stored as an excess refrigerant in the low-pressure receiver 41.

(6-5) Features of the First Embodiment

Since the air conditioning apparatus 1 above uses a refrigerant containing 1,2-difluoroethylene, the air conditioning apparatus 1 can sufficiently reduce GWP.

Since the temperature of the refrigerant that is sucked into the compressor 21 can be reduced by the suction injection pipe 40, the air conditioning apparatus 1 can improve the operation efficiency in the refrigeration cycle.

(6-6) Modification a of the First Embodiment

Although, in the first embodiment, the air conditioning apparatus 1 is described by using as an example an air conditioning apparatus including a plurality of indoor units that are connected in parallel, an air conditioning apparatus including one indoor unit that is connected in series may be used as the air conditioning apparatus.

(6-7) Modification B of the First Embodiment

In the first embodiment, the air conditioning apparatus 1 including the suction injection pipe 40 that allows a refrigerant to be sent to the suction side of the compressor 21 after the refrigerant has flowed through the subcooling heat exchanger 47 is described as an example.

Figure 18:
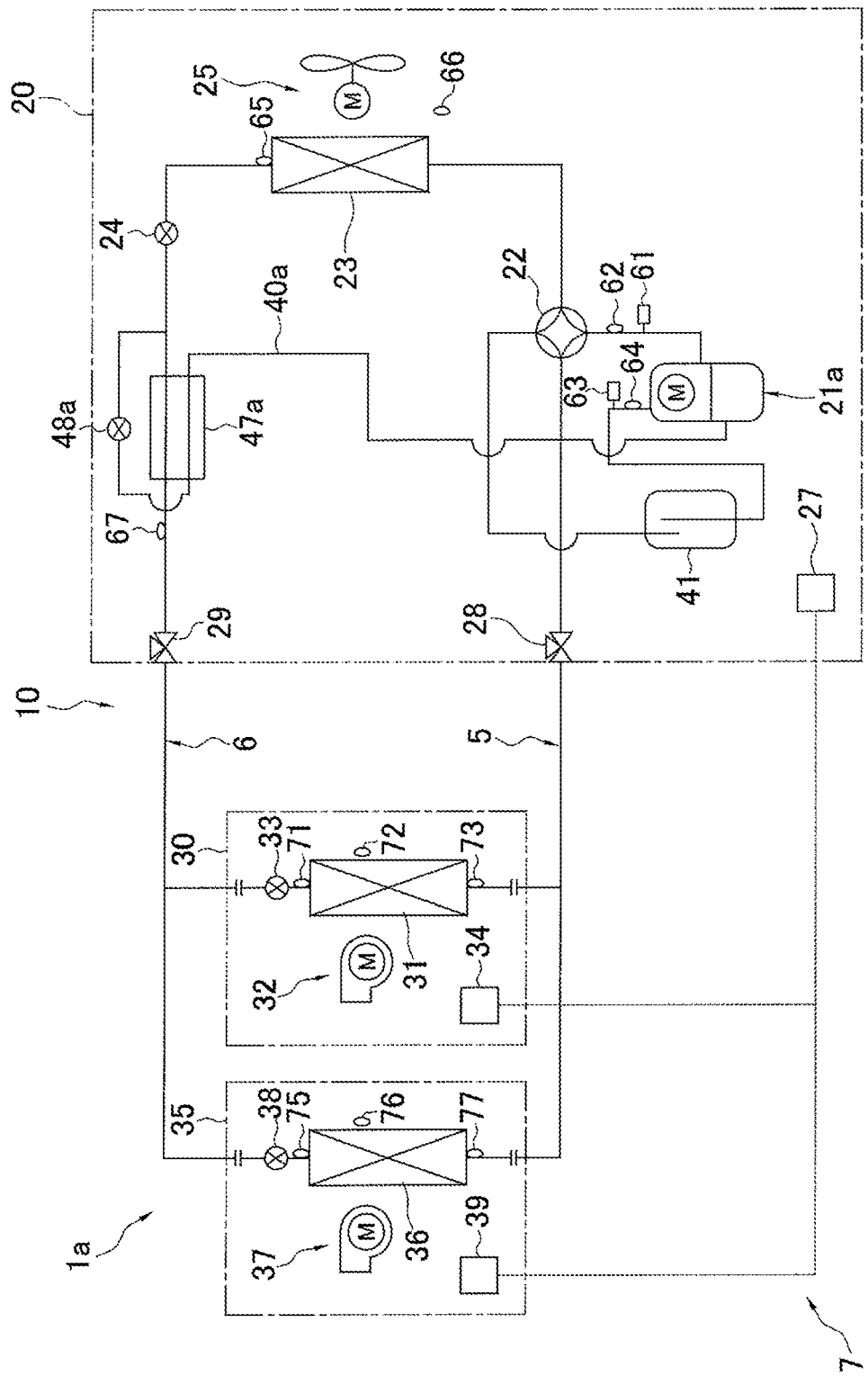
FIG. 18 is a schematic structural view of a refrigerant circuit according to Modification B of the first embodiment.

In contrast, as an air conditioning apparatus, for example, as shown in FIG. 18, an air conditioning apparatus 1a including an economizer injection pipe 40a that sends a refrigerant to a region of intermediate pressure of a compressor 21a after the refrigerant has flowed through an economizer heat exchanger 47a may be used.

The economizer injection pipe 40a is a pipe that branches off from a portion of a main circuit of a refrigerant circuit 10 between the outdoor expansion valve 24 and the liquid-side shutoff valve 29 and extends up to the region of intermediate pressure of the compressor 21a. An economizer expansion valve 48a whose valve opening degree can be controlled is provided at the economizer injection pipe 40a.

The economizer heat exchanger 47a is a heat exchanger that causes heat to be exchanged between a refrigerant that flows into a portion branching off from the main circuit of the refrigerant circuit 10, that flows in the economizer injection pipe 40a, and that has been decompressed at the economizer expansion valve 48a and a refrigerant that flows between the outdoor expansion valve 24 and the liquid-side shutoff valve 29 in the main circuit of the refrigerant circuit 10.

Figure 19:
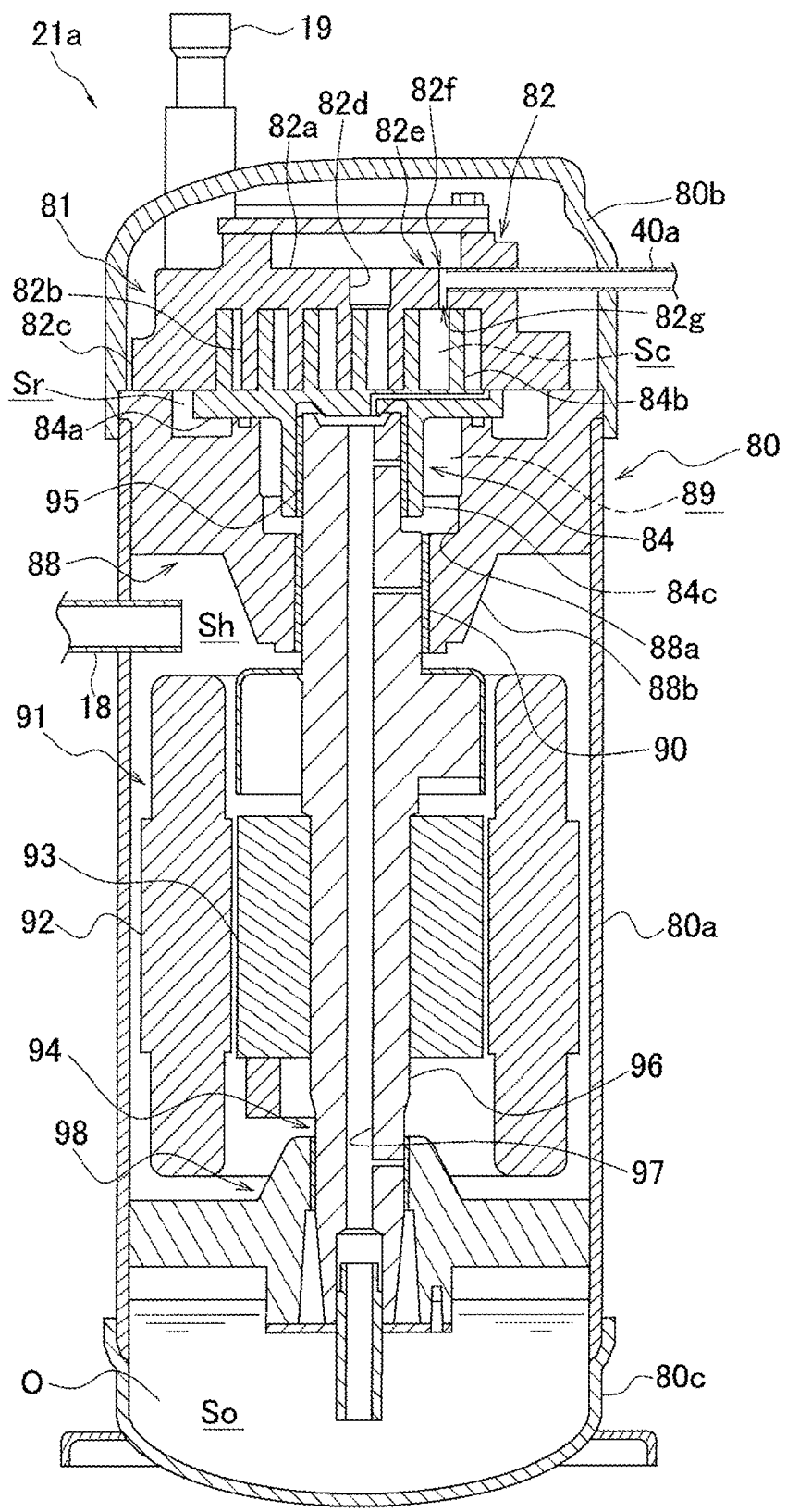
FIG. 19 is a side sectional view showing a schematic structure of a compressor according to the Modification B of the first embodiment.

The compressor 21a is not limited, and, for example, a scroll compressor as that shown in FIG. 19 can be used.

The compressor 21a includes a casing 80, a scroll compression mechanism 81 including a fixed scroll 82, a driving motor 91, a crank shaft 94, and a lower bearing 98.

The casing 80 includes a circular cylindrical member 80a that is substantially circularly cylindrical and that has an open top and an open bottom, and an upper cover 80b and a lower cover 80c that are provided on an upper end and a lower end, respectively, of the circular cylindrical member 80a. The circular cylindrical member 80a and the upper cover 80b and the lower cover 80c are fixed to each other by welding so as to be kept air-tight. Pieces of structural equipment of the compressor 21*a* including the scroll compression mechanism 81, the driving motor 91, the crank shaft 94, and the lower bearing 98 are accommodated in the casing 80. An oil-storage space So is formed in a lower portion of the casing 80. A refrigerating-machine oil O for lubricating, for example, the scroll compression mechanism 81 can be stored in the oil-storage space So. A suction tube 19 that allows a low-pressure gas refrigerant in a refrigeration cycle of the refrigerant circuit 10 to be sucked and that allows a gas refrigerant to be supplied to the scroll compression mechanism 81 is provided at an upper portion of the casing 80 so as to extend through the upper cover 80*b*. A lower end of the suction tube 19 is connected to the fixed scroll 82 of the scroll compression mechanism 81. The suction tube 19 communicates with a compression chamber Sc of the scroll compression mechanism 81 described below. An intermediate portion of the circular cylindrical member 80*a* of the casing 80 is provided with a discharge tube 18 through which a refrigerant that is discharged to the outside of the casing 80 passes. The discharge tube 18 is disposed so that an end portion of the discharge tube 18 inside the casing 80 protrudes into a high-pressure space Sh formed below a housing 88 of the scroll compression mechanism 81. A high-pressure refrigerant in the refrigeration cycle that has been compressed by the scroll compression mechanism 81 flows through the discharge tube 18. A side surface of the upper cover 80*b* of the casing 80 has an injection connection port, and the economizer injection pipe 40*a* is connected in the injection connection port.

The scroll compression mechanism 81 primarily includes the housing 88, the fixed scroll 82 that is disposed above the housing 88, and a movable scroll 84 that forms the compression chamber Sc by being assembled to the fixed scroll 82.

The fixed scroll 82 includes a plate-shaped fixed-side end plate 82*a*, a spiral fixed-side lap 82*b* that protrudes from a front surface of the fixed-side end plate 82*a*, and an outer edge portion 82*c* that surrounds the fixed-side lap 82*b*. Anon-circular discharge port 82*d* that communicates with the compression chamber Sc of the scroll compression mechanism 81 is formed in a central portion of the fixed-side end plate 82*a* so as to extend through the fixed-side end plate 82*a* in a thickness direction thereof. A refrigerant compressed in the compression chamber Sc is discharged from the discharge port 82*d*, passes through a refrigerant passage (not shown) formed in the fixed scroll 82 and the housing 88, and flows into the high-pressure space Sh. The fixed-side end plate 82*a* has a supply passage 82*e* that opens in a side of the fixed-side end plate 82*a* and that communicates with the compression chamber Sc. The supply passage 82*e* allows an intermediate-pressure refrigerant that has flowed through the economizer injection pipe 40*a* to be supplied to the compression chamber Sc. The supply passage 82*e* has a horizontal passage portion 82*f* that extends in a horizontal direction from the opening in the side of the fixed-side end plate 82*a* toward the center of the fixed-side end plate 82*a*. The supply passage 82*e* has an injection port 82*g* that extends toward the compression chamber Sc from a portion of the horizontal passage portion 82*f* on a center side of the fixed-side end plate 82*a* (near an end portion of the horizontal passage portion 82*f* on the center side of the fixed-side end plate 82*a*) and that directly communicates with the compression chamber Sc. The injection port 82*g* is a circular hole.

The movable scroll 84 includes a plate-shaped movable-side end plate 84*a*, a spiral movable-side lap 84*b* that protrudes from a front surface of the movable-side end plate 84*a*, and a circular cylindrical boss portion 84*c* that protrudes from a rear surface of the movable-side end plate 84*a*. The fixed-side lap 82*b* of the fixed scroll 82 and the movable-side lap 84*b* of the movable scroll 84 are assembled to each other in a state in which a lower surface of the fixed-side end plate 82*a* and an upper surface of the movable-side end plate 84*a* face each other. The compression chamber Sc is formed between the fixed-side lap 82*b* and the movable-side lap 84*b* that are adjacent to each other. Due to the movable scroll 84 revolving with respect to the fixed scroll 82 as described below, the volume of the compression chamber Sc changes periodically, and a refrigerant is sucked, compressed, and discharged in the scroll compression mechanism 81. The boss portion 84*c* is a circular cylindrical portion whose upper end is closed. Due to a decentered portion 95 of the crank shaft 94 (described below) being inserted into a hollow portion of the boss portion 84*c*, the movable scroll 84 and the crank shaft 94 are coupled to each other. The boss portion 84*c* is disposed in a decentered-portion space 89 that is formed between the movable scroll 84 and the housing 88. The decentered-portion space 89 communicates with the high-pressure space Sh via, for example, an oil-supply path 97 of the crank shaft 94 (described below), and a high pressure acts in the decentered-portion space 89. This pressure causes a lower surface of the movable-side end plate 84*a* in the decentered-portion space 89 to be pushed upward toward the fixed scroll 82. This force causes the movable scroll 84 to closely contact the fixed scroll 82. The movable scroll 84 is supported by the housing 88 via an Oldham ring disposed in an "Oldham ring space Sr". The Oldham ring is a member that prevents the movable scroll 84 from rotating and that causes the movable scroll 84 to revolve. By using the Oldham ring, when the crank shaft 94 rotates, the movable scroll 84 connected to the crank shaft 94 at the boss portion 84*c* revolves without rotating with respect to the fixed scroll 82, and a refrigerant in the compression chamber Sc is compressed.

The housing 88 is press-fitted to the circular cylindrical member 80*a*, and an outer peripheral surface of the housing 88 is fixed to the circular cylindrical member 80*a* in its entirety in a peripheral direction. The housing 88 and the fixed scroll 82 are fixed to each other with, for example, a bolt (not shown) so that an upper end surface of the housing 88 is in close contact with a lower surface of the outer edge portion 82*c* of the fixed scroll 82. The housing 88 includes a concave portion 88*a* disposed so as to be recessed in a central portion of an upper surface of the housing 88 and a bearing portion 88*b* disposed below the concave portion 88*a*. The concave portion 88*a* surrounds a side surface forming the decentered-portion space 89 where the boss portion 84*c* of the movable scroll 84 is disposed. A bearing 90 that supports a main shaft 96 of the crank shaft 94 is disposed in the bearing portion 88*b*. The bearing 90 rotatably supports the main shaft 96 inserted in the bearing 90. The housing 88 has the Oldham ring space Sr where the Oldham ring is disposed.

The driving motor 91 includes a ring-shaped stator 92 fixed to an inner wall surface of the circular cylindrical member 80*a* and a rotor 93 rotatably accommodated on an inner side of the stator 92 with a slight gap (air gap passage) therebetween. The rotor 93 is connected to the movable scroll 84 via the crank shaft 94 disposed so as to extend in an up-down direction along an axial center of the circular cylindrical member 80*a*. Due to the rotation of the rotor 93, the movable scroll 84 revolves with respect to the fixed scroll 82.

The crank shaft 94 transmits driving force of the driving motor 91 to the movable scroll 84. The crank shaft 94 is disposed so as to extend in the up-down direction along the axial center of the circular cylindrical member 80a, and connects the rotor 93 of the driving motor 91 and the movable scroll 84 of the scroll compression mechanism 81 to each other. The crank shaft 94 includes the main shaft 96 whose center axis coincides with the axial center of the circular cylindrical member 80a and the decentered portion 95 that is decentered with respect to the axial center of the circular cylindrical member 80a. The decentered portion 95 is inserted into the boss portion 84c of the movable scroll 84 as described above. The main shaft 96 is rotatably supported by the bearing 90 at the bearing portion 88b of the housing 88 and the lower bearing 98 described below. The main shaft 96 is connected to the rotor 93 of the driving motor 91 at a location between the bearing portion 88b and the lower bearing 98. The oil-supply path 97 for supplying the refrigerating-machine oil O to, for example, the scroll compression mechanism 81 is formed in the crank shaft 94. A lower end of the main shaft 96 is positioned in the oil-storage space So formed in the lower portion of the casing 80, and the refrigerating-machine oil O in the oil-storage space So is supplied to, for example, the scroll compression mechanism 81 via the oil-supply path 97.

The lower bearing 98 is disposed below the driving motor 91. The lower bearing 98 is fixed to the circular cylindrical member 80a. The lower bearing 98 constitutes a bearing on a lower end side of the crank shaft 94, and rotatably supports the main shaft 96 of the crank shaft 94.

Next, an operation of the compressor 21a is described.

When the driving motor 91 starts up, the rotor 93 rotates with respect to the stator 92, and the crank shaft 94 fixed to the rotor 93 rotates. When the crank shaft 94 rotates, the movable scroll 84 connected to the crank shaft 94 revolves with respect to the fixed scroll 82. A low-pressure gas refrigerant in a refrigeration cycle passes through the suction tube 19 and is sucked into the compression chamber Sc from a peripheral edge side of the compression chamber Sc. As the movable scroll 84 revolves, the suction tube 19 and the compression chamber Sc no longer communicate with each other. As the volume of the compression chamber Sc is reduced, the pressure in the compression chamber Sc starts to increase.

An intermediate-pressure refrigerant that has flowed through the economizer injection pipe 40a is supplied to the compression chamber Sc during compression via the horizontal passage portion 82f and the injection port 82g.

As the compression of the refrigerant progresses, the compression chamber Sc no longer communicates with the injection port 82g. The refrigerant in the compression chamber Sc is compressed as the volume of the compression chamber Sc is reduced, and finally becomes a high-pressure gas refrigerant. The high-pressure gas refrigerant is discharged from the discharge port 82d that is positioned near the center of the fixed-side end plate 82a. Thereafter, the high-pressure gas refrigerant passes through the refrigerant passage (not shown) formed in the fixed scroll 82 and the housing 88, and flows into the high-pressure space Sh. The high-pressure gas refrigerant in the refrigeration cycle that has flowed into the high-pressure space Sh and that has been compressed by the scroll compression mechanism 81 is discharged from the discharge tube 18.

In the air conditioning apparatus 1a, due to the refrigerant that has flowed through the economizer injection pipe 40a merging in the region of intermediate pressure of the compressor 21a, the temperature of the refrigerant having intermediate pressure in the compressor 21a can be reduced, so that it is possible to increase the operation efficiency in the refrigeration cycle.

(6-8) Modification C of the First Embodiment

In the Modification B of the first embodiment, a scroll compressor is used as an example of the compressor to describe the compressor.

In contrast, as the compressor that is used in the first embodiment, a compressor 21b, which is a rotary compressor in a second embodiment described below, may be used.

(7) Second Embodiment

Figure 20:
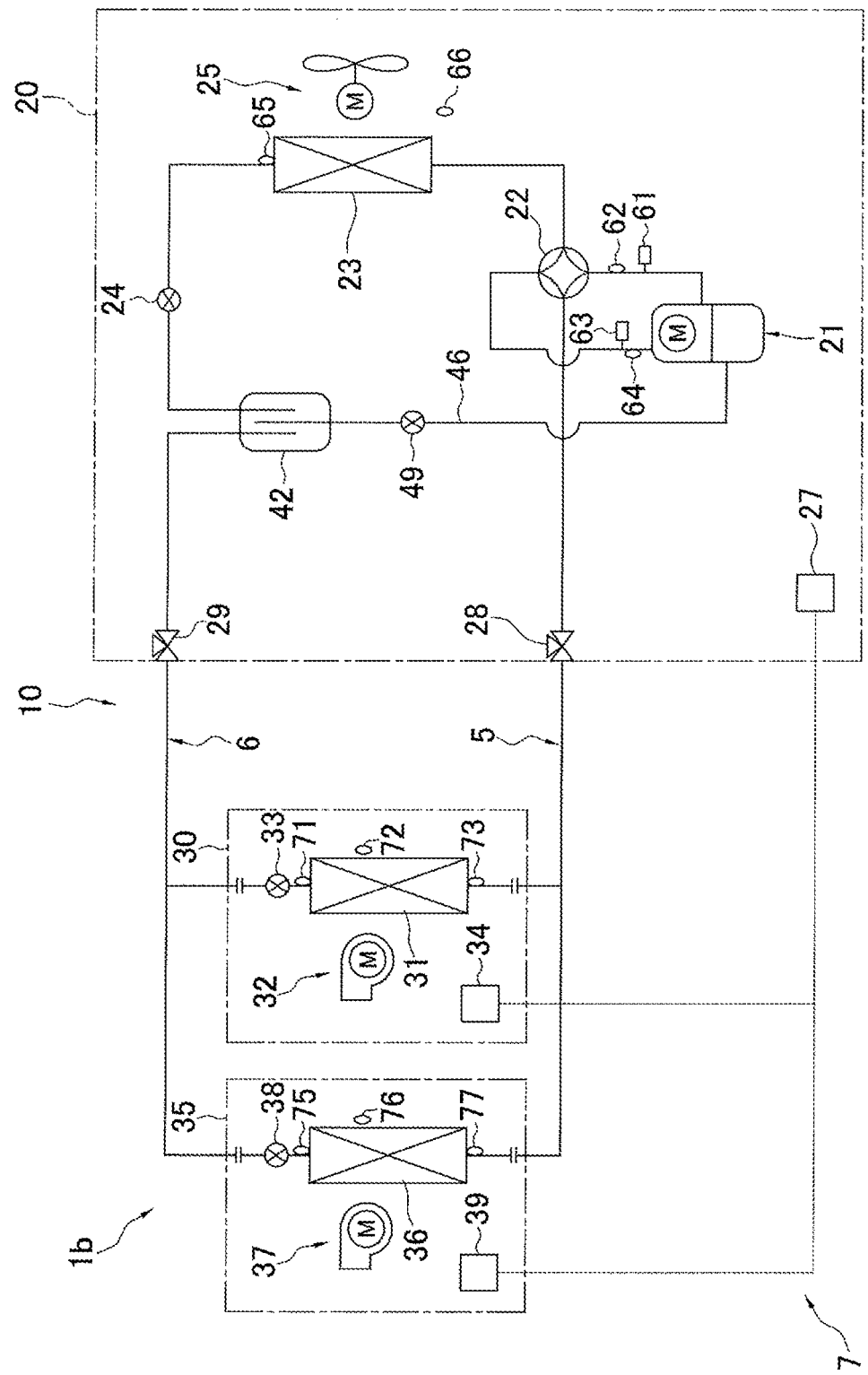
FIG. 20 is a schematic structural view of a refrigerant circuit according to a second embodiment.
Figure 21:
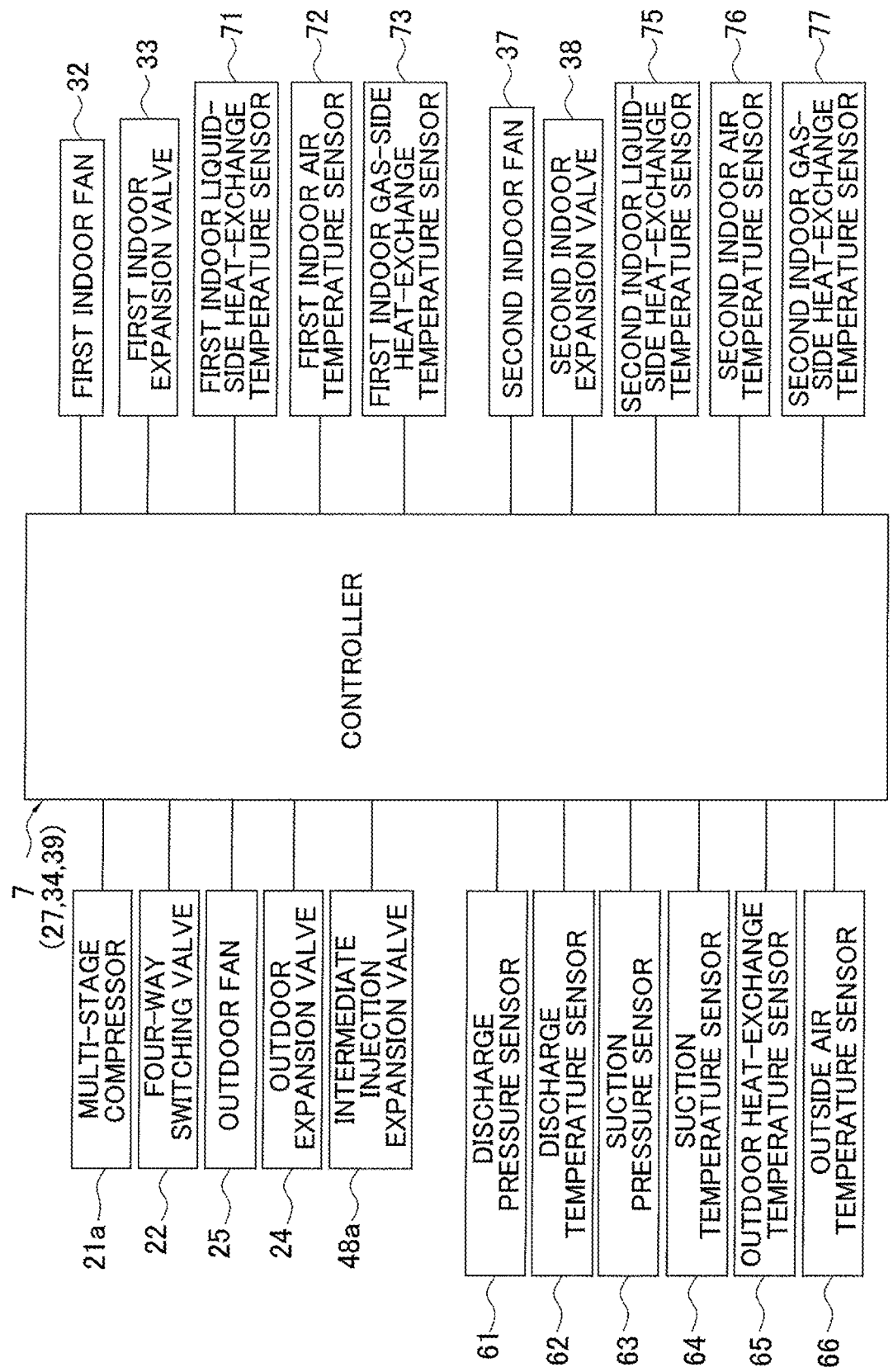
FIG. 21 is a schematic control block structural view of a refrigeration cycle apparatus according to the second embodiment.

With reference to FIG. 20, which is a schematic structural view of a refrigerant circuit, and FIG. 21, which is schematic control block structural view, an air conditioning apparatus 1b serving as a refrigeration cycle apparatus according to the second embodiment is described below.

The air conditioning apparatus 1b of the second embodiment is described below primarily by focusing on portions that differ from those of the air conditioning apparatus 1 of the first embodiment.

Even in the air conditioning apparatus 1b, a refrigerant circuit 10 is filled with a refrigerant that is a mixed refrigerant containing 1,2-difluoroethylene as a refrigerant for performing a vapor compression refrigeration cycle, and is filled with any one of the refrigerants A to E above. The refrigerant circuit 10 is filled with refrigerating-machine oil along with the refrigerant.

(7-1) Outdoor Unit 20

An outdoor unit 20 of the air conditioning apparatus 1b of the second embodiment includes the compressor 21b, a high-pressure receiver 42, an intermediate injection pipe 46, and an intermediate injection expansion valve 49 instead of the compressor 21, the low-pressure receiver 41, the suction injection pipe 40, the subcooling expansion valve 48, the subcooling heat exchanger 47, and the subcooling temperature sensor 67 of the outdoor unit 20 in the first embodiment.

The high-pressure receiver 42 is provided between an outdoor expansion valve 24 and a liquid-side shutoff valve 29 in a main flow path of the refrigerant circuit 10. The high-pressure receiver 42 has an internal space having positioned therein both an end portion of a pipe that extends from a side of the outdoor expansion valve 24 and an end portion of a pipe that extends from a side of the liquid-side shutoff valve 29, and is a container that is capable of storing a refrigerant.

The intermediate injection pipe 46 extends from a gas region of the internal space of the high-pressure receiver 42, and is a pipe that is connected to a region of intermediate pressure of the compressor 21b. The intermediate injection expansion valve 49 is provided in the intermediate injection pipe 46, and has a controllable valve opening degree.

(7-2) Indoor Unit 30

Since a first indoor unit 30 and a second indoor unit 35 of the second embodiment are the same as those of the first embodiment, they are not described.

(7-3) Cooling Operation Mode and Heating Operation Mode

In the air conditioning apparatus 1b above, in a cooling operation mode, the outdoor expansion valve 24 is controlled so that, for example, the subcooling degree of a refrigerant that passes through a liquid-side outlet of an outdoor heat exchanger 23 satisfies a predetermined condition. The intermediate injection expansion valve 49 is controlled so that a refrigerant that flows from the high-pressure receiver 42 is reduced up to an intermediate pressure in the compressor 21b.

In a heating operation mode, the outdoor expansion valve 24 is controlled so that, for example, the superheating degree of a refrigerant that is sucked by the compressor 21b satisfies a predetermined condition. The intermediate injection expansion valve 49 is controlled so that the refrigerant that flows from the high-pressure receiver 42 is reduced up to the intermediate pressure in the compressor 21b.

(7-4) Compressor 21b

Figure 22:
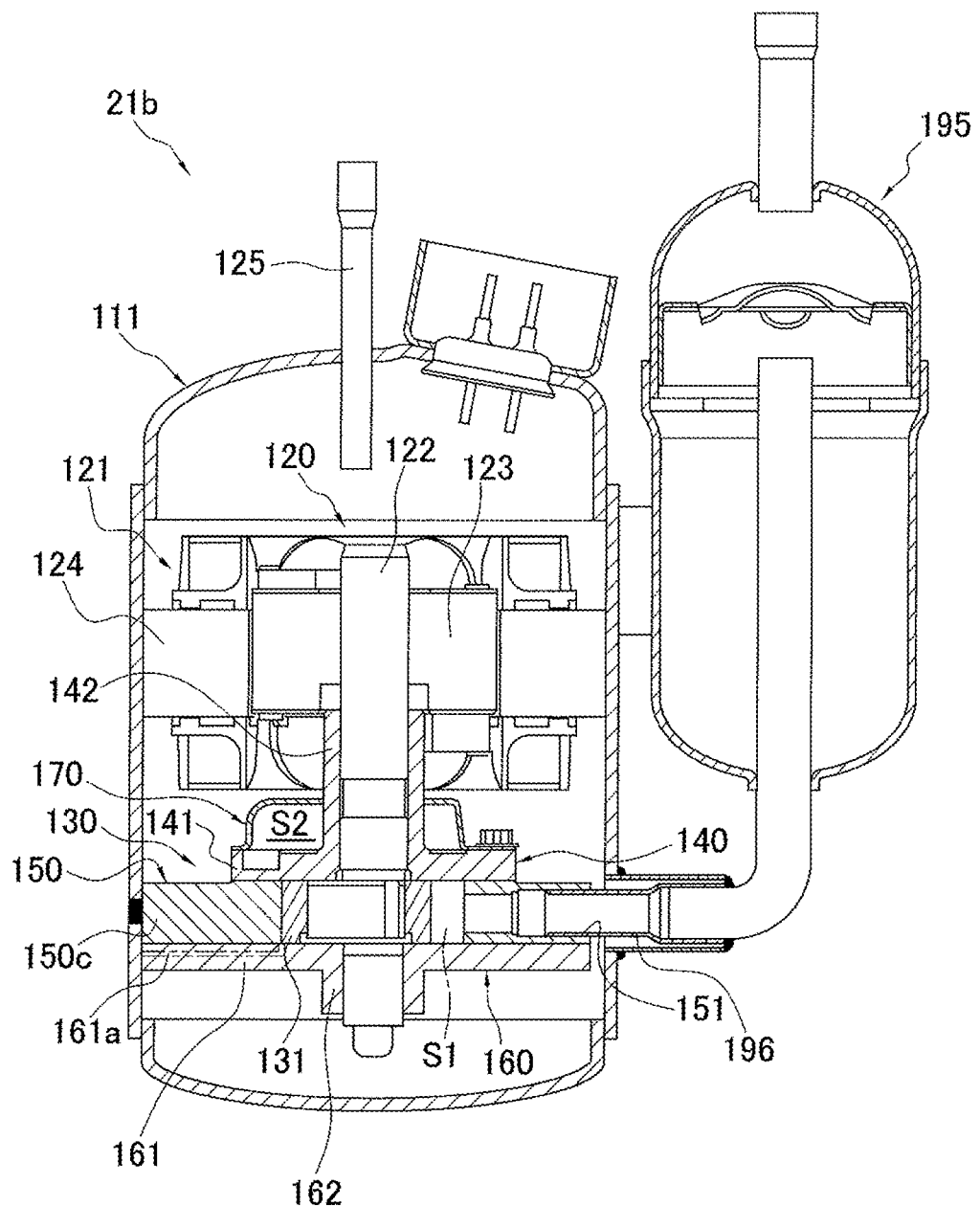
FIG. 22 is a side sectional view showing a schematic structure of a compressor according to the second embodiment.

As shown in FIG. 22, the compressor 21b is a 1-cylinder rotary compressor including a casing 111 and a driving mechanism 120 and a compression mechanism 130 that are disposed in the casing 111. In the compressor 21b, the compression mechanism 130 is disposed on a lower side of the driving mechanism 120 in the casing 111.

(7-4-1) Driving Mechanism

The driving mechanism 120 is accommodated in an upper portion of an internal space of the casing 111 and drives the compression mechanism 130. The driving mechanism 120 includes a motor 121 that is a drive source and a crank shaft 122 that is a drive shaft mounted on the motor 121.

The motor 121 is a motor for rotationally driving the crank shaft 122 and primarily includes a rotor 123 and a stator 124. The rotor 123 has the crank shaft 122 fitted into its internal space and rotates together with the crank shaft 122. The rotor 123 is constituted by electromagnetic steel plates that are stacked, and a magnet that is embedded in a rotor main body. The stator 124 is disposed on an outer side of the rotor 123 in a radial direction with a predetermined space from the rotor 123. The stator 124 is constituted by electromagnetic steel plates that are stacked, and a coil wound around a stator main body. The motor 121 causes the rotor 123 to rotate together with the crank shaft 122 by electromagnetic force that is generated at the stator 124 by causing an electric current to flow through the coil.

Figure 23:
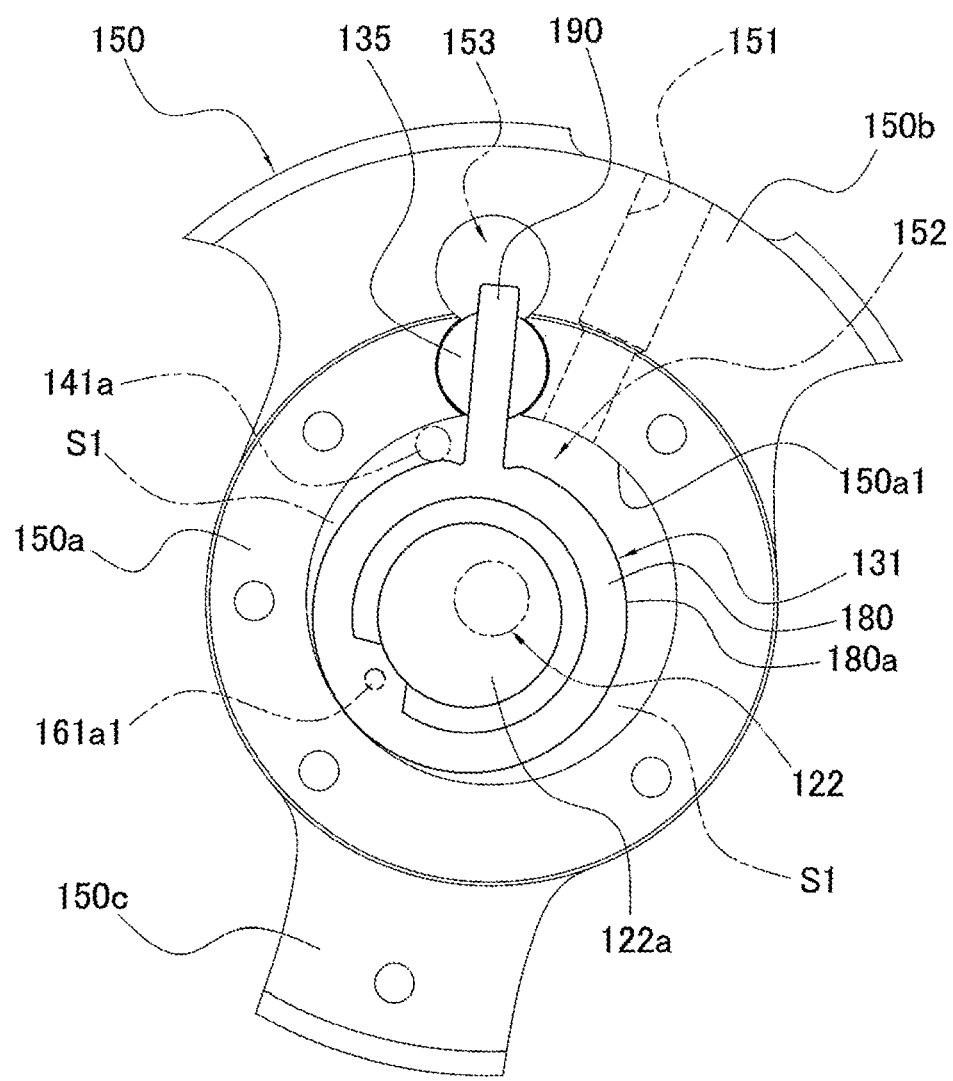
FIG. 23 is a plan sectional view showing the vicinity of a cylinder chamber of the compressor according to the second embodiment.

The crank shaft 122 is fitted into the rotor 123 and rotates around a rotation axis as a center. As shown in FIG. 23, a crank pin 122a, which is a decentered portion of the crank shaft 122, is inserted into a roller 180 (described below) of a piston 131 of the compression mechanism 130, and is fitted to the roller 180 with rotation force from the rotor 123 being in a transmittable state. The crank shaft 122 rotates in accordance with rotation of the rotor 123, causes the crank pin 122a to rotate in a decentered manner, and causes the roller 180 of the piston 131 of the compression mechanism 130 to revolve. That is, the crank shaft 122 has the function of transmitting driving force of the motor 121 to the compression mechanism 130.

(7-4-2) Compression Mechanism

The compression mechanism 130 is accommodated on a lower portion side in the casing 111. The compression mechanism 130 compresses a refrigerant sucked via a suction tube 196. The compression mechanism 130 is a rotary compression mechanism and primarily includes a front head 140, a cylinder 150, the piston 131, and a rear head 160. A refrigerant compressed in a compression chamber S1 of the compression mechanism 130 flows from a front-head discharge hole 141a that is formed in the front head 140 to a muffler space S2 surrounded by the front head 140 and a muffler 170, and is discharged to a space where the motor 121 is disposed and a lower end of the discharge tube 125 is positioned.

(7-4-2-1) Cylinder

The cylinder 150 is a metallic cast member. The cylinder 150 includes a circular cylindrical central portion 150a, a first extending portion 150b that extends toward a side of an attachment accumulator 195 from the central portion 150a, and a second extending portion 150c that extends to a side opposite to the first extending portion 150b from the central portion 150a. The first extending portion 150b has a suction hole 151 into which a lower-pressure refrigerant in a refrigeration cycle is sucked. A columnar space on an inner side of an inner peripheral surface 150a1 of the central portion 150a is a cylinder chamber 152 into which the refrigerant that is sucked from the suction hole 151 flows. The suction hole 151 extends toward an outer peripheral surface of the first extending portion 150b from the cylinder chamber 152 and is open at the outer peripheral surface of the first extending portion 150b. An end portion of the suction tube 196 extending from the accumulator 195 is inserted into the suction hole 151. For example, the piston 131 for compressing the refrigerant that has flowed into the cylinder chamber 152 is accommodated in the cylinder chamber 152.

The cylinder chamber 152 that is formed by the circular cylindrical central portion 150a of the cylinder 150 is open at a first end, which is a lower end of the cylinder chamber 152, and is also open at a second end, which is an upper end of the cylinder chamber 152. A first end, which is a lower end, of the central portion 150a is closed by the rear head 160 described below. A second end, which is an upper end, of the central portion 150a is closed by the front head 140 described below.

The cylinder 150 has a blade swing space 153 where a bush 135 and a blade 190 (described below) are disposed. The blade swing space 153 is formed in both the central portion 150a and the first extending portion 150b, and the blade 190 of the piston 131 is swingably supported by the cylinder 150 via the bush 135. The blade swing space 153 is formed so as to, in a plane, extend toward an outer peripheral side from the cylinder chamber 152 in the vicinity of the suction hole 151.

(7-4-2-2) Front Head

As shown in FIG. 22, the front head 140 includes a front-head disk portion 141 that closes an opening at a second end, which is an upper end, of the cylinder 150, and a front-head boss portion 142 that extends upward from a peripheral edge of a front-head opening in the center of the front-head disk portion 141. The front-head boss portion 142 has a circular cylindrical shape, and functions as a bearing of the crank shaft 122.

In a planar position shown in FIG. 23, the front-head disk portion 141 has the front-head discharge hole 141a. A refrigerant compressed in the compression chamber S1 whose volume changes in the cylinder chamber 152 of the cylinder 150 is intermittently discharged from the front-head discharge hole 141a. The front-head disk portion 141 is provided with a discharge valve that opens and closes an outlet of the front-head discharge hole 141a. The discharge valve opens due to a pressure difference when the pressure of the compression chamber S1 becomes higher than the pressure of the muffler space S2, and discharges the refrigerant to the muffler space S2 from the front-head discharge hole 141a.

(7-4-2-3) Muffler

As shown in FIG. 22, the muffler 170 is mounted on an upper surface of a peripheral edge portion of the front-head disk portion 141 of the front head 140. The muffler 170 forms, along with an upper surface of the front-head disk portion 141 and an outer peripheral surface of the front-head boss portion 142, the muffler space S2 to reduce noise generated by the discharge of a refrigerant. As described above, the muffler space S2 and the compression chamber S1 communicate with each other via the front-head discharge hole 141a when the discharge valve is open.

The muffler 170 has a center muffler opening that allows the front-head boss portion 142 to extend therethrough and a muffler discharge hole in which a refrigerant flows toward an accommodation space of the motor 121, disposed above, from the muffler space S2.

For example, the muffler space S2, the accommodation space of the motor 121, a space above the motor 121 where the discharge tube 125 is positioned, and a space below the compression mechanism 130 where a lubricant is accumulated are all connected to each other, and form a high-pressure space having equal pressure.

(7-4-2-4) Rear Head

The rear head 160 includes a rear-head disk portion 161 that closes an opening at a first end, which is a lower end, of the cylinder 150, and a rear-head boss portion 162 that extends downward from a peripheral edge portion of a central opening of the rear-head disk portion 161 and serves as a bearing. As shown in FIG. 23, the front-head disk portion 141, the rear-head disk portion 161, and the central portion 150a of the cylinder 150 form the cylinder chamber 152. The front-head boss portion 142 and the rear-head boss portion 162 are each a circular cylindrical boss portion, and support the crank shaft 122.

A supply flow path 161a is formed in the rear-head disk portion 161. The supply flow path 161a is connected to an injection hole (not shown) that opens in the casing 111, and is connected to the intermediate injection pipe 46. The supply flow path 161a extends horizontally toward a rotation axis CA of the crank shaft 122 from the injection hole of the casing 111, bends upward, and opens in an upper surface of the rear-head disk portion 161. An outlet opening 161a1 of the supply flow path 161a opens at a planar position shown by an alternate long and two short dashed line in FIG. 23. That is, the outlet opening 161a1 of the supply flow path 161a opens into the cylinder chamber 152 on an inner side of the inner peripheral surface 150a1 of the central portion 150a of the cylinder 150. The supply flow path 161a has the role of, when the angle of revolution of the roller 180 of the piston 131 is in a certain range, allowing an intermediate-pressure refrigerant introduced from the outside of the compressor 21b to flow to the compression chamber S1 whose volume changes in the cylinder chamber 152. Therefore, when the angle of revolution of the roller 180 of the piston 131 is in a predetermined range other than the certain range above, the supply flow path is closed by a part of a lower end surface of the roller 180.

(7-4-2-5) Piston

The piston 131 is disposed in the cylinder chamber 152 and is mounted on the crank pin 122a, which is the decentered portion of the crank shaft 122. The piston 131 is a member including the roller 180 and the blade 190 that are integrated with each other. The blade 190 of the piston 131 is disposed in the blade swing space 153 that is formed in the cylinder 150 and, as described above, is swingably supported by the cylinder 150 via the bush 135. The blade 190 is slidable with respect to the bush 135, and, during operation, swings and repeatedly moves away from the crank shaft 122 and moves toward the crank shaft 122.

Figure 24:
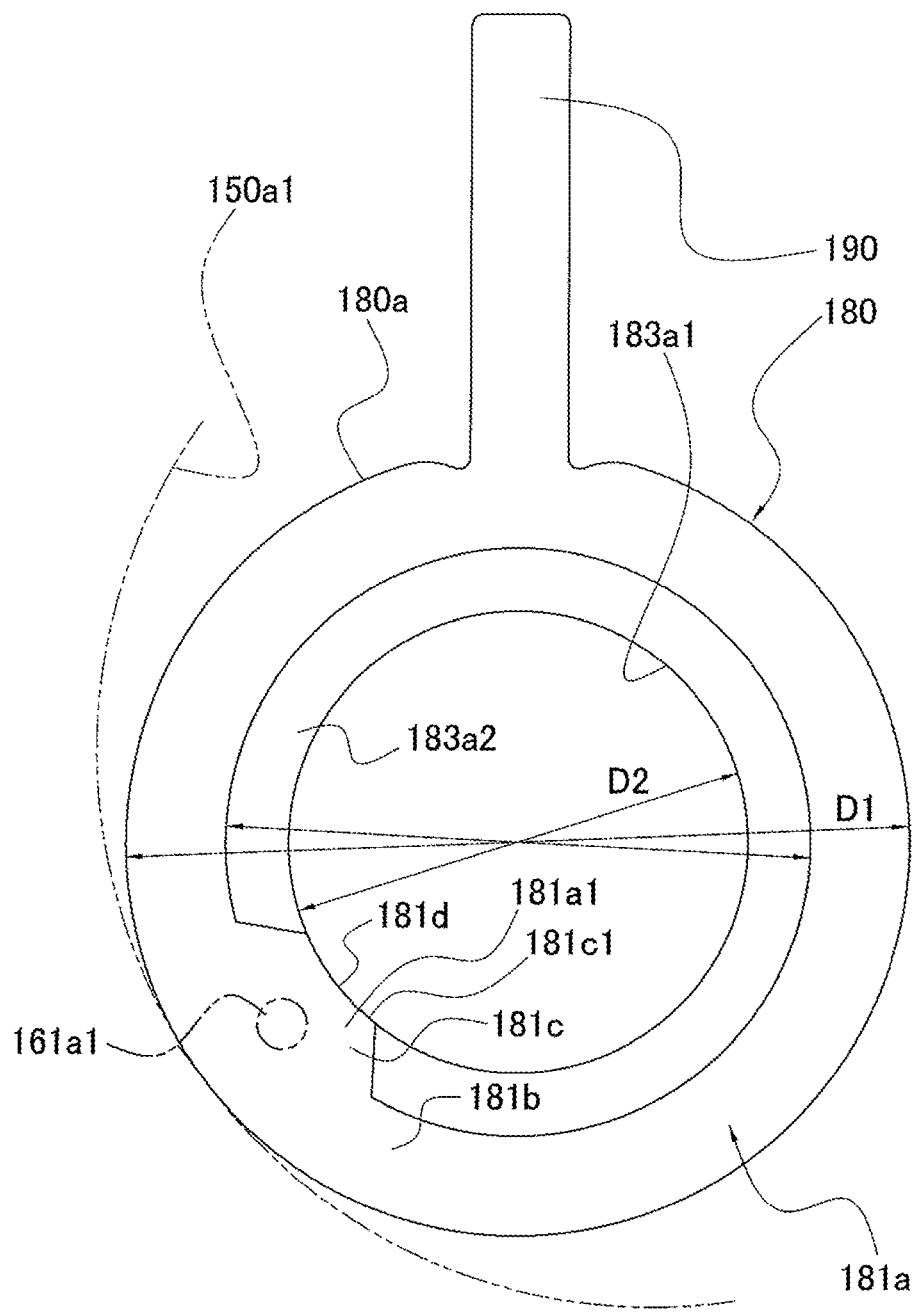
FIG. 24 is a plan sectional view of a piston of the compressor according to the second embodiment.

The roller 180 includes a first end portion 181, where a first end surface 181a that is a roller lower end surface is formed, a second end portion 182, where a second end surface 182a that is a roller upper end surface is formed, and a central portion 183 that is positioned between the first end portion 181 and the second end portion 182. As shown in FIG. 24, the central portion 183 is a circular cylindrical portion having an inside diameter D2 and an outside diameter D1. The first end portion 181 includes a circular cylindrical first main body portion 181b that has an inside diameter D3 and an outside diameter D1, and a first protruding portion 181c that protrudes inward from the first main body portion 181b. The outside diameter D1 of the first main body portion 181b is equal to the outside diameter D1 of the central portion 183. The inside diameter D3 of the first main body portion 181b is larger than the inside diameter D2 of the central portion 183. The second end portion 182 includes a circular cylindrical second main body portion 182b having an inside diameter D3 and an outside diameter D1 and a second protruding portion 182c that protrudes inward from the second main body portion 182b. Similarly to the outside diameter D1 of the first main body portion 181b, the outside diameter D1 of the second main body portion 182b is equal to the outside diameter D1 of the central portion 183. The inside diameter D3 of the second main body portion 182b is equal to the inside diameter D3 of the first main body portion 181b, and is larger than the inside diameter D2 of the central portion 183. An inner surface 181c1 of the first protruding portion 181c and an inner surface 182c1 of the second protruding portion 182c substantially overlap an inner peripheral surface 183a1 of the central portion 183 when viewed in a direction of the rotation axis of the crank shaft 122. In detail, in plan view, the inner surface 181c1 of the first protruding portion 181c and the inner surface 182c1 of the second protruding portion 182c are positioned slightly outward with respect to the inner peripheral surface 183a1 of the central portion 183. In this way, when the first protruding portion 181c and the second protruding portion 182c are excluded, the inside diameters D3 of the first main body portion 181b and the second main body portion 182b are larger than the inside diameter D2 of the central portion 183. Therefore, a first stepped surface 183a2 is formed at a height position of a boundary between the first end portion 181 and the central portion 183, and a second stepped surface 183a3 is formed at a height position of a boundary between the second end portion 182 and the central portion 183 (see FIG. 24).

The ring-shaped first end surface 181a of the first end portion 181 of the roller 180 is in contact with the upper surface of the rear-head disk portion 161, and slides along the upper surface of the rear-head disk portion 161. The first end surface 181a of the roller 180 includes a first wide surface 181a1 whose width in a radial direction is partly large. The first protruding portion 181c of the first end portion 181 and a part of the first main body portion 181b of the first end portion 181 positioned outward with respect to the first protruding portion 181c form the first wide surface 181a1 (see FIG. 24).

The ring-shaped second end surface 182a of the second end portion 182 of the roller 180 is in contact with a lower surface of the front-head disk portion 141, and slides along the lower surface of the front-head disk portion 141. The second end surface 182a of the roller 180 includes a second wide surface 182a1 whose width in a radial direction is partly large. The second wide surface 182a1 is positioned in correspondence with the position of the first wide surface 181a1 when viewed in the direction of the rotation axis of the crank shaft 122. The second protruding portion 182c of the second end portion 182 and a part of the second main body portion 182b of the second end portion 182 positioned outward with respect to the second protruding portion 182c form the second wide surface 182a1.

As shown in FIG. 23, the roller 180 and the blade 190 of the piston 131 form the compression chamber S1 whose volume changes due to the revolution of the piston 131 while partitioning the cylinder chamber 152. The compression chamber S1 is a space that is surrounded by the inner peripheral surface 150a1 of the central portion 150a of the cylinder 150, the upper surface of the rear-head disk portion 161, the lower surface of the front-head disk portion 141, and the piston 131. The volume of the compression chamber S1 changes in accordance with the revolution of the piston 131, a low-pressure refrigerant sucked from the suction hole 151 is compressed and becomes a high-pressure refrigerant, and the refrigerant is discharged to the muffler space S2 from the front-head discharge hole 141a.

(7-4-3) Operation

In the compressor 21b above, movement of the piston 131 of the compression mechanism 130 that revolves due to rotation of the crank pin 122a in a decentered manner causes the volume of the compression chamber S1 to change. Specifically, first, a low-pressure refrigerant from the suction hole 151 is sucked into the compression chamber S1 while the piston 131 revolves. When the compression chamber S1 facing the suction hole 151 is sucking the refrigerant, the volume of the compression chamber S1 gradually increases. When the piston 131 revolves further, the state of communication between the compression chamber S1 and the suction hole 151 is stopped, and compression of the refrigerant is started in the compression chamber S1. Thereafter, after an intermediate-pressure refrigerant has been injected into the compression chamber S1 from the outlet opening 161a1 of the supply flow path 161a, the volume of the compression chamber S1 in a state of communication with the front-head discharge hole 141a becomes considerably small, and the pressure of the refrigerant is increased. Here, the first wide surface 181a1 of the first end surface 181a of the roller 180 of the piston 131 closes the outlet opening 161a1 of the supply flow path 161a of the rear-head disk portion 161, and the intermediate-pressure refrigerant is no longer in a state of being injected to the compression chamber S1. Thereafter, due to further revolution of the piston 131, the refrigerant whose pressure has become high pushes and opens the discharge valve from the front-head discharge hole 141a, and is discharged to the muffler space S2. The refrigerant introduced into the muffler space S2 is discharged to a space above the muffler space S2 from the muffler discharge hole of the muffler 170. The refrigerant discharged to the outside of the muffler space S2 passes through a space between the rotor 123 and the stator 124 of the motor 121, cools the motor 121, and is then discharged from the discharge tube 125.

(7-5) Features of the Second Embodiment

Similarly to the air conditioning apparatus 1 according to the first embodiment, since even the air conditioning apparatus 1b according to the second embodiment uses a refrigerant containing 1,2-difluoroethylene, the air conditioning apparatus 1b can sufficiently reduce GWP.

Since the air conditioning apparatus 1b can reduce the temperature of an intermediate-pressure refrigerant in the compressor 21b by causing a refrigerant that has flowed through the intermediate injection pipe 46 to merge at the region of intermediate pressure of the compressor 21b, the air conditioning apparatus 1b can improve an operation efficiency in a refrigeration cycle.

(7-6) Modification a of the Second Embodiment

Although, in the second embodiment, the air conditioning apparatus 1b is described by using as an example an air conditioning apparatus including a plurality of indoor units that are connected in parallel, an air conditioning apparatus including one indoor unit that is connected in series may be used as the air conditioning apparatus.

(7-7) Modification B of the Second Embodiment

In the second embodiment, the compressor 21b is described by using a rotary compressor as an example.

In contrast, as the compressor that is used in the second embodiment, the compressor 21a, which is the scroll compressor that is described in the Modification B of the first embodiment, may be used.

(7-8) Modification C of the Second Embodiment

The second embodiment is described by using as an example a case in which a gas refrigerant in the high-pressure receiver 42 is caused to merge at the region of intermediate pressure of the compressor 21b by the intermediate injection pipe 46.

In contrast, the gas refrigerant in the high-pressure receiver 42 in the second embodiment may be caused to merge on a suction side instead of at the region of intermediate pressure of the compressor. In this case, by reducing the temperature of the refrigerant that is sucked into the compressor, it is possible to increase the operation efficiency in a refrigeration cycle.

Although the embodiments of the present disclosure are described above, it is to be understood that various changes may be made in the forms and details without departing from the spirit and the scope of the present disclosure described in the claims.

REFERENCE SIGNS LIST 1, 1a, 1b air conditioning apparatus (refrigeration cycle apparatus)
10 refrigerant circuit
19 suction tube (suction flow path)
20 outdoor unit
21, 21a, 21b compressor
23 outdoor heat exchanger (condenser, evaporator)
24 outdoor expansion valve (decompressor)
30 indoor unit, first indoor unit
31 indoor heat exchanger, first indoor heat exchanger (evaporator, condenser)
35 second indoor unit
36 second indoor heat exchanger (evaporator, condenser)
40 suction injection pipe (suction injection flow path, branching flow path)
40a economizer injection pipe (intermediate injection flow path, branching flow path)
42 high-pressure receiver (refrigerant storage tank)
46 intermediate injection pipe (intermediate injection flow path)
47 subcooling heat exchanger (injection heat exchanger)
47a economizer heat exchanger (injection heat exchanger)
48 subcooling expansion valve (opening degree adjusting valve)
48a economizer expansion valve (opening degree adjusting valve)
82 fixed scroll
84 movable scroll (swinging scroll)
196 suction tube (suction flow path)
Sc compression chamber

CITATION LIST

Patent Literature

[Patent Literature 1] International Publication No. 2015/141678

The invention claimed is:

1. A refrigeration cycle apparatus comprising:
a compressor that sucks a refrigerant from a suction flow path, compresses the refrigerant, and discharges a high-pressure refrigerant, the refrigerant flowing through the suction flow path being a low-pressure refrigerant;
a condenser that condenses the high-pressure refrigerant discharged from the compressor;
a decompressor that decompresses the high-pressure refrigerant that has exited from the condenser;
an evaporator that evaporates the refrigerant decompressed at the decompressor; and
an injection flow path that is at least either one of an intermediate injection flow path and a suction injection flow path, the intermediate injection flow path allowing a part of the refrigerant that flows toward the evaporator from the condenser to merge with an intermediate-pressure refrigerant in the compressor, the suction injection flow path allowing a part of the refrigerant that flows toward the evaporator from the condenser to merge with the low-pressure refrigerant that is sucked by the compressor
wherein
the refrigerant comprises trans-1,2-difluoroethylene (HFO-1132(E)), difluoromethane (R32), and 2,3,3,3-tetrafluoro-1-propene (R1234yf),
wherein
when the mass % of HFO-1132(E), R32, and R1234yf based on their sum in the refrigerant is respectively represented by x, y, and z, coordinates (x,y,z) in a ternary composition diagram in which the sum of HFO-1132(E), R32, and R1234yf is 100 mass % are within the range of a figure surrounded by line segments IJ, JN, NE, and EI that connect the following 4 points:
point I (72.0, 0.0, 28.0),
point J (48.5, 18.3, 33.2),
point N (27.7, 18.2, 54.1), and
point E (58.3, 0.0, 41.7),
or on these line segments (excluding the points on the line segment EI;
the line segment U is represented by coordinates $(0.0236y^2-1.7616y+72.0, y, -0.0236y^2+0.7616y+28.0)$;
the line segment NE is represented by coordinates $(0.012y^2-1.9003y+58.3, y, -0.012y^2+0.9003y+41.7)$; and
the line segments JN and EI are straight lines.

2. The refrigeration cycle apparatus according to claim 1, further comprising:
a branching flow path that branches off from a main refrigerant flow path that connects the condenser and the evaporator to each other;
an opening degree adjusting valve that is provided in the branching flow path; and
an injection heat exchanger that causes the refrigerant that flows in the main refrigerant flow path and the refrigerant that flows on a downstream side with respect to the opening degree adjusting valve in the branching flow path to exchange heat,
wherein the refrigerant that exits from the injection heat exchanger and flows in the branching flow path flows in the injection flow path.

3. The refrigeration cycle apparatus according to claim 1, further comprising:
a refrigerant storage tank that is provided in a main refrigerant flow path that connects the condenser and the evaporator to each other,
wherein a gas component of the refrigerant that accumulates in the refrigerant storage tank flows in the injection flow path.

4. The refrigeration cycle apparatus according to claim 1, wherein
the compressor includes a fixed scroll and a swinging scroll, the fixed scroll including an end plate and a lap that stands spirally from the end plate, the swinging scroll forming a compression chamber (Sc) by engaging with the fixed scroll, and
the refrigerant that flows in the injection flow path merges at the compression chamber.

5. A refrigeration cycle apparatus comprising:
a compressor that sucks a refrigerant from a suction flow path, compresses the refrigerant, and discharges a high-pressure refrigerant, the refrigerant flowing through the suction flow path being a low-pressure refrigerant;
a condenser that condenses the high-pressure refrigerant discharged from the compressor;
a decompressor that decompresses the high-pressure refrigerant that has exited from the condenser;
an evaporator that evaporates the refrigerant decompressed at the decompressor; and
an injection flow path that is at least either one of an intermediate injection flow path and a suction injection flow path, the intermediate injection flow path allowing a part of the refrigerant that flows toward the evaporator from the condenser to merge with an intermediate-pressure refrigerant in the compressor, the suction injection flow path allowing a part of the refrigerant that flows toward the evaporator from the condenser to merge with the low-pressure refrigerant that is sucked by the compressor,
wherein
the refrigerant comprises trans-1,2-difluoroethylene (HFO-1132(E)), difluoromethane (R32), and 2,3,3,3-tetrafluoro-1-propene (R1234yf),
wherein
when the mass % of HFO-1132(E), R32, and R1234yf based on their sum in the refrigerant is respectively represented by x, y, and z, coordinates (x,y,z) in a ternary composition diagram in which the sum of HFO-1132(E), R32, and R1234yf is 100 mass % are within the range of a figure surrounded by line segments MM', M'N, NV, VG; and GM that connect the following 5 points:
point M (52.6, 0.0, 47.4),
point M'(39.2, 5.0, 55.8),
point N (27.7, 18.2, 54.1),
point V (11.0, 18.1, 70.9), and
point G (39.6, 0.0, 60.4),
or on these line segments (excluding the points on the line segment GM);
the line segment MM' is represented by coordinates $(0.132y^2-3.34y+52.6, y, -0.132y^2+2.34y+47.4)$;
the line segment MN is represented by coordinates $(0.0596y^2-2.2541y+48.98, y, -0.0596y^2+1.2541y+51.02)$;
the line segment VG is represented by coordinates $(0.0123y^2-1.8033y+39.6, y, -0.0123y^2+0.8033y+60.4)$; and
the line segments NV and GM are straight lines.

6. The refrigeration cycle apparatus according to claim 5, further comprising:
a branching flow path that branches off from a main refrigerant flow path that connects the condenser and the evaporator to each other;
an opening degree adjusting valve that is provided in the branching flow path; and
an injection heat exchanger that causes the refrigerant that flows in the main refrigerant flow path and the refrigerant that flows on a downstream side with respect to the opening degree adjusting valve in the branching flow path to exchange heat,
wherein the refrigerant that exits from the injection heat exchanger and flows in the branching flow path flows in the injection flow path.

7. The refrigeration cycle apparatus according to claim 5, further comprising:
a refrigerant storage tank that is provided in a main refrigerant flow path that connects the condenser and the evaporator to each other,
wherein a gas component of the refrigerant that accumulates in the refrigerant storage tank flows in the injection flow path.

8. The refrigeration cycle apparatus according to claim 5, wherein
the compressor includes a fixed scroll and a swinging scroll, the fixed scroll including an end plate and a lap that stands spirally from the end plate, the swinging scroll forming a compression chamber (Sc) by engaging with the fixed scroll, and
the refrigerant that flows in the injection flow path merges at the compression chamber.

9. A refrigeration cycle apparatus comprising:
a compressor that sucks a refrigerant from a suction flow path, compresses the refrigerant, and discharges a high-pressure refrigerant, the refrigerant flowing through the suction flow path being a low-pressure refrigerant;
a condenser that condenses the high-pressure refrigerant discharged from the compressor;
a decompressor that decompresses the high-pressure refrigerant that has exited from the condenser;
an evaporator that evaporates the refrigerant decompressed at the decompressor; and
an injection flow path that is at least either one of an intermediate injection flow path and a suction injection flow path, the intermediate injection flow path allowing a part of the refrigerant that flows toward the evaporator from the condenser to merge with an intermediate-pressure refrigerant in the compressor, the suction injection flow path allowing a part of the refrigerant that flows toward the evaporator from the condenser to merge with the low-pressure refrigerant that is sucked by the compressor,
wherein
the refrigerant comprises trans-1,2-difluoroethylene (HFO-1132(E)), difluoromethane (R32), and 2,3,3,3-tetrafluoro-1-propene (R1234yf),
wherein
when the mass % of HFO-1132(E), R32, and R1234yf based on their sum in the refrigerant is respectively represented by x, y and z, coordinates (x,y,z) in a ternary composition diagram in which the sum of HFO-1132(E), R32, and R1234yf is 100 mass % are within the range of a figure surrounded by line segments ON, NU, and UO that connect the following 3 points:
point O (22.6, 36.8, 40.6),
point N (27.7, 18.2, 54.1), and
point U (3.9, 36.7, 59.4),
or on these line segments;
the line segment ON is represented by coordinates $(0.0072y^2-0.6701y+37.512, y, -0.0072y^2-0.3299y+62.488)$;
the line segment NU is represented by coordinates $(0.0083y^2-1.7403y+56.635, y, -0.0083y^2+0.7403y+43.365)$; and
the line segment UO is a straight line.

10. The refrigeration cycle apparatus according to claim 9, further comprising:
a branching flow path that branches off from a main refrigerant flow path that connects the condenser and the evaporator to each other;
an opening degree adjusting valve that is provided in the branching flow path; and
an injection heat exchanger that causes the refrigerant that flows in the main refrigerant flow path and the refrigerant that flows on a downstream side with respect to the opening degree adjusting valve in the branching flow path to exchange heat,
wherein the refrigerant that exits from the injection heat exchanger and flows in the branching flow path flows in the injection flow path.

11. The refrigeration cycle apparatus according to claim 9, further comprising:
a refrigerant storage tank that is provided in a main refrigerant flow path that connects the condenser and the evaporator to each other,
wherein a gas component of the refrigerant that accumulates in the refrigerant storage tank flows in the injection flow path.

12. The refrigeration cycle apparatus according to claim 9, wherein
the compressor includes a fixed scroll and a swinging scroll, the fixed scroll including an end plate and a lap that stands spirally from the end plate, the swinging scroll forming a compression chamber (Sc) by engaging with the fixed scroll, and
the refrigerant that flows in the injection flow path merges at the compression chamber.

13. A refrigeration cycle apparatus comprising:
a compressor that sucks a refrigerant from a suction flow path, compresses the refrigerant, and discharges a high-pressure refrigerant, the refrigerant flowing through the suction flow path being a low-pressure refrigerant;
a condenser that condenses the high-pressure refrigerant discharged from the compressor;
a decompressor that decompresses the high-pressure refrigerant that has exited from the condenser;
an evaporator that evaporates the refrigerant decompressed at the decompressor; and
an injection flow path that is at least either one of an intermediate injection flow path and a suction injection flow path, the intermediate injection flow path allowing a part of the refrigerant that flows toward the evaporator from the condenser to merge with an intermediate-pressure refrigerant in the compressor, the suction injection flow path allowing a part of the refrigerant that flows toward the evaporator from the condenser to merge with the low-pressure refrigerant that is sucked by the compressor,
wherein
the refrigerant comprises trans-1,2-difluoroethylene (HFO-1132(E)), difluoromethane (R32), and 2,3,3,3-tetrafluoro-1-propene (R1234yf), wherein
  when the mass % of HFO-1132(E), R32, and R1234yf based on their sum in the refrigerant is respectively represented by x, y, and z, coordinates (x,y,z) in a ternary composition diagram in which the sum of HFO-1132(E), R32, and R1234yf is 100 mass % are within the range of a figure surrounded by line segments QR, RT, TL, LK, and KQ that connect the following 5 points:
  point Q (44.6, 23.0, 32.4),
  point R (25.5, 36.8, 37.7),
  point T (8.6, 51.6, 39.8),
  point L (28.9, 51.7, 19.4), and
  point K (35.6, 36.8, 27.6),
  or on these line segments;
    the line segment QR is represented by coordinates ($0.0099y^2-1.975y+84.765$, y, $-0.0099y^2+0.975y+15.235$);
    the line segment RT is represented by coordinates ($0.0082y^2-1.8683y+83.126$, y, $-0.0082y^2+0.8683y+16.874$);
    the line segment LK is represented by coordinates ($0.0049y^2-0.8842y+61.488$, y, $-0.0049y^2-0.1158y+38.512$);
    the line segment KQ is represented by coordinates ($0.0095y^2-1.2222y+67.676$, y, $-0.0095y^2+0.2222y+32.324$); and
    the line segment TL is a straight line.

14. The refrigeration cycle apparatus according to claim 13, further comprising:
  a branching flow path that branches off from a main refrigerant flow path that connects the condenser and the evaporator to each other;
  an opening degree adjusting valve that is provided in the branching flow path; and
  an injection heat exchanger that causes the refrigerant that flows in the main refrigerant flow path and the refrigerant that flows on a downstream side with respect to the opening degree adjusting valve in the branching flow path to exchange heat,
  wherein the refrigerant that exits from the injection heat exchanger and flows in the branching flow path flows in the injection flow path.

15. The refrigeration cycle apparatus according to claim 13, further comprising:
  a refrigerant storage tank that is provided in a main refrigerant flow path that connects the condenser and the evaporator to each other,
  wherein a gas component of the refrigerant that accumulates in the refrigerant storage tank flows in the injection flow path.

16. The refrigeration cycle apparatus according to claim 13, wherein
  the compressor includes a fixed scroll and a swinging scroll, the fixed scroll including an end plate and a lap that stands spirally from the end plate, the swinging scroll forming a compression chamber (Sc) by engaging with the fixed scroll, and
  the refrigerant that flows in the injection flow path merges at the compression chamber.

17. The refrigeration cycle apparatus according claim 1, A refrigeration cycle apparatus comprising:
  a compressor that sucks a refrigerant from a suction flow path, compresses the refrigerant, and discharges a high-pressure refrigerant, the refrigerant flowing through the suction flow path being a low-pressure refrigerant;
  a condenser that condenses the high-pressure refrigerant discharged from the compressor;
  a decompressor that decompresses the high-pressure refrigerant that has exited from the condenser;
  an evaporator that evaporates the refrigerant decompressed at the decompressor; and
  an injection flow path that is at least either one of an intermediate injection flow path and a suction injection flow path, the intermediate injection flow path allowing a part of the refrigerant that flows toward the evaporator from the condenser to merge with an intermediate-pressure refrigerant in the compressor, the suction injection flow path allowing a part of the refrigerant that flows toward the evaporator from the condenser to merge with the low-pressure refrigerant that is sucked by the compressor,
  wherein
    the refrigerant comprises trans-1,2-difluoroethylene (HFO-1132(E)), difluoromethane (R32), and 2,3,3,3-tetrafluoro-1-propene (R1234yf),
  wherein
    when the mass % of HFO-1132(E), R32, and R1234yf based on their sum in the refrigerant is respectively represented by x, y, and z, coordinates (x,y,z) in a ternary composition diagram in which the sum of HFO-1132(E), R32, and R1234yf is 100 mass % are within the range of a figure surrounded by line segments PS, ST, and TP that connect the following 3 points:
  point P (20.5, 51.7, 27.8),
  point S (21.9, 39.7, 38.4), and
  point T (8.6, 51.6, 39.8),
  or on these line segments;
    the line segment PS is represented by coordinates ($0.0064y^2-0.7103y+40.1$, y, $-0.0064y^2-0.2897y+59.9$);
    the line segment ST is represented by coordinates ($0.0082y^2-1.8683y+83.126$, y, $-0.0082y^2+0.8683y+16.874$); and
    the line segment TP is a straight line.

18. The refrigeration cycle apparatus according to claim 17, further comprising:
  a branching flow path that branches off from a main refrigerant flow path that connects the condenser and the evaporator to each other;
  an opening degree adjusting valve that is provided in the branching flow path; and
  an injection heat exchanger that causes the refrigerant that flows in the main refrigerant flow path and the refrigerant that flows on a downstream side with respect to the opening degree adjusting valve in the branching flow path to exchange heat,
  wherein the refrigerant that exits from the injection heat exchanger and flows in the branching flow path flows in the injection flow path.

19. The refrigeration cycle apparatus according to claim 17, further comprising:
  a refrigerant storage tank that is provided in a main refrigerant flow path that connects the condenser and the evaporator to each other,
  wherein a gas component of the refrigerant that accumulates in the refrigerant storage tank flows in the injection flow path.

20. The refrigeration cycle apparatus according to claim 17, wherein
  the compressor includes a fixed scroll and a swinging scroll, the fixed scroll including an end plate and a lap that stands spirally from the end plate, the swinging scroll forming a compression chamber (Sc) by engaging with the fixed scroll, and the refrigerant that flows in the injection flow path merges at the compression chamber.

* * * * *